United States Patent [19]

Ehrsam et al.

[11] 4,227,253

[45] Oct. 7, 1980

[54] CRYPTOGRAPHIC COMMUNICATION SECURITY FOR MULTIPLE DOMAIN NETWORKS

[75] Inventors: William F. Ehrsam, Kingston; Robert C. Elander, Saugerties, both of N.Y.; Lloyd L. Hollis, Cary, N.C.; Richard E. Lennon, Woodstock, N.Y.; Stephen M. Matyas, Poughkeepsie, N.Y.; Carl H. W. Meyer, Kingston, N.Y.; Jonathan Oseas, Hurley, N.Y.; Walter L. Tuchman, Woodstock, N.Y.

[73] Assignee: International Business Machines Corporation, Armonk, N.Y.

[21] Appl. No.: 857,531

[22] Filed: Dec. 5, 1977

[51] Int. Cl.³ .............................................. H04L 9/00
[52] U.S. Cl. ...................................... 375/2; 364/200; 340/149 R
[58] Field of Search ......... 178/22; 340/149 R, 149 A, 340/152 R

[56] References Cited

U.S. PATENT DOCUMENTS

| | | | |
|---|---|---|---|
| 3,938,091 | 2/1976 | Atalla et al. | 340/152 R |
| 3,956,615 | 5/1976 | Anderson et al. | 178/22 |
| 3,985,998 | 10/1976 | Crafton | 340/149 A |
| 4,004,089 | 1/1977 | Richard et al. | 340/149 A |
| 4,025,760 | 5/1977 | Trenkamp | 340/149 A |
| 4,120,030 | 10/1978 | Johnstone | 178/22 |

Primary Examiner—Howard A. Birmiel
Attorney, Agent, or Firm—Edwin Lester

[57] ABSTRACT

A communication security system for data transmissions between different domains of a multiple domain communication network where each domain includes a host system and its associated resources of programs and communication terminals. The host systems and communication terminals include data security devices each having a master key which permits a variety of cryptographic operations to be performed. When a host system in one domain wishes to communicate with a host system in another domain, a common session key is established at both host systems to permit cryptographic operations to be performed. This is accomplished by using a mutually agreed upon cross-domain key known by both host systems and does not require each host system to reveal its master key to the other host system. The cross domain key is enciphered under a key encrypting key designated as the sending cross domain key at the sending host system and under a different key encrypting key designated as the receiving cross domain key at the receiving host system. The sending host system creates an enciphered session key and together with the sending cross-domain key performs a transformation function to reencipher the session key under the sending cross domain key for transmission to the receiving host system. At the receiving host system, the receiving host system using the receiving cross-domain key and the received session key, performs a transformation function to reencipher the received session key fron encipherment under the sending cross domain key to encipherment under the receiving host system master key. With the common session key now available in usable form at both host systems, a communication session is established and cryptographic operations can proceed between the two host systems.

47 Claims, 66 Drawing Figures

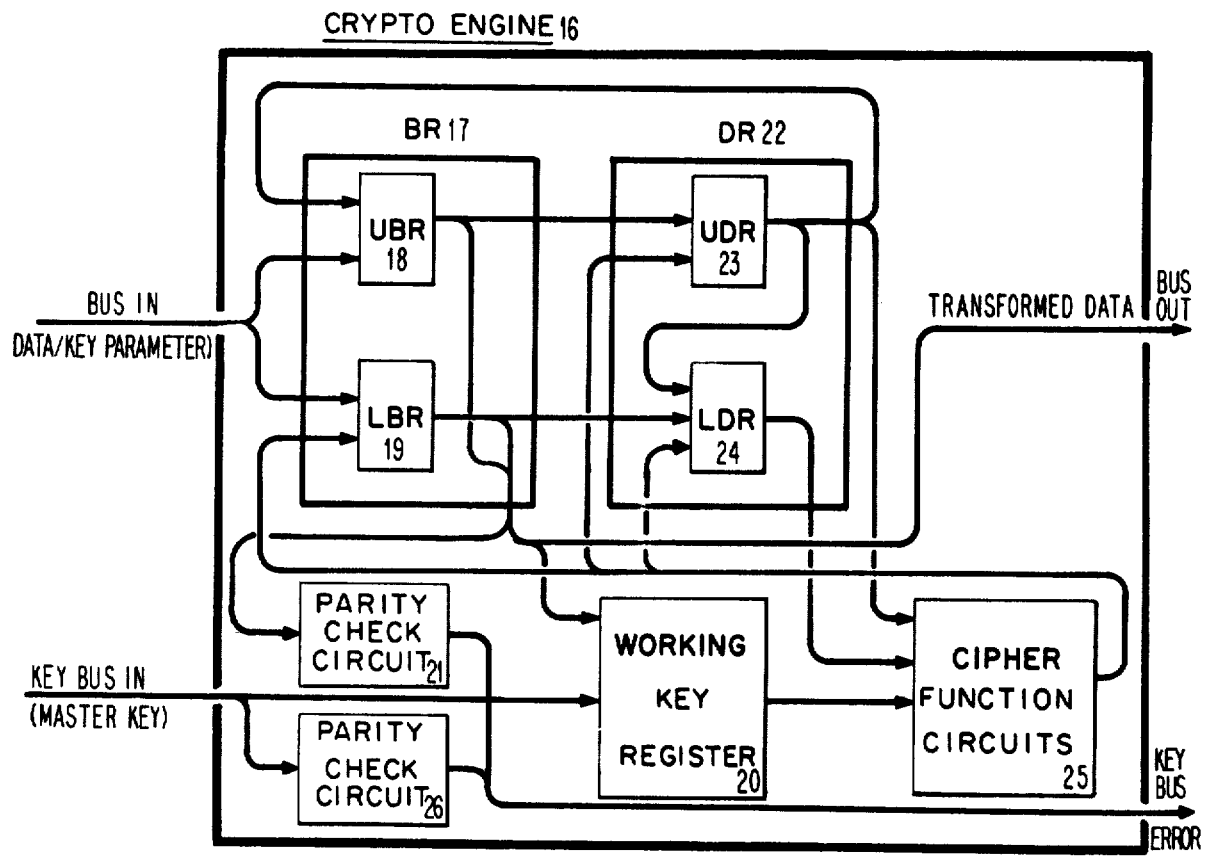
FIG. 3
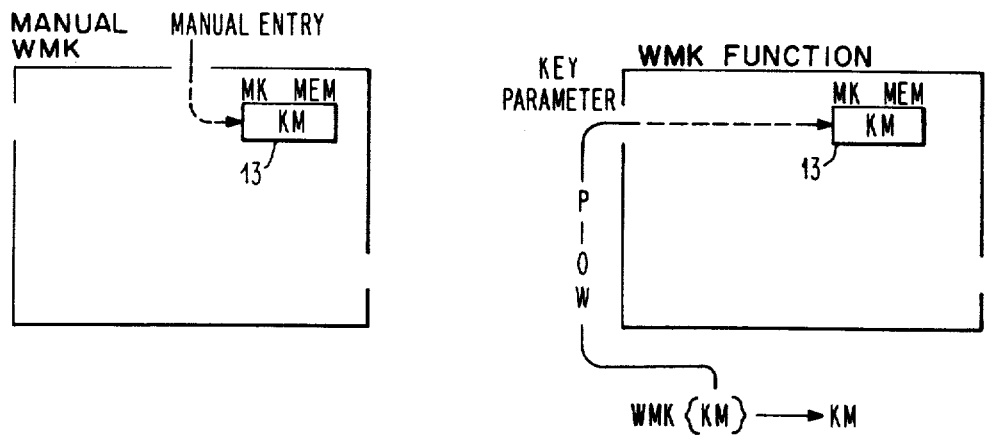
FIG. 4
FIG. 5

FIG. 26

|   | Fig.26c1 | Fig.26d1 | Fig.26e1 | Fig.26f1 | Fig.26g1 | Fig.26h1 |   |
|---|---|---|---|---|---|---|---|
| Fig.26a1 | Fig.26b1 | Fig.26c2 | Fig.26d2 | Fig.26e2 | Fig.26f2 | Fig.26g2 | Fig.26h2 |
| Fig.26a2 | Fig.26b2 | Fig.26c3 | Fig.26d3 | Fig.26e3 | Fig.26f3 | Fig.26g3 | Fig.26h3 | Fig.26i1 |
|   | Fig.26b2' | Fig.26c3' | Fig.26d4 | Fig.26e4 | Fig.26f4 | Fig.26g4 | Fig.26h4 | Fig.26i2 |
|   | Fig.26b3 | Fig.26c4 | Fig.26d5 | Fig.26e5 |   |   |   |   |

FIG. 28A  WMK BY PIOW CMDS
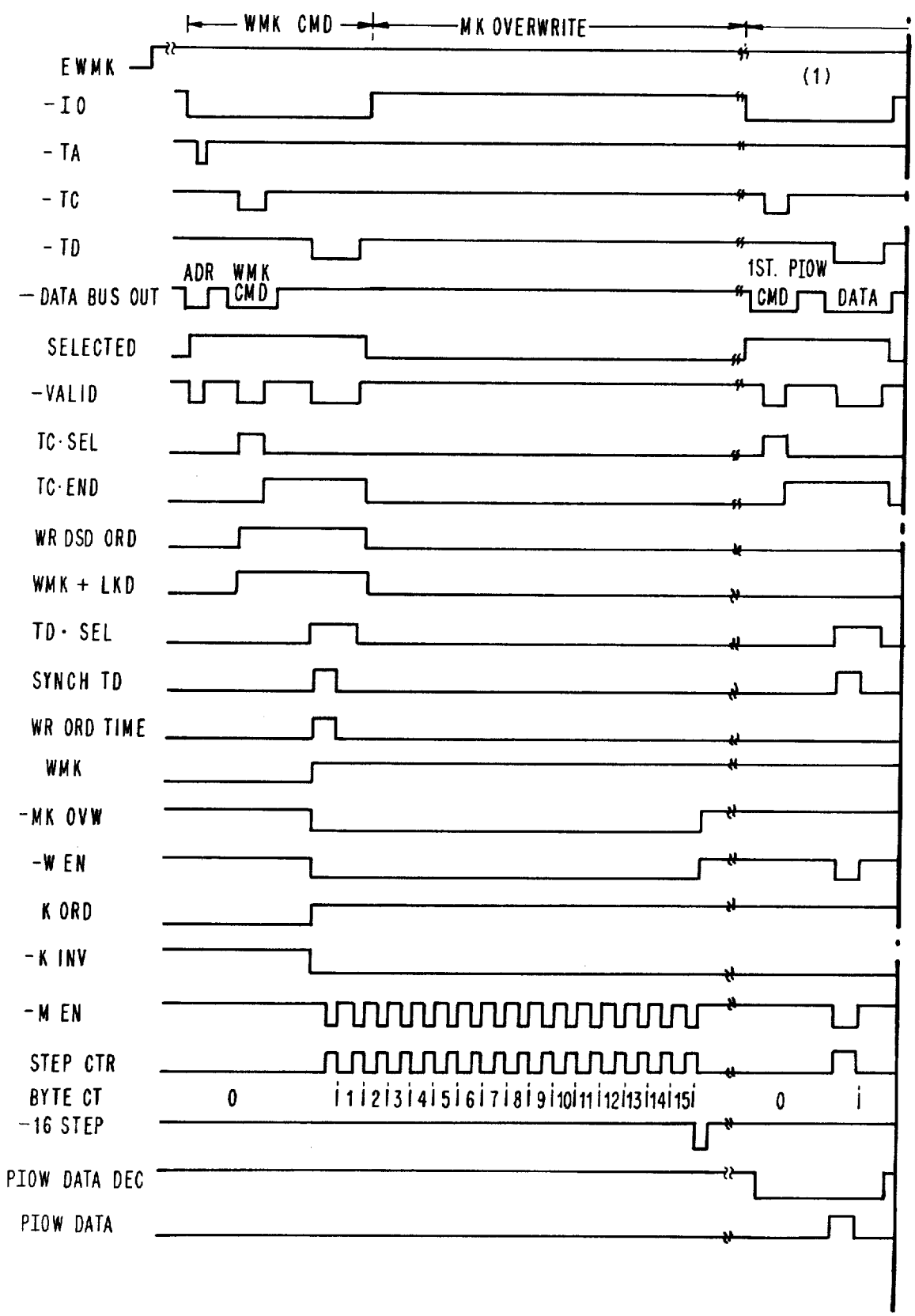

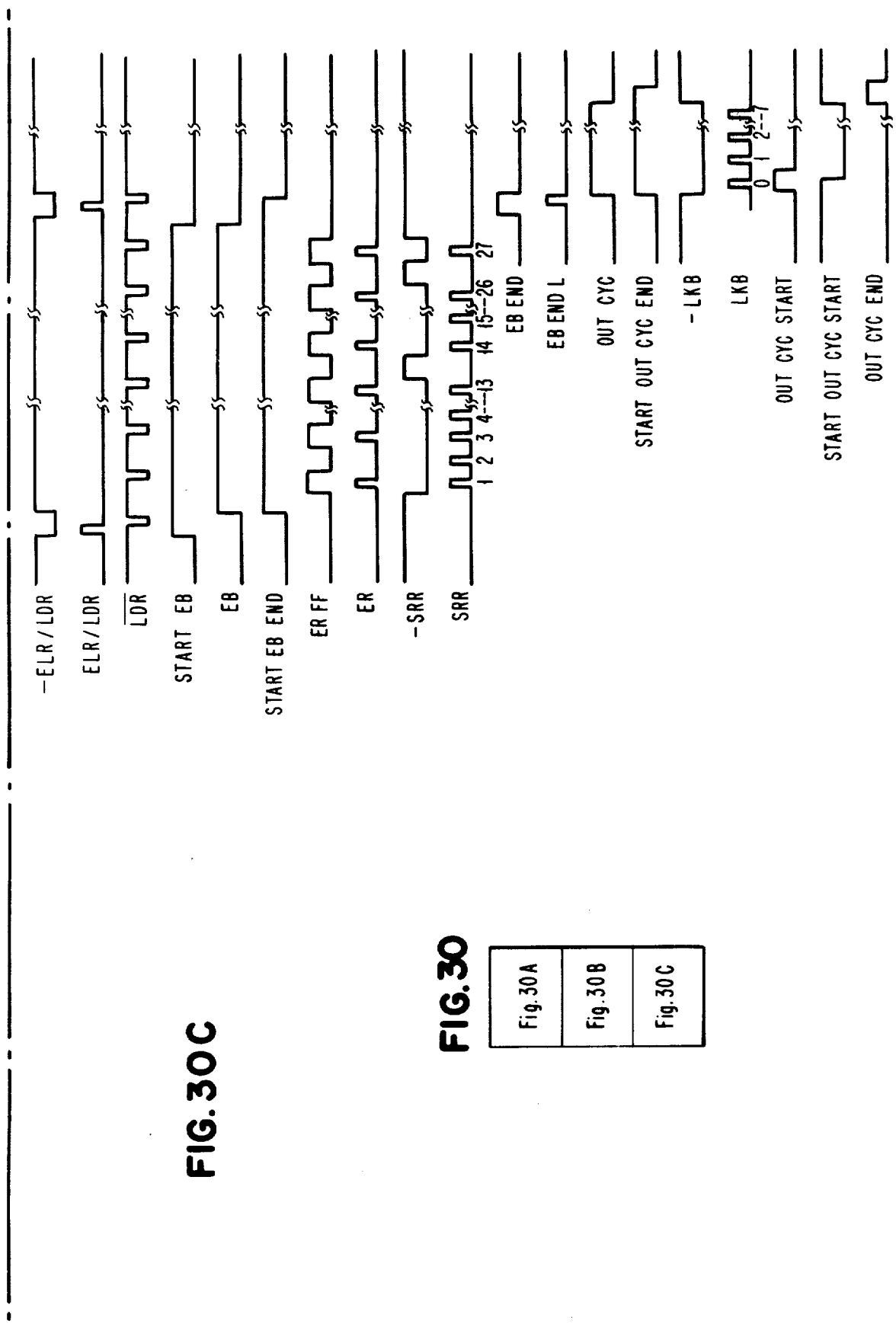

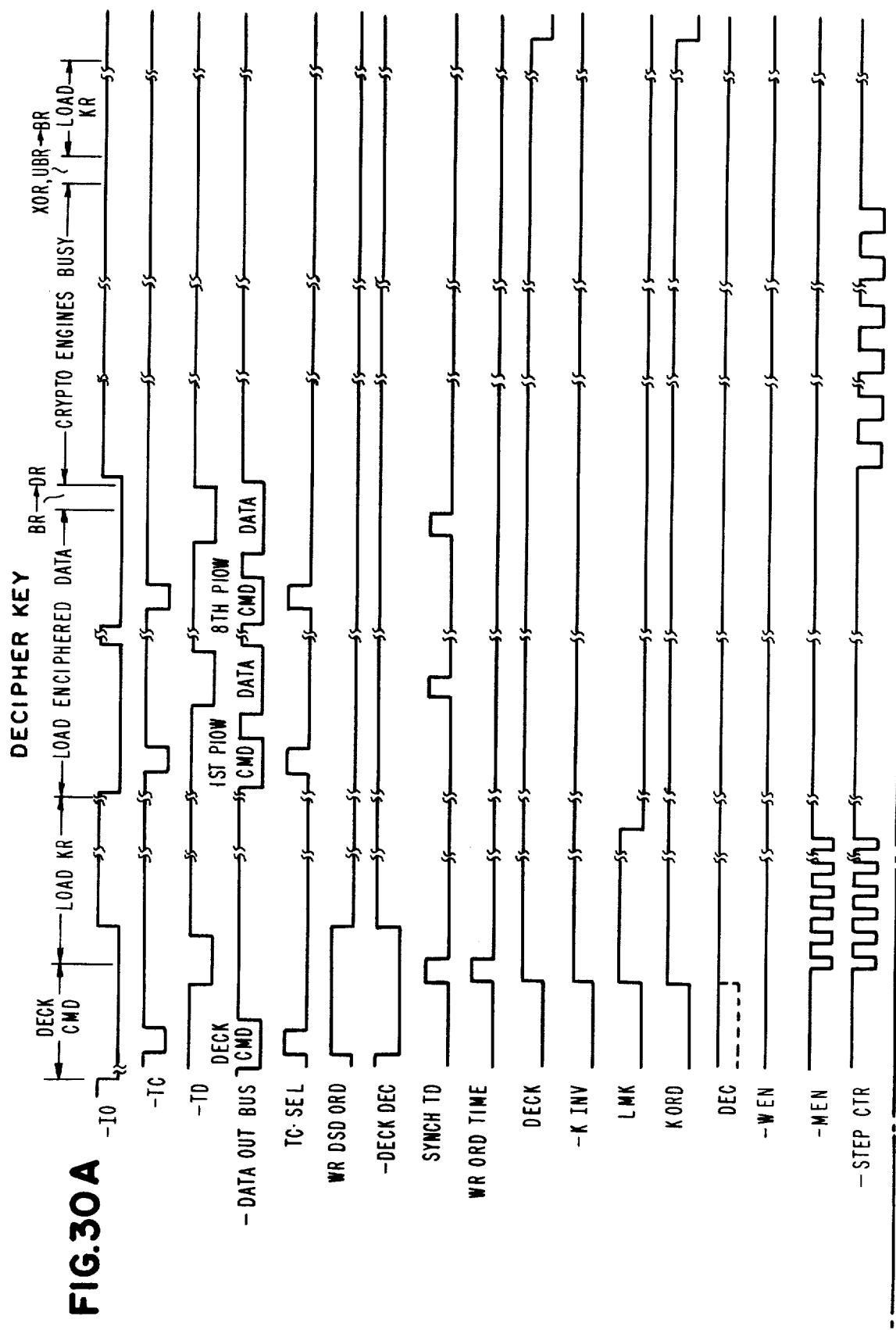

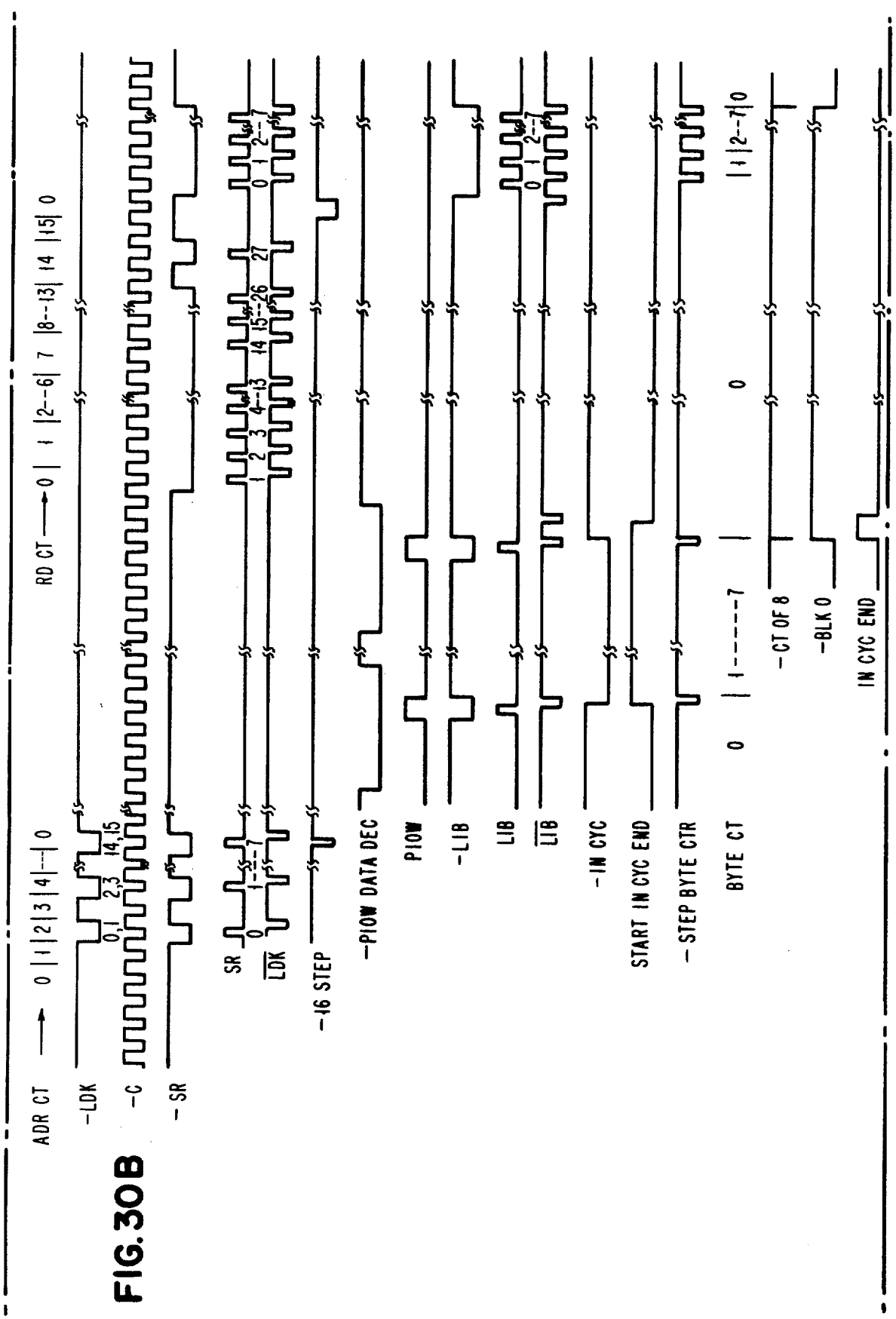

| Fig.31A | Fig.31B |
|---------|---------|
| Fig.31C | Fig.31D |

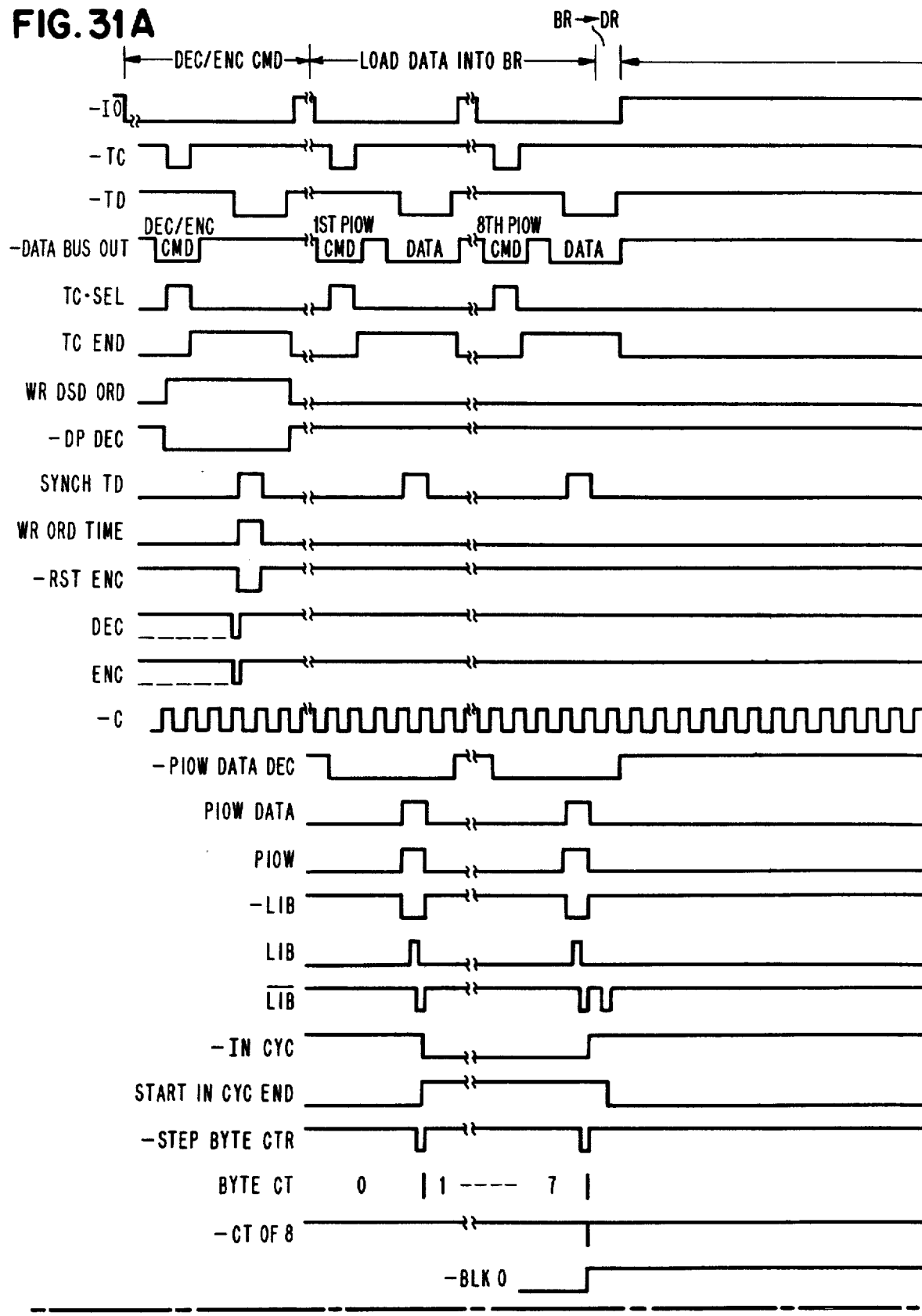
FIG. 31A DECIPHER/ENCIPHER

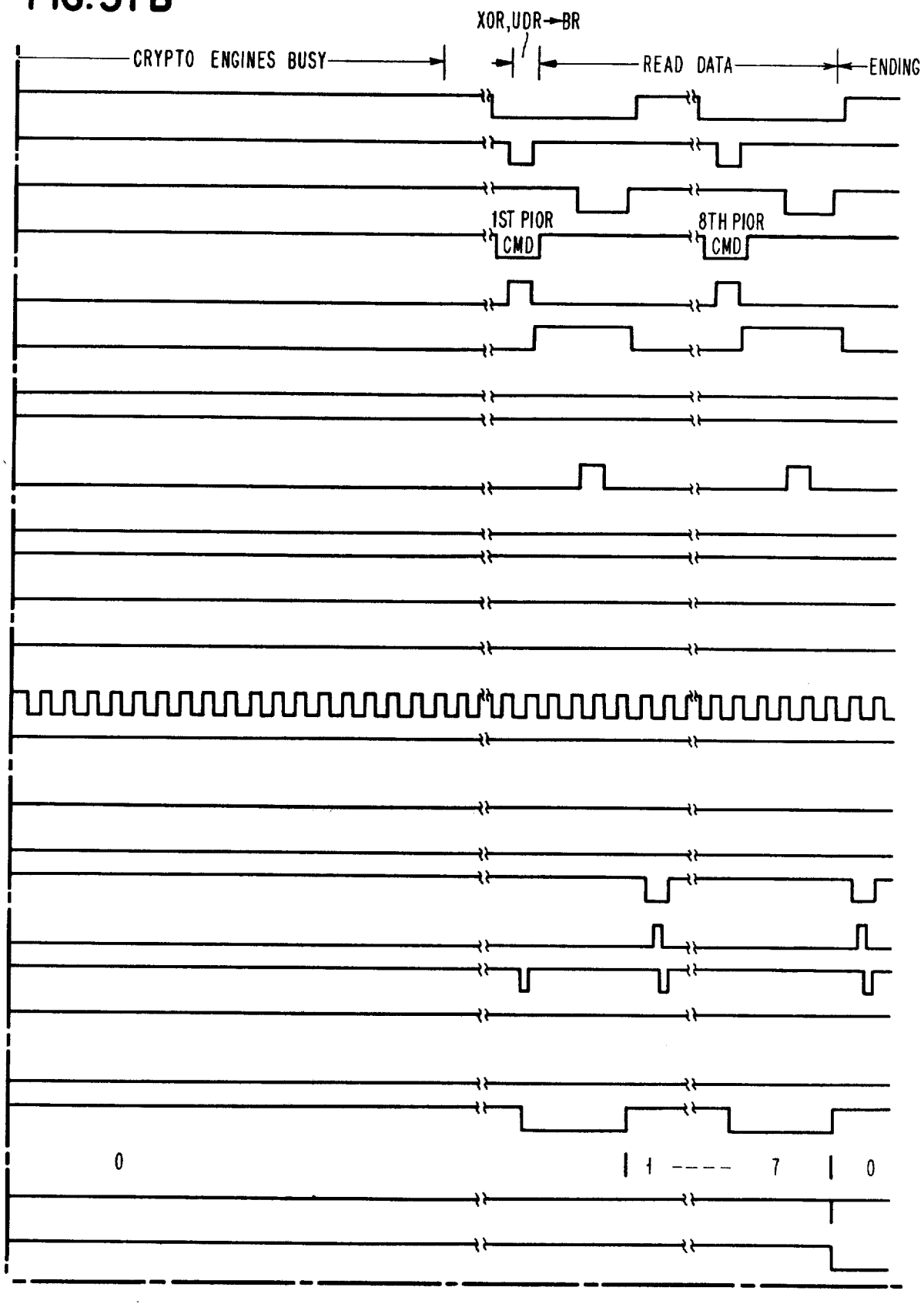
FIG. 31B DECIPHER / ENCIPHER

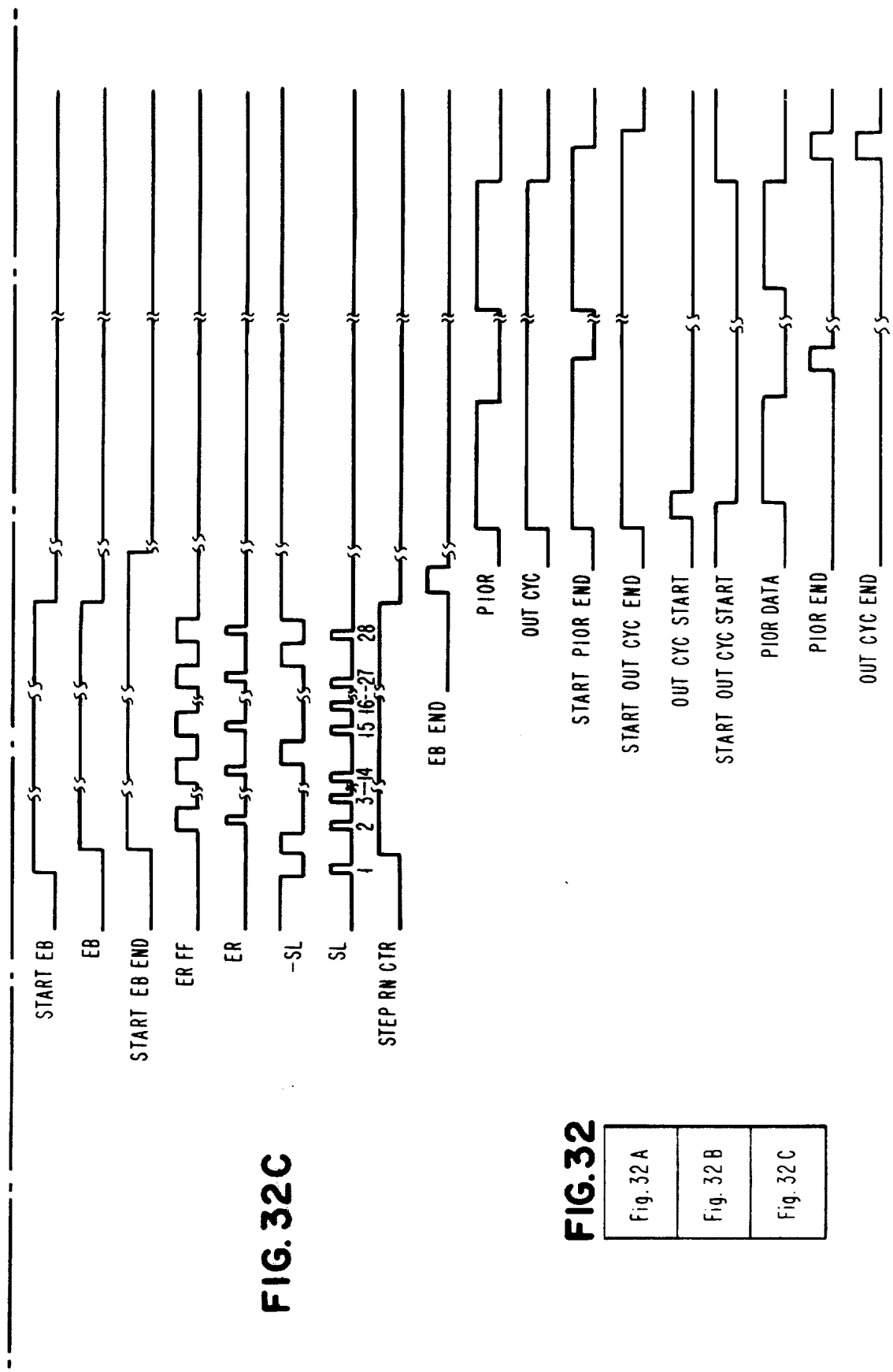

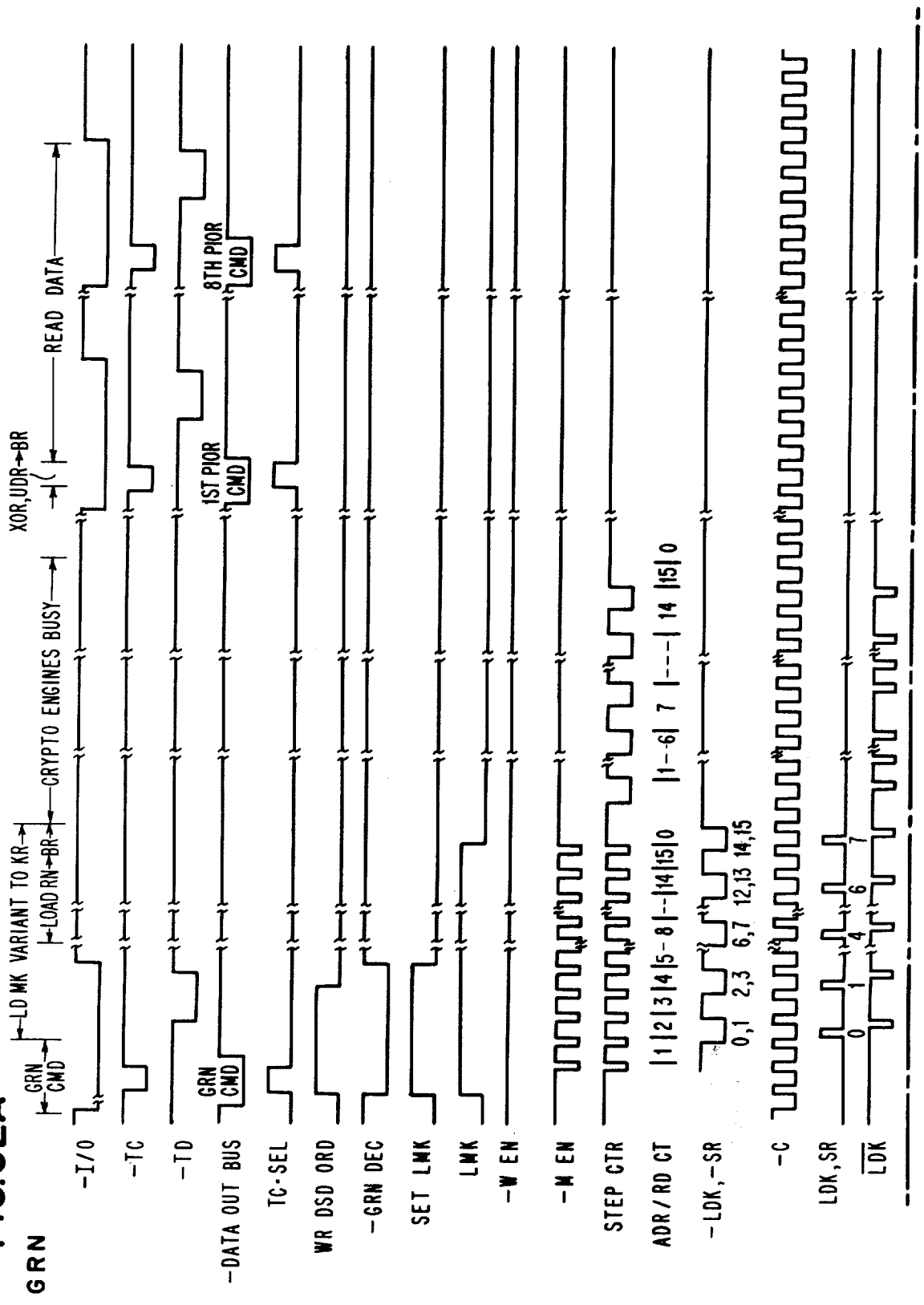

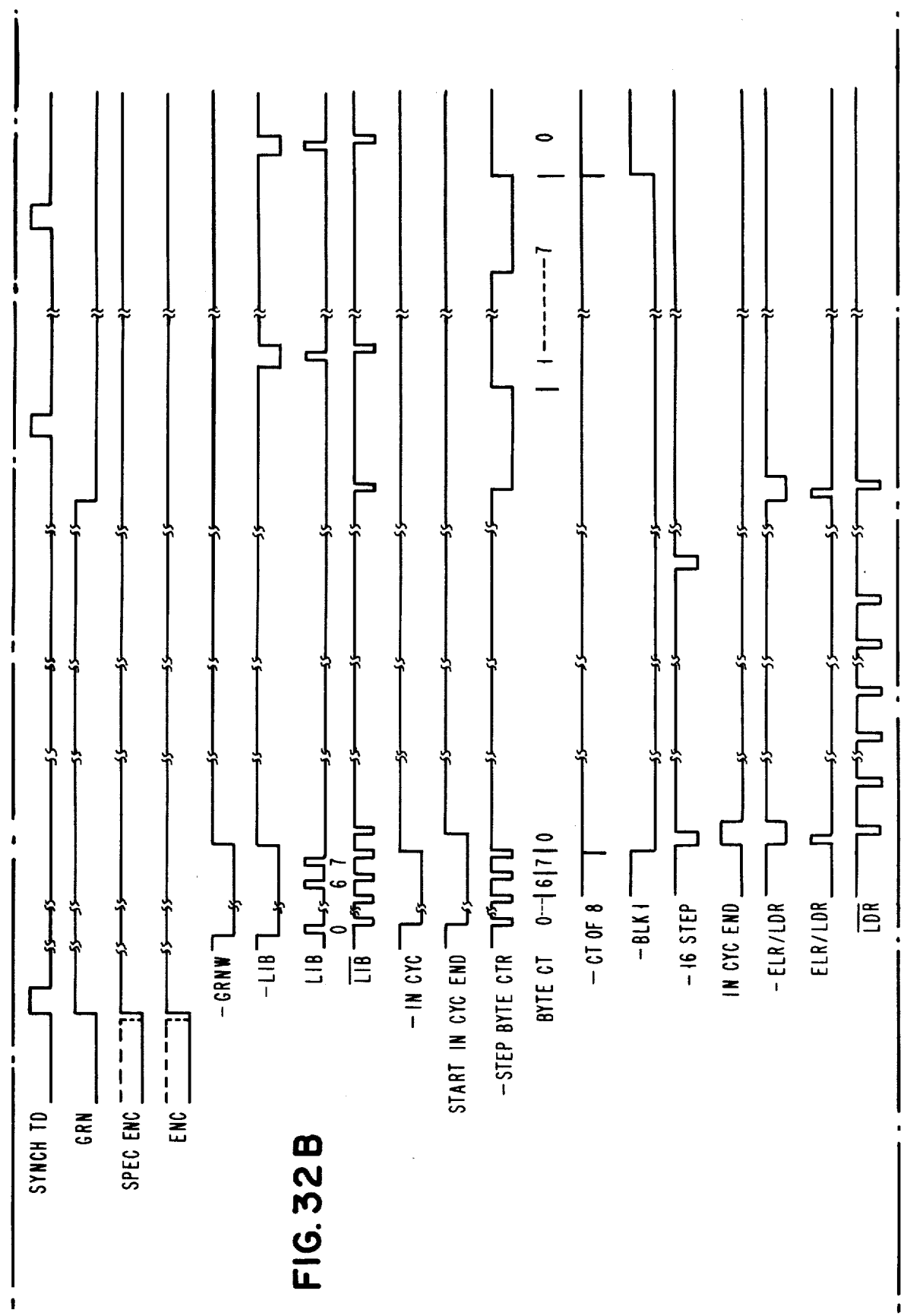

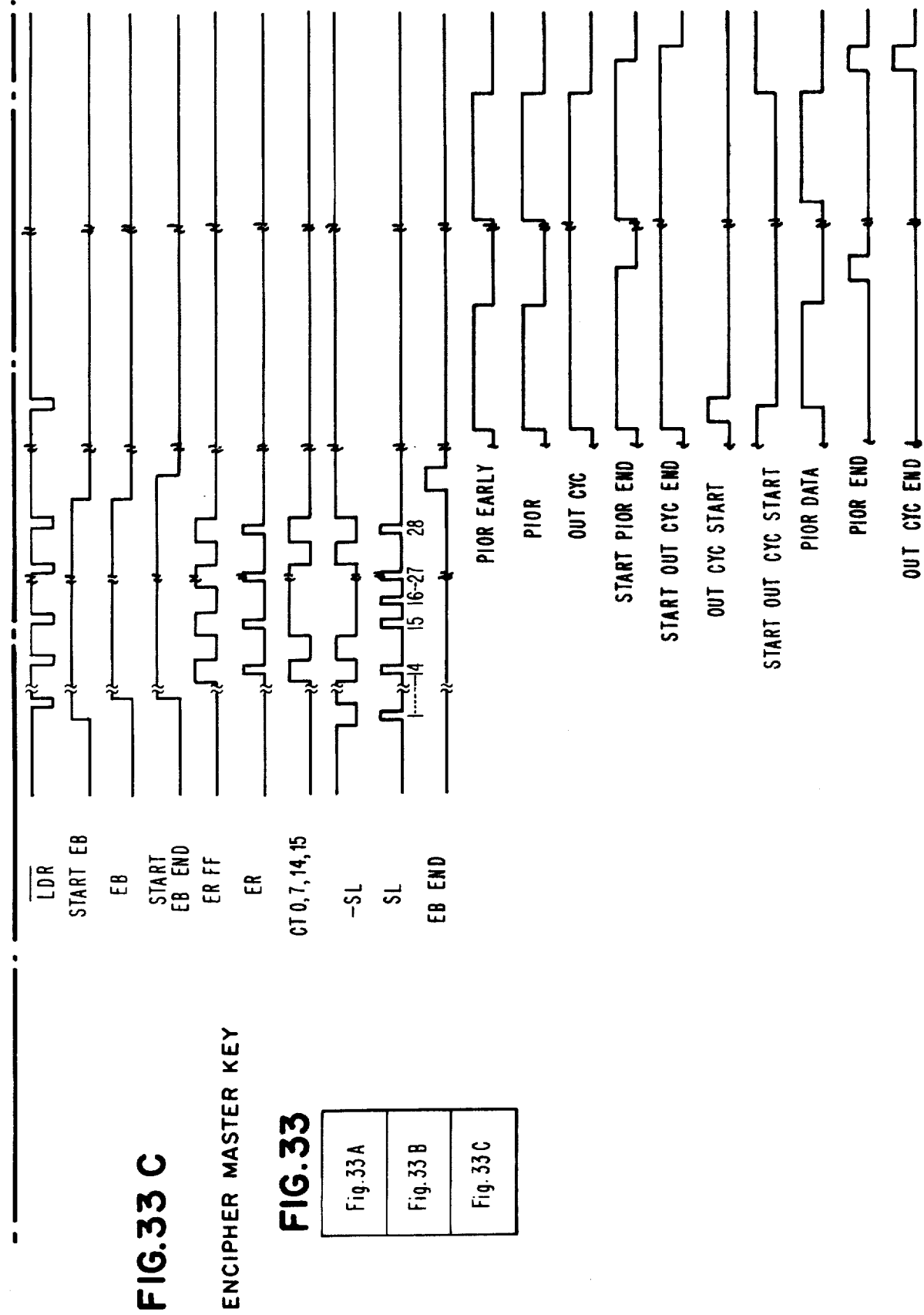

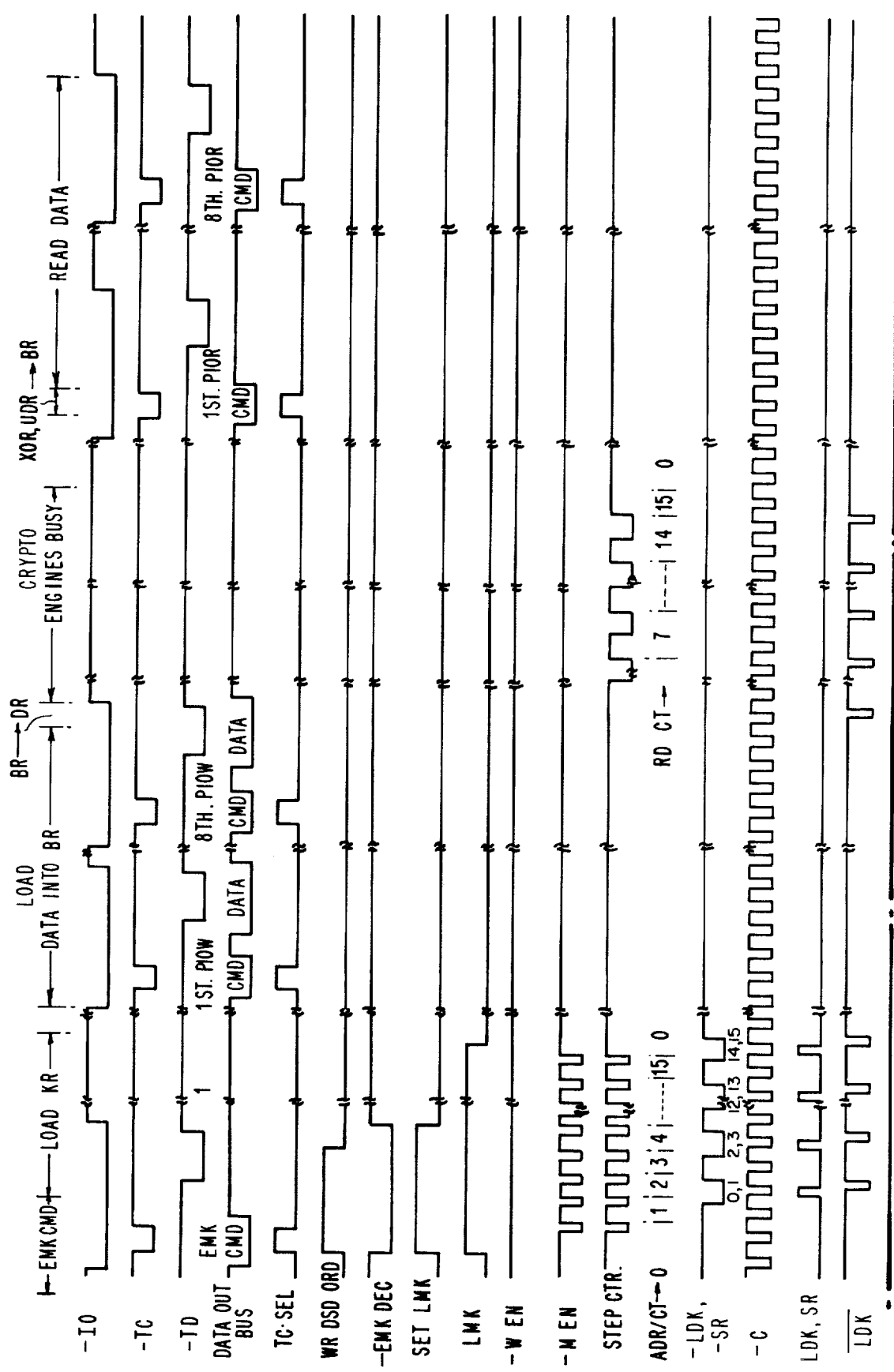
FIG.33A ENCIPHER MASTER KEY

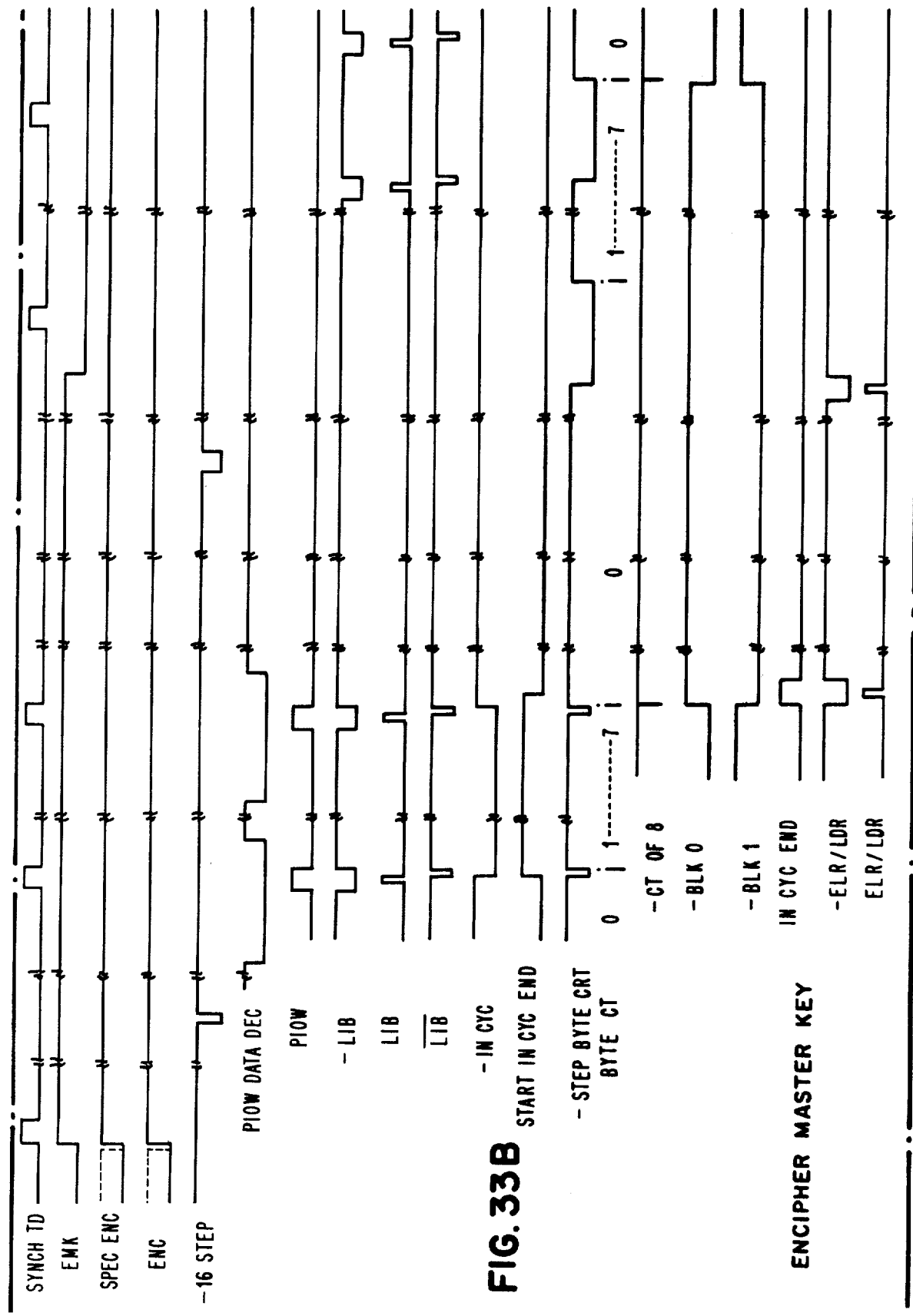

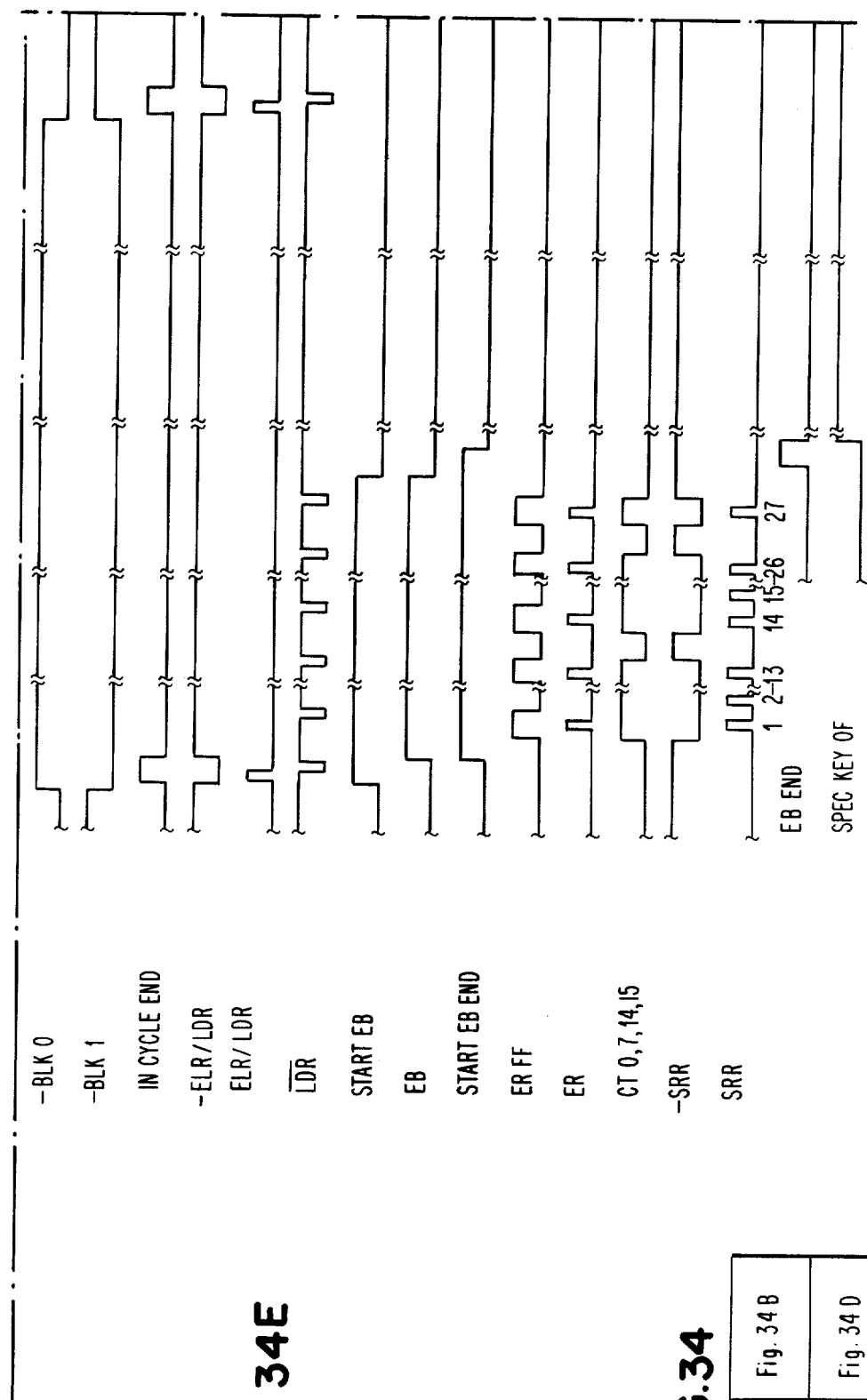

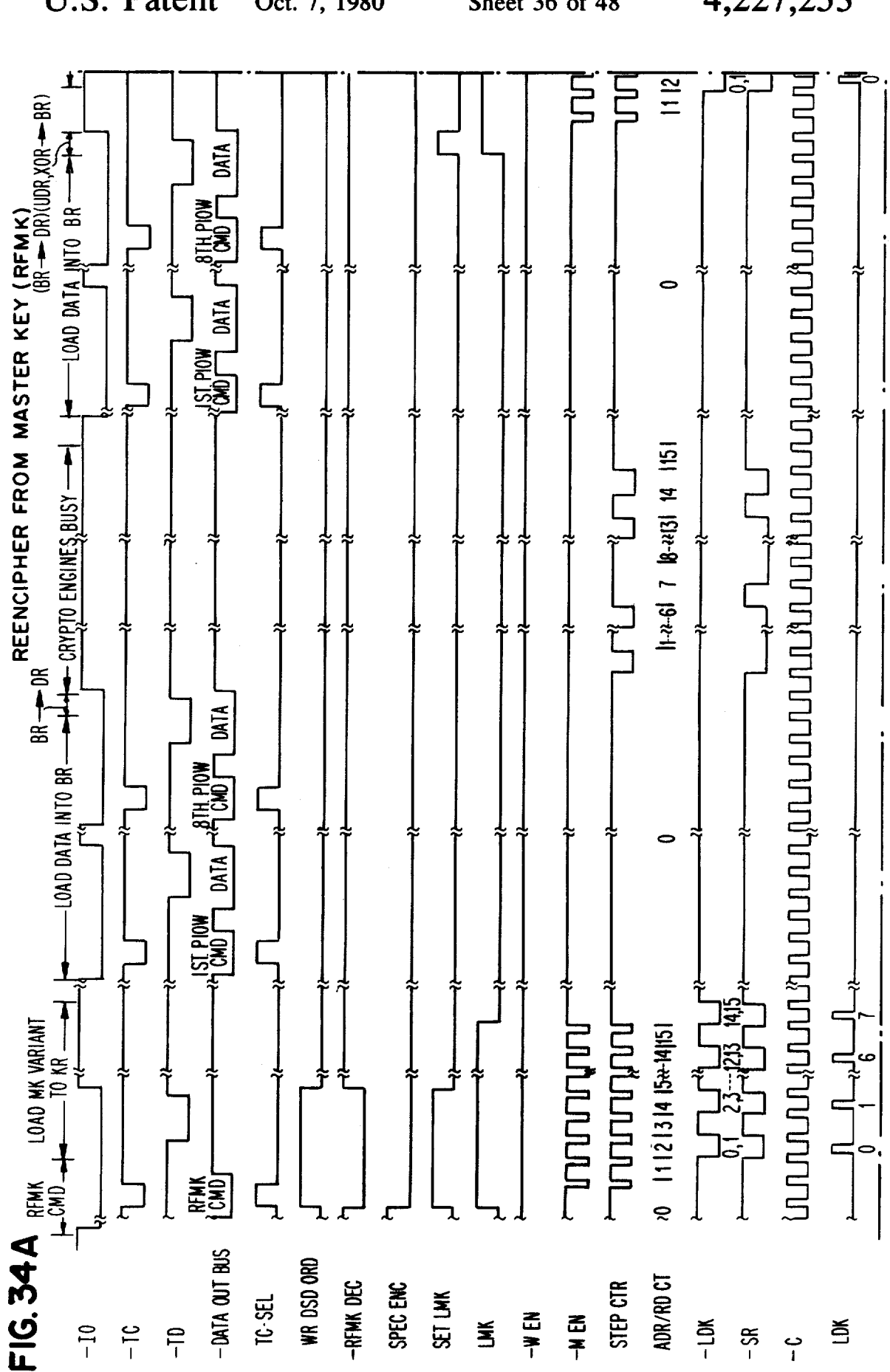

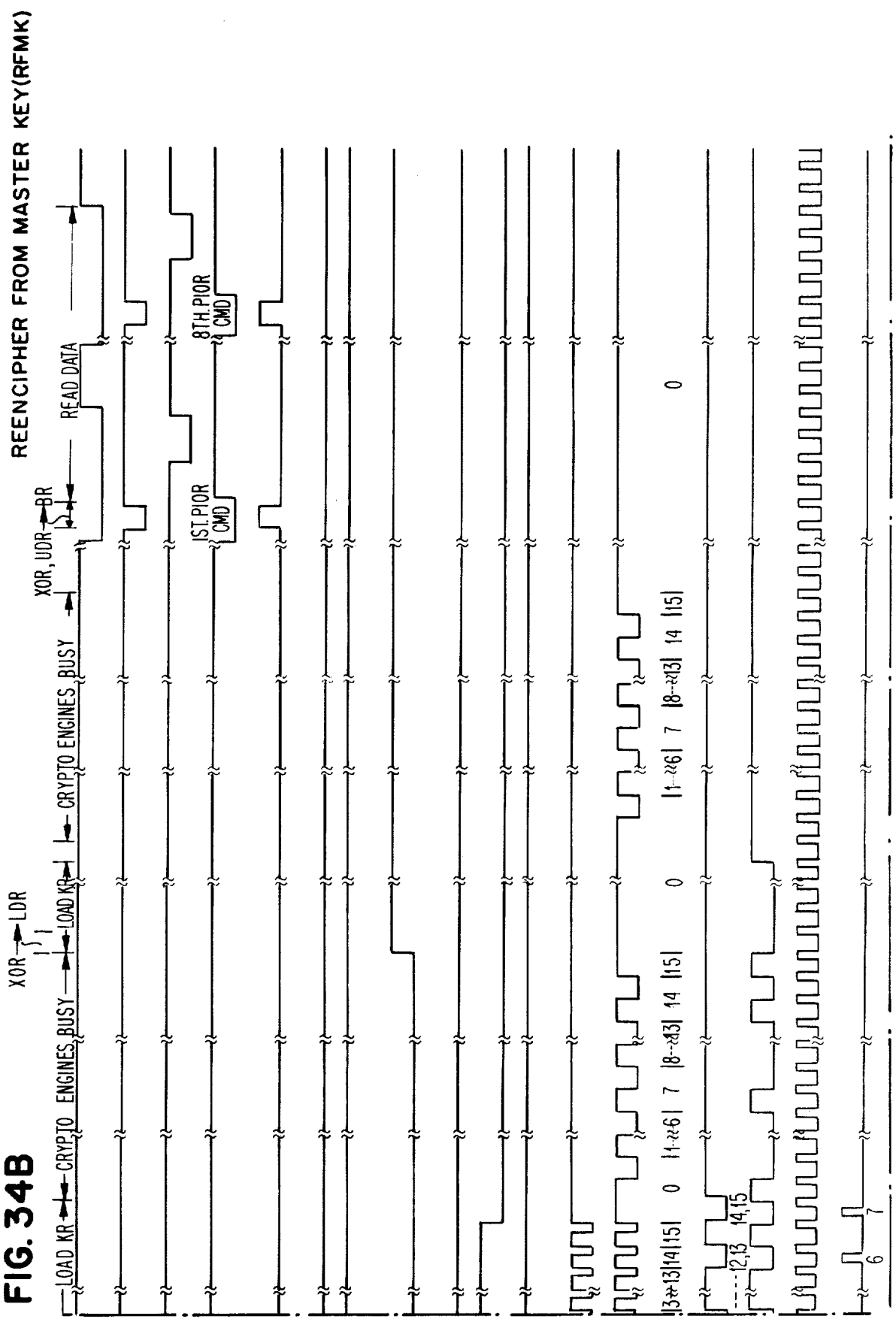

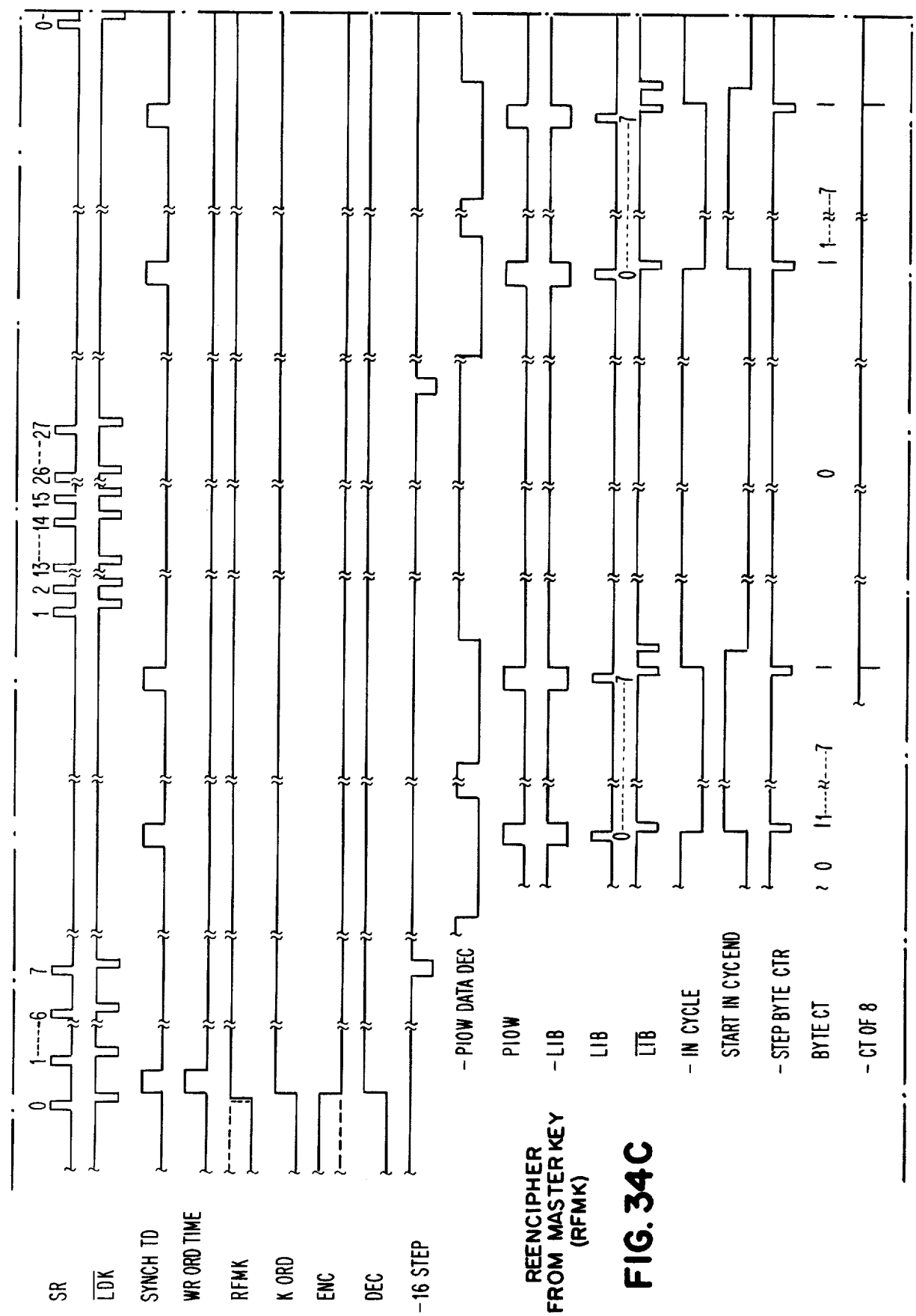
FIG. 34C REENCIPHER FROM MASTER KEY (RFMK)

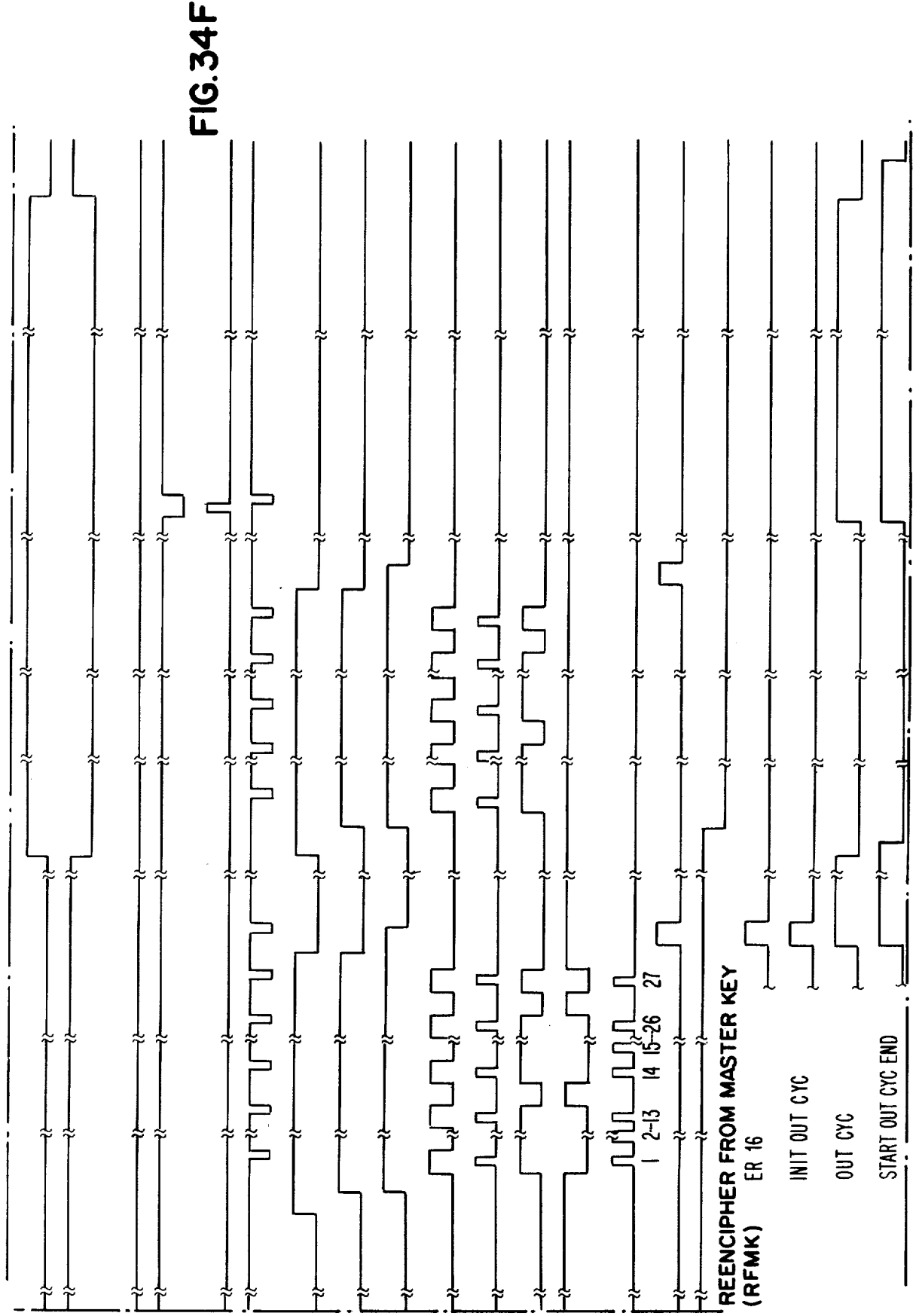

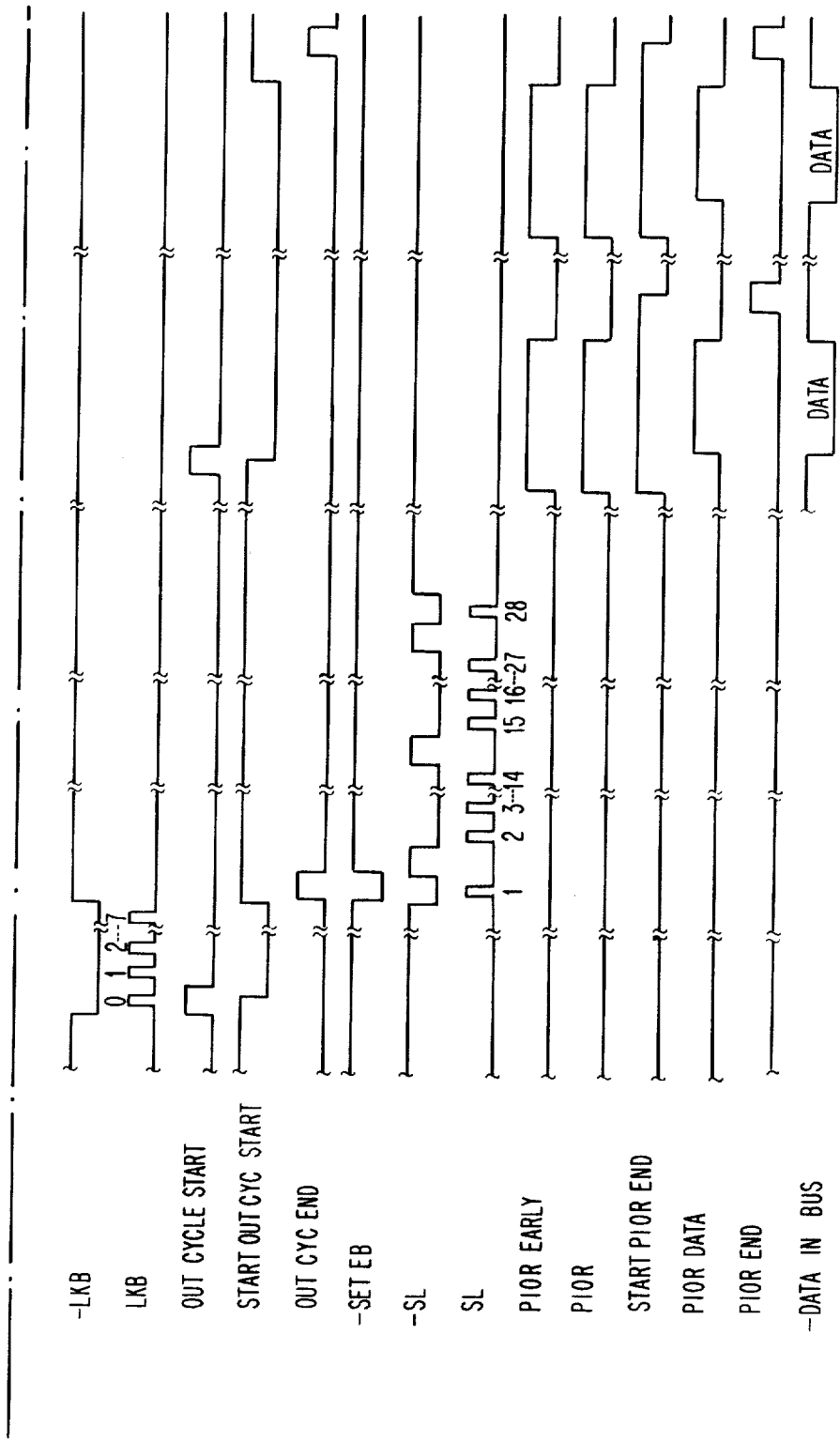

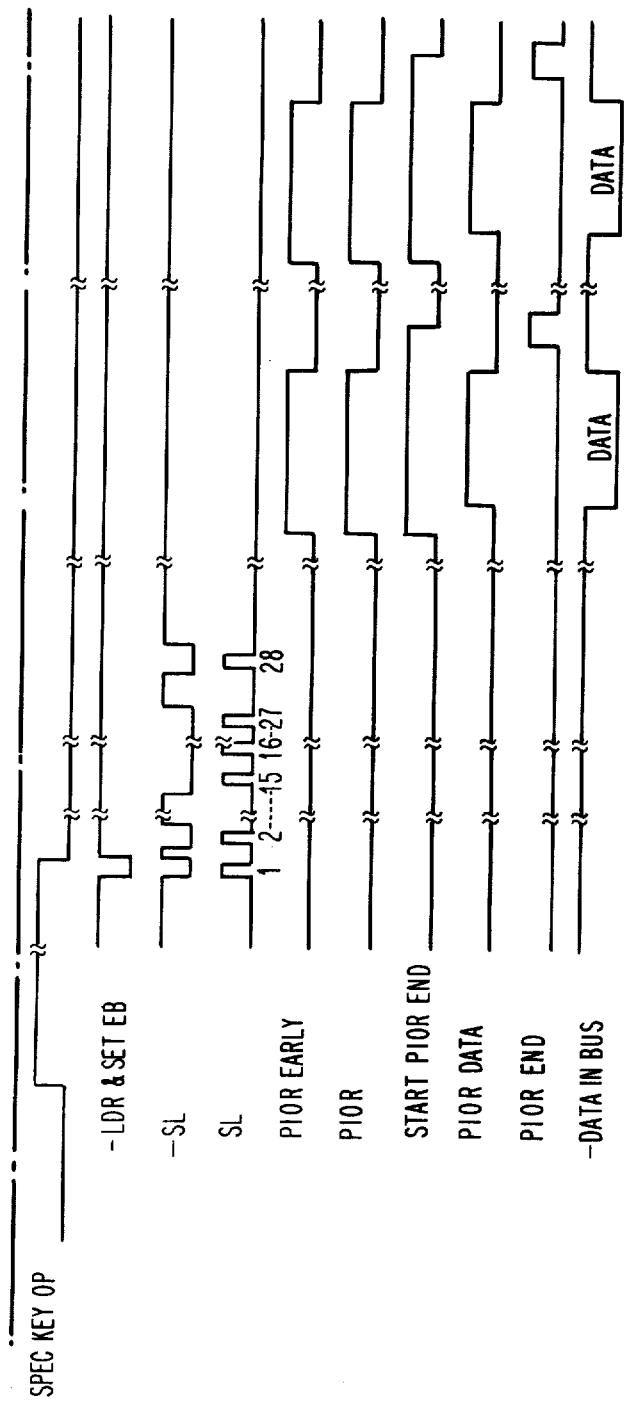

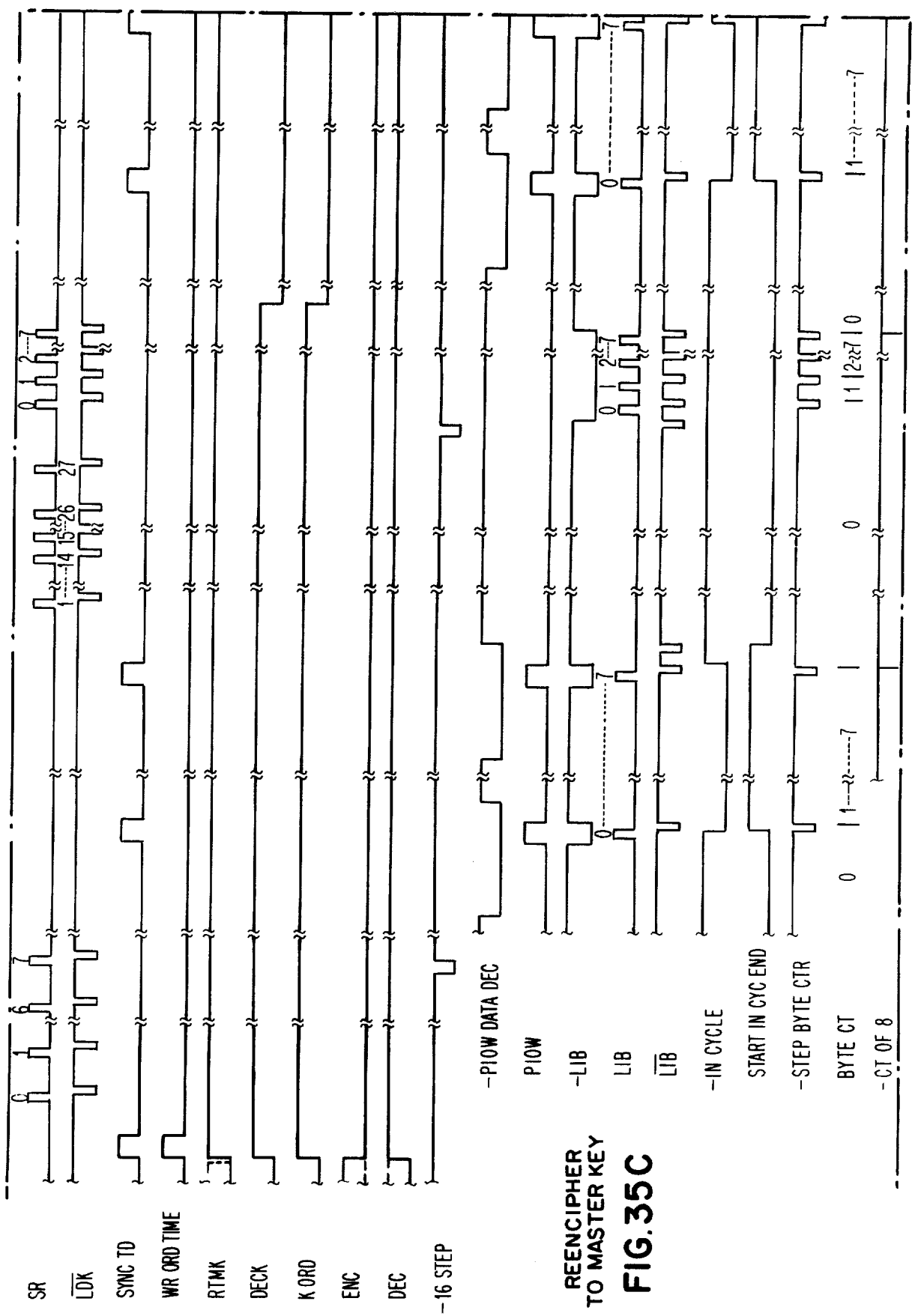

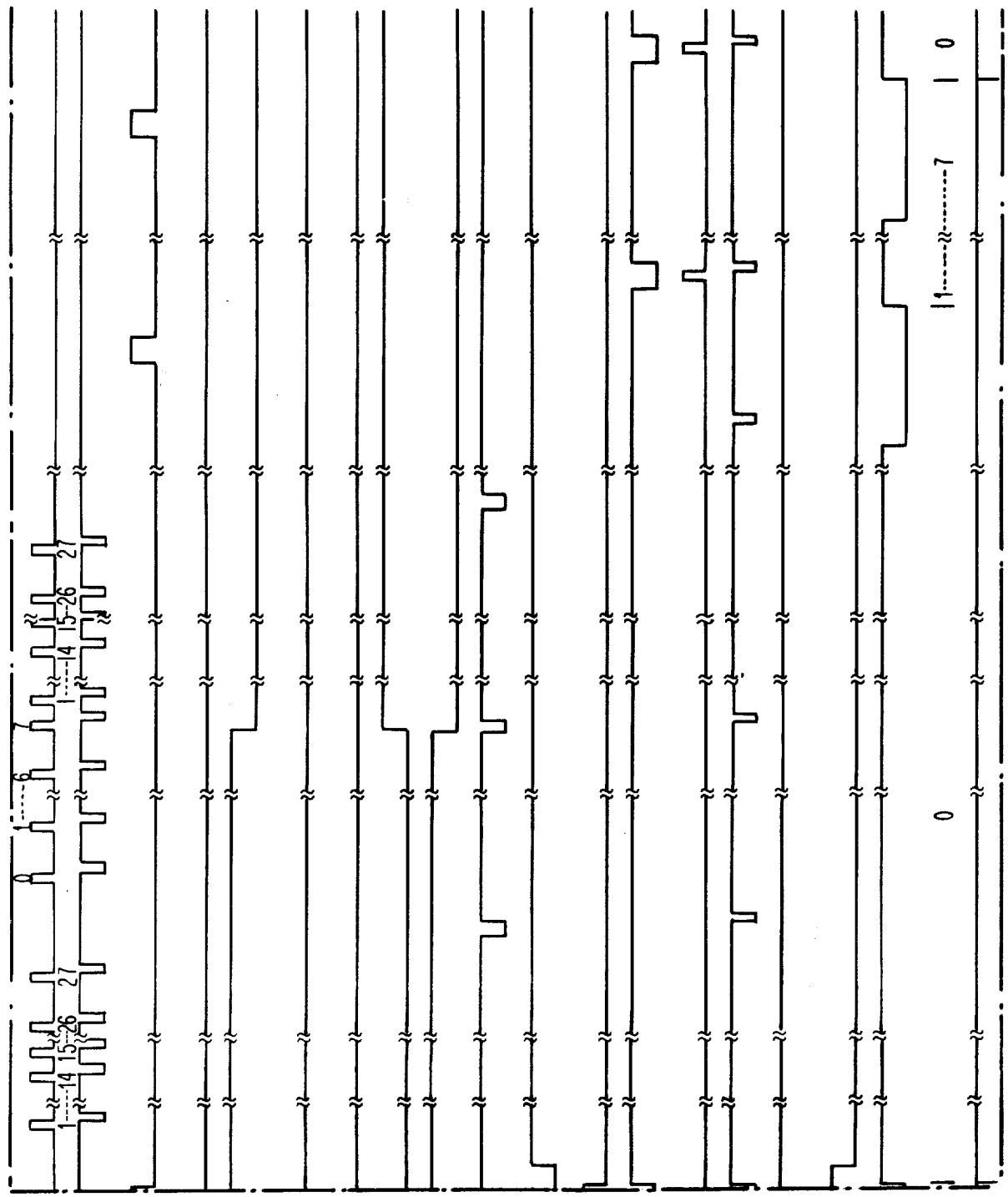
FIG. 35D REENCIPHER TO MASTER KEY

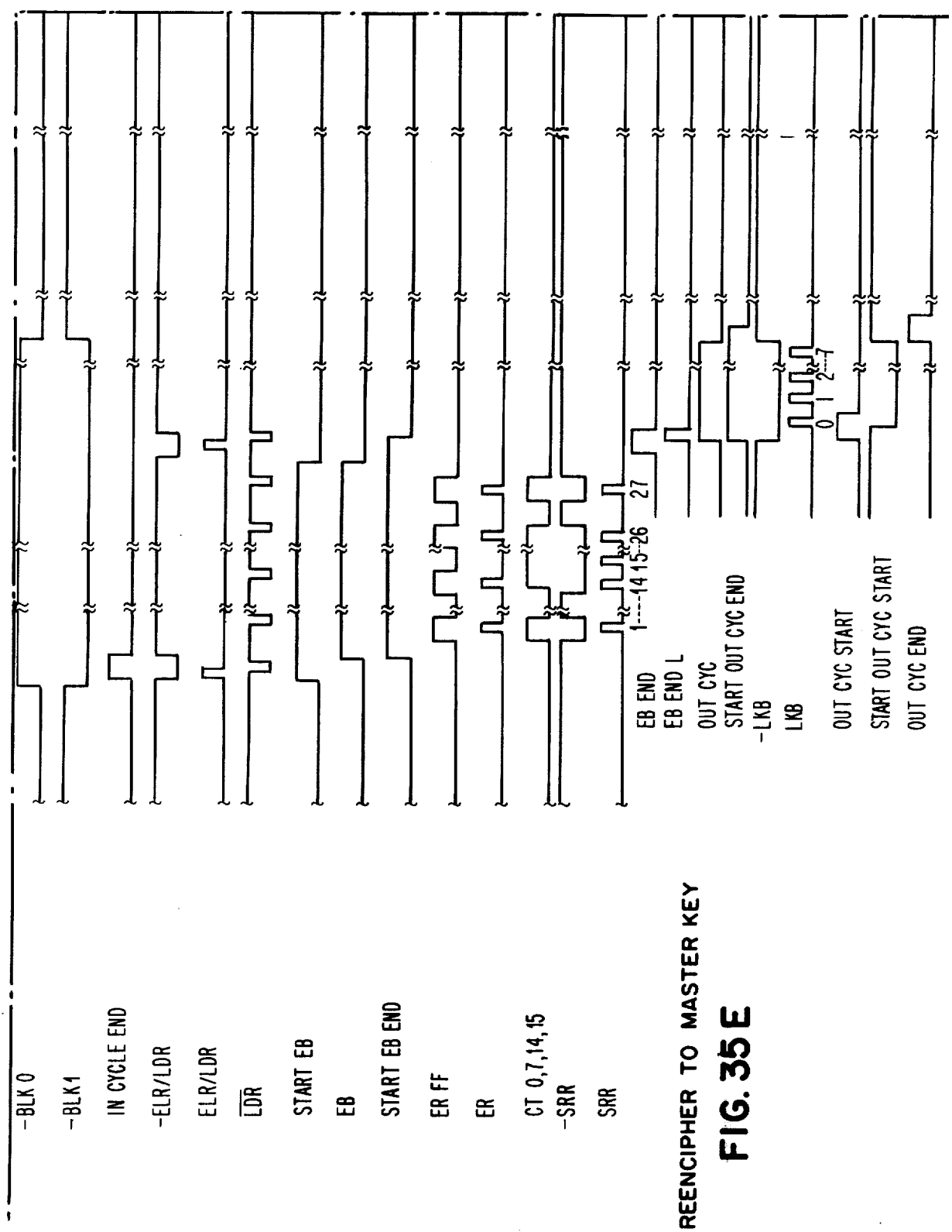

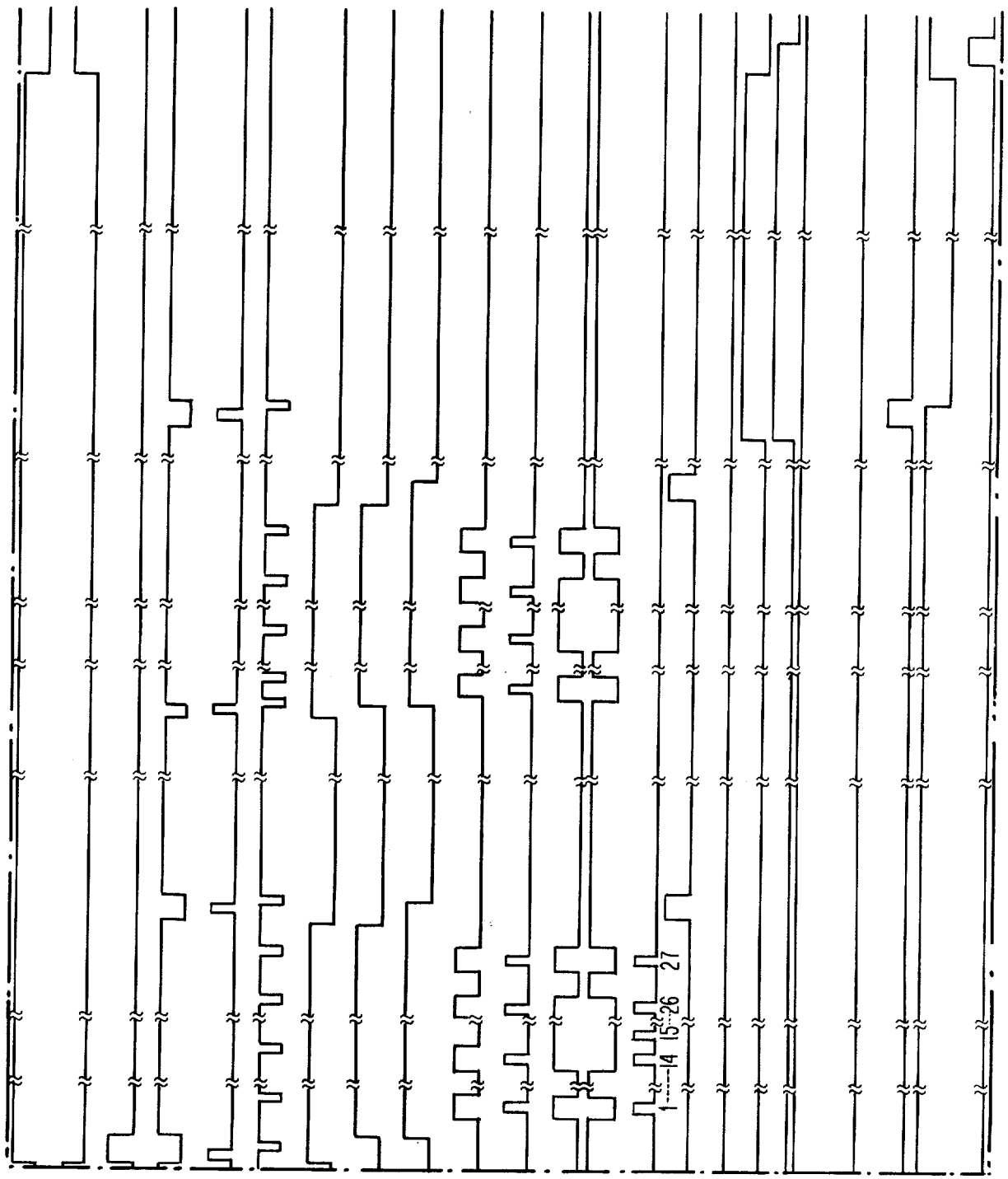
FIG. 35F REENCIPHER TO MASTER KEY

CRYPTOGRAPHIC COMMUNICATION SECURITY FOR MULTIPLE DOMAIN NETWORKS

CROSS REFERENCE TO RELATED APPLICATIONS

This application is related to the following patent applications which are concurrently filed herewith and assigned to the same assignee as the patent application:
1. "Cryptographic Communication and File Security Using Terminals", Ser. No. 857,533, (Docket No. K19-77006), filed Dec. 5, 1977, by Ehrsam et al.
2. "Cryptographic Communication Security for Single Domain Networks", Ser. No. 857,532, (Docket No. K19-77007), filed Dec. 5, 1977, by Ehrsam et al.
3. "Cryptographic File Security for Single Domain Networks", Ser. No. 857,534, (Docket No. K19-77008), filed Dec. 5, 1977, by Ehrsam et al.
4. "Cryptographic File Security for Multiple Domain Networks", Ser. No. 857,535, (Docket No. K19-77014), filed Dec. 5, 1977, by Ehrsam et al.
5. "Cryptograhic Verification of Operational Keys Used in Communication Networks", Ser. No. 857,546, (Docket No. K19-77012), filed Dec. 5, 1977, by Lennon et al.

BACKGROUND OF THE INVENTION

This invention relates to cryptographic communication security techniques and, more particularly, to communication security for data transmissions between different domains of a multiple domain communication network where each domain includes a host system and associated communication terminals each having a data security device which permits cryptographic operations to be performed.

With the increasing number of computer end users, sharing of common system resources such as files, programs and hardware and the increasing use of distributed systems and telecommunications, larger and more complex computer base information systems are being created. In such systems, an increasing amount of sensitive data may be transmitted across unsecure communication lines. Because of the insecurity of communication lines, there is an increasing concern over the interception or alteration of sensitive data which must pass outside a controlled or protected environment or which may become accessible if maintained for too long a period of time. Cryptography has been recognized as an effective data security measure in that it protects the data itself rather than the medium over which it is transmitted or the media on which it is stored.

Cryptography deals with methods by which message data called cleartext or plaintext is encrypted or enciphered into unintelligible data called ciphertext and by which the ciphertext is decrypted or deciphered back into the plaintext. The encipherment/decipherment transformations are carried out by a cipher function or algorithm controlled in accordance with a cryptographic or cipher key. The cipher key selects one out of many possible relationships between the plaintext and the ciphertext. Various algorithms have been developed in the prior art for improving data security in data processing systems. Examples of such algorithms are described in U.S. Pat. No. 3,796,830 issued Mar. 12, 1974 and U.S. Pat. No. 3,798,359 issued Mar. 19, 1974. Another more recent algorithm providing data security in data processing systems is described in U.S. Pat. No. 3,958,081 issued May 18, 1976. This algorithm was adopted by the National Bureau of Standards as a data encryption standard (DES) algorithm and is described in detail in the Federal Information Processing Standards publication, Jan. 15, 1977, FIPS PUB 46.

A data communication network may include a complex of communication terminals connected via communication lines to a single host system and its associated resources such as the host programs and locally attached terminals and data files. Within the data communication network, the domain of the host system is considered to be the set of resources known to and managed by the host system. Various single domain data communication networks have been developed in the prior art using cryptographic techniques for improving the security of data communication within the network. In such networks, a cryptographic facility is provided at the host system and at various ones of the remote terminals. In order for the host system and a remote terminal to perform a cryptographic communication, both must use the same cryptographic algorithm and a common operational cryptographic key so that the data enciphered by the sending station can be deciphered at the receiving station. In prior art cryptographic communication arrangements, the operational key to be used at the sending station is communicated by mail, telephone or courier to the receiving station so that a common operational key is installed at both stations to permit the cryptographic communications to be performed. Furthermore, the operational key was kept for a relatively long period of time. In order to present a "moving target" to an opponent, other prior art arrangements developed techniques which improved security by changing operational keys dynamically where the frequency of changing keys is done automatically by the system. One such tenchique is provided in the IBM 3600 Finance Communication System utilizing the IBM 3614 consumer transaction facility as remote terminals and is exemplified by U.S. Pat. No. 3,956,615 issued May 11, 1976.

As the size of data communication networks increases, other host systems may be brought into the network to provide multiple domain networks with each host system having knowledge of and managing its associated resources which make up a portion or domain of the network. By providing the proper cross domain data link between the domains of the network, two or more domains may be interconnected to provide a networking facility. Accordingly, as the size of the network increases and the number of communication lines interconnecting the domains of network increases, there is an increasing need to provide communication security for data transmitted over such communication lines connecting the domains of a multiple domain communication network.

Accordingly, it is an object of the invention to maintain communication security of data transmissions in a multiple domain network.

Another object of the invention is to establish cryptographic communication sessions between host systems in different domains of a multiple domain network without revealing the keys of each host system to the other host system.

A further object of the invention is to maintain communication security of data transmission between a terminal associated with a host system in one domain and an application program associated with a host system in another domain of a multiple domain network.

Still another object of the invention is to maintain communication security of data transmissions between an application program associated with a host system in one domain and an application program associated with a host system in another domain of a multiple domain network.

Still a further object of the invention is to provide a cross-domain key which allows communication sessions to be established between different domains of a multiple domain network.

Still another object of the invention is to provide a cross-domain key which is known by a sending and receiving host system in different domains of a multiple domain network.

Still a further object of the invention is to create cross-domain keys for cross-domain data communications between a host system in one domain and host systems in other domains of a multiple domain network.

Still another object of the invention is to create a cross-domain key for cross-domain data communications by generating a pseudo-random number which is defined as the cross-domain key.

Still a further object of the invention is to maintain the security of cross domain keys by protecting them under a host key encrypting key.

Still another object of the invention is to protect a cross domain key under a key encrypting key of a sending host system in one domain and under a different key encrypting key of a receiving host system in another domain of a multiple domain network.

Still a further object of the invention is to protect a cross domain key under a variant of the master key of a sending host system in one domain and under a different variant of the master key of a receiving host system in another domain of a multiple domain network.

Still another object of the invention is to protect cross-domain keys used for data transmissions from the host system in one domain to the host system in another domain by a first host key encrypting key and to protect cross domain keys used for data transmissions from the host system in the other domain to the host system in the one domain by a second host key encrypting key.

Still a further object of the invention is to establish a common operational key between host systems in different domains of a multiple domain network to permit cross domain cryptographic operations to be performed.

Still another object of the invention is to establish a common operational key for a terminal in one domain and an application program in another domain to permit cross domain cryptographic operations to be performed.

Still a further object of the invention is to provide an irreversible transformation function which uses a protected cross-domain key at a sending host system in one domain to encipher a session key for transmission to a receiving host system in another domain of a multiple domain network.

Still another object of the invention is to provide an irreversible transformation function at a receiving host system using a protected cross-domain key to reencipher a received session key from encipherment under a cross-domain key to encipherment under the master key of the receiving host system.

Still a further object of the invention is to reencipher a session key created at a host system in one domain from encipherment under a host master key to encipherment under a cross-domain key for transmission to the host system in another domain.

Still another object of the invention is to reencipher a session key created at a host system in one domain from encipherment under a host master key to encipherment under a terminal key encrypting key of a terminal associated with the host system in the one domain with which a communication session is to be established.

Still a further object of the invention is to dynamically create a session key by generating a pseudo random number defined as a session key enciphered under an application key.

Still another object of the invention is to create application keys for the application programs associated with a host system in a data communication network.

Still a further object of the invention is to protect application keys by enciphering them under a host key encrypting key.

Still another object of the invention is to reencipher a session key created at a host system in one domain from encipherment under an application key to encipherment under the master key of the host system.

Still a further object of the invention is to dynamically create a different operational key for each new communication session between the host systems in different domains of a multiple domain network.

Still another object of the invention is to provide different operational keys for each new communication session between a terminal associated with a host system in one domain and an application program associated with a host system in another domain of a multiple domain network.

Still a further object of the invention is to provide host data security devices for host systems in different domains of a multiple domain network to permit cross-domain cryptographic data communication.

In accordance with the invention, a multiple domain data communication network is provided in which each domain includes a host system with an integrated data security device and associated host programs and communication terminals with integrated data security devices. The data security devices of the host systems and the communication terminals include a memory for storing a master key and cryptographic apparatus for ciphering input data under control of a cryptographic key to produce ciphered output data. For cross-domain communication between the host system in one domain and the host system in another domain, the host data security device of each host system generates a random number which is defined as a cross domain key for cross domain communication between the two host systems and is communicated in a secure manner to the other host system. The cross-domain key generated at each host system is protected at that host system by encipherment under a first key encrypting key and stored in enciphered form as a sending cross-domain key while the cross-domain key received at that host system from the other host system is protected by encipherment under a second key encrypting key and stored in enciphered form as a receiving cross-domain key. When a communication session is to be established between the host system in one domain and the host system in another domain, the host data security device of the originating host system generates a random number which is defined as being a session key enciphered under the host master key of the originating host system. The originating host data security device then performs a transformation function in accordance with the enciphered sending cross-domain key and the enciphered session key to reencipher the session key from encipherment under the originating host master key to encipherment under the sending cross-domain key for transmission to the host system of the other domain. At the receiving host system in the other domain, the receiving host data security device performs a transformation function in accordance with the enciphered receiving cross-domain key stored at the receiving host system and the received enciphered session key to reencipher the session key from encipherment under the sending cross-domain key to encipherment under the host master key of the receiving host system. At this point, the common session key is available in useable form at both host systems without revealing the master keys of each host system to the other host system and so as to permit subsequent cryptographic operations to be performed between the two host systems.

Other arrangements are also provided which permit a variety of communication security applications in a multiple domain network. In one such arrangement, a communication session is established between a terminal associated with a host system in one domain and an application program associated with a host system in another domain. The host data security device of the sending host system, in addition to generating the cross-domain key, generates a series of random numbers each of which is defined as the terminal master key for a terminal associated with the host system and is communicated to each terminal user in a secure manner for loading into the data security device of the respective terminals. The host data security device then enciphers and stores each of the terminal master keys under the same host key encrypting key which protects the cross-domain key to maintain the terminal keys in a secure manner. When a communication session is to be established between one of the terminals and the host system in the other domain, the host data security device generates a pseudo random number which is defined as being a session key enciphered under the host master key. The host data security device then performs a first transformation function in accordance with the enciphered terminal master key of the terminal and the enciphered session key to reencipher the session key from encipherment under the host master key to encipherment under the terminal master key. The host data security device then performs a second transformation function in accordance with the enciphered sending cross-domain key and the enciphered session key to reencipher the session key from encipherment under the host master key to encipherment under the sending cross-domain key. The session key enciphered under the terminal master key and the session key enciphered under the sending cross-domain key are then transmitted to the host system in the other domain. At the receiving host system in the other domain, the receiving host data security device performs a transformation function in accordance with the enciphered receiving cross-domain key stored at the receiving host system and the received session key enciphered under the sending cross-domain key to reencipher the session key from encipherment under the sending cross-domain key to encipherment under the host master key of the receiving host system which is in useable form to carry out subsequent cryptographic operations at the host system in the other domain. The receiving host system then transmits the received session key enciphered under the terminal master key to the terminal with which the session is to be established. At this point, the common session key is available in useable form at both the terminal of the host system in the one domain and the host system in the other domain without having revealed the master keys of each host system to the other host system so as to permit subsequent cryptographic data processing operations to be performed between the two units in the different domains.

In another arrangement, using similar architecture, a communication session is established between an application program associated with a host system in one domain and an application program associated with a host system in another domain. The host data security device of the host system in the one domain, in addition to generating the sending cross-domain key, generates a series of random numbers each of which is defined as the application key for an application program associated with the host system. The host data security device then enciphers and stores each of the application keys under a key encrypting key which is different than the one which protects the sending cross-domain key to maintain the application keys in a secure manner. When a communication session is to be established between the application programs in the different domains, the host data security device generates a pseudo random number which is defined as a session key enciphered under the application key of the application program of the sending host system. The host data security device then performs a first transformation function in accordance with the enciphered application key and the enciphered session key to reencipher the session key from encipherment under the application key to encipherment under the sending host master key. The host data security device then performs a second transformation function in accordance with the enciphered sending cross-domain key and the enciphered session key to reencipher the session key from encipherment under the sending host master key to encipherment under the sending cross-domain key. The session key enciphered under the application key and the session key enciphered under the sending cross-domain key are then transmitted to the host system in the other domain. At the receiving host system in the other domain, the receiving host data security device performs a transformation function in accordance with the enciphered receiving cross-domain key stored at the receiving host system and the received session key enciphered under the sending cross-domain key to reencipher the session key from encipherment under the sending cross-domain key to encipherment under the receiving host master key which is in useble form to carry out subsequent cryptographic operations by the application program at the receiving host system. The receiving host system then transmits the received session key enciphered under the application key to the application program of the sending host system with which the session is to be established. The application program at the sending host system requests the host data security device to perform another transformation function in accordance with the enciphered application key stored at the sending host system and the received enciphered session key to reencipher the session key from encipherment under the application key to encipherment under the sending host master key. At this point, the common session key is available in useable form at both host systems without having revealed the master keys of each host system to the other host system so as to permit subsequent cryptographic data processing operations to proceed between the two application programs in the different domains.

In addition, the above arrangements may include the use of pre-defined private terminal keys, private application keys or private session keys made known to both host systems to permit private cryptographic operations to be performed.

The foregoing and other objects, features and advantages of the invention will be apparent from the following particular description of a preferred embodiment of the invention, as illustrated in the accompanying drawings.

BRIEF DESCRIPTION OF THE DRAWINGS

FIG. 3 is a block diagram of a cryptographic engine which performs cryptographic functions in a logically and physically secure manner.

FIG. 4 illustrates in block diagram form a manual WMK function.

FIG. 5 illustrates in block diagram form a host controlled WMK function.

FIG. 26 is a diagram of how FIGS. 26a1 through 26i2 may be placed to form a detailed schematic diagram.

FIGS. 26a1 through 26i2, taken together, comprise a detailed schematic diagram of the data security device of the present invention.

FIG. 28 illustrates how FIGS. 28a and 28b may be placed to form a composite timing diagram.

FIG. 28a and 28b, taken together, comprise a timing diagram of the host controlled WMK operation.

FIG. 30 illustrates how FIGS. 30a to 30c may be placed to form a composite timing diagram.

FIGS. 30a to 30c, taken together, comprise a timing diagram of the DECK operation.

FIGS. 31a to 31d, taken together, comprise a timing diagram of the DEC/ENC operation.

FIG. 32 illustrates how FIGS. 32a to 32c may be placed to form a composite timing diagram.

FIGS. 32a to 32c, taken together, comprise a timing diagram of the GRN operation.

FIG. 33 illustrates how FIGS. 33a to 33c may be placed to form a composite timing diagram.

FIGS. 33a to 33c, taken together, comprise a timing diagram of the EMK operation.

FIG. 34 illustrates how FIGS. 34a to 34g may be placed to form a composite timing diagram.

FIGS. 34a to 34g, taken together, comprise a timing diagram of the RFMK operation.

FIG. 35 illustrates how FIGS. 35a to 35g may be placed to form a composite timing diagram.

FIGS. 35a to 36g, taken together, comprise a timing diagram of the RTMK operation.

GENERAL DESCRIPTION

INTRODUCTION

Figure 1:
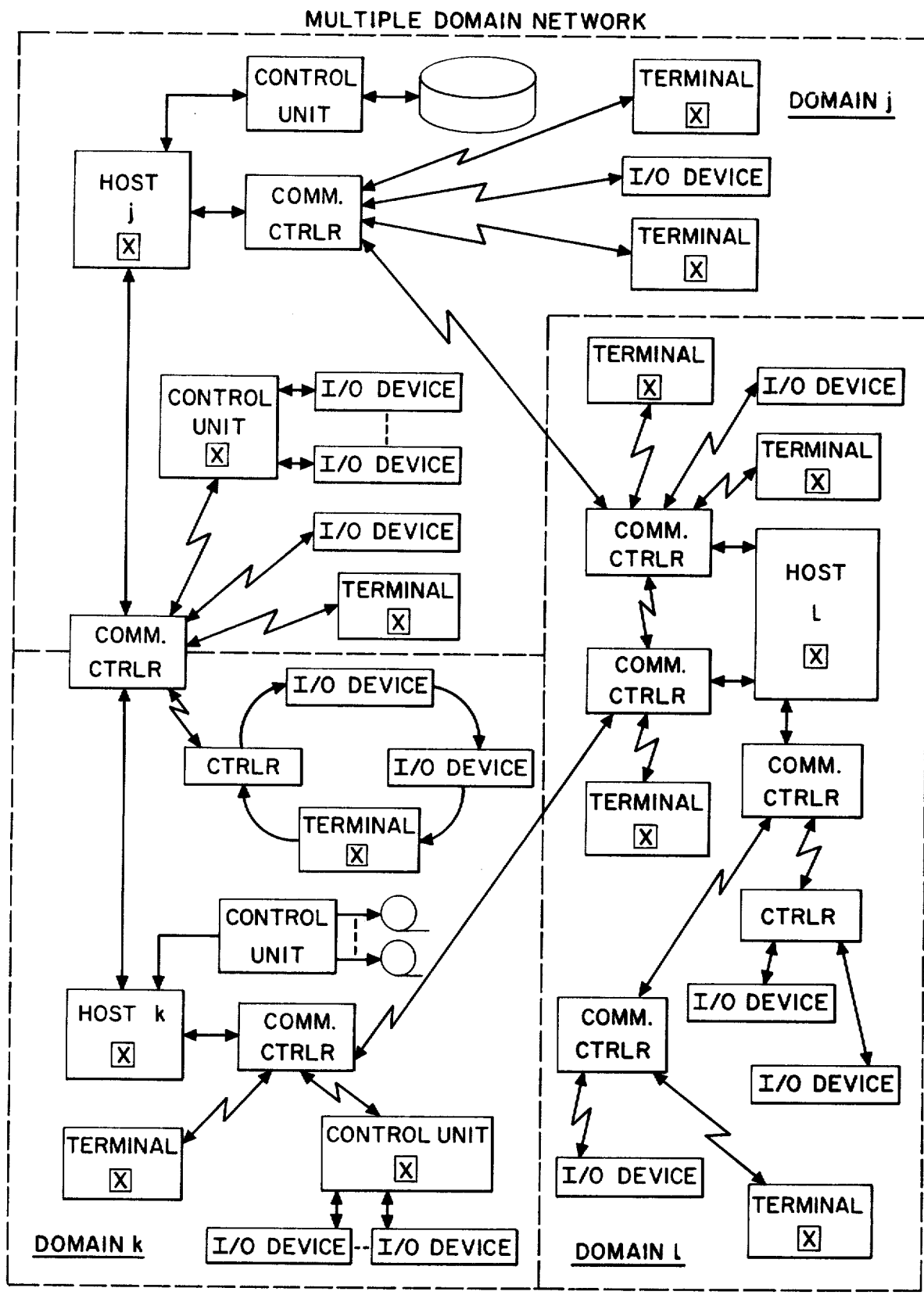
FIG. 1 is a block diagram illustrating a multiple domain data communication network.

In a single domain data communication network, a complex of communication terminals are connected via a plurality of communication lines to a host data processing system and its associated resources such as host programs, and locally attached terminals and secondary storage files. Because of the complexity and increasing size of such networks other host systems may be brought into the network by providing the proper cross domain link between the multiple systems thereby providing a multiple domain network. However, with this increasing size of the network, the problem of transmitting data over unsecure communication lines becomes more acute and it is necessary to protect the data to maintain the confidentiality and integrity of the information represented by that data. Cryptography provides an effective data security measure for communication security in that it protects the confidentiality and integrity of the data itself rather than the medium over which it is transmitted. FIG. 1 illustrates a cryptographic arrangement in a representative multiple domain data communication network.

Most practical cryptographic systems require two basic elements, namely, (1), a cryptographic algorithm which is a set of rules that specify the steps required to transform or encipher plaintext into ciphertext or to transform or decipher ciphertext back into plaintext and (2) a cipher key. The cipher key is used to select one out of many possible relationships between the plaintext and the ciphertext. Various cryptographic algorithms have been developed in the prior art for improving data security in data processing systems. One such algorithm is described in U.S. Pat. No. 3,958,081 issued May 18, 1976 and was recently adopted as a United States Federal Data Processing Standard as set forth in the aforesaid Federal Information Processing Standard publication. A hardware implementation of this algorithm is incorporated in the present invention. The cryptographic algorithm operates to transform or encipher a 64 bit block of plaintext into a unique 64 bit block of ciphertext under control of a 56 bit cipher key or to transform or decipher a 64 bit block of ciphertext back into an original 64 bit block of plaintext under control of the same 56 bit cipher key with the deciphering process being the reverse of the enciphering process. The effectiveness of this cipher process depends on the techniques used for the selection and management of the cipher key used in the cipher process. The only cipher key actually used in the cipher process to personalize the algorithm when encrypting or decrypting data or other keys is termed the working key and is accessible only by the cryptographic apparatus. All other keys hereafter discussed are used at different times as working keys depending upon the cipher operation to be performed.

There are basically two categories of cipher keys used in the cryptographic system, namely, operational keys (KO) and key encrypting keys (KEK) with operational keys being referred to and used as data encrypting keys. Data encrypting or operational keys are a category of keys used to encrypt/decrypt data while key encrypting keys are a category of keys used to encrypt/decrypt other keys.

Within the two basic categories, there are variously defined classes and types of cipher keys. Thus, in the data encrypting or operational class of cipher keys, the data encrypting or operational key which protects data during data communication sessions is a class of key called the primary communication key. One type of this class of keys is one which is a system generated, time variant, dynamically created key transmitted in enciphered form under a key encrypting key from a host system to a remote terminal. The key is deciphered at the terminal and then loaded into the working key register and used as the working key. The key exists only for the duration of the communication session and will be referred to as the system session key (KS). In private cryptographic systems which use a private protocol known to each end user but unknown to the system, a private key may be used as another type of primary communication key to provide communication security. The private key is loaded into the terminal working key register and then used as the working key. The key exists only for a time duration determined by the private protocol which may require the key to be changed for each communication, once an hour, once a week, etc. and will be referred to as the private session key (KSP).

Within the key encrypting category of cipher keys, there are two sub-categories, namely, the primary key encrypting key and the secondary key encrypting key. In the primary key encrypting key sub-category of cipher keys, the key encrypting key used in the host system to encipher other keys is a class of key called the system key. One type of this class of keys is one which is used to protect the system session keys actively used at the host and will be referred to as the host master key (KMH). In the secondary key encrypting key sub-category of cipher keys, there is a class of key called a secondary communication key which is used to protect other keys. Two types of this class of key are used to protect system session keys transmitted to a terminal and when system generated will be referred to as the terminal master key (KMT) and when provided as a pre-defined private key will be referred to as a private terminal master key (KMTP). Another type of this class of key is used to protect system session keys transmitted from the host system in one domain to a host system in another domain of a multiple domain communication network and will be referred to as a cross-domain key (KNC). Two additional types of this class of key are used to protect system session keys transmitted to an application program associated with a host system and when system generated will be referred to as the application key (KNA) and when provided as a pre-defined private application key will be referred to as a private application key (KNAP). The various cryptographic keys defined above are summarized in the following table by category, class, type and use:

| CATEGORY | SECURITY CLASS | TYPE | USE |
|---|---|---|---|
| Key Encrypting Keys | | | |
| Primary | System Key | Host Master Key (KMH) | Encipher |
| | | Terminal Master Key (KMT) | |
| | | | Other |
| | Secondary | Private Terminal Master Key (KMTP) | |
| Secondary | Communication Keys | Cross-Domain Key (KNC) | Crytographic |
| | | Application Key (KNA) | Keys |
| | | Private | |

| CATEGORY | SECURITY CLASS | TYPE | USE |
|---|---|---|---|
| | | Application Key (KNAP) | |
| Data Encrypting Keys | | System Session Key (KS) | Encipher Or |
| (Operational Keys) | Primary Communication Keys | Private Session Key (KSP) | Decipher Data |

GENERATION, DISTRIBUTION, INSTALLATION AND MANAGEMENT OF CRYPTOGRAPHIC KEYS

Key generation is the process which provides for the creation of the cipher keys required by a cryptographic system. Key generation includes the specification of a system master key and primary and secondary communication keys.

The host master key is the primary key encrypting key and is the only cipher key that needs to be present in the host cryptographic facility in clear form. Since the host master key does not generally change for long periods of time, great care must be taken to select this key in a random manner. This may be accomplished by using some random experiment such as coin tossing where bit values 0 and 1 are determined by the occurrence of heads and tails of the coin or by throwing dice where bit values 0 and 1 are determined by the occurrence of even or odd rolls of the dice, with the occurrence of each group of coins or dice being converted into corresponding parity adjusted digits. By enciphering all other cipher keys stored in or passed outside the host system, overall security is enhanced and secrecy for such other cipher keys reduces to that of providing secrecy for the single host master key. Secrecy for the host master key may be accomplished by storing it in a non-volatile master key memory so that the host master key need only be installed once. Once installed, the master key is used only by the cryptographic apparatus for internally deciphering enciphered keys which may then be used as the working key in a subsequent encipher/decipher operation.

Installation of the host master key may be accomplished by a direct manual entry process using mechanical switches, dials, or a hand-held key entry device. Alternately, an indirect entry method may be used in which case the host master key may be entered from a non-volatile media such as a magnetic card or tape which is maintained in a secure location (safe, vault, etc.) accessible only to the security administrator. Another alternative indirect entry method may be to use a keyboard entry device, though this method is subject to human error. In any event, whichever indirect method is chosen, during initialization, the host master key may be read into and temporarily stored in the host memory and then transferred to the master key memory with the host memory entry being subsequently erased so that only one copy is present and accessible only by the cryptographic facility.

The terminal master key is a secondary key encrypting key and like the system master key, is the only key encrypting key that needs to be present in clear form in the terminal cryptographic facility. Since there may be numerous terminals associated with a host system, it may not be practical or prudent to have these keys generated by a human user using some type of random experiment. Therefore, to relieve the system administrator from the burden of creating cryptographic keys, except for the single system master key, the cryptographic apparatus of the host system can be used as a pseudo random generator for generating the required terminal master keys used by the various terminals associated with the host system. The manner by which such host system generated random numbers are produced is described in detail hereafter. In addition to the system generated terminal master keys, off line means may be used by end users to establish a private terminal master key. In either event, the clear form of the system or private generated terminal master key is distributed in a secure manner to the authorized individuals. This may be accomplished by transporting the key by courier, registered mail, public telephone, etc. The liklihood of an opponent obtaining the key during transit can be lessened by transmitting different portions of the key over independent paths and then combining them at the destination. Once having properly received a valid system or private generated terminal master key in clear form, it becomes necessary to maintain its secrecy. At the terminal, this is accomplished by writing the terminal master key into a non-volatile master key memory, as in the case of the host system master key. Once installed, the terminal master key is used only by the terminal cryptographic apparatus for internally deciphering enciphered system generated primary communication keys which may then be used as the working key in a subsequent encipher/decipher operation.

The cross-domain key is a secondary key encrypting key which is used as a secondary communication key to allow a session key generated at the host system in one domain to be transmitted and recovered at the host system in another domain of a multiple domain communication network. The cryptographic apparatus of the sending host system used as a pseudo random generator, as in the case of generating terminal master keys, can also be used to generate the cross-domain key. Because there may be numerous host systems interconnected in the multiple domain communication network, it is necessary to generate a separate cross-domain key for each cross-domain communication between each host system and the other host systems of the network. As in the case of the terminal master keys, these cross-domain keys must be distributed from each host system to each of the other host systems in the network in a secure manner. This may be accomplished in a similar manner to that described for the distribution of terminal master keys. Once having properly received a valid cross-domain key in clear form at the receiving host system, it becomes necessary to maintain its secrecy. The manner in which this is accomplished will be described hereafter. However, once installed at the receiving host system in a protected form, the cross-domain key is used only by the receiving host system for internally transforming enciphered session keys transmitted by a sending host system into a form usable by the receiving host system to carry out cryptographic operations.

The application key is a secondary key encrypting key which is used as a secondary communication key to protect the session key generated at a sending host system of a multiple domain network. The session key protected by the application key is transformed into a form usable by the sending host system to carry out cryptographic operations. Since there may be numerous application programs associated with a host system, it is necessary to generate a separate application key for each application program. Therefore, the cryptographic apparatus of a host system may be used as a pseudo random generator, as in the case of generating terminal master keys and cross-domain keys, to generate the application keys for each of the application programs associated with the host system. In addition to the system generated application keys, off line means may be used by end users to define and establish a private application key for use in private communication arrangements. In either event, once having validly generated a system or private application key, it becomes necessary to maintain its secrecy. The manner in which this is accomplished will be described hereafter.

Because the ciphering algorithm used is not secret, the degree of protection that can be derived from a cryptographic system ultimately depends upon the security of the cryptographic keys. Therefore, the objectives of key mangement are: (1) cryptographic keys should never occur in clear form outside the cryptographic device, except under secure conditions during the period when keys are originally distributed and installed or when stored in a secure place such as a safe, vault or similar location for backup or recovery and (2) no cryptographic operation, or combination thereof, using any cryptographic quantities which are routinely stored or routed through the system, or derived therefrom, should permit clear keys to be recoverable outside the cryptographic device. Therefore, if the system generated terminals keys are to be stored at the host system they must be protected from being exposed in clear form. This can be accomplished by having the terminal keys enciphered under another key. Accordingly, a dual master key approach is adapted, by the present invention, in which a variant (KMH1) of the host master key (KMH$\phi$) is used to encipher the terminal master keys by an Encipher Master Key function (EMK1), which will be described in greater detail hereafter. In the embodiment of the present invention, only the host master key resides in clear form within the cryptographic device. Accordingly, when an EMK1 function is to be performed, the host master key is read out of the master key memory and by selected inversion of certain bits of the host master key the variant KMH1 is derived for use in enciphering the terminal master key. By enciphering the terminal master keys under the variant of the host master key, the enciphered terminal keys now in protected form may be stored in a cryptographic data set until required for use in a cryptographic operation.

In the case of multiple domain networks, a cross-domain key generated at a host system in one domain for cross domain communication with a host system in another domain of the network is communicated in a secure manner to the host system in the other domain and visa versa so that a pair of cross-domain keys is shared between the two host systems. Thus, the cross-domain key generated at the host system in the one domain is designated as the sending cross-domain key for the one domain and as the receiving cross-domain key in the other domain whereas the cross-domain key generated at the host system in the other domain is designated as the sending cross-domain key for the other domain and as the receiving cross-domain key in the one domain. Therefore, each host system must store two cross-domain keys for cross domain communications between itself and another host system of the network, one being the cross-domain key it generated and designated as the sending cross-domain key and the other being a cross-domain key it received from the other host system and designated as the receiving cross-domain key. Since, these pairs of keys are to be stored at each host system, they must also be protected from being exposed in clear form. This can be accomplished, as in the case of terminal master keys, by having them enciphered under another key.

A sending cross-domain key in a sending host system is used in a transformation process, termed an RFMK function which will be described in greater detail hereafter, to reencipher a session key from encipherment under the host master key to encipherment under the sending cross-domain key for transmission, in this protected form, over a communication line to the receiving host system. At the receiving host system, the receiving cross-domain key is used in a different type of transformation process, termed an RTMK function which will be described in greater detail hereafter, to reencipher the received session key from encipherment under the sending cross-domain key to encipherment under the receiving host master key. In order to achieve cryptographically strong key management, these transform processes should be unidirectional i.e. the transform process should be irreversible at the sending host system and decipherable only at the receiving host system. Unidirectionality is achieved in the present invention by a multiple master key technique in which a first variant (KMH1) of the sending host master key (KMH$\phi$) is used to encipher the sending cross-domain key by the Encipher Master Key function (EMK1) and a second variant (KMH2) of the sending host master key (KMH$\phi$) is used to encipher the the receiving cross-domain key by an Encipher Master Key function (EMK2), which will be described in greater detail hereafter. The EMK2 function is similar to the EMK1 function in that the master key of the associated host system is read out and by selected inversion of certain bits, different from those inverted by the EMK1 function, of the host master key, the variant KMH2 is derived for use in enciphering the receiving cross-domain key. By enciphering the sending cross-domain key under the first variant of the host master key and by enciphering the receiving cross-domain key under the second variant of the host master key, the enciphered cross-domain keys, now in protected form, may be stored in a cryptgraphic data set until required for use in the transform processes.

Unidirectionality is made possible because the output of the sending RFMK transformation function, the session key enciphered under the sending cross-domain key, is usable only by the receiving RTMK transformation function. Thus, the sending host system can reencipher the session key from encipherment under the sending host master key to encipherment under the sending cross-domain key because the sending cross-domain key enciphered under the first variant of the sending host master key is available at the sending host system, but it cannot reencipher the session key from encipherment under the first variant of the sending cross-domain key to encipherment under the sending host master key because the sending cross-domain key enciphered under a second variant of the sending host master key is not available at the sending host system. Inversely, the receiving host system can reencipher the session key from encipherment under the sending cross-domain key to encipherment under the receiving host master key because the sending cross-domain key enciphered under the second variant of the receiving host master key is available at the receiving host system, but it cannot reencipher the session key from encipherment under the receiving host master key to encipherment under the sending cross-domain key because the sending cross-domain key is not available at the receiving host system.

In a multiple domain network where cross domain communication is to be established between an application program in one domain with an application program in another domain, an RTMK transformation function is required to reencipher the session key from encipherment under the application key of the application program associated with the sending host system to encipherment under the sending host master key, as will be described in greater detail hereafter. To perform this transform process the application key enciphered under the second variant of the sending host master key must be available at the sensing host system. Accordingly, the application keys of the application programs associated with each host system are enciphered under the second variant of the associated host system master key to permit this transform process to be performed. The EMK2 function may be used to encipher the application keys under the second variant of the host master key and the enciphered application keys, now in protected form, may also be stored in the cryptographic data set until required for use in the transformation process.

System generated primary communication keys, i.e. session keys, are time variant keys which are dynamically generated for each communication session and are used to protect communicated data. Since there may be numerous communications sessions it is impractical to have these keys generated by a human user. Therefore, the cryptographic apparatus of the host system may be used as a pseudo-random generator for generating, as each communication session is required, a pseudo-random number which, in keeping with the objective that cryptographic keys should never occur in the clear, may be defined as being a session key enciphered under the host key encrypting key. In a multiple domain network when cross domain communication is to be established between a terminal associated with a host system in one domain and an application program associated with a host system in another domain, the generated random number is defined as being the session key enciphered under a host master key. On the other hand, when cross domain communication is to be established between an application program in one domain and an application program in another domain, the generated random number is defined as being the session key enciphered under the application key associated with the application program of the sending host system.

In some private cryptographic systems involving multiple domain networks, end users may wish to use a mutually agreed upon private secondary communication key i.e. a private terminal master key or a private application key. These keys must be protected by encipherment under the appropriate variant of the associated host master key.

Where limited key management facilities are used with a private end user protocol, it may be necessary to write the enciphered private secondary communication key to an output device, such as a printer, and store the printer output in a secure manner, e.g. in a physically protected vault, until such time as the communication session is desired. At that time, the enciphered private secondary communication key is brought out and loaded into the host system. In the case of a private terminal master key the terminal user loads the private key into the terminal master key memory and the communication session may then be initiated.

In other private cryptographic systems involving multiple domain networks, where the end users use a private protocol which is unknown to the system, key selection, management and data transfer operations are performed without system knowledge that cryptography is being performed. In such arrangements, the end users may define a private protocol using a mutually agreed upon private primary communication key, i.e. a private session key. In order to meet the objective that no cryptographic key appear in clear form, the private session key must also be protected. This is accomplished, in this case, by enciphering the private session key under the host master key by an Encipher Master Key function ($EMK\phi$), which will be described in greater detail hereafter. With this end-to-end encryption approach, enciphered messages can be sent via networks of any type, private or public, without system knowledge that cryptography is being performed but providing communication security for such data transmissions.

The following table summarizes the protection provided for the various cryptographic keys used at a representative host system in a multiple domain communication network by the multiple master key arrangement which uses variants of the host master key.

KEY TABLE

| NAME | KMH1 | KMH2 | EXPLANATORY NOTE |
|---|---|---|---|
| Term 1 | $E_{KMH1}KMT_1$ | | |
| . | . | | Outboard |
| . | . | | |
| Term i | $E_{KMH1}KMT_i$ | | Terminal Keys |
| . | . | | |
| . | . | | |
| Term n | $E_{KMH1}KMT_n$ | | |
| Appl 1 | | $E_{KMH2}KNA_1$ | |
| . | | . | Inboard |
| Appl i | | $E_{KMH2}KNA_i$ | |
| . | | . | Application Keys |
| . | | . | |
| Appl n | | $E_{KMH2}KNA_n$ | |
| Host j | $E_{KMH1}KNC^{jk}$ | $E_{KMH2}KNC^{kj}$ | |
| . | $E_{KMH1}KNC^{jl}$ | $E_{KMH2}KNC^{lj}$ | Sending and Receiving |
| . | | | Cross-Domain Keys |
| Host k | $E_{KMH1}KNC^{kj}$ | $E_{KMH2}KNC^{jk}$ | For Sending And |
| . | $E_{KMH1}KNC^{kl}$ | $E_{KMH2}KNC^{lk}$ | Receiving |
| Host l | $E_{KMH1}KNC^{lj}$ $E_{KMH1}KNC^{lk}$ | $E_{KMH2}KNC^{jl}$ $E_{KMH2}KNC^{kl}$ | To/From Other Host Systems |

While it is efficient to use variants of a host master key to provide protection for the various cryptographic keys used in the system, it is well within the skill of the art to provide separate master keys instead of variants of a single master key. This could be accomplished by providing separate master key memories each being loaded with a master key which is different from each other and being accessed when needed. While this is a viable alternative, it would substantially increase the cost of the host data security device as opposed to using a single master key memory and obtaining variants as needed.

MULTIPLE DOMAIN COMMUNICATION NETWORKS

Figure 2:
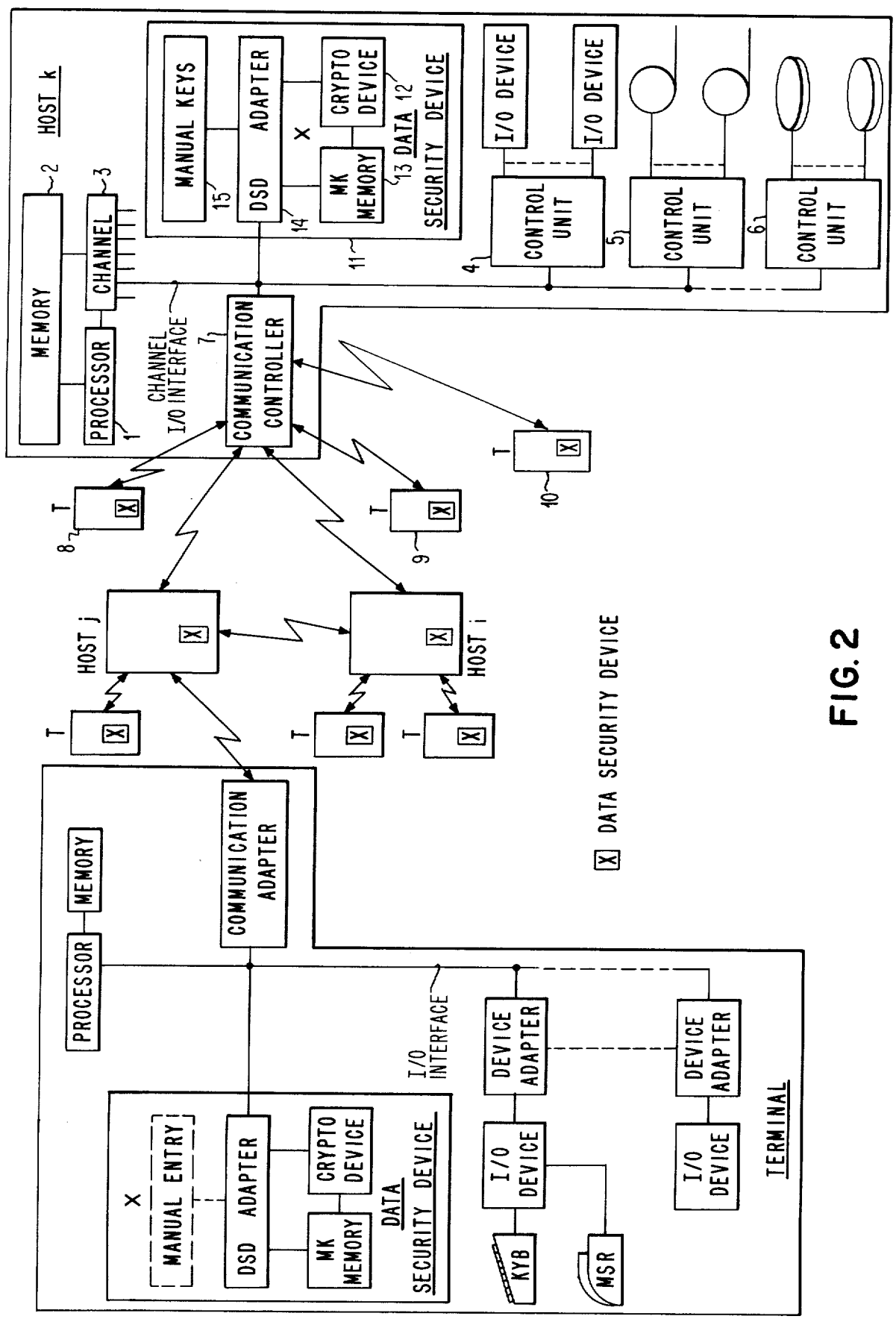
FIG. 2 is a block diagram of a representative multiple domain network illustrating, in block form, the details of a host and terminal in such a network.

Modern day data communication networks may include a complex of communication terminals connected via communication lines to a single host and its associated resources such as the host programs and locally attached terminals and data files. As the size of a data communication network increases other host systems may be brought into the network to provide multiple domain networks with each host system having knowledge of and managing its associated resources which make up a portion or domain of the network. By providing the proper cross domain link between the domains of the network, two or more domains may be interconnected to provide a networking facility. A representative multiple domain network is shown in FIG. 1 with a representative one of the host systems and its associated resources shown in block form and a representative one of the plurality of remote communication terminals associated with a host system also shown in block form. The terminal and its integrated data security device and the manner in which the data security device performs cryptographic operations is described in detail in the co-pending application Ser. No. 857,533, filed Dec. 5, 1977 entitled "Cryptographic Communication and File Security Using Terminals" by Ehrsam et al. While the particular manner in which the host is implemented is not critical to the present invention, the block diagram of the host in FIG. 2 shows the data flow and control relationships of a representative host arrangement. The host includes a programmable processor 1 operationally connected to a memory 2 which provides storage for data and the programs which are utilized to control the system and a channel 3 which controls the transfer of data between input/output devices and the processor 1. Channel 3 is connected to the processor 1 and memory 2 and via a channel I/O Interface, with control units such as control unit 4 capable of controlling a cluster of input/output devices which may be display or printer type of devices, control unit 5 capable of controlling a plurality of magnetic tape units or control unit 6 capable of controlling a plurality of disk files. Communication controller 7 is a two-direction control unit that links the host to communication lines connected to remote terminals such as communication terminals 8, 9 and 10 and host systems H$^i$ and H$^j$ each of which is similar to Host $^k$ and also have a plurality of terminals associated therewith. One of the terminals associated with Host $^j$ is shown in block form and is representative of the type of terminal used in the network. Such terminals and the manner in which they perform cryptographic operations is fully described in the aforementioned application Ser. No. 857,533. While not shown, communication lines require a modem at each end of the line to convert binary signals to analog signals (modulation) for transmission over the communication line and for reconverting (demodulation) analog signals back to binary signals at the other end of the line.

The collection of data and control lines connected between the channel and I/O control units is commonly referred to as the channel I/O interface providing an information format and signal sequence common to all the I/O control units. The I/O interface lines generally include a data bus out which is used to transmit device addresses, commands and data from the channel 3 to the I/O control unit; a data bus in which is used to transmit device identification, data or status information from the I/O control unit to the channel 3 and tag signal lines which are used to provide signals identifying an I/O operation, the nature of information on the data bus and parity condition. Since each I/O control unit has a unique electrical interface, device adapters are generally provided to allow device connection to the common I/O interface. All I/O data transfers between the processor and the attached control units may be performed in a programmed input/output (PIO) mode on a 1 byte per I/O instruction basis.

Into this organization of a general purpose host system is integrated a data security device of the present invention. The data security device (DSD) 11 includes a crypto device 12, a master key (MK) memory 13, a DSD adapter 14 which connects to the I/O interface and a manual entry device 15 for manually loading a terminal master key into the MK memory 13. Either one of two methods can be used for writing a host master key into the MK memory 13. The first method for writing the host master key into the MK memory 13 is achieved under program control. In this method, an I/O device having a keyboard, magnetic stripe card reader or the like, may use such elements to cause the host master key to be stored in the host memory 2 as in the case of conventional data entry. Subsequently, under program control, the host master key may be read from the host memory 2 to the MK memory 13 of the DSD in a manner which will be described in greater detail hereafter. The other method of writing the host master key into the MK memory 13 consists of manually writing the host master key into the MK memory 13 by means of individual toggle or rotary switches wired to produce binary coded hex digits as will be described in greater detail hereafter. To enable master key writing into the MK memory 13 by either method, an enable write key (EW) switch is provided which is initially turned on when a write master key operation is initiated and turned off at the end of write master key operation. To prevent the key from being changed by unauthorized persons, the EW switch operation may be activated by a physical key lock arrangement.

The DSD adapter 14 serves a dual function namely, providing adapter functions for DSD connection to the I/O interface and control functions for the DSD.

The I/O interface provides the DSD adapter 14 with overall direction, gives it cipher keys to be used, presents it with data to be processed and accepts the processed results. Overall direction is achieved by use of operation commands which are decoded and subsequently provide control in properly timed sequences of signals to carry out each command. These signals are synchronized with the transfer of data in and out. The DSD adapter 14 also controls the placing of cipher keys in the crypto device 12 and directs the crypto device in the enciphering and deciphering operations.

The MK memory 13 is a non-volatile 16×4 bit random access memory (RAM) which is battery powered to enable key retention when host power may not be present. The host master key consists of eight master key bytes (64 bits) each of which consists of seven key bits and one parity bit.

The crypto device 12 is the heart of the DSD hardware for performing enciphering and deciphering operations. The crypto device 12 performs encipher/decipher operations on a block cipher basis in which a message block of 8 data bytes (64 bits) is enciphered/deciphered under control of a 56 bit cipher working key to produce an enciphered/deciphered message block of 8 data bytes. The block cipher is a product cipher function which is accomplished through successive applications of a combination of non-linear substitutions and transpositions under control of the cipher working key. Sixteen operation defined rounds of the product cipher are executed in which the result of one round serves as the argument of the next round. This block cipher function operation is more fully described in the aforementioned U.S. Pat. No. 3,958,081. A basic encipher/decipher operation of a message block of data starts with the loading of the cipher key from the host memory 2. This key is generally stored under master key encipherment to conceal its true value. Therefore, it is received as a block of data and deciphered under the master key to obtain the enciphering/deciphering key in the clear. The clear key does not leave the crypto device 12 but is loaded back in as the working key. The message block of data to be enciphered/deciphered is then transferred to the crypto device 12 and the cipher function is performed, after which the resultant message block of enciphered/deciphered data is transferred from the crypto device 12 to the host memory 3. If subsequent encipher/decipher functions are to be performed using the same working key, there is no need to repeat the initial steps of loading and deciphering the working key as it will still be stored in the working key register.

The crypto device 12 includes duplicate crypto engines operating in synchronism to achieve checking by 100% redundancy. Referring now to FIG. 3, one of the crypto engines is shown in simplified block form with a heavy lined border signifying a secure area. The crypto engine 16 contains a 64 bit input/output buffer register 17 divided into upper and lower buffer registers 18 and 19 of 32 bits each. The buffer register 17 is used in a mutually exclusive manner for receiving input data on a serial by byte basis from the bus in, termed an input cycle, and for providing output data in a serial by byte basis to the bus out, termed an output cycle. Thus, during each input cycle a message block of eight data bytes is written into the buffer register 17 from the host memory 2 while during each output cycle a message block of eight processed data bytes is read from the buffer register 17 to the host memory 2. Serial outputs of the buffer register 17 are also applied as serial inputs to the working key register 20 and a parity check circuit 21, the latter being controlled to be effective only when a 64 bit clear cipher key is to be loaded directly into the working key register 20 from the host memory 2 via the buffer register 17. Only 56 of the 64 bits are stored in the working key register 20, the 8 parity bits being used only in the parity check circuit 21. The buffer register 17 is also provided with parallel input and output paths from and to a 64 bit data register 22 also divided into upper and lower data registers 23 and 24 of 32 bits each. The upper and lower data registers 23 and 24 each possesses parallel outputs and two sets of parallel inputs. The parallel inputs to the lower data register 24 being from the lower buffer register 19 and the upper data register 23 while the parallel inputs to the upper data register being from the upper buffer register 18 and from the lower data register 24 after modification by the cipher function circuits 25. The 64 bit master key is inputted to the crypto engine 16 on a serial by byte basis with each byte being checked for correct parity by the parity check circuit 26. As in the case of the cipher key transfer from the buffer register 17 to the working key register 20, only 56 of the 64 bits are stored in the key register 20, the 8 parity bits being used only in the parity check circuit 26. During the loading process, the key register 20 is configured as seven 8-bit shift right registers to accommodate the eight 7-bit bytes received from the MK memory 13 (or the buffer register 17).

When the working key is used for enciphering, the key register 20 is configured as two 28 bit recirculating shift left registers and the working key is shifted left, in accordance with a predetermined shift schedule, after each round of operation of the cipher function so that no set of key bits once used to perform a cipher operation is used again in the same manner. Twenty-four parallel outputs from each of the two shift registers (48 bits) are used during each round of the encipher operation. The shift schedule provided in such that the working key is restored to its initial beginning position at the end of the complete encipher operation.

When the working key is used for deciphering, the key register 20 is configured as two 28 bit recirculating shift right registers and the working key is shifted right in accordance with a predetermined shift schedule, after each round of operation of the cipher function so that again no set of key bits is used again. As in the enciphering operation, twenty-four parallel outputs from each of the two shift registers (48 bits) are used during each round of the decipher operation. The shift schedule provided in this case is also such that the working key is restored in its initial beginning position at the end of the complete decipher operation.

The cipher function circuits 25 perform a product cipher through successive application of a combination of non-linear substitutions and transpositions under control of the cipher working key. Sixteen rounds of the product cipher are executed in which the results of one round serves as the argument of the next round. Deciphering is accomplished by using the same key as for enciphering but with the shift schedule for shifting the key being altered so that the deciphering process is the reverse of the enciphering process, thus undoing in reverse order every step that was carried out during the enciphering process. During each round of the cipher function, the data contents of the upper data register 23, designated R, is enciphered under control of the working key, designated K, with the result being added modulo-2 to the contents of the lower data register 24, designated L, the operation being expressed as $L \oplus f(R,K)$. At the end of the cipher round, the contents of the upper data register 23 is parallel transferred to the lower data register 24 while the output of the cipher function circuits 25 is parallel transferred to the upper data register 23 to form the arguments for the next round of the cipher function. After a total of sixteen rounds, which completes the total cipher function, the contents of the upper data register 23 is parallel transferred to the upper buffer register 18 while the output of the cipher function circuits 25 is parallel transferred to the lower buffer register 19. The transformed data contents of the buffer register 17 is then outputted via the bus out of the host memory 2.

DSD COMMANDS AND ORDERS

Input/output operations of an I/O device are generally directed by the execution of I/O instructions. In executing an I/O instruction, the channel generally provides an address field for addressing the I/O device, a command field for designating the operation to be performed and another address field for addressing the data field in memory from which data is fetched or to which data is stored. The data security device 11 of the present invention is responsive to seven types of commands from the processor as shown in the following table including the mnemonic and bit pattern of the command:

| | COMMAND FORMAT | | | | | | | |
|---|---|---|---|---|---|---|---|---|
| | | | | | | | Command Field | |
| Name | Mnemonic | 0 | 1 | 2 | 3 | 4 | 5 | 6 7 |
| 1. Reset Adapter | RST | — | — | — | — | 0 | 0 | 1 0 |
| 2. Set Basic Status | SET BS | — | — | — | — | 0 | 1 | 1 0 |
| 3. Reset Basic Status | RST BS | — | — | — | — | 0 | 1 | 0 0 |
| 4. Read Basic Status | RD BS | — | — | — | — | 0 | 1 | 1 1 |
| 5. PIO Write Data | PIOW | — | — | — | — | 1 | 1 | 0 0 |
| 6. PIO Read Data | PIOR | — | — | — | — | 1 | 1 | 0 1 |
| 7. Write DSD Order | WR DSD | w | x | y | z | 1 | 1 | 1 0 |

The following is a brief description of the function of each of the commands, the operation of which will be described in greater detail hereafter.

1. Reset Adapter (RST)—This command causes a reset signal to be created to reset all counters, flip-flops and latches in the adapter and control sections of the DSD.

2. Set Basic Status (SET BS)—This command causes those latches in a status register of the DSD that correspond to 1's in the data field to be set to 1.

3. Reset Basic Status (RST BS)—This command is similar to the SET BS command except that the status latches corresponding to 1's in the data field are set to 0.

4. Read Basic Status (RD BS)—This command causes the contents of the status latches to be applied via the data bus in to the processor.

5. PIOW Data (PIOW)—This command causes the data field to be loaded into the buffer register or the bits 0, 1, 2, and 3 of the data field to be stored in the MK memory depending on the operation to be performed.

6. PIOR Data (PIOR)—This command causes the contents of the buffer register, with correct parity, to be applied via the data bus in to the processor.

7. Write DSD Order (WR DSD)—This command uses the four high order bits of the command field to designate cipher key handling and data processing orders as shown in the following table including the mnemonic and bit pattern of the order field:

| | ORDER FORMAT | | | | |
|---|---|---|---|---|---|
| | | Order Field | | Command Field | |
| Name | Mnemonic | W X | Y Z | 4 5 | 6 7 |
| Cipher Key Handling | | | | | |
| 1. Write Master Key | WMK | 0 0 | 0 0 | 1 1 | 1 0 |
| 2. Decipher Key | DECK | 0 1 | 1 1 | 1 1 | 1 0 |
| 3. Generate Random Number | GRN | 1 1 | 1 1 | 1 1 | 1 0 |
| 4. Encipher Master Key $\phi$ | EMK$\phi$ | 1 1 | 0 0 | 1 1 | 1 0 |
| 5. Encipher Master Key 1 | EMK1 | 1 1 | 0 1 | 1 1 | 1 0 |
| 6. Encipher Master Key 2 | EMK2 | 1 1 | 0 1 | 1 1 | 1 0 |
| 7. Reencipher From Master Key | RFMK | 0 1 | 0 1 | 1 1 | 1 0 |
| 8. Reencipher To Master Key | RTMK | 0 1 | 1 0 | 1 1 | 1 0 |
| Data Processing | | | | | |
| 1. Encipher | ENC | 1 0 | 0 0 | 1 1 | 1 0 |
| 2. Decipher | DEC | 1 0 | 1 0 | 1 1 | 1 0 |

DSD FUNCTIONS

DSD cryptographic functions may be performed by combinations of the previously defined commands or by a combination of functions. These functions require an input to the cryptographic apparatus consisting of a key parameter or a data parameter. The notation used to describe these functions will be expressed as follows:
FUNCTION[KEY PARAMETER]→OUTPUT or FUNCTION[DATA PARAMETER]→OUTPUT
and when functions are combined, the notation used to describe the combined functions will be expressed as follows:
FUNCTION[KEY PARAMETER, DATA PARAMETER]→OUTPUT The salient characteristics of host cyrptographic functions are that (1) the key parameter, is always in enciphered form and therefore must be internally deciphered by the crypto engine before the clear key is used and that (2) no function allows keys to become available in clear form. The descriptions that follow describe what each function does and how it is performed. These functions will be described in greater detail hereafter but the general description of these functions or combination of functions are given at this point to provide a better understanding of how various security applications may be performed. The descriptions may follow along with reference to FIG. 3 at times. In the diagrams which are referenced in the following, the cryptographic facility is shown in simplified block form for ease of understanding these operations and will be shown and described in greater detail hereafter.

Before proceeding to the descriptions of the functions, a brief general description will be given of how the manual write key operation is performed. Referring now to FIG. 4, there is shown a simplified block diagram of a manual WMK operation. In the manual WMK operation, an EW switch is set on to enable writing into the MK memory 13 after which a MW switch is closed to enable manual writing and causing the current master key to be overwritten with whatever happens to be set in the data key entry switches. Following this, 16 sets of 4 bits (64 bits) are manually written into the MK memory 13 to complete the manual WMK operation.

Referring now to FIG. 5, there is shown a simplified block diagram of a write master key (WMK) function. This function is carried out by the following sequence of commands: (1) WMK and (2) 16 PIOW's. In this operation, as in the manual WMK operation, the EW switch is previously set on to enable writing into the MK memory 13. The execution of this function causes the current master key in the master key memory 13 to be over-written with whatever happens to be present as bits 0, 1, 2 and 3 on the bus in. Thereafter, the crypto engine controls are set to allow a 64 bit master key KM to be written as a key parameter into the MK memory 13 by means of 16 successive PIOW data commands with the bits 0, 1, 2 and 3 in the data fields associated with the 16 PIOW data commands constituting the new master key. The notation WMK[KM]→KM is used to describe this operation whereby the term WMK indicates the function, the contents of the brackets indicate the key parameter input to the MK memory 13 and the arrow points to the result.

Figure 6:
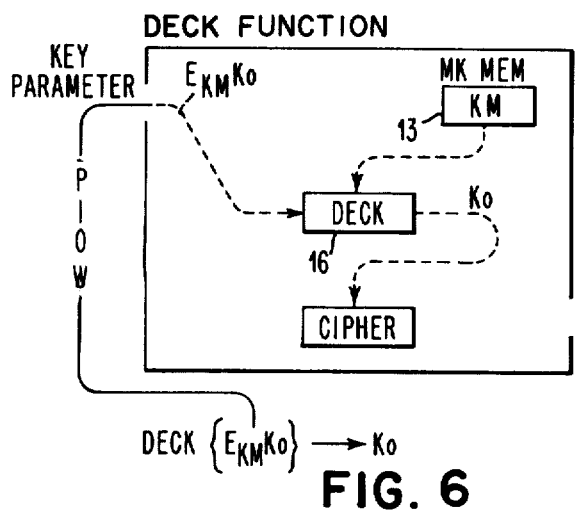
FIG. 6 illustrates in block diagram form a DECK function.

Referring now to FIG. 6, there is shown a simplified block diagram of a decipher key DECK function. This function is carried out by the following sequence of commands: (1) DECK and (2) 8 PIOW's. The execution of this function sets the crypto engine controls to first allow the master key KM in the MK memory 13 to be transferred to the crypto engine 16 as the working key. After or during the master key transfer, a 64 bit data block, defined as an operational key enciphered under the master key, is loaded as a key parameter into the crypto engine 16 by means of 8 successive PIOW data commands with the successive data fields associated with the 8 PIOW commands constituting the enciphered operational key. After the key parameter loading is completed, the crypto engine 16 performs a decipher operation to obtain the cipher key in clear form. The resultant clear cipher key does not leave the crypto engine 16 but is loaded back into the key register of the crypto engine 16 replacing the master key as the working key. The notation DECK[$E_{KM}$KO]→KO is used to describe this operation whereby the term DECK indicates the function, the contents of the bracket indicate the key parameter which is inputted to the crypto engine 16 and the arrow points to the result.

Figure 7:
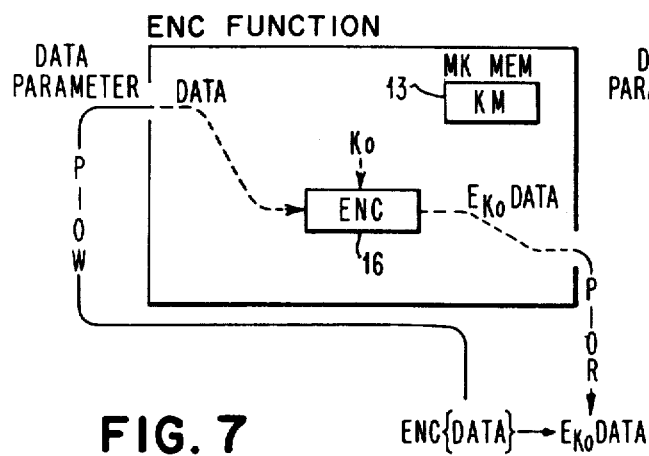
FIG. 7 illustrates in block diagram form a ENC function.

Referring now to FIG. 7, there is shown a simplified block diagram of an encipher (ENC) function. This function is carried out by the following sequence of commands: (1) ENC (2) 8 PIOW's and (3) 8 PIOR's. The execution of this function sets the crypto engine controls to the encipher mode of operation and allows a 64 bit message block of data to be loaded as a data parameter into the crypto engine 16 by means of 8 successive PIOW data commands with the successive data fields associated with the 8 PIOW commands constituting the message block of data to be enciphered. After the data parameter loading is completed, the crypto engine 16 performs an encipher operation to encipher the data parameter under the operational key presently stored in the working key register of the crypto device 16. The 64 bit enciphered result is transferred by a series of 8 PIOR commands from the crypto engine 16 for storage in designated data fields of the host memory 2. The notation ENC[DATA]→$E_{KO}$DATA is used to describe this operation whereby the term ENC indicates the function, the contents of the bracket indicate the data parameter input to the crypto engine 16 and the narrow arrow points to the result. Additionally, so long as the crypto engine controls remain set in the encipher mode of operation, then a message which consists of multiple 8 byte blocks of data may be enciphered by the crypto engine 16 by means of an encipher command followed by a series of successive 8 PIOW data commands and successive 8 PIOR data commands for each block of data. This message encipherment may be expressed by the notation: ENC[$DATA_1$, $DATA_2$ - - - $DATA_N$]→$E_{KO}$($DATA_1$, $DATA_2$ - - - $DATA_N$).

Figure 8:
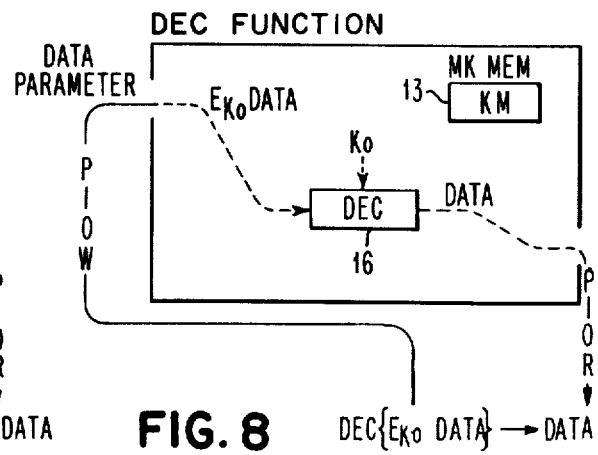
FIG. 8 illustrates in block diagram form a DEC function.

Referring now to FIG. 8, there is shown a simplified block diagram of a decipher (DEC) function. This function is carried out by the following sequence of commands: (1) DEC (2) 8 PIOW's and (3) 8 PIOR's. The execution of this function sets the crypto engine controls to a decipher mode of operation and allows a 64 bit message block of enciphered data to be loaded as a data parameter into the crypto engine 16 by means of 8 successive PIOW data commands with the successive data fields associated with the 8 PIOW commands constituting the message block of enciphered data to be deciphered. After the data parameter loading is completed, the crypto engine 16 performs a decipher operation to decipher the data parameter under control of the operational key presently stored in the working key register of the crypto engine 16. The 64 bit deciphered result is transferred by a series of 8 PIOR commands from the crypto engine 16 for storage in designated data fields of the host memory 2. The notation DEC[$E_{KO}$DATA]→DATA is used to describe this operation whereby the term DEC indicates the function, the contents of the bracket indicate the data parameter input to the crypto engine 16 and the arrow points to the results. Additionally, so long as the crypto engine controls remain set in the decipher mode of operation, then a message which consists of multiple blocks of enciphered data may be deciphered by the crypto engine 16 by means of a decipher command followed by a series of successive 8 PIOW data commands and successive 8 PIOR data commands for each block of enciphered data. This message decipherment may be expressed by the notation: DEC[$E_{KO}$($DATA_1$, $DATA_2$ - - - $DATA_N$)]→$DATA_1$,$DATA_2$ - - - $DATA_N$.

Figure 9:
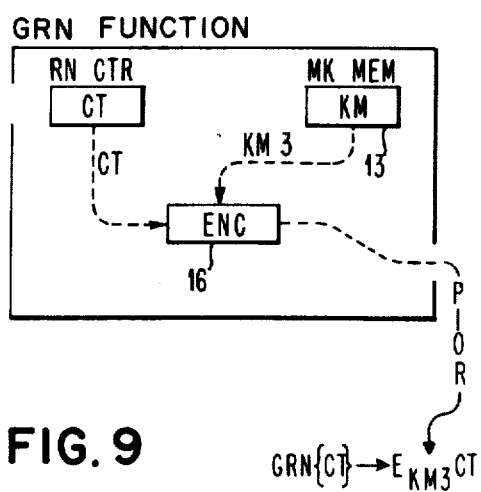
FIG. 9 illustrates in block diagram form a GRN function.

Referring now to FIG. 9, there is shown a simplified block diagram of a generate random number (GRN) function. This function is carried out by the following sequence of commands (1) GRN and (2) 8 PIOR's. Accordingly, in executing this function, the crypto engine controls are set to the encipher mode of operation and a variant KM3 of the master key KM in the MK memory 13 is transferred to the crypto engines 16 as the working key, the variant KM3 being obtained by inverting predefined bits of the master key. During the transfer of the master key variant KM3 to the crypto engine 16, a 64 bit count value CT from a non-resettable RN counter is loaded as a data parameter into the crypto engine 16. After the key and the data parameter loading is completed, the RN counter is stepped by one and the crypto engine 16 performs an encipher operation to encipher the data parameter CT under control of the variant KM3 of the master key presently stored in the working key register of the crypto device 16. The 64 bit enciphered result is a pseudo random number RN which is transferred by a series of 8 PIOR commands from the crypto engine 16 for storage in designated data fields of the host memory for use as a cryptographic key in a manner which will be described hereafter. The notation GRN [CT]→$E_{KM3}$(CT)=RN is used to describe this operation whereby the term GRN indicates the function, the contents of the bracket indicates the data parameter input to the crypto engine 16 and the arrow points to the result.

Figure 10:
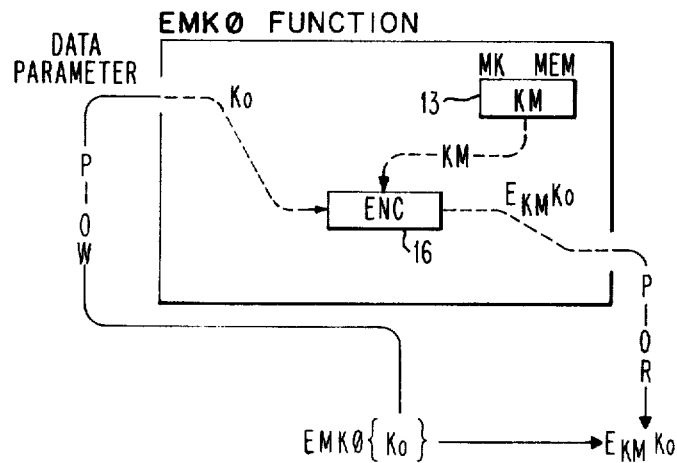
FIG. 10 illustrates in block diagram form an EMK0 function.
Figure 11:
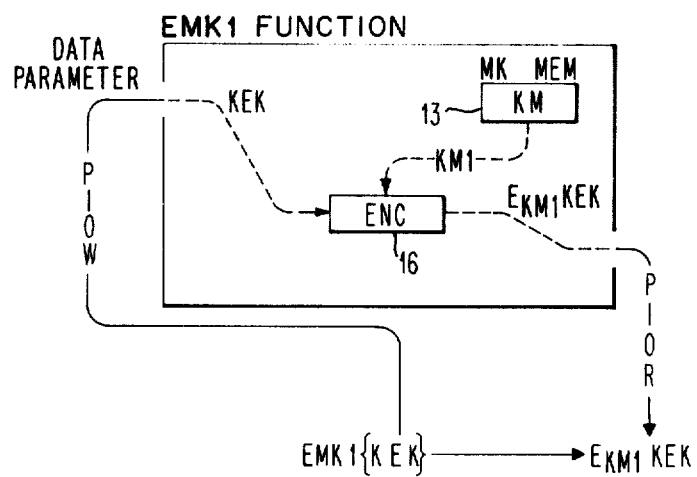
FIG. 11 illustrates in block diagram form an EMK1 function.
Figure 12:
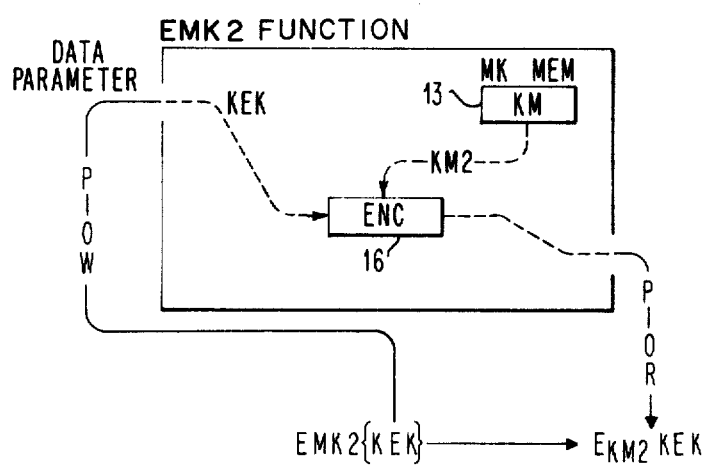
FIG. 12 illustrates in block diagram form an EMK2 function.

Referring now to FIGS. 10, 11, and 12, there are shown simplified block diagrams of the encipher master key (EMKφ, EMK1 and EMK2) function. This functon is carried out by the following sequence of commands (1) EMKφ (2) 8 PIOW's and (3) 8 PIOR's; (1) EMK1 (2) 8 PIOW's and (3) 8 PIOR's and (1) EMK2 (2) 8 PIOW's and (3) 8 PIOR's. Accordingly, in executing these functions, the crypto engine controls are set to the encipher mode of operation causing, in the case of the EMKφ function, the unmodified master key in the MK memory 13 to be transferred to the crypto engine 16 as the working key, in the case of the EMK1 function, a first variant KM1 of the master key KM in the MK memory 13 to be transferred to the crypto engine 16 as the working key and in the case of the EMK2 function, a second variant KM2 of the master key KM in the MK memory 13 to be transferred to the crypto engine 16 as the working key. The first variant KM1 and second variant KM2 are obtained by inverting different predefined bits of the master key which are different from those used in the GRN function. After or during the master key transfer, a 64 bit data block, defined as an operational key, in the case of the EMKφ command, or as a secondary key encrypting key, in the case of the EMK1 and EMK2 commands, are loaded as a data parameter into the crypto engine 16 by means of 8 successive PIOW data commands with successive data fields associated with the 8 PIOW commands constituting the operational key or the secondary key encrypting key. After the key and data parameter loading is completed, the crypto engine 16 performs an encipher operation to encipher the data parameter under the master key or variant of the master key stored in the working key register of the crypto device 16. The 64 bit enciphered result is transferred by a series of 8 PIOR commands from the crypto engine 16 for storage in designated data fields of the host memory. The notation EMKφ[KO]→$E_{KM}$KO is used to describe the EMKφ operation while the notations EMK1[KEK]→$E_{KM1}$KEK and EMK2[KEK]→$E_{KM2}$KEK are used to describe the EMK1 and EMK2 operations whereby the terms EMKφ, EMK1 and EMK2 indicate the function, the contents of the bracket indicate the data parameter input to the crypto engine 16 and the arrow points to the results.

Figure 13:
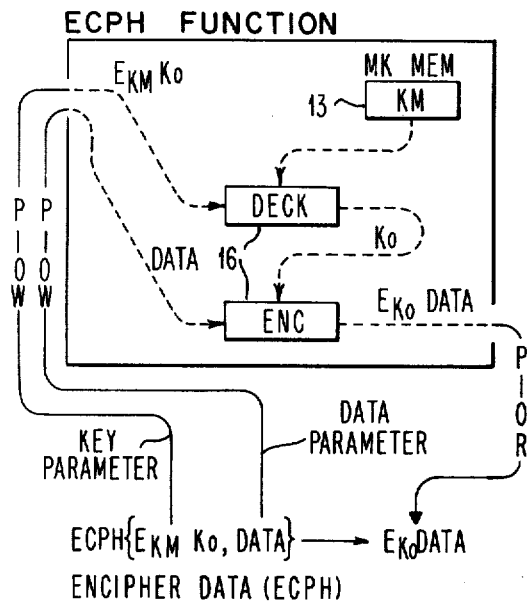
FIG. 13 illustrates in block diagram form an ECPH function.

Referring now to FIG. 13, there is shown a simplified block diagram of an encipher data (ECPH) function. This function is a combination of the DECK function and the ENC function and is carried out by the following sequence of commands: (1) DECK (2) 8 PIOW's (3) ENC (4) 8 PIOW's and (5) 8 PIOR's. Accordingly, in executing this function, the crypto engine controls are first set to the decipher key mode of operation by the DECK command causing the master key KM in the master key memory 13 to be transferred as the working key to the working key register of the crypto engine 16. After or during the master key loading, the key parameter of the function, consisting of an operational key enciphered under the master key, is loaded into the crypto engine 16 by means of 8 successive PIOW data commands. The crypto engine 16 then performs a decipher key operation to obtain the operational key in clear form which is then loaded back in as the working key of the crypto engine 16 replacing the previously loaded master key. The crypto engine controls are then set to an encipher mode of operation by the ENC command and the data parameter of the function, consisting of clear data, is loaded into the crypto engine 16 by means of 8 successive PIOW data commands. The crypto engine 16 then performs an encipher operation to encipher the data parameter under the present operational key. The enciphered result is then transferred by a series of 8 PIOR commands from the crypto engine 16 for storage in designated fields of the host memory 2. The notation ECPH[$E_{KM}$KO, DATA]→$E_{KO}$DATA is used to describe this operation whereby the term ECPH indicates the function, the contents of the bracket indicate the successive key parameter and data parameter inputs to the crypto engine and the arrow points to the result.

Figure 14:
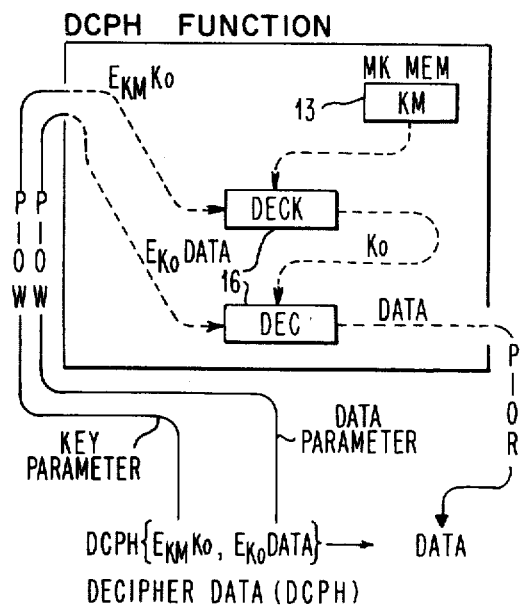
FIG. 14 illustrates in block diagram form a DCPH function.

Referring now to FIG. 14, there is shown a simplified block diagram of a decipher data (DCPH) function. This function is a combination of the DECK function and the DEC function and is carried out by the following sequence of commands: (1) DECK (2) 8 PIOW's (3) DEC (4) 8 PIOW's and (5) 8 PIOR's. The first part of this function is identical to that for the encipher data function insofar as loading an operational key in clear form as the working key of the crypto engine 16. After the operational key loading is completed, the crypto engine controls are then set to a decipher mode of operation by the DEC command and the data parameter of the function, consisting of DATA enciphered under the operational key, is loaded into the crypto engine 16 by means of 8 successive PIOW data commands. The crypto engine 16 then performs the decipher operation to decipher the data parameter under control of the present operational key. The deciphered result is then transferred by a series of 8 PIOR commands from the crypto engine 16 for storage in designated fields of the host memory 2. The notation DCPH[$E_{KM}$KO,$E_{KO}$DATA]→DATA is used to describe this operaton whereby the term DCPH indicates the function, the contents of the bracket indicates the successive key parameter and the data parameter inputs to the crypto engine and the arrow points to the result.

Figure 15:
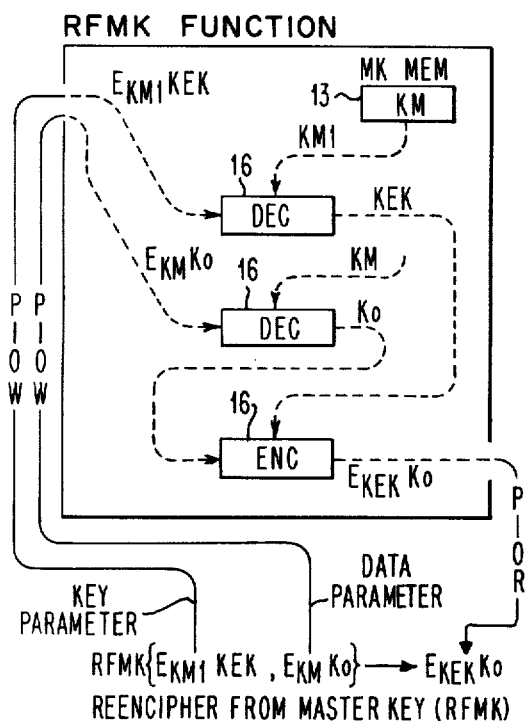
FIG. 15 illustrates in block diagram form a RFMK function.

Referring now to FIG. 15, there is shown a simplified block diagram of a reencipher from master key (RFMK) function. This function is carried out by the following sequence of commands: (1) RFMK, (2) 8 PIOW's (3) 8 PIOW's and (4) 8 PIOR's. Accordingly, in executing this function, the crypto engine controls are first set to the decipher mode of operation by the RFMK command and a variant KM1 of the master key KM in the KM memory 13 is transferred to the crypto engine 16 as the working key, the variant KM1 being obtained by inverting the same predefined bits of the master key as in the EMK1 function. During or after the transfer of the master key variant KM1 to the crypto engine 16, a 64 bit data block, defined as a key encrypting key enciphered under the same variant of the master key is loaded as a key parameter to the crypto engine 16 by means of 8 successive PIOW data commands with the successive data fields associated with the commands constituting the enciphered key encrypting key. After the key parameter loading is completed, the crypto engine 16 performs a decipher operation to obtain the key encrypting key in clear form. The resultant clear key encrypting key does not leave the crypto engine 16 but is retained, with half the resultant clear key available at the upper data registers 23 of the crypto engine 16 and the other half available at the cipher function circuits 25. With the crypto engine control still set for the decipher mode of operation, a special key operation is now performed in which a 64 bit data block, defined as an operational key enciphered under the master key, is loaded as a data parameter into the buffer register 17 of the crypto engine 16 by means of 8 successive PIOW data commands with the successive data fields associated with the commands constituting the enciphered operational key. After the data parameter loading is completed, the contents of the buffer register 17 is transferred to the data register 22 of the crypto engine 16 while at the same time the contents of the upper data register 23 and the output of the cipher function circuits 25 are transferred to the buffer register 17 of the crypto engine 16. By this swapping action, the key encrypting key resulting from the first decipher operation now resides in the buffer register 17 of the crypto engine 16 while the enciphered operational key now resides in the data register 22 of the crypto engine 16. Because of the fact that a special key operation is being performed, the crypto engine control allows the master key KM in the master key memory 13 to now be transferred to the crypto engine 16 as the working key. After the master key loading is completed, the crypto engine 16 performs a second decipher operation to obtain the operational key in clear form. The resultant clear operational key does not leave the crypto engine 16 but is retained, with half of the resultant clear key available at the upper data register 23 of the crypto engine 16 and the other half available at the cipher function circuits 25. At this time, a special encipher operation is initiated with the crypto engine controls being set for an encipher mode of operation and the half of the clear operational key at the cipher function circuits 25 is transferred to the lower data register 24 so that the clear operational key is now fully available in data register 22. The key encrypting key resulting from the first decipher operation and presently residing in the buffer register 17 of the crypto engine 16 is now loaded as a working key into the key register 20 of the crypto engine 16. After key register loading operation is completed, the crypto engine 16 performs an encipher operation to encipher the operational key under the key encrypting key to complete the reencipherment function by which the operational key enciphered under the master key is now enciphered under the key encrypting key. The reenciphered result is transferred by a series of 8 PIOR commands from the crypto engine 16 for storage in designated data fields of the host memory. The notation RFMK[$E_{KM1}$KEK,$E_{KM}$KO]→$E_{KEK}$KO is used to describe this operation whereby the term RFMK indicates the function, the contents of the brackets indicates the successive key parameter and data parameter inputs to the crypto engine and the arrow points to the results.

Figure 16:
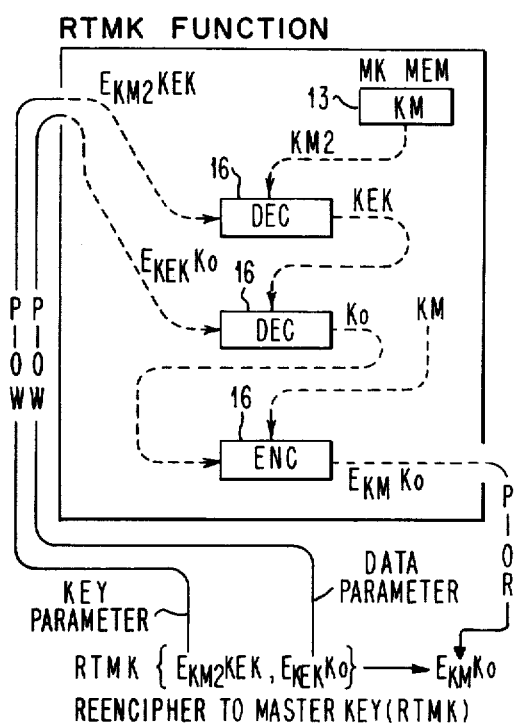
FIG. 16 illustrates in block diagram form a RTMK function.

Referring now to FIG. 16, there is shown a simplified block diagram of a reencipher to master key (RTMK) function. This function is carried out by the following sequence of commands: (1) RTMK, (2) 8 PIOW's, (3) 8 PIOW's and (4) 8 PIOR's. Accordingly, in executing this function the crypto engine controls are first set to the decipher mode of operation by the RTMK command and a variant KM2 of the master key KM in the MK memory 13 is transferred to the crypto engine 16 as the working key, the variant KM2 being obtained by inverting the same predefined bits of the master key as in the EMK2 function. During or after the transfer of the master key variant KM2 to the crypto engine 16, a 64 bit data block, defined as a key encrypting key enciphered under the same variant of the master key, is loaded as a key parameter into the crypto engine 16 by means of 8 successive PIOW data commands with the successive data fields associated with the 8 PIOW commands constituting the enciphered key encrypting key. After the key parameter loading is completed, the crypto engine 16 performs a decipher operation to obtain the key encrypting key in clear form. The resultant clear key encrypting key does not leave the crypto engine 16 but is loaded back into the key register 20 of the crypto engine 16 replacing the variant KM2 of the master key as the working key. With the crypto engine control still set for the decipher mode of operation, a second decipher operation is now performed in which a 64 bit data block, defined as an operational key enciphered under the same key encrypting key as is in the key register 20 of the crypto engine 16, is loaded as a data parameter into the crypto engine 16 by means of 8 successive PIOW data commands with the successive data fields associated with the command constituting the enciphered operational key. After the data parameter loading is completed, the second decipher operation is performed to obtain the operational key in clear form. The resultant clear operational key does not leave the crypto engine 16 but is retained in the buffer register 17 of the crypto engine 16. At this time, a special key operation is initiated to allow the master key KM in the MK memory 13 to now be transferred to the crypto engine 16 as the working key. After the master key loading is completed, the clear operational key, presently stored in the buffer register 17 of the crypto engine 16, is transferred to the data register 22 of the crypto engine 16 and a special encipher operation is initiated to set the crypto engine controls for an encipher mode of operation. The crypto engine 16 now performs an encipher operation to encipher the operational key under the host master key to complete the reencipherment function by which the operational key enciphered under the key encrypting key is reenciphered to the operational key enciphered under the host master key. The reenciphered result is transferred by a series of 8 PIOR commands from the crypto engine 16 for storage in designated data fields of the host memory. The notation RTMK[$E_{KM2}$KEK, $E_{KEK}$KO]→$E_{KM}$KO is used to describe this operation whereby the term RTMK indicates the function, the contents of the bracket indicates the key parameter and data parameter input to the crypto engine and the arrow points to the result.

COMMUNICATION SECURITY APPLICATIONS

The previous section provides a description of the various basic function, command and order capabilities of a host having a data security device capable of performing enciphering and deciphering operations. Similarly, the aforementioned co-pending application Ser. No. 857,533, provides a description of the various basic function, command and order capabilities of a terminal having a data security device capable of performing enciphering and deciphering operations. Accordingly, the following descriptions will provide an explanation of how such a terminal and host may be used in various communication security applications involving multiple domain networks. While the diagrams used to illustrate these applications are simplified block diagrams, it should be understood that the networks represented by these diagrams are far more complex than that shown. However, this type of representation is used merely to simplify and aid in the understanding of the applications to be described. It should be further understood that each host system contains a full complement of known programming support including an operating system, application programs, a telecommunications access method which, in the present case of multiple domain networks, directs the transmission of data between host systems and their associated application programs and terminals.

COMMUNICATION SECURITY IN MULTIPLE DOMAIN NETWORKS

Figure 17:
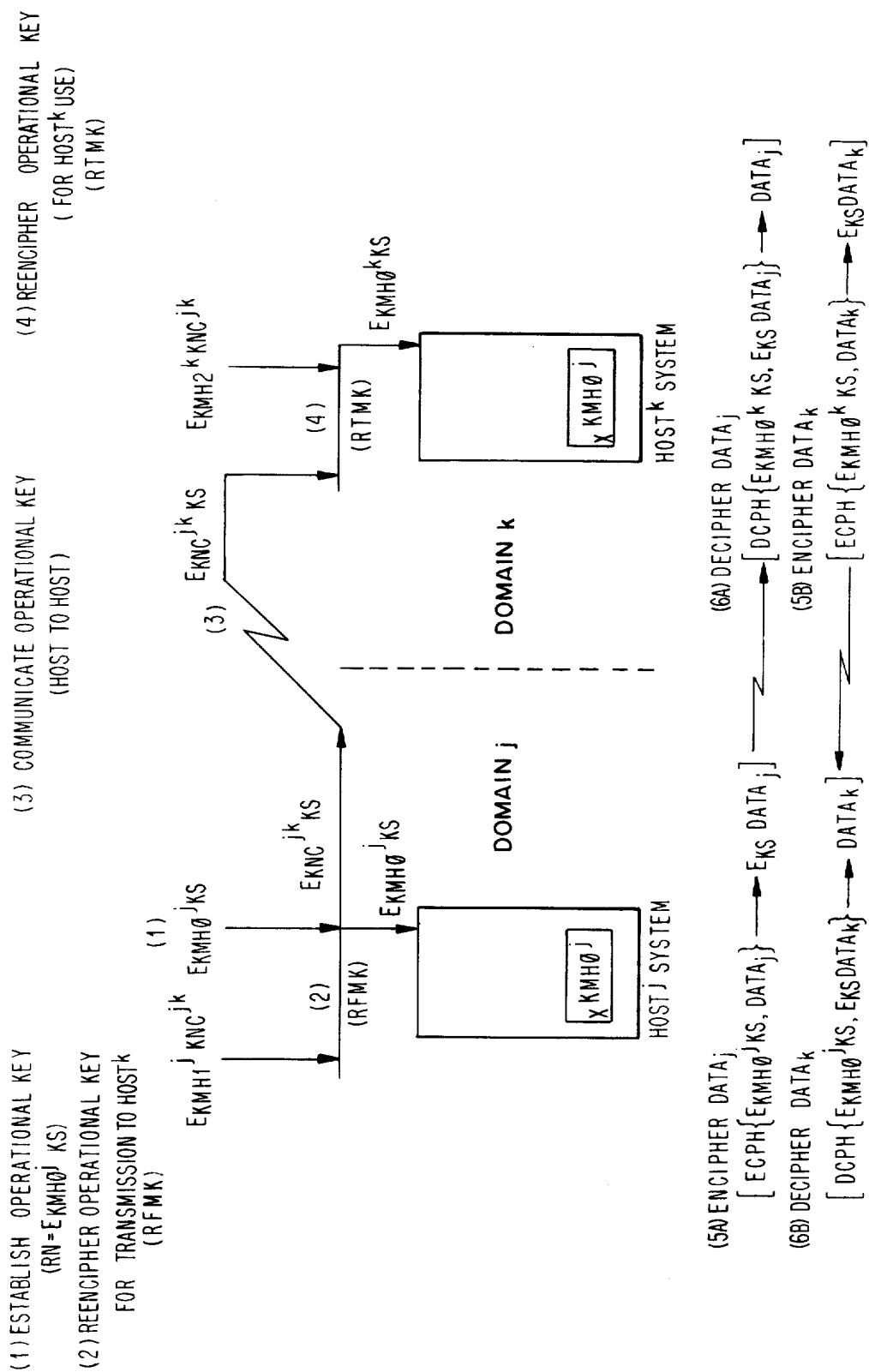
FIG. 17 is a block diagram illustrating the basic concepts of cryptographic communication security in a multiple domain network.

Referring now to FIG. 17, there is shown a simplified conceptual block diagram of a multiple domain data communication network comprising a first Host$^j$ system, having a data security device, connected via a communication line to a second Host$^k$ system also having a data security device contained therein.

At host system initialization time, primary key encrypting keys KMH$\phi^j$ and KMH$\phi^k$ are generated in some random manner, as by coin or dice throwing, and then written into the MK memory of the respective host DSD's. Following this, secondary communication key encrypting keys are generated in clear form and designated as cross-domain keys KNC$^{jk}$ and KNC$^{kj}$. The clear cross-domain keys are then distributed in a secure manner, as by courier, registered mail, public phone, etc. to authorized users at each host system. At the Host$^j$, the Host$^j$ cross-domain key is enciphered under the first variant of the Host$^j$ master key as $E_{KMH1j}KNC^{jk}$ by an Encipher Master Key (EMK1) function and the Host$^k$ cross-domain key is enciphered under the second variant of the Host$^j$ master key as $E_{KMH2j}KNC^{kj}$ by an Encipher Master Key (EMK2) function. At the Host$^k$, the Host$^k$ cross-domain key is enciphered under the first variant of the Host$^k$ master key as $E_{KMH1k}KNC^{kj}$ by an Encipher Master Key (EMK1) function and the Host$^j$ cross-domain key is enciphered under the second variant of the Host$^k$ master key as $E_{KMH2k}KNC^{jk}$ by an Encipher Master Key (EMK2) function. Following the encipherment of the cross-domain keys, they are written out to a cryptographic data set for storage until they are needed for a cryptographic operation.

To establish a communication session between Host$^j$ system and Host$^k$ system, the next step is to generate a primary communication operational or data encrypting key as the common session key KS. This is initiated at one of the host systems, as for example Host$^j$, by a procedure which causes a message to be transmitted to the other host system, Host$^k$, identifying itself and the application program with which it wishes to communicate and a request to initiate a communication session. Host$^k$, in response thereto, communicates with the identified application program to determine whether it is available for a communication session with Host$^j$. If available, the Host$^k$ system causes a message to be transmitted back to Host$^j$ indicating that the application program is available and Host$^j$ causes a pseudo random number to be generated which is defined as being the system session key enciphered under the Host$^j$ master key $E_{KMH\phi j}KS$. This is in keeping with the rule that no key shall ever appear in the clear. The enciphered session key is retained at the Host$^j$ system for encipher/decipher operations during the communication session. Additionally, in order to distribute the session key from the sending Host$^j$ to the receiving Host$^k$, Host$^j$, using the enciphered cross-domain key $E_{KMH1}KNC^{jk}$ and the enciphered session key $E_{KMH\phi j}KS$, performs a privileged RFMK transformation function which reenciphers the session key from encipherment under the Host$^j$ master key to encipherment under the sending cross-domain key i.e. from $E_{KMH\phi j}KS$ to $E_{KNC^{jk}}KS$. Since the session key is now enciphered under the sending cross-domain key i.e. $E_{KNC^{jk}}KS$, it may be transmitted over the communication line to establish a communication session with the application program in Host$^k$.

At the receiving Host$^k$, the received enciphered session key i.e. $E_{KNC^{jk}}KS$, must be transformed into a form which is usable by Host$^k$. Accordingly, Host$^k$, accesses its cryptographic data set to obtain the sending cross-domain key, which had been previously enciphered under a second variant of the Host$^k$ master key i.e. $E_{KMH2k}KNC^{jk}$, and together with the enciphered session key received from Host$^j$, performs a privileged RTMK transformation function which reenciphers the session key from encipherment under the sending cross-domain key to encipherment under the Host$^k$ master key.

Now, both host systems have the common session key in a form usuable to perform encipher/decipher data processing operations and the communication session is established. Host$^j$ can now communicate with the Host$^k$ to perform the following encipher ECPH function: ECPH[$E_{KMH\phi j}KS$,DATA$_j$]$\rightarrow E_{KS}$DATA$_j$. In executing this function, a decipher key operation DECK-($E_{KMH\phi j}KS$)$\rightarrow$KS is first performed to obtain the session key in clear form as the working key after which an encipher data operation ENC(DATA$_j$)$\rightarrow E_{KS}$DATA$_j$ is performed on the data to be transmitted over the communication line to the application program in Host$^k$.

At Host$^k$, the enciphered Host$^j$ data is deciphered by performing the following DCPH function:

DCPH($E_{KMH\phi k}KS$, $E_{KS}$DATA$_j$)$\rightarrow$DATA$_j$

In executing this function, Host$^k$ first performs a decipher key operation DECK($E_{KMH\phi k}KS$)$\rightarrow$KS to obtain the session key in clear form for use as the working key after which the enciphered data received from Host$^j$ is deciphered by a decipher operation DEC($E_{KS}$DATA$_j$)-$\rightarrow$DATA$_j$ to obtain the Host$^j$ data in clear form. Alternatively, Host$^k$ data may be enciphered under the session key at the Host$^k$ by performing the ECPH function ECPH($E_{KMH\phi k}KS$,DATA$_k$)$\rightarrow E_{KS}$DATA$_k$ for transmission over the communication line to Host$^j$. In this case, Host$^j$ performs the (DCPH) function to obtain the Host$^k$ data in clear form:

DCPH[$E_{KMH\phi k}KS$,$E_{KS}$DATA$_k$]$\rightarrow$DATA$_k$

It should be noted that when the communication session is terminated, either host system must reinitiate a new request for a new communication session and cause a new session key to be generated and defined as being enciphered under the host master key for establishing a new communication session. This procedure provides increased security for the system since the primary communication keys are time variant and dynamically generated for each new communication session. Thus, it should be apparent that there will be frequent operational key changes for subsequent communication sessions thereby providing increased security for the system.

COMMUNICATION SECURITY IN MULTIPLE DOMAIN NETWORKS USING CROSS-DOMAIN KEYS (TERMINAL-APPLICATION PROGRAM)

Figure 18:
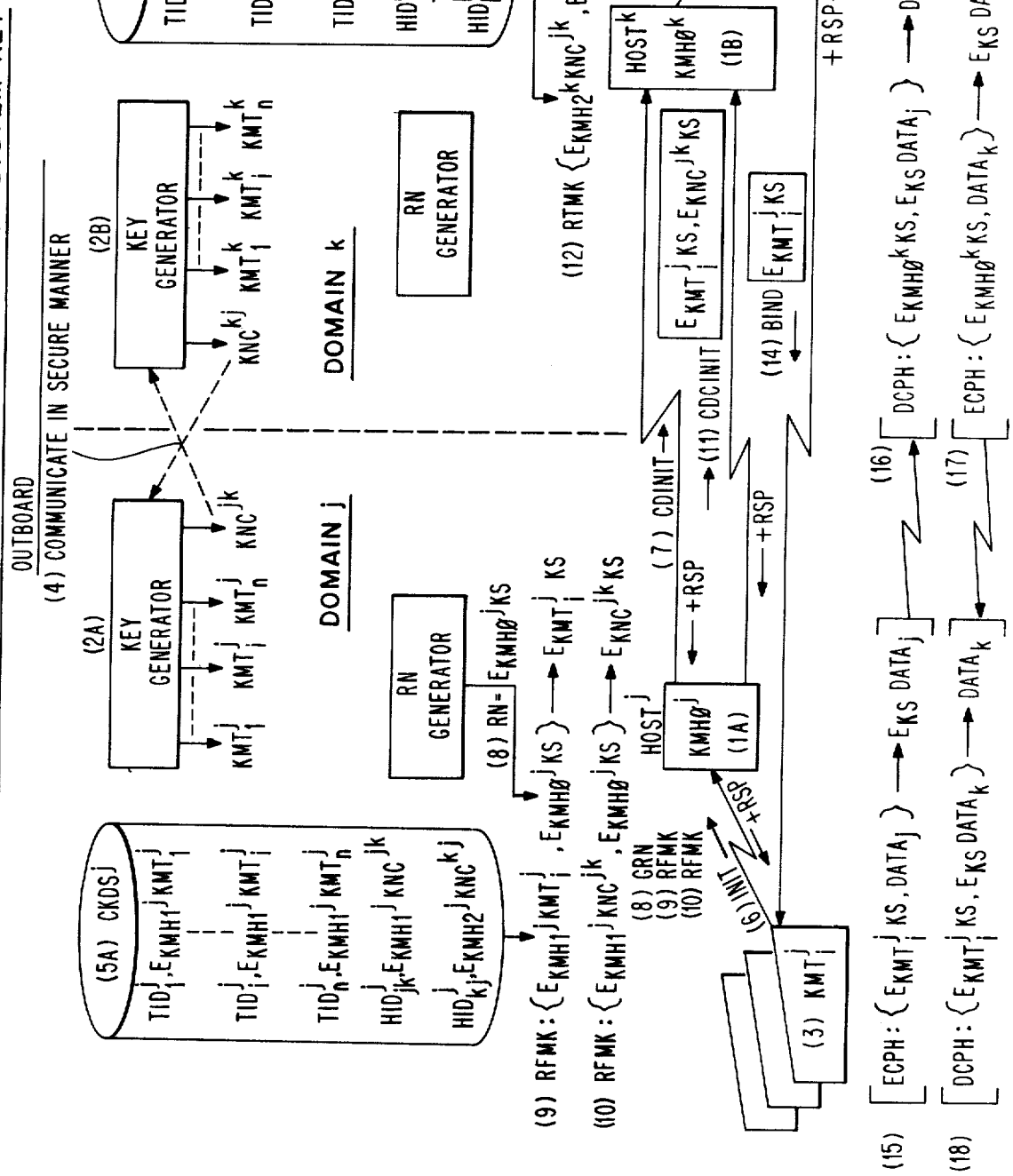
FIG. 18 is a block diagram illustrating details of cryptographic communication security in a multiple domain network involving a terminal and an application program in different domains of the network using system generated keys.

Referring now to FIG. 18, there is shown in block diagram form, a logical view of session level communication security involving a terminal in one domain and an application program in another domain of a multiple domain network. In order to properly control data transmissions throughout a data communication network, it is necessary to define a communication architecture for the network. The architecture establishes the logical structure, formats, protocols, and operational sequences for the orderly movement of information throughout the network. There are many possible communication architectures which can be extended to include cryptography support. One such type of architecture is the system network architecture described in varying detail in the following publications: "Systems Network Architecture General-Information" No. GA27-3102, IBM Corporation, Armonk, N.Y., 1975; "Advanced Function for Communications System Summary" No. GA27-3099, IBM Corporation, Armonk, N.Y., Second Edition, 1975; "System Network Architecture" IBM Systems Journal, Vol. 15, No. 1, 1976, Pages 4-80. Further details of the formats and protocols of such architecture are described in "Systems Network Architecture Format and Protocol Reference Manual: Architecture Logic" No. SC30-3112, IBM Corporation, Armonk, N.Y. 1976. Also, one type of access method implementation of this architecture for controlling the transmission of data between elements in a data communication network is described in detail in the publication, "Advanced Communication Function for VTAM (ACF/VTAM)—Concepts and Planning" No. GC38-0282-1, IBM Corporation, Armonk, N.Y., Second Edition, Aug. 1977. Another publication which provides an introductory description of data communication network configurations involving multiple domains is "Introduction to Advanced Communications Function—Multiple System Data Communication Networks" No. GC30-3033-0, IBM Corporation, Armonk, N.Y.; First Edition, Oct. 1976. A further publication which describes the logic of the Multisystem Networking Facility of the access method is provided in "Advanced Communication Function for VTAM—Multisystem Networking Facility Logic" No. LY27-8022-0, IBM Corporation, Armonk, N.Y., First Edition, Sept. 1977. While the details of the architecture described in these publications are not critical to the present invention, a brief discussion of the commands for session initiation and the network element between which they flow will be given in the following to provide a better understanding of the environment in which the invention may be applied.

In data communication networks, application programs and terminals are considered as logical units. Before data may be communicated between such logical units, a logical relationship called a session must be established between the respective logical units. In the communication session between an application program of a host system in one domain and a remote terminal of a host system in another domain, the application program acts as the primary logical unit (PLU) for establishing and terminating the communication session and the terminal acts as the secondary logical unit (SLU). In the communication session between an application program of a host system in one domain and an application program of a host system in another domain, one of the application programs acts as the primary logical unit (PLU) for establishing and terminating the communication session and the other application program acts as the secondary logical unit (SLU). In order to allow a session to proceed, it is necessary to establish a connection between the two logical units. Typically, the connection may be initiated at the terminal or by the application program causing an Initiate (INIT) request to be passed to the System Services Control Point (SSCP$_1$) of the associated host system in the one domain along with request parameters identifying the SLU in the session. The SSCP$_1$ is responsible for managing the network and has available to it a complete description of the network. When the INIT request is accepted, a positive response is returned to the requesting LU. SSCP$_1$ then causes a Cross Domain Initiate (CDINIT) request to be passed to the System Services Control Point (SSCP$_2$) associated with the host system in the other domain. The CDINIT request is used to notify SSCP$_2$ that a LU in the sending domain wishes to establish a communication session with a LU in the receiving domain. Upon receipt of the CDINIT request, SSCP$_2$ has the option to accept or reject the request. If accepted, a positive response is returned to SSCP$_1$ resulting in the creation of a Cross Domain Control Initiate (CDCINIT) request to be passed back to SSCP$_2$. The CDCINIT request is used to notify SSCP$_2$ to initiate a request to the LU in the receiving domain with which the sending LU wishes to communicate. Included with the CDCINIT request is a Bind image which contains the session parameters that establish the characteristics of the session to be established. If the CDCINIT request is accepted, a positive response is returned to SSCP$_1$ and SSCP$_2$ then causes a Control Initiate (CINIT) request to be passed to the application program in that domain that it should attempt to establish (BIND) a communication session with the LU in the sending domain. Included with the CINIT request is the Bind image containing the session parameters establishing the characteristics of the session to be established. Upon receipt of the CINIT request, the application program has the option to accept or reject the request to go into session with the LU in the other domain. When the CINIT request is accepted, a positive response is returned to SSCP$_2$. The application program then causes a BIND request, based on the Bind image, to be passed to the LU in the other domain requesting that a communication session be established. Included with the BIND request is the session parameters which define all of the protocols which must be observed during this session. Upon receipt of the BIND request, the LU in the other domain has the option to accept or reject the request to go into session with the application program. When the BIND request is accepted, a positive response is returned to the application program and the session is now established allowing data to be communicated between the application program in the other domain and the remote terminal/application program in the one domain.

The descriptions which now follow in connection with FIG. 18 through FIG. 23 are keyed to numbered notations in the figures in order to aid in understanding the sequence of operations performed in carrying out the application shown in each figure.

Accordingly, referring now to FIG. 18, at host initialization time of each host system in the different domains, (1) host master keys (KMH$\phi^j$) and (KMH$\phi^k$) are selected and loaded into the MK memory of the respective hosts systems by a manual WMK function or by requesting the execution of a WMK function under host control, (2) each host system then requests a series of GRN functions to be executed to define a series of terminal master keys (KMT$_1$-KMT$_n$) for each of the terminals associated with each host system and cross-domain keys (KNC$^{jk}$) and (KNC$^{kj}$) for each host system respectively. (3) The terminal master keys are then distributed to authorized individuals in a secure manner, as by courier, registered mail, public telephone etc. and loaded into the MK memory of the respective terminals by a manual WMK function or by requesting the execution of a WMK function under terminal control. (4) Similarly, the cross-domain keys are distributed in a secure manner to authorized individuals in the other domain for loading into the host system of the other domain. (5) Each host system next requests a series of EMK1 functions to be performed to encipher each of the generated terminal master keys and the cross-domain key under the first variant of the host master key ($E_{KMH1j}KMT^j$ - - - $E_{KMH1j}KMT_n^j$) and ($E_{KMH1j}KNC^{jk}$) in Host$^j$ and ($E_{KMH1k}KMT_1^k$ - - - $E_{KMH1k}KMT_n^k$) and ($E_{KMH1k}KNC^{kj}$) in Host$^k$. Each host system then requests an EMK2 function to be performed to encipher the received cross-domain key from the other host system under the second variant of the host master key ($E_{KMH2j}KNC^{kj}$) and ($E_{KMH2j}KNC^{jk}$) which are then written to a cryptographic key data set (CKDS) along with terminal and host ID's for subsequent retrieval when cryptographic operations are to be performed.

The session initiation process begins with either the terminal or an application program initiating (6) an INIT request. In the example shown, the terminal initiates an INIT request to the SSCP of Host$^j$ along with request parameters identifying the terminal in the session for which connection is being sought. When the INIT request is accepted, a positive response is returned to the requesting LU and (7) a CDINIT request is passed to notify Host$^k$ that a LU associated with Host$^j$ wishes to establish a communication session with a LU associated with Host$^k$. When the CDINIT request is accepted, a positive response is returned to the requesting Host$^j$. It should be noted that if the INIT request had been issued by the application program and accepted by Host$^k$, then Host$^k$ would issue the CDINIT request to inform Host$^j$ that a LU associated with Host$^k$ wishes to establish a communication session with a LU associated with Host$^j$. In either event, following the acceptance of the CDINIT request, the SSCP associated with Host$^j$ must now obtain a session key and arrange for its distribution to the participating network elements. Accordingly, the SSCP request a (8) GRN function to be performed to generate a random number which is defined as the session key enciphered under the host master key i.e. RN=$E_{KMH\phi j}KS$, in keeping with the objective that no key shall occur in clear form, with the enciphered session key being retained in the host memory for subsequent cryptographic transformation operations. In order to distribute the session key in a form usable by the requesting terminal, the SSCP next requests a (9) privileged RFMK transformation function to be performed. This is accomplished by accessing the CKDS for the enciphered terminal master key $E_{KMH1j}KMT^j$ as the key parameter and accessing the host memory for the enciphered session key $E_{KMH\phi j}KS$ as the data parameter to perform the RFMK function, whereby the enciphered session key is reenciphered from encipherment under the Host$^j$ master key to encipherment under the terminal master key $E_{KMTij}KS$. In order to distribute the session key in a form usable by Host$^k$, the SSCP at Host$^j$ next requests another (10) privileged RFMK transformation function to be performed. This is accomplished by accessing the CKDS for the enciphered cross-domain key $E_{KMH1j}KNC^{jk}$ as the key parameter and accessing the host memory for the enciphered session key as the data parameter to perform the second RFMK function whereby the enciphered session key is reenciphered from encipherment under the Host$^j$ master key to encipherment under the sending cross-domain key $E_{KNCjk}KS$. At this point, the session key enciphered under the Host$^j$ master key, $E_{KMH\phi j}KS$, is no longer needed and may be erased or, alternatively, the result of the second RFMK transformation may be used to overlay the enciphered session key $E_{KMH\phi j}KS$ so that it is no longer accessible. Having derived these quantities i.e. $E_{KMTij}KS$ and $E_{KNCjk}KS$, they are included in the session parameters of the CDCINIT request. (11) The SSCP associated with Host$^j$ then causes the CDCINIT request to be passed to the SSCP associated with Host$^k$ indicating that there is a request for a session to be established with the terminal. If the SSCP associated with Host$^k$ accepts the CDCINIT request, a positive response is returned to the SSCP associated with Host$^j$. In order to obtain the received session key in usable form at the receiving Host$^k$, the SSCP at Host$^k$ next requests a (12) privileged RTMK transformation function to be performed. This is accomplished by accessing the CKDS associated with Host$^k$ for the sending cross-domain key enciphered under the second variant of the Host$^k$ master key $E_{KMH2k}KNC^{jk}$ as the key parameter and the received enciphered session key as the data parameter to perform the RTMK function whereby the received enciphered session key is reenciphered from encipherment under the sending cross-domain key $E_{KNCjk}KS$ to encipherment under the receiving Host$^k$ master key $E_{KMH\phi k}KS$. The result of the RTMK transformation function ($E_{KMH\phi k}KS$) replaces the enciphered session key ($E_{KNCjk}KS$) as a session parameter. (13) The SSCP associated with Host $^k$ then prepares a CINIT request and passes it to the application program indicating that there is a request for a session to be established with the terminal. If the application program accepts the CINIT request, a positive response is returned to the SSCP associated with Host$^k$ and the enciphered session key $E_{KMH\phi k}KS$ is extracted and saved for subsequent encipher/decipher data operations during the session. (14) The application program then generates a BIND request which contains among other things the enciphered session key $E_{KMTij}KS$, which is passed to the terminal. If the terminal accepts the BIND request, a positive response is returned to the application program and the enciphered session key $E_{KMTij}KS$ is extracted and saved for subsequent encipher/decipher data operations during the session. The net result of this is to establish a communication session between two participating LU's of the different domains of the network with each being provided with a common operational key in a form suitable for use with their respective cryptographic apparatus. Thus, the terminal can now request that an (15) ECPH function be performed to encipher terminal data, using the session key enciphered under the terminal master key, to obtain enciphered terminal data $E_{KS}DATA_j$ for transfer to the application program and the application program can request a (16) DCPH function be performed to decipher the enciphered data received from the terminal using the same session key but enciphered under the host master key to obtain the terminal data (DATA$_j$) in clear form. Alternatively, the application program can request an (17) ECPH function to be performed, using $E_{KMH\phi k}KS$, to encipher Host$^k$ data and the terminal can request a (18) DCPH function to be performed, using $E_{KMTij}KS$, to decipher enciphered host data received from the application program.

COMMUNICATION SECURITY IN MULTIPLE DOMAIN NETWORKS USING CROSS-DOMAIN KEYS (APPLICATION PRGM—APPLICATION PRGM)

Figure 19:
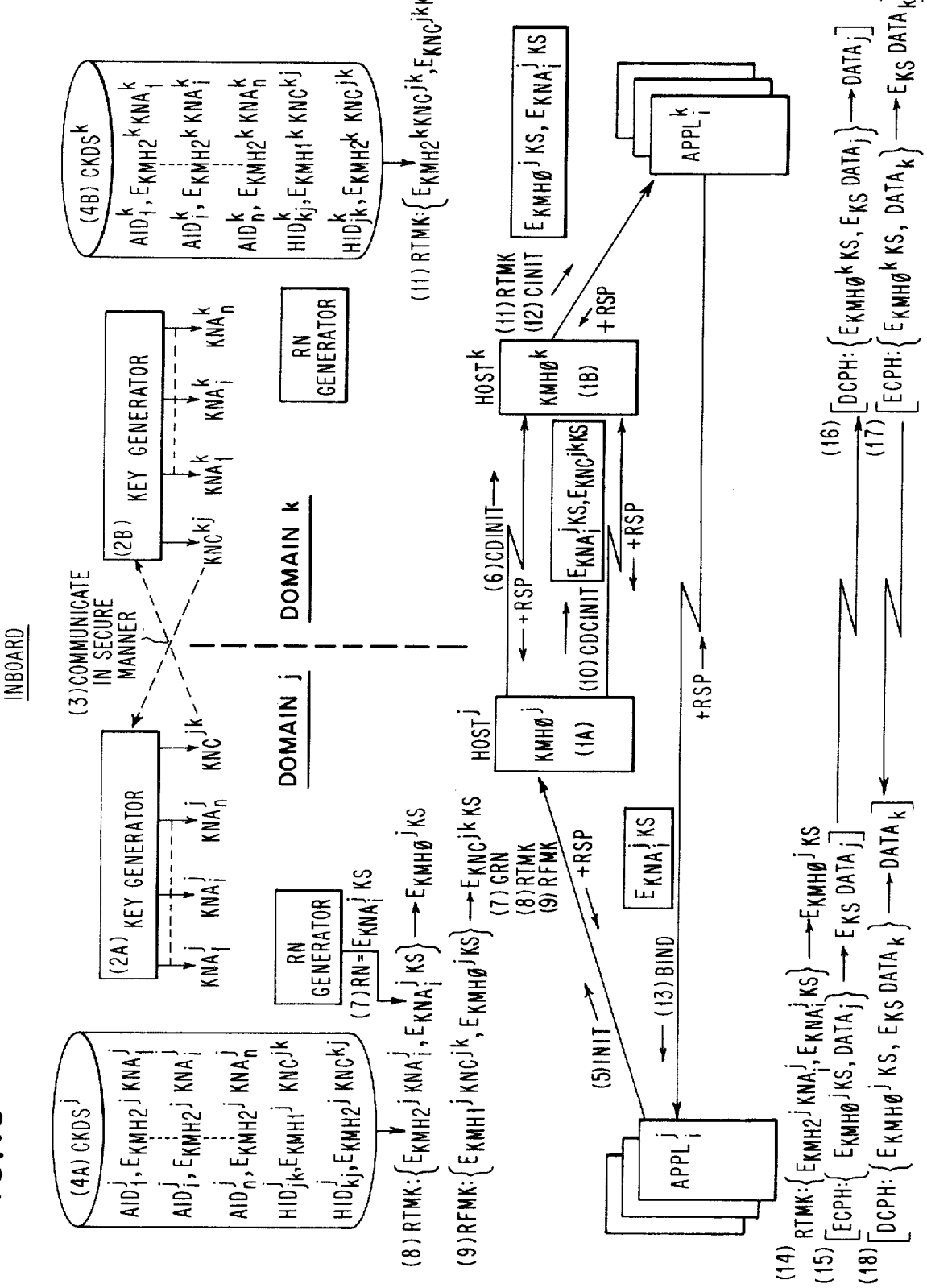
FIG. 19 is a block diagram illustrating details of cryptographic communication security in a multiple domain network involving application programs in different domains of the network using system generated keys.

Referring now to FIG. 19, there is shown in block diagram form, a logical view of session level communication security involving an application program in one domain and another application program in another domain of a multiple domain network. At host initialization time of each host system in the different domains, (1) host master keys (KMH$\phi^j$) and (KMH$\phi^k$) are selected and loaded into MK memory of the respective host systems by a manual WMK function or by requesting the execution of a WMK function under host control, (2) each host system then requests a series of GRN functions to be executed to define a series of application keys (KNA$_1$-KNA$_n$) for each of the application programs associated with each host system and a cross-domain key (KNC$^{jk}$) and (KNC$^{kj}$) for each host system, respectively. (3) The cross-domain keys are then distributed to an authorized individual in the other domain in a secure manner, as by courier, registered mail, public telephone and so forth, for loading into the host system of the other domain. (4) Each host system next requests a series of EMK2 functions to be performed to encipher each of the generated application keys and the cross domain key received from the other host system under the second variant of the host master key (E$_{KMH2j}$KNA$_1^j$ - - - E$_{KMH2j}$KNA$_n^j$) and (E$_{KMH2j}$KNC$^{kj}$) in Host$^j$ and (E$_{KMH2k}$KNA$_1^k$ - - - E$_{KMH2k}$KNA$_n^k$) and (E$_{KMH2k}$KNC$^{jk}$) in Host$^k$. Each host system then requests an EMK1 function to be performed to encipher the sending cross domain key under the first variant of the host master key (E$_{KMH1j}$KNC$^{jk}$) and (E$_{KMH1k}$KNC$^{kj}$) which are then written to a cryptographic data set (CKDS) along with the application and host ID's for subsequent retrieval when cryptographic operations are to be performed.

The session initialization process begins with either application program initiating an INIT request. (5) In the example request shown, the application program associated with Host$^j$ initiates the INIT request to the SSCP of Host$^j$ along with request parameters identifying the application program in the session for which connection is being sought. When the INIT request is accepted, a positive response is returned to the requesting LU and (6) a CDINIT request is passed to notify Host$^k$ than an LU associated with Host$^j$ wishes to establish a communication session with a LU associated with Host$^k$. When the CDINIT request is accepted, a positive response is returned to the requesting Host$^j$. The SSCP associated with Host$^j$ must now obtain a session key and arrange for its distribution to the participating network elements. Accordingly, the SSCP requests a (7) GRN function to be performed to generate a randon number which is defined as the session key enciphered under the application key associated with the requesting application program i.e. RN=E$_{KNAij}$KS, in keeping with the objective that no key shall occur in clear form, with the enciphered session key being retained briefly in the host memory for a subsequent cryptographic transformation operation. In order to distribute the session key in a form usable by the receiving host system, the SSCP must perform two transformation functions, the first of which is to obtain the session key enciphered under the host master key of the sensing Host$^j$ and the second of which is to use the result of the first transformation function to obtain the session key enciphered under the sensing cross domain key of the Host$^j$ for transmission over the cross domain link to the receiving Host$^k$. Therefore, the SSCP next requests a (8) privileged RTMK transformation function to be performed. This is accomplished by accessing the CKDS for the enciphered application key associated with the requesting program E$_{KMH2j}$ KNA$_i^j$ as the key parameter and accessing the host memory for the enciphered session key E$_{KNAij}$ KS as the data parameter to perform the RTMF function, whereby the enciphered session key is reenciphered from encipherment under the application key to encipherment under the Host$^j$ master key E$_{KMH\phi j}$KS. The SSCP at Host$^j$ next requests (9) privileged RFMK transformation function to be performed. This is accomplished by accessing the CKDS for the enciphered sending cross-domain key E$_{KMH1j}$KNC$^{jk}$ as the key parameter and accessing the host memory for the enciphered session key as the data parameter to perform the RFMK function whereby the enciphered session key is reenciphered from encipherment under the Host$^j$ master key to encipherment under the sending cross-domain key E$_{KNCjk}$KS. At this point, the session key enciphered under the Host$^j$ master key, E$_{KMH\phi j}$KS is no longer needed and may be erased or, alternatively, the result of the RFMK transformation may be used to overlay the enciphered session key E$_{KMH\phi j}$KS so that it is no longer accessible. Having derived the quantities i.e. E$_{KNAij}$KS and E$_{KNCjk}$KS they are included in the session parameters of the CDCINIT session parameter request. (10) The SSCP associated with Host$^j$ then causes the CDCINIT request to be passed to the SSCP associated with Host$^k$ indicating that there is a request for a session to be established with a LU in domain j. If the SSCP associated with Host$^k$ accepts the CDCINIT request, a positive response is returned to the SSCP associated with Host$^j$.

In order to obtain the received session key in usable form at the receiving Host$^k$, the SSCP at Host$^k$ next requests a (11) privileged RTMK transformation function to be performed. This is accomplished by accessing the CKDS associated with Host$^k$ for the sending cross-domain key enciphered under the second variant of the Host$^k$ master key E$_{KMH2k}$KNC$^{jk}$ as the key parameter and the received enciphered session key as the data parameter to perform the RTMK function whereby the received enciphered session key is reenciphered from encipherment under the sensing cross-domain key E$_{KNCjk}$KS to encipherment under the receiving Host$^k$ master key E$_{KMH\phi k}$KS.

The result of the RTMK transformation function (E$_{KMH\phi k}$KS) replaces the enciphered session key (E$_{KNCjk}$KS) as a session parameter. (12) The SSCP associated with Host$^k$ then prepares a CINIT request and passes it to the application program indicating that there is a request for a session to be established with the LU in domain j. If the application program accepts the CINIT request, a positive response is returned to the SSCP associated with Host$^k$ and the enciphered session key E$_{KMH\phi k}$KS is extracted and saved for subsequent encipher/decipher data operations at Host$^k$ during the session. (13) The application program associated with Host$^k$ then generates a BIND request which contains among other things the enciphered session key E$_{KNAij}$KS, which is passed to the application program associated with Host$^j$. If the application program accepts the BIND request, a positive response is returned to the application program associated with Host$^k$ and the enciphered session key $E_{KNAij}KS$ is extracted and saved for a subsequent transformation function to provide the session key in a usable form at Host$j$. Unlike the terminal communication in the previous example, an application program has no cryptographic facility of its own and therefore must use the cryptographic facility of the host with which it is associated. Therefore, the session key used by the application program when enciphering or deciphering data must be in a form in which it is enciphered under the associated host master key. Accordingly, the session key presently enciphered under the application key of the associated application program must be reenciphered under the associated host master key. This is accomplished by requesting a (14) privileged RTMK transformation function to be performed at Host$j$. This is accomplished by accessing the CKDS associated with Host$j$ for the application key associated with the requesting application program which is enciphered under the second variant of the Host$j$ master key $E_{KMH2j}KNA_j$ as the key parameter and the received enciphered session key as the data parameter to perform the RTMK function, whereby the received enciphered session key is reenciphered from encipherment under the application key $E_{KNAij}KS$ to encipherment under the sending Host$j$ master key $E_{KMH\phi j}KS$. The net result of this is to establish a communication session between the two participating application programs of the different domains of the network with each being provided with a common operational key in a form suitable for use with the cryptographic apparatus of the respective host systems. Thus, the application program associated with the Host$j$ can now request that an (15) ECPH function be performed to encipher Host$j$ data using the session key enciphered under the Host$j$ master key, to obtain enciphered Host$j$ data $E_{KS}DATA_j$ for transfer to the application program associated with Host$k$ and the application program associated with Host$k$ can request a (16) DCPH function to be performed to dicipher the enciphered data received from the application program associated with Host$j$ using the same session key but enciphered under the Host$k$ master key to obtain the Host$j$ data ($DATA_j$) in clear form. Alternatively, the application program associated with Host$k$ can request an (17) ECPH function to be performed, using $E_{KMH\phi k}KS$, to encipher Host$k$ and the application program associated with Host$j$ can request a (18) DCPH function to be performed, using $E_{KMH\phi j}KS$, to decipher enciphered Host$k$ data received from the application program associated with Host$k$ to obtain Host$k$ data ($DATA_k$) in clear form.

COMMUNICATION SECURITY IN MULTIPLE DOMAIN NETWORKS USING A PRIVATE KEY (TERMINAL-APPLICATION PROGRAM)

Figure 20:
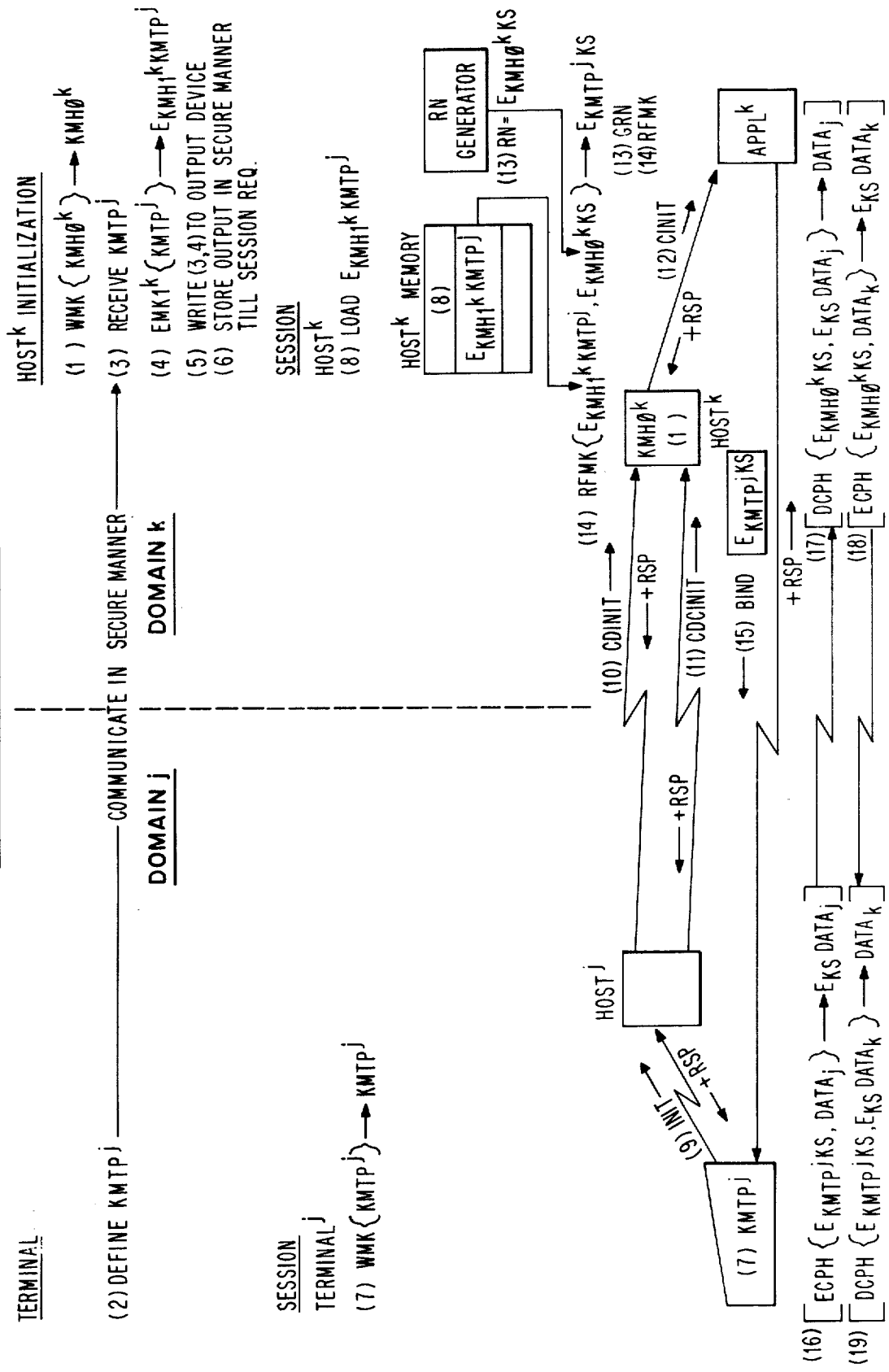
FIG. 20 is a block diagram illustrating details of cryptographic communication security in a multiple domain network involving a terminal and an application program in different domains of the network using a private terminal key.

Referring now to FIG. 20, there is shown in block diagram form, a logical view of communication security involving a terminal in a one domain and an application program in another domain of a multiple domain network using a private key. There are many situations where it is desired to provide data transmissions through a data communication network using a private secondary communication key i.e. a private terminal master key (KMTP) which is not system generated but is mutually agreed upon by the end users. In this case, a private level of communication security can be established by using a protcol whereby key selection and distribution are the users responsibility and requests for cryptographic service are explicitly expressed by the end user. Therefore, in this case, at Host$k$ initialization time (1) a Host$k$ master key (KMH$\phi^k$) is again selected and loaded into or may already reside in the Host$k$ MK memory. (2) The terminal user decides upon and defines a private terminal master key (KMTP$j$) to be used in a communication session with an application program associated with Host$k$. (3) The defined private terminal master key is then communicated in a secure manner to an authorized user at Host$k$. The private terminal master key is then loaded into the Host$k$ memory and the host requests (4) an EMK1 function to be performed to encipher the private key under the first variant of the Host$k$ master key $E_{KMH1k}KMTP^j$. However, in this instance, since cryptographic services are explicitly expressed by the end user rather than the system, the private key and its enciphered version are not written out to a CKDS but rather (5) to an output device e.g. a printer, where both a copy of the defined private key and its enciphered version is (6) stored in a secure manner e.g. in a vault, until such time as a communication session is to be established. At that time, (7) the terminal user who wishes to initiate a communication session loads the private terminal master key into the terminal by a manual WMK function or by requesting the execution of a WMK function under the terminal control and (8) the enciphered version retrieved from the vault is loaded into the Host$k$ memory for subsequent use when cryptographic services are requested. As in the previously described terminal-application example, the request to establish a session may be initiated, for example, by the terminal user causing an (9) INIT request to be passed to the SSCP of the Host$j$ system. When the INIT request is accepted, a positive response is returned to the requesting LU. In this case, since the private end user protocol has established that requests for cryptographic services are to be expressed by the application program, the SSCP makes no request for a session key but merely causes a (10) CDINIT request to be passed to the SSCP of the Host$k$ system to notify the SSCP that a LU in the sending domain wishes to establish a communication session with a LU in the receiving domain. If the SSCP associated with the Host$k$ accepts the CDINIT request, a positive response is returned to the SSCP associated with the Host$j$ resulting in the creation of a CDCINIT request to be passed back to the SSCP of the Host$k$ system requesting it to initiate a request to the LU receiving domain with which the sensing LU wishes to communicate. If the SSCP associated with the Host$k$ system accepts the CDCINIT request, a positive response is returned to the SSCP of the Host$j$ and a (12) CINIT request is passed to the application program requesting that it attempt to bind a communication session between the application program in domain$_k$ and the LU in domain$_j$. If the application program accepts the CINIT request, a positive response is returned to the SSCP of the Host$k$ system and the application program then requests a (13) GRN function to be performed to obtain a random number defined as the enciphered session key i.e. $R = E_{KMH\phi k}KS$ and a (14) privileged RFMK function to transform the session key enciphered under the host master key $E_{KMH\phi k}KS$ to the session key enciphered under the private terminal master key $E_{KMTPj}KS$ for transmittal to the terminal. This is accomplished by accessing the Host$k$ memory for the enciphered private terminal master key $E_{KMH1k}KMTP^j$ as the key parameter and the enciphered session key $E_{KMH\phi k}KS$ as the data parameter to perform the RFMK function whereby the session key is reenciphered from encipherment under the Host$^k$ master key $E_{KMH\phi k}KS$ to encipherment under the private terminal master key. The result of the RFMK transformation function is placed in the Bind image and the application program generates a BIND request, based on the Bind image, which is (15) passed to the terminal associated with Host$^j$. If the terminal accepts the BIND request, a positive response is returned to the application program associated with Host$^k$ and the enciphered session key $E_{KMTPj}KS$ is extracted and saved for subsequent cryptographic operations at the terminal. The balance of the operation is identical to that described above in connection with FIG. 18 and once the common session key is established at both ends, the application program will control all requests for encipher (ECPH) or decipher (DCPH) data operations at the Host$^k$ system and the terminal associated with the Host$^j$ will control all requests for encipher/decipher data operations in domain$_j$.

COMMUNICATION SECURITY IN MULTIPLE DOMAIN NETWORKS USING A PRIVATE KEY (APPLICATION PRGM-APPLICATION PRGM)

Figure 21:
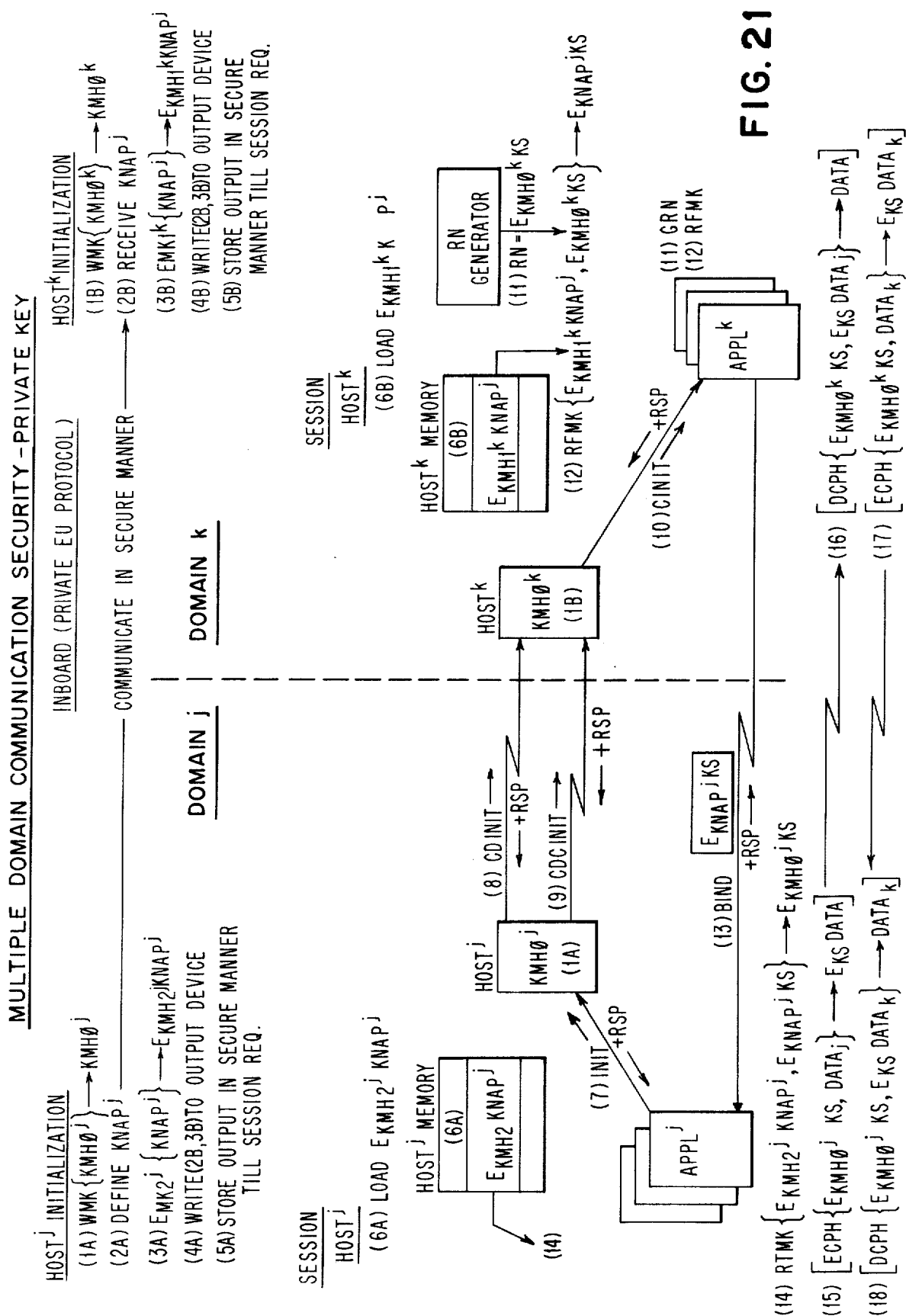
FIG. 21 is a block diagram illustrating cryptographic communication security in a multiple domain network involving application programs in different domains of the network using a private application key.

Referring now to FIG. 21, there is shown in block diagram form, a logical view of communication security involving an application program in one domain and an application program in another domain of a multiple domain network using a private key and a private end user protcol. Here again, as in the last example, a private level of communication security can be established using a protcol whereby key selection and distribution are the end users responsibility and requests for cryptographic services are explicitly expressed by the end users. Therefore, in this case, at host initialization time (1) host master keys (KMH$\phi^j$) and (KMH$\phi^k$) are selected and loaded into or may already reside in the MK memory of the respective hosts. (2) An end user in one domain, for example, domain j decides upon and privately defines a private application key (KNAP$^j$) to be used in the communication session which is communicated in a secure manner to an authorized user at Host$^k$. (3a) At Host$^j$ the private application key is loaded into the host memory and a request is made that an EMK2 function be performed to encipher the private application key under the second variant of the Host$^j$ master key $E_{KMH2j}$KNAP$^j$. (3b) Similarly, at Host$^k$ the private application key is loaded into the Host$^k$ memory and a request is made that an EMK1 function be performed to encipher the private application key under the first variant of the Host$^k$ master key $E_{KMH1k}$KNAP$^j$. Since cryptographic services are explicitly expressed by the end users rather than the system, the resultant values at both those systems are not written out to a CKDS but rather (4) to output devices e.g. a printer, where both a copy of the defined private key and its enciphered version is (5) stored in a secure manner e.g. in a vault, until such time as a communication session is to be established. At that time, the copies are taken out of the respective vaults and the enciphered private application keys are respectively (6) loaded into the host memory of each Host for subsequent use when cryptographic services are requested. As in the previously described example, a cross domain sequence of requests, involving the (7) INIT (8) CDINIT (9) CDCINIT and (10) CINIT requests proceed from domain$_j$ to domain$_k$. If the application program associated with the Host$^k$ accepts the CINIT request, a request is made to perform a (11) GRN function to obtain a random number defined as the enciphered session key i.e. $RN = E_{KMH\phi k}KS$ and a (12) privileged RFMK function to transform the session key enciphered under the Host$^k$ master key $E_{KMH\phi k}KS$ to the session key enciphered under the private application key $E_{KNAPj}KS$ for (13) transmittal in the BIND request to the application program associated with the Host$^j$. If the application program associated with the Host$^j$ accepts the BIND request, then in order to obtain the received session key in usable form at the Host$^k$, since the application program must use the cryptographic apparatus of the Host$^j$, the application program requests a (14) privileged RTMK transformation function to be performed. This is accomplished by accessing the Host$^j$ memory for the private application key enciphered under the second variant of the Host$^j$ master key $E_{KMH2j}$KNAP$^j$ as the key parameter and the received enciphered session key $E_{KNAPj}KS$ as the data parameter to perform the RTMK function, whereby the received enciphered session key is reenciphered from encipherment under the private application key $E_{KNAPj}KS$ to encipherment under the receiving Host$^j$ master key $E_{KMH\phi j}KS$. The net result of this is to establish the communication session between the two participating application programs of the different domains of the network with each being provided with the common operational key in a form suitable for use with their respective cryptographic apparatus. Once the common session key is established in a usable form at both ends, the balance of the operation is identical to that described for the previous examples with each application program controlling all requests for either an encipher (ECPH) or decipher (DCPH) data operations at the host system, respectively.

COMMUNICATION SECURITY IN MULTIPLE DOMAIN NETWORKS USING A PRIVATE KEY AND TOTALLY PRIVATE PROTOCOL (TERMINAL-APPLICATION PROGRAM

Figure 22:
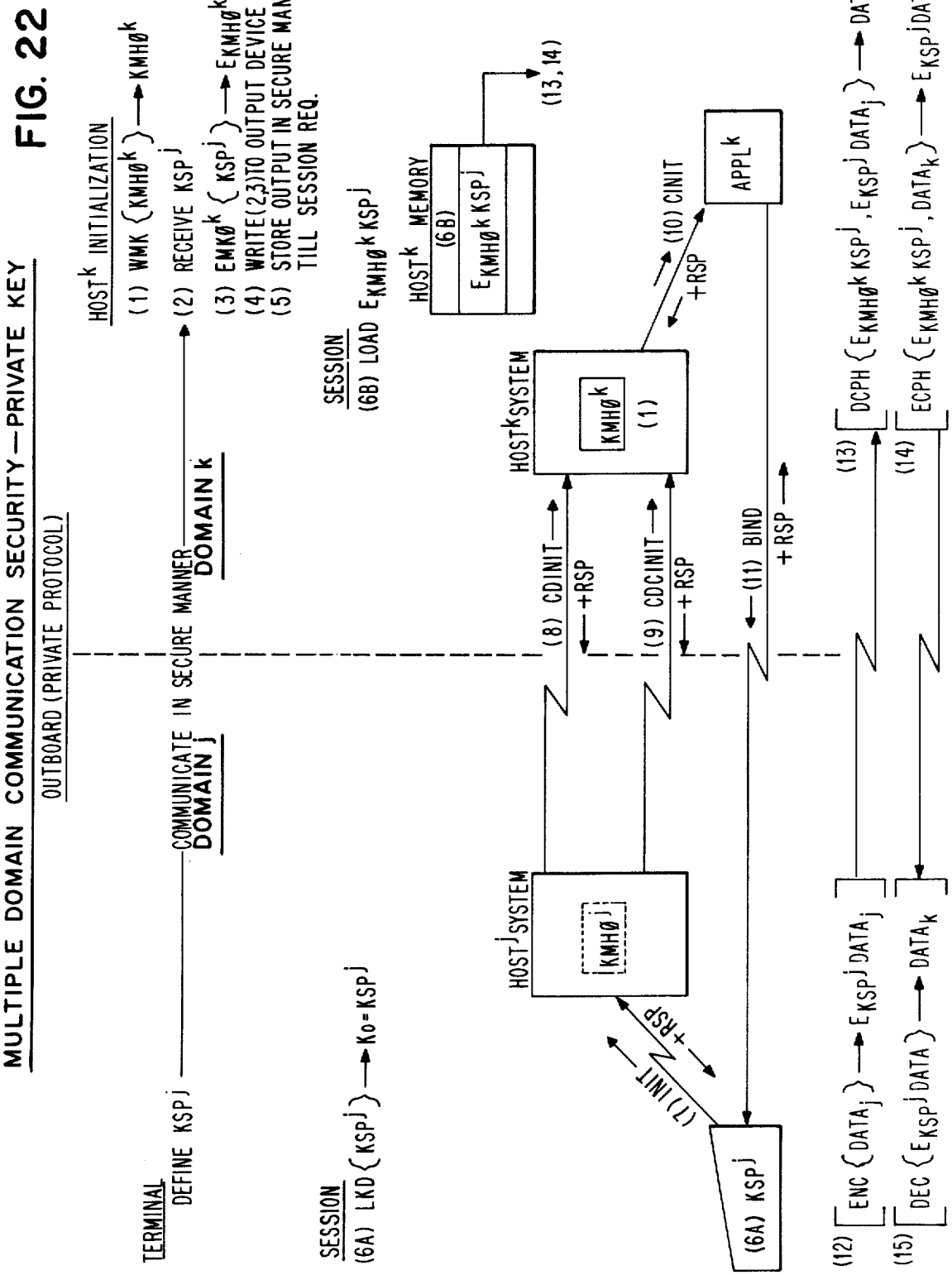
FIG. 22 is a block diagram illustrating details of cryptographic communication security in a multiple domain network involving a terminal and an application program in different domains of the network using a private session key.

Referring now to FIG. 22, there is shown in block diagram form, a logical view of communication security involving a terminal in one domain and an application program in another domain of a multiple domain network using a private key and a private protocol which is totally private and therefore unknown to the system. In totally private systems, key selection, key management and data transfer is accomplished without system knowledge that cryptography is being performed. Therefore, in this case assume that a terminal user associated with Host$^j$ wishes to have a private session with an application program associated with Host$^k$. Accordingly, at Host$^k$ initialization time, (1) a Host$^k$ master key (KMH$\phi^k$) is selected and loaded into or may already reside in the Host$^k$ MK memory. The terminal user then decides upon and privately defines, in a secure manner, a private communication key i.e. a private session key KSP$^j$ to be used as the common operational key which is (2) communicated in a secure manner to an authorized user at Host$^k$. (3) The private key is then loaded into the Host$^k$ memory and a request is made (3) to perform an EMK$\phi$ function in order to encipher the private session key under the Host$^k$ master key $E_{KMH\phi k}$KSP$^j$. (4) The resulting enciphered value is written to an output printer device and both a copy of the defined private session key and its enciphered version are (5) stored in a secure manner i.e. in a vault, until such time as a communication session is to be established. At that time, (6A) the terminal user writes the private session key into the key registers of the terminal crypto engine as a working key by a Load Key Direct function and (6B) the copy of the enciphered version of the private session key is taken out of the vault and loaded into the Host$^k$ memory for subsequent use when cryptographic services are requested. Since a totally private protocol is being used in this application, the steps (7) INIT request (8) CDINIT request (9) CDCINIT request (10) CINIT request and (11) BIND request proceed in a straight forward manner to establish a communication session between the terminal and the application program without the system being aware that any cryptographic operation is to be performed. Following the establishment of the session, the terminal can perform an (12) ENC function to encipher terminal data using the private session key KSP$^j$ as the operational key to obtain enciphered terminal data E$_{KSPj}$DATA$_j$ for transfer to the application program associated with Host$^k$. At Host$^k$, upon receipt of the enciphered terminal data, the application program requests a (13) decipher (DCPH) function to be performed to decipher the enciphered terminal data, using the enciphered private session key E$_{KMH\phi k}$KSP$^j$, to obtain the terminal data (DATA$_j$) in clear form. Alternatively, the application program associated with Host$^k$ can request an (14) encipher (ECPH) function to be performed on Host$^k$ data, using the enciphered private session key to obtain enciphered Host$^k$ data E$_{KSPj}$DATA$_k$ for communication to the terminal associated with the Host$^j$. At the terminal, upon receipt of the enciphered host data, the terminal requests a (15) decipher (DEC) function to be performed to decipher the enciphered Host$^k$ data, using the private session key as the working key, to obtain the host data (DATA$_k$) in clear form.

COMMUNICATION SECURITY IN MULTIPLE DOMAIN NETWORKS USING A PRIVATE KEY AND A TOTALLY PRIVATE PROTOCOL (APPLICATION PRGM-APPLICATION PRGM)

Figure 23:
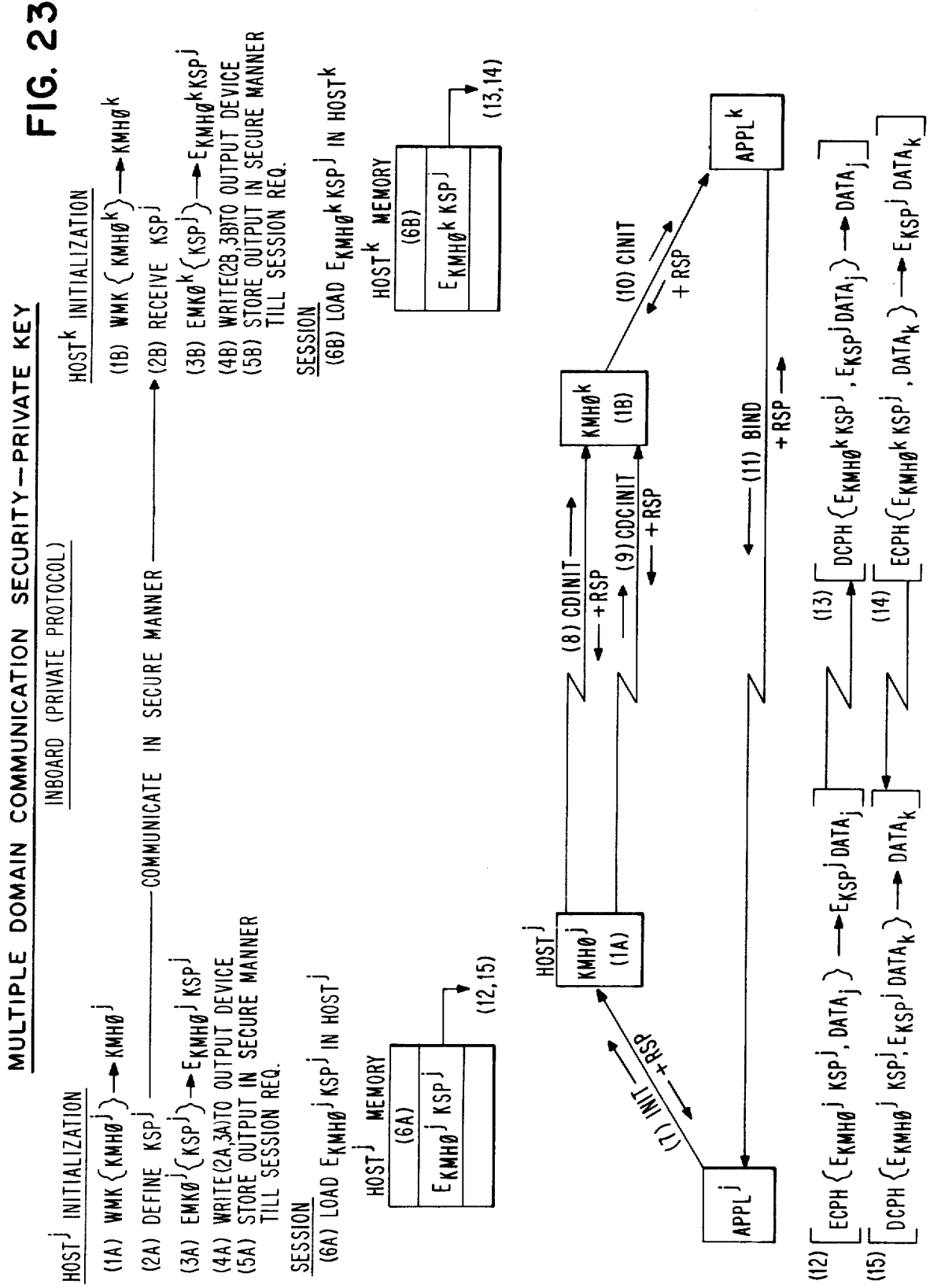
FIG. 23 is a block diagram illustrating details of cryptographic communication security in a multiple domain network involving application programs in different domains of the network using a private session key.

Referring now to FIG. 23, there is shown in block diagram form a logical view of communication security involving an application program in one domain and an application program in another domain of a multiple domain network using a private key and a private protocol which is unknown to the system. Therefore, in this case, as in the previous example, key selection, key management and data transfer is accomplished without system knowledge that cryptography is being performed. Therefore, assume that an application program associated with Host$^j$ wishes to have a private session with an application program associated with Host$^k$. Accordingly, at initialization time of each host system in the different domains, (1) host master keys (KMH$\phi^j$) and (KMH$\phi^k$) are selected and loaded into or may already reside in the MK memory of the respective host systems. (2) The end user then decides upon and privately defines, in a secure manner, a private communication key i.e. a private session key KSP$^j$ to be used as the common operational key which is (2) communicated in a secure manner to an authorized user at Host$^k$. (3) The private key is then loaded into the respective host memories and a request is made to perform an EMK$\phi$ function, at each host system, in order to encipher the private session key under the respective host master keys E$_{KMH\phi j}$KSP$^j$ and E$_{KMH\phi k}$KSP$^j$. (4) The resulting enciphered values are written to output printer devices and both a copy of the defined private session key and its enciphered versions are (5) stored in a secure manner i.e. in a vault, until such time as a communication session is to be established. At that time, (6) the copies of the enciphered versions of the private session key are taken out of the vaults and loaded into the respective host memories for subsequent use when cryptographic services are requested. Since a totally private protocol is being used in this application, the steps (7) INIT request (8) CDINIT request (9) CDCINIT request (10) CINIT request and (11) BIND request proceed in a straight forward manner to establish a communication session between the application programs without the system being aware that any cryptographic operation is to be performed. Following the establishment of the session, the application program associated with Host$^j$ can perform an (12) ECPH function to encipher data using the enciphered private session key E$_{KMH\phi j}$KSP$^j$ as the operational key to obtain enciphered data E$_{KSPj}$DATA$_j$ for transfer to the application program associated with Host$^k$. At Host$^k$, upon receipt of the enciphered data, the application program requests a (13) decipher (DCPH) function to be performed to decipher the enciphered Host$^j$ data, using the enciphered private session key, to obtain the data (DATA$_j$) in clear form. Alternatively, the application program associated with Host$^k$ can request an (14) encipher (ECPH) function to be performed on Host$^k$ data, using the enciphered private session key to obtain enciphered Host$^k$ data E$_{KSPj}$DATA$_k$ for communication to the application program associated with the Host$^j$. Upon receipt of the enciphered Host$^k$ data, the application program associated with Host$^j$ requests a (15) decipher (DCPH) function to be performed to decipher the enciphered Host$^k$ data, using the private session key as the working key, to obtain the Host$^k$ data (DATA$_k$) in clear form.

DETAILED DESCRIPTION—HOST DATA SECURITY DEVICE

Data Security Device Clock

Figure 24:
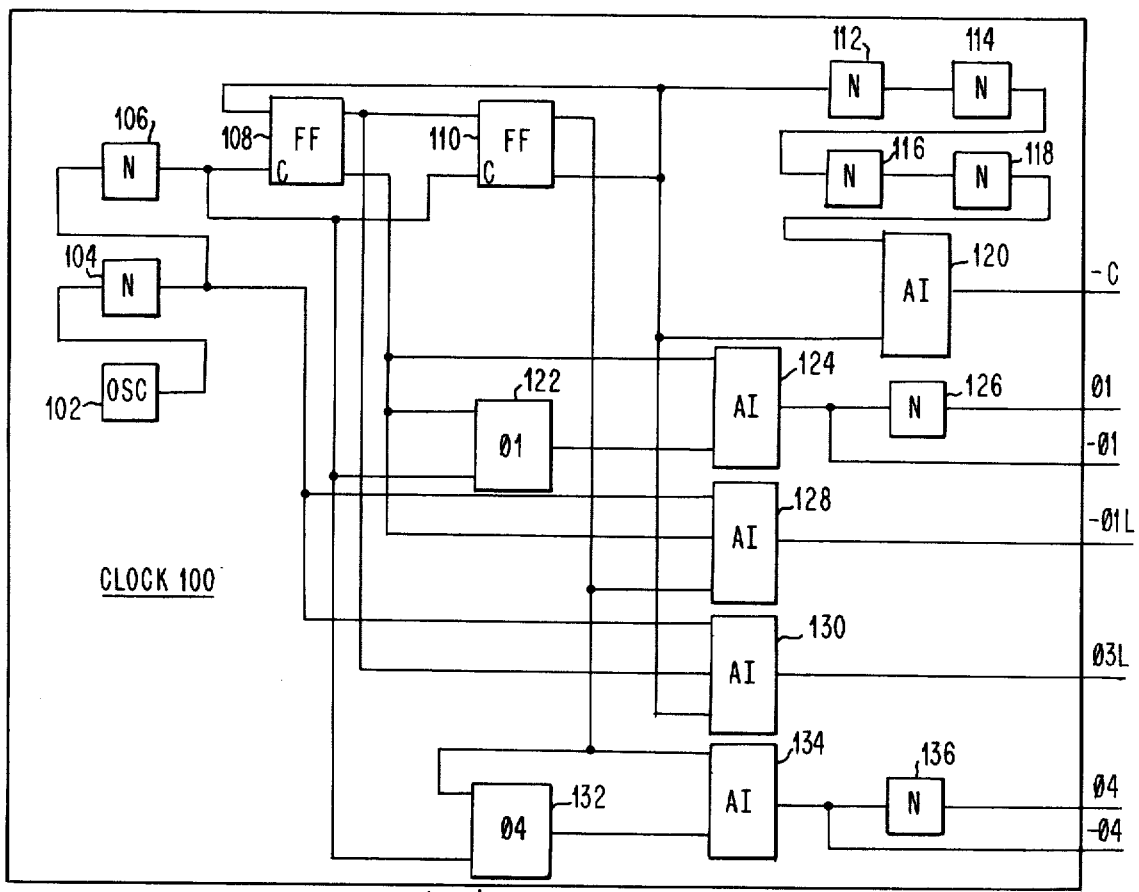
FIG. 24 illustrates the details of a clock circuit used in the data security device of the present invention.

Referring now to FIG. 24, there is shown the logic details of a clock pulse generator 100 used in the DSD of the present invention. The primary input is a square wave oscillator whose nominal repetition rate is 4 MHz, having approximately a 50% duty cycle. The oscillator 102 effectively drives a ring counter made up of two D-type flip-flops 108 and 110 which are used for controlling other logic circuits within the clock 100. The clock 100 produces a clock signal —C derived from the flip-flop 110 and additionally produces four basic clock pulses from a ring counter and the oscillator pulses on the phase 1, —phase 1, —phase 1 late, phase 3 late and phase 4 lines, each being nominally 125 ns in duration and having the relationships shown in FIG. 25.

Figure 25:
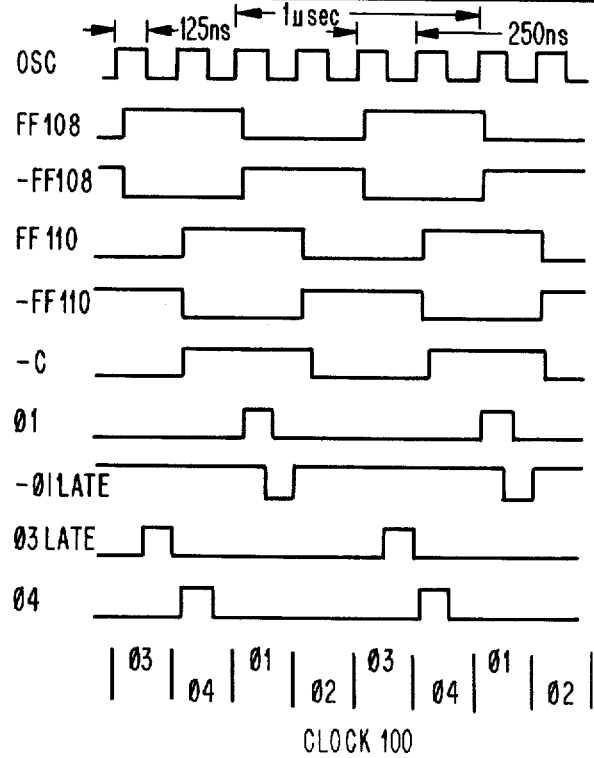
FIG. 25 is a timing diagram explaining the operation of the clock circuit illustrated in FIG. 24.

More specifically, the flip-flops 108 and 110 are initially in an off state with the flip-flop 110 applying a positive signal to one input of the AND circuit 130 and to condition the flip-flop 108 for being turned on. The leading edge of a pulse from the oscillator 102 is applied via inverters 104 and 106 to turn on the flip-flop 108 which, in being turned on, applies a positive signal to a second input of the AND circuit 130 and to condition the flip-flop 110 for being turned on. At the trailing edge of the first oscillator pulse, a positive signal is applied from the inverter 104 to render the AND circuit 130 effective to apply a positive pulse on the $\phi$3L line having a 125 ns duration. The leading edge of the next oscillator pulse is applied via the inverters 104 and 106 to turn on the conditioned flip-flop 110 which, in being turned on, applies a positive signal to condition the AND invert circuit 134 and to turn on the φ4 latch 132. The latch 132, in being turned on, applies a positive signal to render the AND invert circuit 134 effective to apply a negative pulse on the —φ4 line and, via inverter 136, a positive pulse on the φ4 line, both pulses being of 125 ns duration. The flip-flop 110 in being turned on also applies a negative signal to condition the flip-flop 108 for being turned off and to render the AND invert circuit 120 effective to apply a positive signal to the —C line. The leading edge of the next oscillator pulse is effective via the inverters 104 and 106 to turn off the flip-flop 108 which, in being turned off, applies a positive signal to condition the AND invert circuit 124, to turn on the φ1 latch 122 and to one input of the AND invert circuit 128 and also applied a negative signal to condition the flip-flop 110 for being turned off. The latch 122 in being turned on applies a positive signal to render the AND invert circuit 124 effective to apply a negative pulse to the φ1 line and, via the inverter 126, a positive pulse to the φ1 line, both being of 125 ns duration. The flip-flop 110 still being on applies a positive signal to a second input of the AND invert circuit 128. Accordingly, at the trailing edge of the third oscillator pulse, a positive signal is applied from inverter 104 to render the AND invert circuit 128 effective to apply a negative pulse on the φ1L line having a duration of 125 ns. The trailing edge of the third oscillator pulse is also effective via the inverter 106 to apply a negative pulse to reset the latch 122. The leading edge of the fourth oscillator pulse is effective, via the inverters 104 and 106, to reset the flip-flop 110 which returns the ring counter back to its initial condition. The flip-flop 110 in being reset applies a positive signal to one input of the AND invert circuit 120 and after a delay provided by the inverters 112, 114, 116 and 118 to render the AND invert circuit 120 effective to apply a negative signal on the —C line. At the end of the fourth oscillator cycle, the clock 100 is back at the initial condition to repeat the generation of the various clock pulses in successive phase times as shown in FIG. 25.

MANUAL WRITE MASTER KEY (WMK) OPERATION

The write master key operation consists of manually writing 16 half-bytes (4 bits) constituting the master key into the master key (MK) memory via 4 bit lines. Enable write (EW) and manual write (MW) switches are provided to initialize and control the 16 cycles needed for loading the individual half-bytes into the MK memory. Bit switches are also provided for producing the binary coded numbers 0 through F with all outputs being low for 0 and high for F. The master key is pre-generated, in a random manner, as 16 hexadecimal numbers to be written into the 16 locations of the MK memory. The following is a generalized step-by-step procedure of manually writing the master key into the MK memory.

Step 1: Set the EW switch to the on or enable write master key (EWMK) position.

Step 2: Press the MW switch once to reset the MK memory address counter to 0 and to overwrite the master key presently stored in the MK memory.

Step 3: Set the bit switches to the half-byte to be written into the MK memory location 0.

Step 4: Press the MW switch once.

Step 5: Set the bit switches to the next half-byte to be written into the next succeeding location of the MK memory.

Step 6: Press the MW push button once.

Steps 7–34: Repeat Steps 5 and 6 in succession until the last half-byte has been written into the last location of the MK memory.

Step 35: Set the EW switch to the off position.

At any time during the execution of this procedure, as when there is uncertainty that it has been correctly done, a restart can be accomplished by doing Step 35 and beginning again with Step 1.

Figure 27:
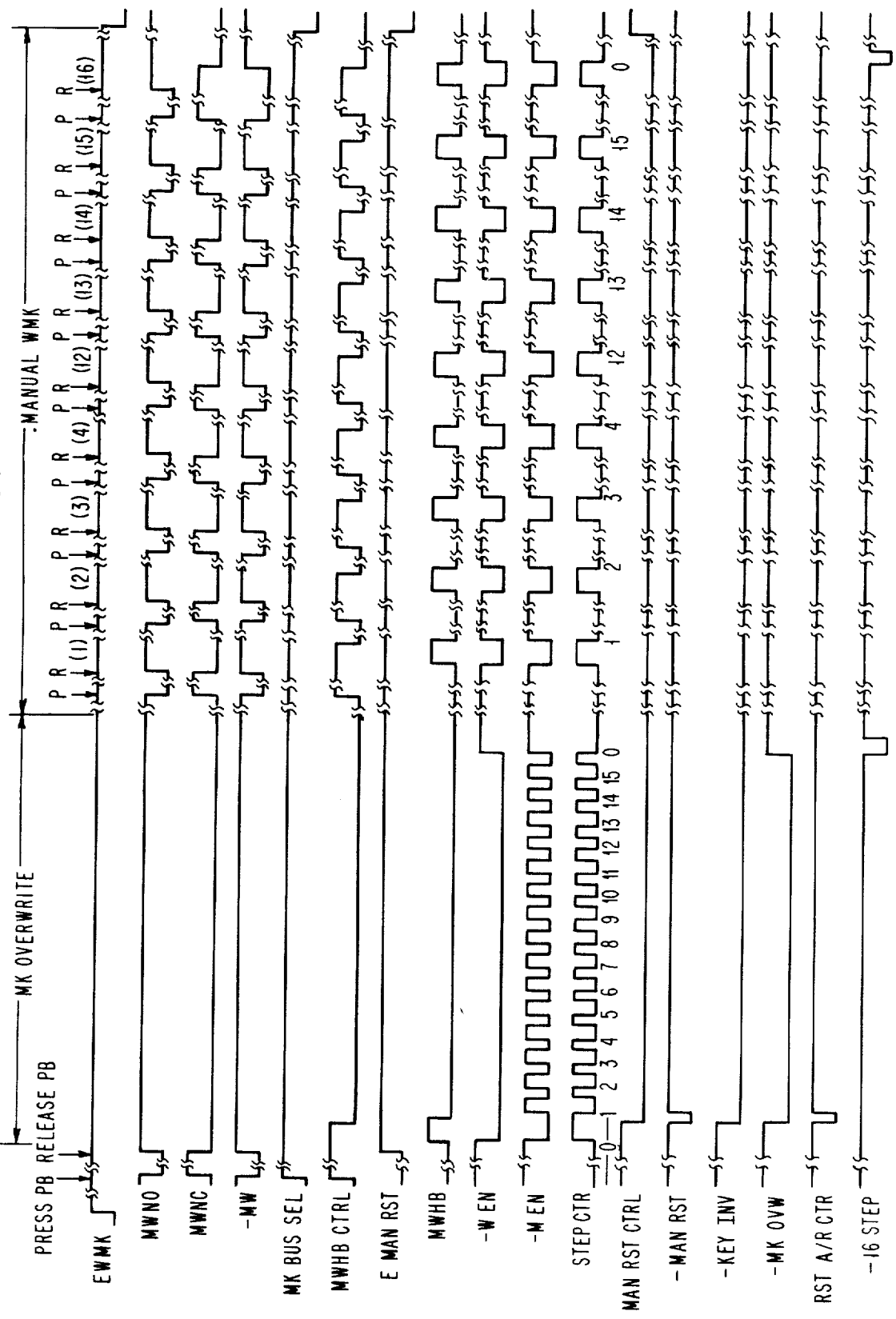
FIG. 27 is a timing diagram of the manual WMK operation.

Referring now to FIG. 26c1 and the timing diagram of FIG. 27, a more detailed description of the manual WMK operation will be given in the following. To initiate this operation, the Enable Write (EW) switch, which may be a SPDT switch activated by a physical key lock to prevent the key from being changed by unauthorized persons, is set to the ON position. Following this, the Manual Write (MW) switch, which may be a push-button switch, may be pressed to the MWNO position causing a negative pulse to be applied to turn on the MW latch 138. The latch 138 in being turned on applies a negative signal via the —MW line to turn on the MK BUS SELECT latch 140 and the manual write half byte (MWHB) control latch 154. The latch 140 in being turned on applies a positive signal to condition the AND circuits 164 in FIG. 26d1 for passing a half byte (4 bits) from the bit switches SW0-SW3. When the MW switch is released, it returns to the MWNC position causing a negative signal to be applied to reset the MW latch 138. The MW latch 138 in being reset applies a positive signal on the —MW line which together with the positive signal from the latch 140 renders the AND invert circuit 142 effective to apply a negative signal to turn on the ENABLE MAN RST latch 144. At φ1 time of the next clock cycle, a φ1 clock pulse together with the positive signal now on the —MW line and a positive signal from the latch 154 render the AND invert circuit 156 effective to apply a negative signal to the inverter 160 where it is inverted to a positive signal on the MWHB line. The positive signal on the MWHB line is applied to condition the AND invert circuits 152 and 158. The AND invert circuit 158 is effective to maintain the positive signal on the MWHB line until the next φ1 time when a —φ1 clock pulse is applied to decondition the AND invert circuit 158 causing the positive signal on the MWHB line to be terminated thereby providing a 1 microsecond positive signal on the MWHB line. The AND invert circuit 152 is rendered effective by a φ4 clock pulse in the present clock cycle for resetting the MWHB CTRL latch 154.

Referring now to FIG. 26c2, the positive signal on the NWHB line is inverted to a negative signal by inverter 162 to decondition the AND circuit 380 causing a negative signal to be applied to the —W ENABLE line and to decondition the AND inverter 376 which, in turn, applies a positive signal to the inverter 378 where it is inverted to a negative signal on the —M ENABLE line.

Signals on the —M ENABLE and —W ENABLE lines are used to enable the MK memory for writing and reading operations. The MK memory 700 shown in block form in FIGS. 26e1 and 26e2 is a 16 word by 4 bit CMOS random access memory (RAM) which is used for storing the master key. The MK memory 700 is addressed by a 4-bit value on the address lines —ADR1, —ADR2, —ADR3 and —ADR4 from the setting of the address counter 390 in FIG. 26d2. When negative signals are applied to both the —W ENABLE and —M ENABLE lines, the information present on the 4 bit input lines 0, 1, 2 and 3 is written into the MK memory 700 at the designated address. A transistor switch 139 is provided in series with the −W ENABLE line to control writing into the MK memory 700. The potential at the base of this switch is controlled by the setting of the EW switch. Accordingly, when the EW switch is set on and a negative signal is applied to the −W ENABLE line, the transistor 139 is turned on to produce a negative signal on the −W ENABLE line to enable writing into the MK memory 700 whereas when the EW switch is set OFF the transistor switch 139 is biased off causing a positive signal to be maintained on the −W ENABLE line to prevent writing into the MK memory 700. Addressing of the MK memory 700 for reading is accomplished in the same manner as that for writing. When a positive signal is applied to the −W ENABLE line and a negative signal is applied to the −M ENABLE line, the information which was written into the designated address of the MK memory 700 is read out in inverted form to the 4 bit output lines of the MK memory 700 and applied to a buffer register consisting of the 4 shift registers 702.

Referring now to FIGS. 26c1 and 26c2, during $\phi3$ time, a positive $\phi3L$ clock pulse together with positive signals from the latches 144 and 146 render the AND invert circuit 148 effective to apply a negative signal to turn on the MAN RST latch 150 which remains set until the next clock cycle when a −$\phi1L$ clock pulse is applied to reset latch 150 thereby providing a negative signal on the −MAN RST line from $\phi3L$ time to $\phi1L$ time. The MAN RST latch 150 in being turned on applies a negative signal via the −MAN RST line to reset the latch 146, to decondition the AND circuit 382, and to turn on the master key overwrite (MK OVW) latch 276 and the KEY INVALID latch 278 in FIG. 26c3. The AND circuit 382 in being deconditioned is effective to apply a negative signal to the reset inputs of the address counter 390 resetting the counter to an address of 0. The latch 276 in being set applies a negative signal on the −MK OVW line to decondition the AND circuit 380 to maintain a negative signal on the −W ENABLE line during the entire period of the master key overwrite operation. The negative signal on the −MK OVW line is also applied to decondition the AND invert circuit 368 which, in turn, applies a positive signal to condition the AND invert circuits 370 and 374 during the entire period of the MK overwrite operation. Referring now to FIG. 26c1, at $\phi1$ time of the next clock cycle, a −$\phi1$ clock pulse is applied to decondition the AND invert circuit 158 and apply a positive signal to the inverter 160 where it is inverted to a negative signal on the MWHB line which is maintained thereon for the balance of the overwrite operation. The negative signal is inverted to a positive signal and applied to one input of the AND invert circuit 376. However, at this time, namely, $\phi1$ time, positive signals are maintained at the inputs to the AND invert circuit 374 which is therefore effective to apply a negative signal to the other input of the AND invert circuit 376 to maintain the AND invert circuit 376 deconditioned despite the signal change on the MWHB line. As a result, the AND invert circuit 376 maintains a positive signal output therefrom until $\phi1L$ time when the −$\phi1L$ clock pulse is applied to decondition the AND invert circuit 374 causing a positive signal to be applied to the AND invert circuit 376. Therefore, at this $\phi1$ time, the AND invert circuit 376 is rendered effective to apply a negative signal to the STEP CTR line and to the inverter 278 where it is inverted to a positive signal on the −M ENABLE line.

It should be apparent that from the time the address counter 390 is reset to address 0, namely, at $\phi3L$ time, until the present $\phi1L$ time negative signals are maintained on both the −W ENABLE and −M ENABLE lines to allow a 4 bit value to be written into the MK Memory 700 at address 0. Referring now to FIG. 26d1, whatever the bit switches SW0 to SW3 happen to be set at are applied as a half byte value via the conditioned AND circuits 164 and OR invert circuits 168 to the bit inputs of the MK memory 700. For example, if the bit switch SW0 is set to the 1 position, a positive signal is applied to render the AND circuit 164a effective to apply a positive signal to the OR invert circuit 168a which, in turn, applies a negative signal as a 1 bit input to the MK memory 700. If the bit switch SW0 is set to the 0 position then a positive signal is applied as a 0 bit input to the MK memory 700.

Returning now to FIGS. 26c2 and 26d2, the negative signal applied to the −STEP CTR line, at $\phi1L$ time, is inverted by inverter 388 to a positive signal and applied via the STEP CTR line to step the address counter to an address count of 1 in preparation for writing the half byte value setting of switches SW0 to SW3 into the next location of the MK memory 700. AND invert circuits 374 and 376 are connected in a latching arrangement such that the negative signal output of the AND invert circuit 376 is effective to maintain the AND invert circuit 374 deconditioned after termination of the −$\phi1L$ clock pulse and thereby maintain a positive signal input to the AND invert circuit 376 which together with the positive signal from the inverter 162 (due to the negative signal now maintained on the MWHB line) maintain the AND invert circuit 376 effective to maintain a negative signal output thereof (and a positive signal on the −M ENABLE line). This condition will be maintained until $\phi3L$ time, when a $\phi3L$ clock pulse is applied to render the AND invert circuit 370 effective to apply a negative signal to now decondition the AND invert circuit 376. The AND invert circuit 376 in being deconditioned applies a positive signal to the inverter 378 where it is inverted to a negative signal on the −M ENABLE line. The positive signal output of the AND invert circuit 376 will be operative in the latching arrangement of AND invert circuits 374 and 376 to maintain this signal output until $\phi1L$ time of the next clock cycle when the −$\phi1L$ clock pulse is applied to decondition the AND invert circuit 374. Accordingly, a negative signal will be maintained on the −M ENABLE line from $\phi3L$ time of the present clock cycle which together with the negative signal maintained on the −W ENABLE line, due to the AND circuit 380 being maintained deconditioned by the MK OVW latch 276, allows writing of the half byte value setting of the switches SW0 to SW3 into the MK Memory 700 at address 1.

In a similar manner, each succeeding $\phi1L$ clock pulse will be effective to control stepping of the address counter 290 to the next address of the MK memory 700 and each succeeding $\phi3L$ clock pulse will be effective to control writing the half byte value setting of the switches SW0 to SW3 into the MK memory 700 at the next address. After 16 such operations, the master key previously stored in the MK memory 700 will have been overwritten. Disclosure of the master key through unauthorized writing of trial half bytes into the MK memory 700 is thwarted by this overwriting operation of the previously stored master key when the MW switch is first pressed.

Referring now to FIG. 26d2, when the address counter 390 steps to a count of 8 (the 9th location in MK memory 700) a negative signal from the −C8 output is applied to set the 16 STEP latch 404 which, in being set, applies a positive signal to condition the AND circuit 406. After the 16th half byte is written into the MK memory 700, the address counter 390 is again stepped, at φ1L time, back to an address count of 0 and a positive signal is applied via the −C8 output to render the AND circuit 406 effective to apply a positive signal to the inverter 408 where it is inverted to a negative signal on the −16 STEP line. The negative signal on the −16 STEP line is applied to reset the MK OVW latch 276 in FIG. 26c2 which, in being reset, applies a positive signal via the −MK OVW line to render the AND circuit 380 effective to apply a positive signal to the −W ENABLE line thereby inhibiting further writing into the MK memory 700. The positive signal on the −MK OVW line is also applied to render the AND invert circuit 368 effective to apply a negative signal to decondition the AND invert circuits 370 and 374 so that the −φ1L and φ3L clock pulses will have no further effect. The jointly deconditioned AND invert circuits 370 and 374 will jointly apply a positive conditioning signal to one input of the AND invert circuit 376.

This completes the master key overwrite operation and the host operator may now proceed to load the new master key into the MK memory 700 a half byte at a time, for 16 times, in order to completely load the 64 bit master key into the MK memory 700. Referring to FIGS. 26c1 and 26d1 the host operator sets the switches SW0 to SW3 according to the first half byte of the master key to be loaded. Following this, the MW switch set to the MWNO position causing a negative pulse to be applied to turn on the MW latch 138. The MW latch 138 in being turned on applies a negative signal via the −MW line to set the MWHB CTRL latch 154 which, in being set, applies a positive signal to one input of the AND invert circuit 156. When the MW switch is released to the MWNC position, a negative signal is applied to reset the MW latch 138 which, in being reset, applies a positive signal to a second input of the AND invert circuit 156. Therefore, at φ1 time of the next clock cycle, a φ1 clock pulse is applied to render the AND invert circuit 156 effective to apply a negative signal to the inverter 160 where it is inverted to a positive signal on the MWHB line. The positive signal on the MWHB line is applied to the inverter 162 in FIG. 26c2 where it is inverted to a negative signal and applied to decondition the AND circuit 380 which, in turn, applies a negative signal to the −W ENABLE line. The negative signal from the inverter 162 is also applied to decondition the AND invert circuit 376 which, in turn, applies a positive signal to the inverter 378 where it is inverted to a negative signal on the −M ENABLE line. The combination of negative signals on the −W ENABLE and −M ENABLE lines permits the first half byte of the new master key to be passed via the AND circuits 164 in FIG. 26d1 and the OR invert circuits 168 to be loaded into the MK memory 700 at location 0. Referring now to FIG. 26c1, at φ4 time, a φ4 clock pulse in combination with the positive signal on the MWHB line renders the AND invert circuit 152 effective to apply a negative signal to reset the MWHB CTRL latch 154 which, in being reset, applies a negative signal to decondition the AND invert circuit 156.

At φ1 time of the next clock cycle, a −φ1 clock pulse is applied to decondition the AND invert circuit 158 which, in turn, applies a positive signal to the inverter 160 where it is inverted to a negative signal on the MWHB line. The negative signal on the MWHB line is applied to the inverter 162 in FIG. 26c2 where it is inverted to a positive signal to render the AND circuit 380 effective to apply a positive signal to the −W ENABLE line to terminate the writing operation into the MK memory 700. The positive signal from the inverter 162 is also applied to render the AND invert circuit 376, conditioned by the positive signal output from the AND invert circuits 370 and 374, effective to apply a negative signal via the −STEP CTR line to the inverter 378 where it is inverted to a positive signal on the −M ENABLE line. The negative signal on the −STEP CTR line is also inverted by inverter 388 in FIG. 26d2 to a positive signal to step the address counter 390 to an address count of 1 in preparation for writing into the next location of the MK memory 700. Referring now to FIG. 26d1, the bit switches SW0 to SW3 are now set in accordance with the second half byte of the master key for loading into the MK memory 700. The MW switch is again set and the circuitry operates in the same manner as described above with respect to writing the first half byte for writing the next half byte of the new master key and stepping the address counter 390 to the next address. This operation is repeated for a total of 16 times in order to write the 16 half bytes of the master key into the MK memory 700.

After the last half byte of the new master key is loaded into the MK memory 700, the EW switch in FIG. 26c1 is switched off to terminate the manual write operation. The EW switch in being turned off applies a negative signal to reset the MK BUS SELECT latch 140 and to reset the ENABLE MAN RESET latch 144 which, in being reset, applies a negative signal to set the MAN RST CTRL latch 146 in preparation for the next time a manual write master key operation is to be performed.

ADDRESS DECODING AND SELECTION

Referring now to FIGS. 26a1 and 26a2, when an IO operation is to be performed, a negative signal is applied to the −IO tag line. The convention to be used in the following descriptions are that all lines are down level active i.e. the active state is the presence of a negative signal and, in the case of data, a 1 bit is represented as a negative signal and a 0 bit as a positive signal. Information is received by the DSD on a −DATA BUS OUT and may include address information, command information or data to be processed. Tag signals are used as control signals to identify the nature of the information being provided on the Data Bus. Thus, when an address is placed on the −DATA BUS OUT, a −TA signal is provided on the −TA tag line to identify the information as being address information, when a command is placed on the bus, a −TC signal is provided on the −TC tag line to identify the information as being a command and when data is placed on the bus, a −TD signal is provided on the −TD tag line to identify the information as being data. The −IO signal is inverted to a positive signal by the inverter 182 and applied to one input of the AND invert circuit 190. At TA time, address information is received on the −DATA BUS OUT and a −TA signal is applied to the inverter 184 where it is inverted to a positive signal and applied as a second input to the AND invert circuit 190.

The data security device can be personalized to be responsive to any one of 40 possible addresses. This is accomplished by jumpering each of the 3 pins, J5, J6 and J7 to either ground or +5 v, and by jumpering one pin JU to any one of five others J0, J1, J2, J3 or J4. In the example shown, the wiring is such that the DSD responds to the address 1xxxx010. The 8 bit address is passed via the inverters 170 to the parity generator 178 which generates a parity bit which is compared with the parity bit received with the address. If the generated parity bit is equal to the received parity bit a positive signal is applied via the PARITY GOOD line to a third input of the AND invert circuit 190. Additionally, the personalized bits from the jumpers J5, J6 and J7 are compared with the inverted incoming bits on lines 5, 6 and 7 by the exclusive OR and inverter combinations 172 and 174 which produce positive signal inputs to the AND circuit 176 if a match is found. The personalized bit on the JU jumper is applied as the remaining positive input to render the AND circuit 176 effective for applying a positive signal to the remaining intput of the AND invert circuit 190. Accordingly, if the personalized address having good parity has been detected, then the AND invert circuit 190 is rendered effective to apply a negative signal to set the SEL latch 192 and to decondition the AND circuit 216 in FIG. 26b1 which, in turn, produces a −VALID B signal indicating a valid address byte presentation. The SEL latch 192 remains set throughout the I/O operation unless reset subsequently by the occasion of a command error which will be described hereafter. The SEL latch 192, in being set, applies a positive signal via the SEL line to condition the AND invert circuits 204, 206 and 208. Referring now to FIG. 26a1, at the end of TA time, a positive signal is applied to the −TA tag line which is inverted to a negative signal by inverter 184 to decondition the AND invert circuit 190. Accordingly, AND invert circuit 190 applies a positive signal to render AND circuit 216 effective to terminate the negative signal on the −VALID B line.

COMMAND DECODING

At TC time, command information is received on the −DATA BUS OUT and a −TC signal is provided to indicate this condition. The low order command bit (bit 7) specifies the direction of the data transfer, i.e., whether the I/O operation is a read (bit 7=1) or a write (bit 7=0) operation. Referring now to FIG. 26a2, the I/O command byte is passed via the inverters 170 to the AND invert circuits 222 and to the parity generator 178 where a parity bit is generated and compared with the parity bit provided with the command byte by the exclusive OR 180. If the parity bit generated by the parity generator 178 is equal to the parity bit associated with the command byte then the exclusive OR 180 provides a positive signal on the PARITY GOOD line as a second input to the AND invert circuit 206. The −TC signal is inverted by the inverter 188 to a positive TC signal and applied to the remaining inputs of the AND invert circuits 206 and 209. The AND invert circuit 206 is rendered effective to apply a negative signal via −TC SEL line to the inverter 214 and to decondition the AND circuit 216. The AND circuit 216 in being deconditioned applies a −VALID B signal to indicate that a valid command byte has been received. The inverter 214 inverts the negative signal to a positive signal on the TC SEL line which is applied to procedural error circuitry, which will be described hereafter, and to the other inputs of the AND invert circuits 222 in FIG. 26a2 to allow the I/O command byte to be loaded into the command register 224. The positive signal on the TC line in combination with the positive signal on the SEL line render the AND invert circuit 208, in FIG. 26b1, effective to apply a negative signal to set the TC END latch 210 which in being set, applies a positive signal to condition the AND circuit 218.

Referring now to FIGS. 26b2 and 26b3, the command and order codes of the command byte stored in the command register 224 during TC time are decoded by a series of AND invert circuits. Bits 4, 5, 6, and 7 are decoded to produce one of the seven defined commands described in the section DSD COMMANDS AND ORDERS. Thus, the AND invert circuit 226 decodes the PIOW data command (PIOW), the AND invert circuit 232 decodes the set basic status command (SET BS), the AND invert circuit 238 decodes the reset basic status command (RST BS), the AND invert circuit 242 decodes the read basic status command (RD BS), the AND invert circuit 250 decodes the reset adapter command (RST), the AND invert circuit 262 decodes the PIOR data command (PIOR) and the AND invert circuit 266 decodes the WR DSD order command (WR DSD). Detailed description of the operation of these commands will be provided hereafter.

In addition to the command code provided by bits 4, 5, 6 and 7 an order code WXYZ is provided by the other four bits, namely, bits 0, 1, 2 and 3 if the command is a WR DSD command. Thus, bits 0, 1, 2 and 3 of the order code are decoded to produce one of the five previously defined cipher handling orders or one of the two previously defined data processing orders. Accordingly, the AND invert circuits 280 and 302 decode a portion of the cipher key handling and data processing orders for (WMK) and (ENC or DEC), respectively, the AND invert circuits 288, 314, 324, 332, 340, 341 and 349 decode the cipher key handling orders (DECK), (GRN), (RFMK), (RTMK), (EMK1) and (EMK2), respectively. Detailed description of the operation of these orders will be provided hereafter.

Referring now to FIG. 26a1, at the end of TC time, a positive signal is applied to the −TC tag line which is inverted to a negative signal by the inverter 188 and applied via the TC line to decondition the AND invert circuits 206 and 208. Accordingly, deconditioned AND invert circuit 206 applies a positive signal to render AND circuit 216 effective to terminate the negative signal on the −VALID B line. The positive signal from deconditioned AND invert circuit 206 is also applied to inverter 214 where it is inverted to a negative signal on the TC SEL line and applied to the procedural error circuitry and to decondition the AND invert circuits 222 associated with the command register 224 in FIG. 26a2. The deconditioned AND invert circuit 208 applies a positive signal to render the AND circuit 218, conditioned by the positive signal output of the TC End latch 210, effective to apply a positive signal on the TC END line. If bit 7 of the decoded command code is a 1, indicating a read operation, then positive signals on the bit 7 line and the TC END line are applied to render the AND invert circuit 220 effective to produce a −P Valid signal to indicate that the parity of the data byte to be subsequently presented to the −DATA BUS IN is valid. This is so because the DSD always provides correct parity for data bytes it applies to the −DATA BUS IN for read type commands. The positive signal on the TC END line is also applied, in FIG. 26b2, to the inverter 244, AND circuit 254, inverter 258 to control the operation of the READ BS, RST and PIOR commands, respectively, and to AND invert circuit 356 in FIG. 26c4 to control the command error detection, all of which will be described in greater detail hereafter.

COMMAND ERROR DETECTION

Referring now to FIGS. 26b3 and 26c4 if one of the legal commands has been decoded, then a negative signal is applied to decondition either AND circuit 350 or AND invert circuit 352 to apply a positive signal to the LEGAL CMD line. The positive signal on the LEGAL CMD line is inverted by inverter 354 to a negative signal which is applied via the NO LEGAL CMD line to decondition the AND invert circuit 356. The AND invert circuit 356 in being deconditioned applies a positive signal which has no effect on the CMD ERR latch 358. On the other hand, if none of the legal commands are decoded, then the AND invert circuit 352 is rendered effective to apply a negative signal to the inverter 354 which it is inverted to a positive signal and applied via the NO LEGAL CMD line to condition the AND invert circuit 356. At the end of TC time, the positive signal on the TC END line is applied to render the AND invert circuit 356 effective to apply a negative signal to set the CMD ERR latch 358 which in being set, applies a negative signal via the −CMD ERR line to reset the SEL latch 192 in FIG. 26a1 thereby deselecting the DSD due to the command error. Referring now to FIG. 26i2, the negative signal on the −CMD ERR line is also applied to set the machine check bit latch 954 E (bit 5) of the status register 952. SYNC TD At TD time, a −TD signal is provided to indicate that a data byte is present on the −DATA BUS OUT or that a data byte is on the −DATA BUS IN depending upon whether a write or read operation is to be performed. Additionally, because the clock 100 may run asynchronously with respect to the processor, it is necessary to provide a special timing signal for use during certain operations, this signal being called the SYNC TD signal. This signal begins at $\phi 1$ time of a clock cycle coinciding with or following the beginning of a TD time and lasts until $\phi 1$ time of the next clock cycle. It then remains inoperative until the next occurring TD time.

Referring now to FIG. 26a1, at TD time, the −TD signal is applied to the inverter 186 where it is inverted to a positive TD signal and applied in combination with a positive signal from the SYNCH latch 196 to condition the AND invert circuit 198. At $\phi 1$ time, a $\phi 1$ clock pulse is applied to render the AND invert circuit 198 effective to apply a negative signal to the inverter 202 where it is inverted to a positive signal on the SYNCH TD line. At $\phi 4$ time, a $\phi 4$ clock pulse in combination with the positive signal on the SYNCH TD line render the AND invert circuit 194 effective to apply a negative signal to reset the SYNCH latch 196. At $\phi 1$ time of the next clock cycle, a $-\phi 1$ signal is applied to decondition the AND invert circuit 200 causing a positive signal to be applied to the inverter 202 to terminate the positive signal on the SYNCH TD line, the positive signal having been present for a 1 usec clock cycle period. The positive signal on the SYNCH TD line is used to synchronize the PIOW data and WR DSD commands as will be described in greater detail hereafter.

Referring now to FIGS. 26a1 and 26b1, if the SEL latch 192 has not been reset by a common error, then positive signals on the SEL and TD lines are applied to render the AND invert circuit 204 effective to apply a negative signal via the −TD SEL line to the inverter 212 and to decondition the AND circuit 216 causing a −VALID B signal to be produced indicating that the DSD was selected and a legal command was decoded. The inverter 212 inverts the negative signal to a positive signal on the TD SEL line which is used to determine whether there was a crypto engine data error during the execution of a PIOR Data command which will be described in greater detail hereafter and for controlling write error detection which will be described in the next section.

Referring now to FIG. 26a1, at the end of TD time, a positive signal is applied to the −TD tag line which is inverted to a negative signal by the inverter 186 and applied via the TD line to decondition the AND invert circuit 204. The AND invert circuit 204 in being deconditioned causes a positive signal to be applied to the −TD SEL line which, in turn, is applied to the inverter 212 and to render the AND circuit effective to terminate the negative signal on the −VALID B line. The inverter 212 inverts the positive signal to a negative signal on the TD SEL line which is applied to decondition the engine error circuitry in FIG. 26h3, to control circuitry in FIG. 26b2 for terminating the operation of the SET BS or RST BS commands and to decondition the write error circuitry in FIG. 26b3.

Following the end of TD time, the IO operation ends and a positive signal is applied via the −IO tag line to the inverter 182 where it is inverted to a negative signal to reset the SEL latch 192 and the WR ERR latch 364 in FIG. 26c4. The SEL latch 192 in being reset applies a negative signal to reset the command register 224 in FIG. 26a2 to reset the TC END latch 210 which, in being reset, applies a negative signal to decondition the AND circuit 218 thereby terminating the positive signal on the TC END line. The deconditioned AND circuit 218 causes a negative signal to be applied via the TC END line to decondition the AND invert circuit 220 thereby terminating the negative signal on the −P Valid line. The command register 224 in being reset deconditions all of the decoder circuitry in FIGS. 26b2 and 26b3.

WRITE ERROR DETECTION

Referring now to FIGS. 26b3 and 26c4, if a legal command has been decoded, indicated by a positive signal on the LEGAL CMD line, and the command is of the write type, indicated by a positive signal on the −7 line, and if the data byte on the BUS IN has bad parity, indicated by a positive signal on the PARITY BAD line, then, at TD time, the positive signal on the TD SEL line is applied to render the AND invert circuit 362 effective to apply a negative signal to set the WR ERR latch 364. This latch will remain set for the duration of the IO operation or until the end of TD time for a RST command. The WR ERR latch 364 in being set applies a positive signal to set the status bit 3 latch 954D in the status register 952 in FIG. 26i2 to record the fact that a write error was detected.

ILLEGAL ORDER

If the DSD has been properly addressed and selected and if the command byte specifies an order code not recognized by the DSD, then this condition will be detected and the status bits 0 and 2 of the status register set to indicate this illegal order condition. More specifically, referring to FIG. 26b2, if a WR DSD ORDER command is decoded by the AND invert circuit 266, a negative signal is applied to the inverter 268 where it is inverted to a positive signal and applied via the WR DSD ORDER line to condition the AND circuit 270. At TD time, the positive signal on the SYNCH TD line is applied to render the AND circuit 270 effective to apply a positive signal via the WR ORD TIME line to one input of the AND invert circuit 348 in FIG. 26b3. The other inputs to the AND invert circuit 348 are the legal order codes recognized by the DSD. If none of these order codes occur, then positive signals are applied to the remaining inputs of the AND invert circuit 348 rendering it effective to apply a negative signal via the minus ILG ORD line to set the status bit 0 and 2 latches 954a and 954c of the status register 952 in FIG. 26i2.

WRITE MASTER KEY ORDER OPERATION

A general description of this operation will first be given followed by a more detailed description. Provided that the EW switch has been previously set to the on position, three latches are set when this order is decoded, namely, the WMK latch 274 in FIG. 26c3, the key invalid latch 278 and the master key overwrite latch (MW OVW) 276 in FIG. 26c2. The master key overwriting function, which is provided to destroy the previously stored contents of the MK memory 700, is accomplished by activating the write enable line, pulsing the memory enable line and stepping the address counter 390 in FIG. 26b2. Whatever happens to be present as bits 0, 1, 2 and 3 on the BUS IN will be written into the MK memory in all locations. The MK OVW latch 276 remains set for 16 microseconds and is reset after the 16th MK memory location has been overwritten. Thereafter, the actual master key is written with bits 0, 1, 2 and 3 from the data fields in a series of 16 PIOW data commands with one microsecond write enable and memory enable signals being provided for each SYNCH TD time. The address counter 390 is stepped at the conclusion of each pulse. There is no automatic termination of the write master key order. After the 16th half byte has been written into the MK memory 700, a RST command must be issued to reset the WMK latch 274 and regardless of whether the operation is under terminal control or manual control the EW switch must be set to the off position. The key invalid latch 278 is left set and no data can be processed until after a valid key is installed in the crypto engines by a DECK order. If the WMK order is issued while the EW switch is set in the off position, there is no action other than recording a procedural error. The WMK order is performed infrequently and is done only under physically secure conditions, as the master key appears in clear form in the machine at this time.

Figure 28B:
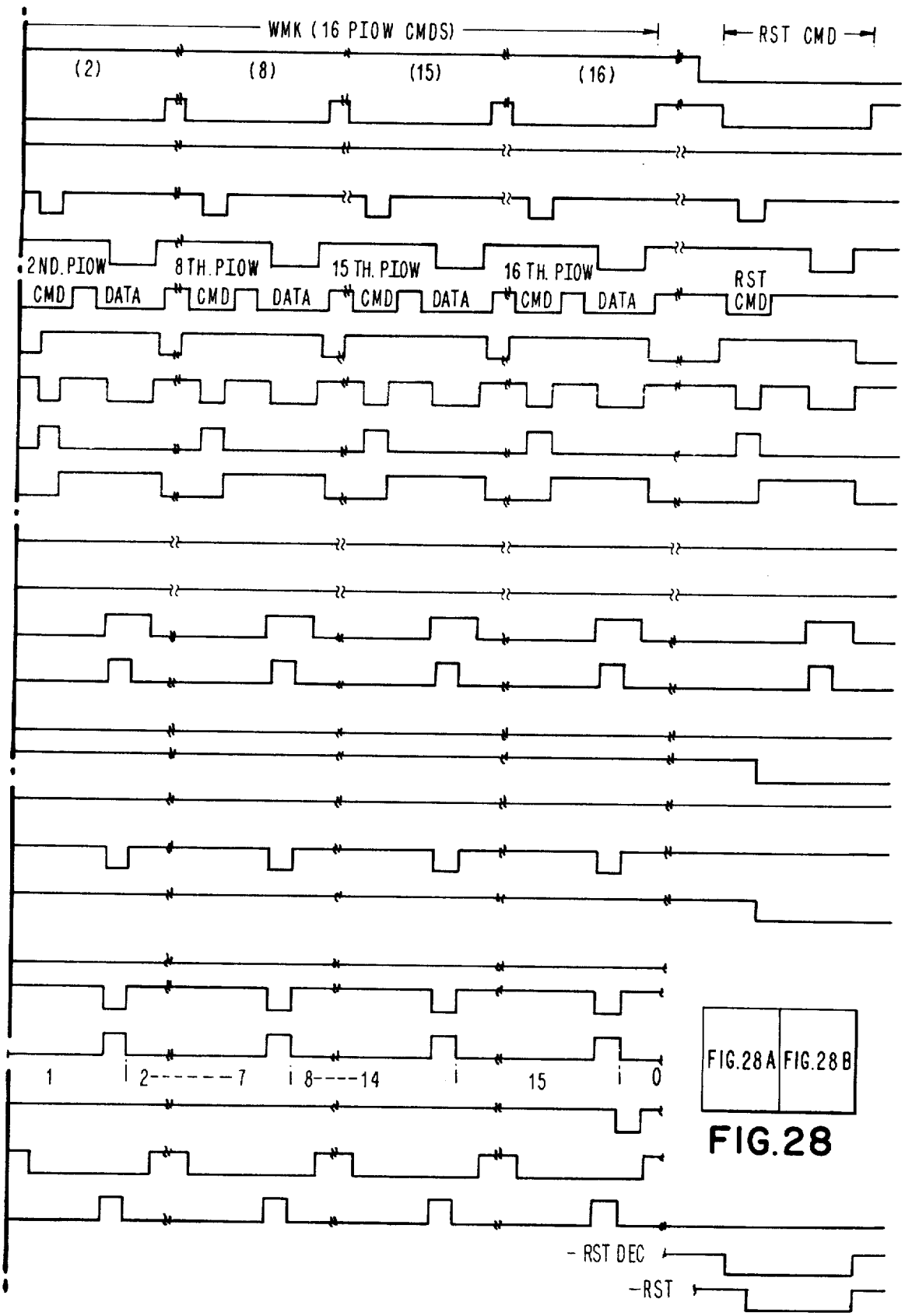

A more detailed description of the write master key order operation will now be given and should be followed in conjunction with the timing diagram of FIG. 28. After address selection at TA time and loading of the command register 224 at TC time, the command decode is decoded by the AND inverter circuit 266 in FIG. 26b2 to produce a negative signal which is inverted to a positive signal by the inverter 268 on the WR DSD ORDER line thereby indicating the presence of a WR DSD order command. The positive signal on the WR DSD ORDER line is applied to condition the AND circuit 270. At the same time, a portion of the order code is decoded by the AND invert circuit 280 to apply a negative signal via the −WMK DEC line to the inverter 282 where it is inverted to a positive signal and applied via the WMK line to one input of the AND invert circuit 272. A positive signal on the −Y line personalizes this order as a WMK order and is applied to a second input of the AND invert circuit 272. Referring now to FIG. 26c1, the EW switch will have previously been set to the on position, thereby permitting a positive signal from the +5V source to be applied as a third input to the AND invert circuit 272 in FIG. 26b2. At TD time, a positive signal is applied via the SYNCH TD line to render the conditioned AND circuit 270 effective to apply a positive signal via the WR ORD TIME line to the remaining input of the AND invert circuit 272. Accordingly, the AND invert circuit 272 is rendered effective to apply a negative signal via the −SET WMK line to set the WMK latch 274 in FIG. 26c3 and to set the MK OVW 276 in FIG. 26c2. The MK OVW latch 276 in being set applies a negative signal via the −MK OVW line to decondition the AND circuit 380 and the AND invert circuit 368. The deconditioned AND circuit 380 applies a negative signal to the −W ENABLE line to prepare the MK memory 700 for a writing operation. The AND invert circuit 368 in being deconditioned applies a positive signal to condition the AND invert circuit 370 and 374, in a manner as previously described in the manual WMK operation, for producing the successive signals on the −M ENABLE line during the memory overwrite operation. The WMK latch 274 remains set for the remainder of this operation and applies a positive signal to the WMK line and a negative signal to the −WMK line. The positive signal on the WMK line is applied to condition the AND invert circuit 366 in FIG. 26c2 in preparation for writing the new master key into the MK memory 700. The negative signal on the −WMK line is applied to set the KEY INVALID latch 278 which remains set for the remainder of this operation and will be reset only after a valid key is installed in the crypto engines by either a LKD or DECK order, either of which will cause a reset of this latch. The negative signal on the −WMK line is also applied to decondition the AND invert circuit 298 in FIG. 26c4 causing a positive signal to be applied to the K ORD line and via inverter 300 a negative signal to the −K ORD indicating that a key order operation is being performed.

Referring now to FIG. 26c2, at ϕ3L time, a ϕ3L clock pulse is applied to render the AND invert circuit 370 effective to apply a negative signal to decondition the AND invert circuit 376 which, in turn, applies a positive signal which is inverted by the inverter 378 to a negative signal on the −M ENABLE line. Accordingly, the presence of negative signals on the −W ENABLE and −M ENABLE lines enables the MK memory 700 for a write operation. Referring now to FIG. 26c1, since the MW switch has not operated, the MW latch 138 remains reset and likewise the MK BUS SELECT latch 140. The MK BUS SELECT latch 140 in being in a reset state applies a positive signal to condition the AND circuits 166 and a negative signal to decondition the AND circuits 164 in FIG. 26d1. In this case, the half byte value is not taken from the manual switches SW0 to SW3 but rather from whatever happens to be present on the bits 0, 1, 2 and 3 line of the BUS IN which will now be written into location 0 of the MK memory 700. Referring now to FIG. 26c2, the positive signal produced by the AND invert circuit 376 is applied to the AND invert circuit 374 the other inputs of which have positive signals maintained thereon at this time causing a negative signal to be applied to the AND invert circuit 376 to maintain the positive signal output thereof until φ1L time of the next clock cycle. At that time, a −φ1L clock pulse is applied to decondition the AND invert circuit 374 which, in turn, applies a positive signal to render the AND circuit 376 effective to apply a negative signal to the −STEP CTR line and to the inverter 378 where it is inverted into a positive signal on the −M ENABLE line. The negative signal on the −STEP CTR line is inverted by the inverter 388 in FIG. 26d2 to a positive signal which is applied via the −STEP CTR line to step the address counter 390 to an address count of 1 indicating the next location of the MK memory 700. In a similar manner each successive φ3L clock pulse is effective to control the application of a negative signal on the −M ENABLE line to permit half byte value on the BUS IN to be written into and overwrite the previous master key half byte at that location and each succeeding −φ1L clock pulse is effective to control the termination of the negative signal on the −M ENABLE line and to step the address counter 390 to the next location as previously described in connection with the manual write master key operation. Similarly, when a count of 16 is reached and the address counter 390 returns to an address count of 0, the negative signal on the −16 STEP line is applied to reset the MK OVW latch 276 to thereby terminate the MK overwrite operation.

Following the end of the MK overwrite operation, the first of 16 PIOW data commands is provided to the DSD. After address selection during the TA time and loading of the command byte in the command register during TC time, in a manner previously described, the AND invert circuit 226 in FIG. 26b2 decodes this command and applies a negative signal via the −PIOW DATA DEC line to one input of the OR invert circuit 230. At TD time, a positive signal on the SYNCH TD line is inverted by the inverter 228 to a negative signal to the other input of the OR invert circuit 230 which, in turn, applies a positive signal to the PIOW DATA line. The positive signal on the PIOW DATA line is applied to the AND invert circuit 366 in FIG. 26c2 which in combination with the positive signal on the MK line renders the AND invert circuit 366 effective to apply a negative signal to decondition the AND circuit 380 and the AND invert 376 for the period of the SYNC TD pulse. The AND circuit 380 in being deconditioned applies a negative signal to the −W ENABLE line. The AND invert circuit 376 in being deconditioned applies a positive signal which is inverted by inverter 378 to a negative signal on the −M ENABLE line. The combination of negative signals on the −W ENABLE and −M ENABLE lines permit the bits 0, 1, 2 and 3 of the data field associated with the PIOW command, which is the first half byte of the new master key, to be written into location 0 of the MK memory 700. At the end of SYNC TD time, a negative signal is applied to the SYNC TD line which is inverted by inverter 228 in FIG. 26b2 to a positive signal which renders the AND invert circuit 230 effective to apply a negative signal via the PIOW DATA line to decondition the AND invert circuit 366 in FIG. 26c2. Accordingly, AND invert circuit 366, in being deconditioned, applies a positive signal to condition the AND circuit 380 and the AND invert circuit 376. The AND circuit 380 in being conditioned applies a positive signal on the −W ENABLE line while the AND invert circuit 376 in being conditioned applies a negative signal to the −STEP CTR line and is inverted by the inverter 378 to a positive signal on the −M ENABLE line. The positive signals on the −W ENABLE AND −M ENABLE lines inhibit further writing operations into the MK memory 700. The negative signal on the −STEP CTR line is inverted by inverter 388 in FIG. 26d2 to a positive signal on the STEP CTR line to step the address counter 390 to an address count of 1 representing the next address for the MK memory 700. In a similar manner, succeeding negative signals on the −W ENABLE and −M ENABLE lines are provided for succeeding SYNC TD times to write the succeeding half bytes of the new master key into the MK memory 700 with the address counter 390 being stepped at the conclusion of each succeeding SYNC TD signal.

After the sixteenth half-byte value has been written into the MK memory 700, the WMK order operation is completed by setting the EW switch in FIG. 26c1 to the off position which, in turn, causes a negative signal to be applied to decondition the AND invert circuit 272 in FIG. 26b2 and inhibit the performance of any subsequent WMK order operation so long as the EW switch remains off. This concludes the description of the WMK order operation. However, it should be noted that the MK latch 274 in FIG. 26c3 remains set until such time as a RST command is issued to reset this latch and that the KEY INVALID latch 278 also remains set and no data can be processed until after a valid key is installed in the crypto engine by a DECK order as will be described in greater detail hereafter.

RESET ADAPTER COMMAND OPERATION

The execution of this command causes a RST signal to be created from the end of TC time until the end of I/O operation. This signal is used to reset all counters, flip-flops and latches in the adapter and control section. Nothing in the crypto engines are reset and the data field associated with this command is ignored. The same reset signal can also be created by a discrete reset signal on the −RESET line from the I/O interface.

A more detailed description of the reset adapter command operation will now be given in conjunction with the timing diagram in FIG. 28. After the address selection is performed during TA time and the command byte is loaded into the command register during the TC time, as previously described, the AND invert circuit 250 in FIG. 26b2 decodes the RST command code and produces a negative signal which is applied to the inverter 252 where it is inverted to a positive signal and applied to one input of the AND circuit 254. At TC time, a positive signal on the TC END line is applied to render the AND circuit 254 effective to apply a positive signal to the OR invert circuit 256 which, in turn, applies a negative signal on the RST line. A similar operation may be initiated by a discrete negative signal on the −RESET line from the I/O interface in FIG. 26a2 which is inverted by the inverter 248 to apply a positive signal to the OR invert circuit 256 which, in turn, applies a negative signal to the −RST line. As mentioned above, this signal is used to reset all counters, flip-flops and latches in the adapter and control sections that are not automatically reset by the clock 100 or tag signals. If this command is issued after a WMK order command, then the negative signal on the −RST line is applied to reset the WMK latch 274 which, in being reset, applies a positive signal on the −WMK line to render the AND invert circuit 298 in FIG. 26c5 effective to apply a negative signal on the K ORD line and via the inverter 300 a positive signal on the −K ORD line.

INPUT/OUTPUT MANAGEMENT AND CONTROLS

Before proceeding to various order commands which involve the use of the crypto engine, a description will be given of the I/O management technique used in the DSD as well as some of the major controls used in such management. Referring now to FIGS. 26f1 and 26g1, one of the crypto engines is shown in block form and includes a 64-bit input/output buffer register divided into an upper buffer register UBR 100 and a lower buffer register LBR 150 of 32 bits each. The buffer register is used for both input and output operations in a mutually exclusive manner for receiving an input block of data by a series of 8 PIOW DATA commands, termed an input cycle or for producing an output block of data by a series of 8 PIOR data commands, termed an output cycle. During each input cycle, an 8 byte block of input data is written into the buffer register on a serial-by-byte basis from the terminal memory and during each output cycle an 8 byte block of output data is read from the buffer register on a serial-by-byte basis to the terminal memory. During the input cycle, each received byte is parity checked for odd parity over nine bits and during the output cycle to each byte is appended a parity bit to achieve odd parity over nine bits. Principal input/output controls which are used for the I/O management include: (1) an input cycle latch 454 in FIG. 26e3 which is set by a PIOW data command, except during the execution of a WMK order command, and remains set until after 8 PIOW data commands have been counted by a byte counter 448 in FIG. 26d4; (2) an output cycle latch 464 in FIG. 26e3 which is set by a PIOR data command, by the conclusion of the input cycle during the LKD order operation or by the conclusion of the deciphering process during the execution of the DECK order operation, and remains set until after the 8 PIOR data commands have been counted or until after 8 buffer to key register shifts have been counted by the byte counter; (3) a byte counter 448 which counts the number of shifts of the buffer register as it is being loaded or unloaded by PIOW or PRIOR data commands, respectively, or as a cipher key is being transferred from the buffer register to the key register; and (4) a block counter 414 in FIG. 26d3 which is set at the end of every input cycle and is reset at the end of every output cycle.

CRYPTO ENGINE CONTROLS

Figure 29B:
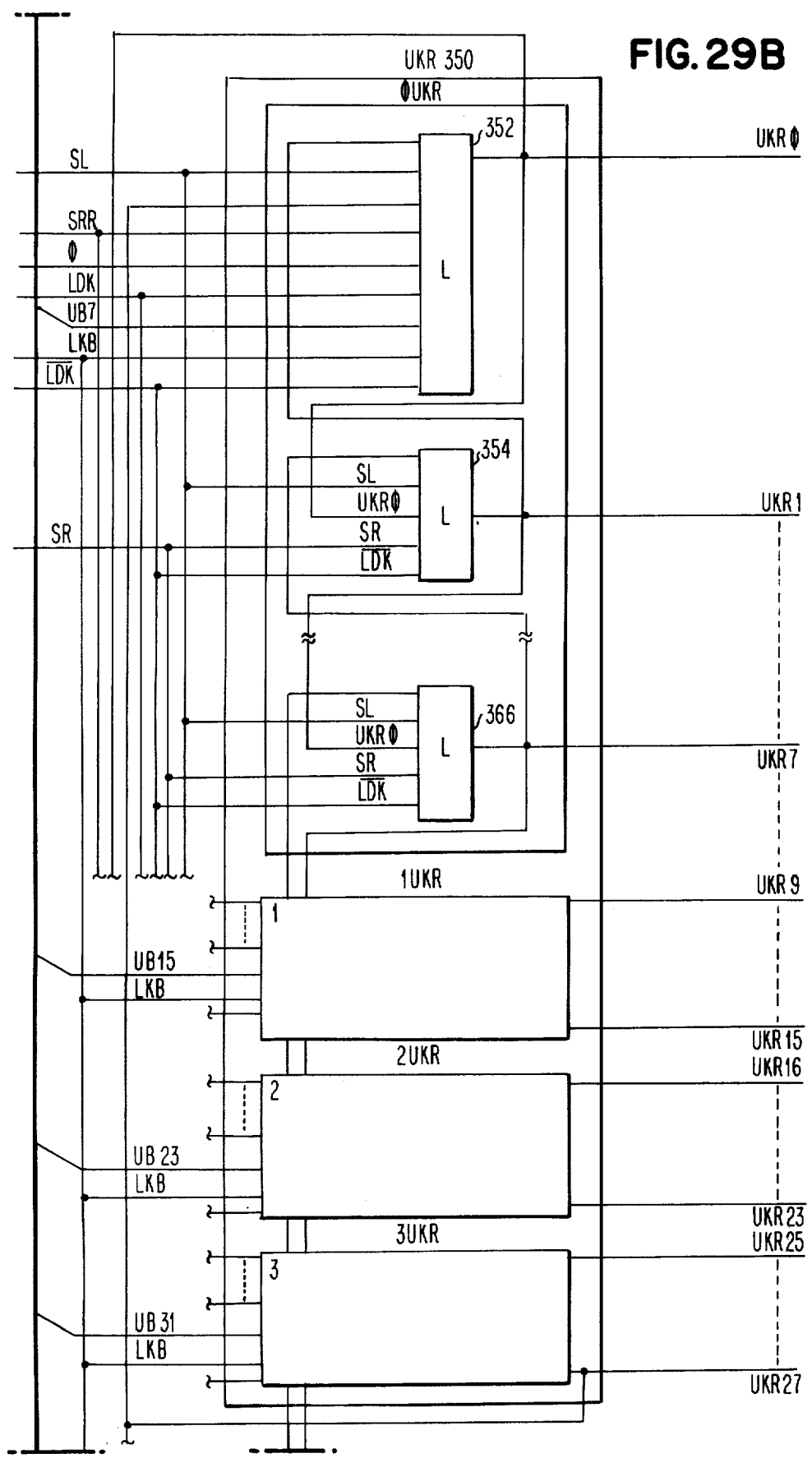
FIG. 29 illustrates logic details of the crypto engine used in the data security device of the present invention.
Figure 29A:
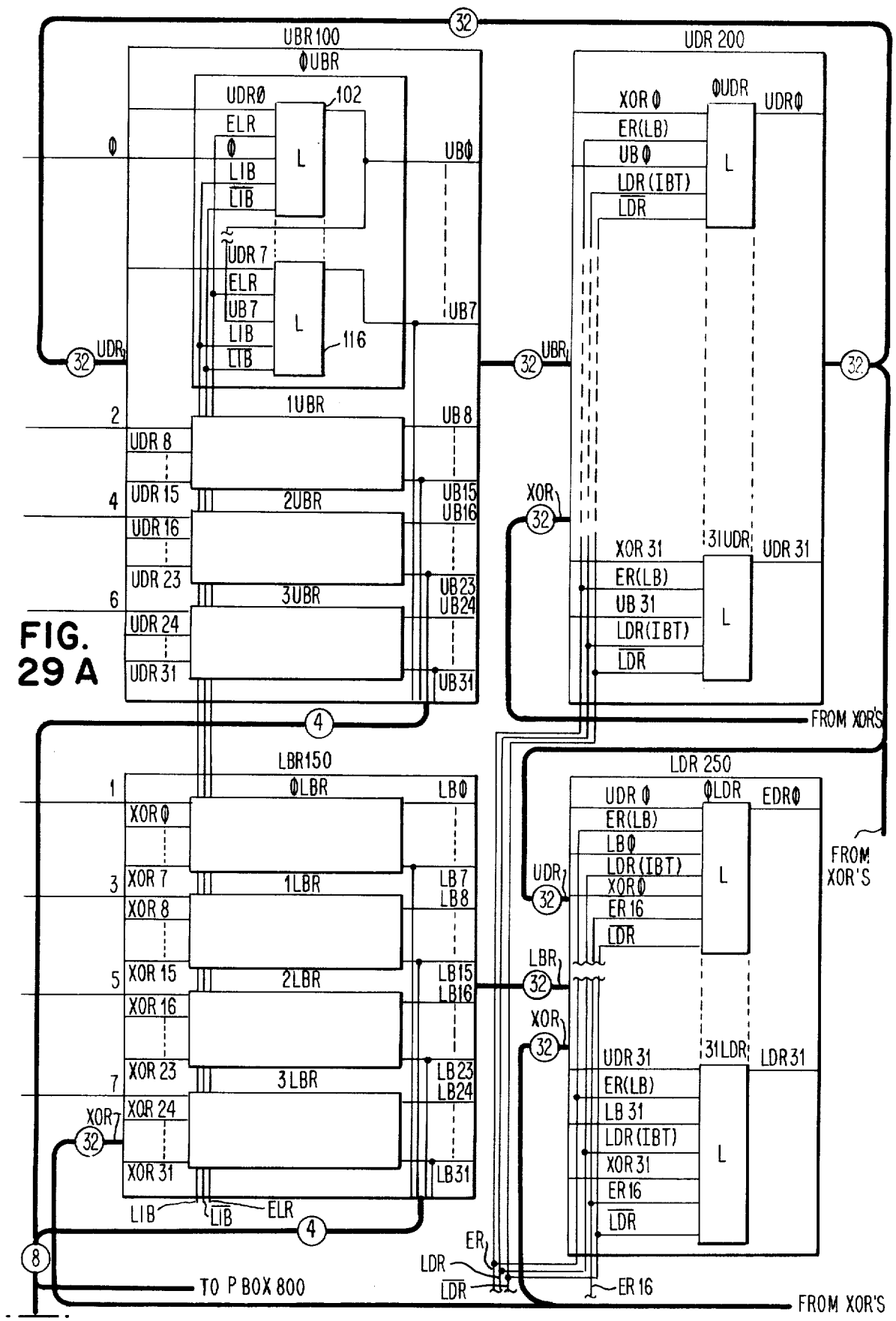
Figure 29C:
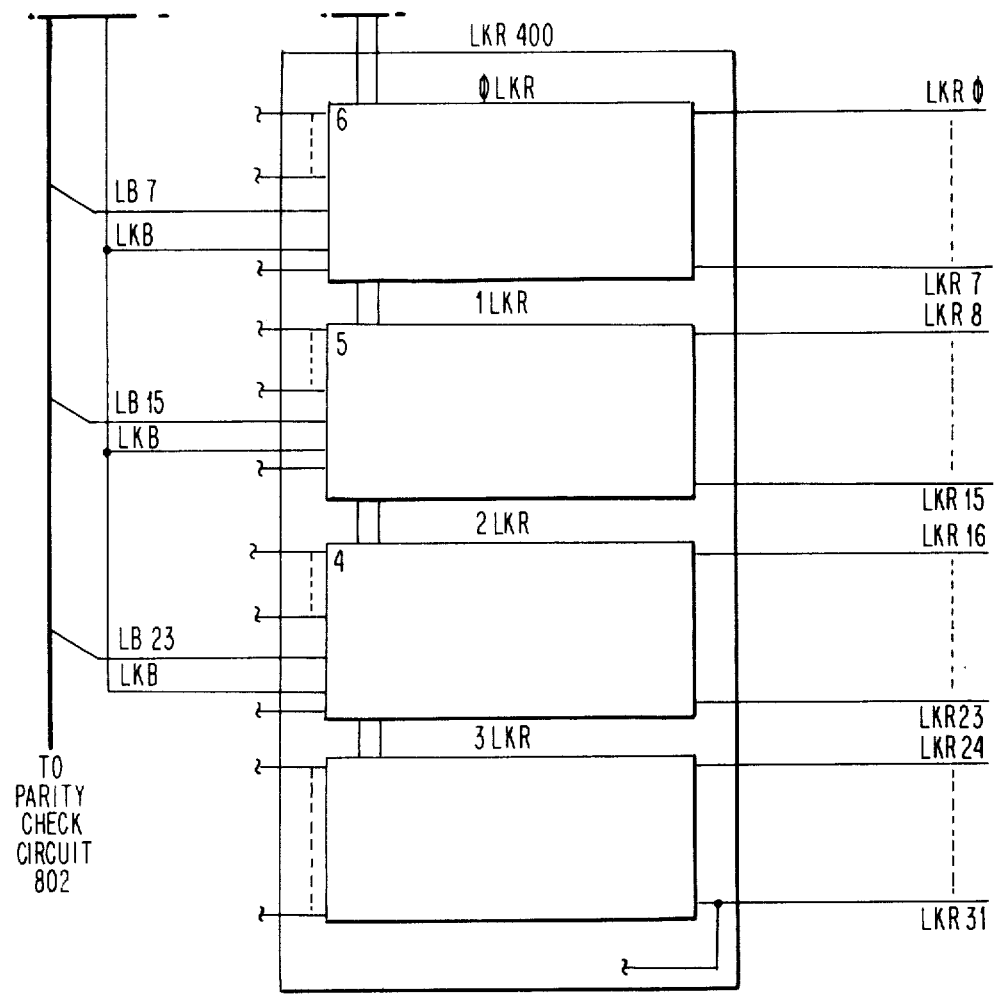

The crypto engine used in the present invention is similar in detail to that shown and described in the aforementioned U.S. Pat. No. 3,598,081. One difference between the engine shown in the aforementioned patent and that in the present invention is that in the aforementioned patent the crypto engine is provided with separate input and output bubber registers whereas in the crypto engine of the present invention a single input/output buffer register is provided and used, in a mutually exclusive manner, for input/output operations. However, while there is a difference in design detail between the previous and the present crypto engine, the algorithm performed by both is identical. Additionally, the crypto engine of the aforementioned patent discloses how the basic encipher/decipher operations are performed with the cipher key being loaded directly into the key register as a working key whereas, in the present invention, in addition to being loaded directly into the key register from the MK memory 700, it is also loaded as a working key into the key register via the input/output buffer register when the cipher key is provided from the host memory during a DECK operation. The details of these modifications of the prior crypto engine are shown in FIG. 29a to FIG. 29c and correspond to FIGS. 3a to 3d of the aforementioned patent with the notations used being identical for both except for the lines labeled ER and LBR which correspond to lines labeled LB and IBT in the aforementioned patent. The various control signals used in the crypto engine and their function will be generally described in the following and the operation of the modified crypto engine will be described in conjunction with the detailed descriptions of the various command operations which will be described hereafter.

Load Input Buffer (LIB)—This signal is used for loading and unloading the buffer registers UBR 100 and LBR 150. During an input cycle, this signal causes a data byte presently on the BUS IN to be latched in and simultaneously shifted in the buffer registers. After eight such actions, the loading operation is complete. During an output cycle, a data byte is outputted, after which this signal causes the buffer registers UBR 100 and LBR 150 to be shifted in preparation for outputting the next data byte. After eight such actions, the unloading operation is complete.

Load Key Register From Buffer (LKB)—This signal is essentially identical to the LIB signal and is produced during the output cycle of LKD or DECK operations causing the buffer register outputs to be latched into the key registers UKR 350 and LKR 400.

Load Data Register (LDR) and End of Last Round (ELR)—These signals are simultaneously produced from the same source with LDR causing the content of the buffer register UBR 100 and LBR 150 to be transferred to the data registers UDR 200 and LDR 250 and ELR causing the contents of the data registers UDR 200 and LDR 250 (via the cipher function circuits) to be transferred to the buffer registers UBR 100 and LBR 150, the simultaneous action constituting a swap of the contents of the buffer and data registers.

Engine Busy (EB)—This control signal is produced during actual data ciphering operations and occurs from the end of the input cycle to the end of the last of the 16 rounds of the cipher function.

End of Round (ER)—This signal is used to latch up the intermediate results of each round in the data registers UDR 200 and LDR 250.

End of Round 16 (ER16)—This signal is used to latch up the final result output of the cipher function circuits to the lower data register LDR 250.

Load Master Key (LDK)—This signal causes the contents of the MK memory buffer 702 to be latched into the key registers UKR 350 and LKR 400.

Shift Right (SR), Shift Right and Recirculate (SRR) and Shift Left (SL)—The SR signal is used to shift the key registers UKR and LKR 400 to the right when a cipher key is being loaded from either the MK memory 700 or the buffer registers UBR 100 and LBR 150. The SRR signal configures the key register UKR 350 and LKR 400 into two recirculating right shifting registers. During the decipher process, the SR and SRR control signals cause the key registers to be shifted to the right. During the encipher operation, the SL control signal configures the key registers UKR 350 and LKR 400 into two recirculating left shifting registers which are shifted to the left.

DECIPHER KEY ORDER OPERATION

The function of this operation is to decipher an enciphered operational key and then load the operational key in clear form as the working key in the key registers of the crypto engines for subsequent data processing operations.

When the order code specifying this order is decoded, a decipher key (DECK) latch is set, a load master key (LMK) latch is set, the key invalid latch is reset (having been set and remain set by a previous WMK order command if that command preceded the present one) to permit data to be subsequently processed since a new working key is to be written into the key registers of the crypto engines by the present operation and an encipher (ENC) latch is reset so that the processing mode is set for a decipher operation. With the LMK latch set, the contents of the MK memory is caused to be read out and transferred, a byte at a time, to the crypto engines. The master key is parity checked, a byte at a time, and loaded as a working key directly into the key registers of the crypto engines. Concurrently with (or after) loading the master key into the key registers, a series of 8 PIOW commands are received with the data fields associated with the commands, constituting the enciphered operational key to be deciphered under control of the master key, being loaded into the buffer registers of the crypto engines. The first such command initiates an input cycle and a byte counter counts each such command received. After the 8 PIOW commands have been received and the 8th byte written into the buffer registers, then, at the 8th count, the input cycle ends, the enciphered operational key is transferred from the buffer registers to the data registers of the crypto engines, a block counter is set and the crypto engines start a decipher operation which is indicated by the generation of an engine busy signal. At the end of the decipher operation, the operational key, now in clear form, is loaded into the buffer registers of the crypto engines and an output cycle is started. During the output cycle, the buffer registers and the key registers are shifted in synchronism, once for each clock cycle, causing the operational key presently in the buffer registers to be shifted into the key registers. During this transfer, the byte counter counts the clock cycles and after the 8th count, the output cycle ends, the block counter is reset and the DECK latch is reset to end the operation. Any attempt to read the contents of the buffer registers while the operational key is present in clear form will be detected and cause a procedural error as will be described in greater detail hereafter.

A more detailed description of the decipher key operation will now be given in conjunction with the timing diagrams of FIGS. 30a–30c. After address selection at TA time and loading the command byte into the command register at TC time, the command code is decoded by AND invert circuit 266 in FIG. 26b2 to produce a negative signal which is inverted by inverter 268 to a positive signal on the WR DSD ORDER line thereby indicating the presence of a WR DSD order command. At the same time, the order code is decoded by the AND invert circuit 288 to apply a negative signal via the −DECK DEC line to the inverter 290 where it is inverted to a positive signal and applied to one input of the AND invert circuit 292. At TD time, a positive signal is applied via the SYNCH TD line to render the AND circuit 270, conditioned by the positive signal on the WR DSD line, effective to provide a positive signal on the WR ORD TIME line which is applied to the remaining input of the AND invert circuit 292 to render it effective to produce a negative signal on the −SET DECK line. The negative signal on the −SET DECK line is applied to set the DECK latch 296 in FIG. 26c3, to reset the key invalid latch 278, to set the LMK latch 566 in FIG. 26g4 and to decondition the AND invert circuit 368 in FIG. 26c2. The AND invert circuit 368 in being deconditioned applies a positive signal to condition the AND invert circuits 370 and 374 which will be used for controlling a MK memory readout as will be described hereafter. The LMK latch 566 in being set applies a negative signal via the −LMK line, in FIG. 26c2, to maintain the AND invert circuit 368 deconditioned and thereby maintain the AND invert circuits 370 and 374 conditioned while the LMK latch remains set i.e. during the MK memory read out time. Referring now to FIGS. 26c3, 26c4 and 26d5, the DECK latch 296 in being set applies a negative signal via the −DECK line to decondition the AND invert circuit 298 which, in turn, applies a positive signal on the K ORD line and via inverter 300 a negative signal on the −K ORD line thereby providing indications that this is a key order operation. The negative signal on the −K ORD line is applied to reset the ENC latch 312. Since DECK latch 296 is set, a positive DECK signal is applied to OR invert circuit 492, resetting SPEC ENC latch 494. The ENC latch 312, and SPEC ENC latch 494, being reset, apply a negative signal via OR circuit 522 to the ENC line which, in FIG. 26g3 is inverted to a positive signal by the inverter 546 to provide a positive signal on the DEC line indicating a decipher mode of operation.

Referring now to FIG. 26c2, negative signals are applied to the inputs of the AND invert circuit 366 and a negative signal is applied to the inverter 162 both of which cause a positive signal to be applied to one input of the AND circuit 380 and to condition the AND invert circuit 376. Additionally, the MK OVW latch 276, presently in a reset state, causes a positive signal to be applied via the −MK OVW line to the other input of the AND circuit 380 rendering it effective to apply and maintain a positive signal on the −W ENABLE line. At ϕ3L time, a ϕ3L clock pulse is applied to render the AND invert circuit 370 effective to apply a negative pulse to decondition the AND invert circuit 376 which, in turn, applies a positive signal to the inverter 378 where it is inverted to a negative signal on the −M ENABLE line. The positive signal on the −W ENABLE line together with the now negative signal on the −M ENABLE line are effective to cause the first half byte at location 0 of the MK MEMORY 700 to be read out. At ϕ1 time of the next clock cycle, a ϕ1 clock pulse is effective to shift the half byte into the shift registers 702 in FIG. 26e1. Referring now to FIG. 26c2, at ϕ1L time, a −ϕ1L clock pulse is applied to decondition the AND invert circuit 374 which, in turn, applies a positive signal to render the AND invert circuit 376 effective to apply a negative signal to the −STEP CTR line and to the inverter 378 to apply a positive signal on the −M ENABLE line. The negative signal on the −STEP CTR line is applied to the inverter 388 where it is inverted to a positive signal to step the address counter 390 to an address count of 1 and cause a positive signal to be provided on the C1 line. At ϕ3L times, a ϕ3L clock pulse is again applied to render the AND invert circuit 370 effective to initiate production of a negative signal, via the AND invert circuit 376 and the inverter 378, on the −M ENABLE line. The positive signal on the −W ENABLE line in combination with the negative signal on the −M enable line is again effective to cause the next half byte at location 1 of the MK memory 700 to be read out. At $\phi$1 time of the next clock cycle, a $\phi$1 clock pulse is effective to shift the next half byte into the first stages of the shift register 702 and to shift the previous half byte read out of the MK memory 700 to the second stages of the shift registers 702. As a result of this action, the first full byte of the cipher key is now stored in the shift registers 702.

Referring now to the AND invert circuit 568 in FIG. 26g4, a $\phi$1 DEL clock pulse in combination with positive signals on the C1, −STEP CTR and LMK lines are applied to render and AND invert circuit 568 effective to apply a negative signal to set the LDK latch 570 which, in being set, applies a negative signal via the −LDK line to decondition the AND circuit 572 and to one input of the OR invert circuit 576. The deconditioned AND circuit 572 causes a negative signal to be applied via the −SR line to one input of the OR invert circuit 574.

Referring to the AND invert circuit 374 in FIG. 26c2, at $\phi$1L time, a −$\phi$1L clock pulse is applied to decondition the AND invert circuit 374 causing a positive signal to be applied to render and AND invert circuit 376 effective to apply a negative signal to the −STEP CTR line and via the inverter 378 to a positive signal on the −M ENABLE line. The negative signal on the −STEP CTR line is inverted by the inverter 388 to a positive signal to step the address counter to an address count of 2 and causing a negative signal to now be applied to the C1 line.

Referring now to the OR invert circuits 574 and 576 in FIG. 26g4, at $\phi$2 time, a −C clock pulse is applied to the other inputs of the OR circuits 574 and 576 causing them to apply positive signals via the SR and LDK lines respectively, to the control signal cable connected to the crypto engines. The positive signal on the SR line is also applied to the OR invert circuit 606 in FIG. 26h4 causing a negative signal, delayed by delay circuit 608, to be applied via $\overline{\text{LDK}}$ line to the control signal cable.

Referring now to the crypto engines in FIG. 26g1, the positive signal on the LDK line is applied to condition the AND circuit 807 to permit a parity check to be made of the first byte of the cipher key stored in the shift registers 702 to be checked for a parity error. The positive signals on the SR, LDK and $\overline{\text{LDK}}$ lines are applied as control signal inputs to the key registers UKR 350 and LKR 400 to shift the key register and allow the first byte of the cipher key, passed via the P box 300, to be latched into the key registers.

Referring now to FIG. 26c2, at $\phi$3L time, a $\phi$3L clock pulse is again applied to render the AND invert circuit 370 effective to initiate production of a negative signal on the −M ENABLE line to permit the third half byte to be read out of the MK memory 700 from location 2. Referring now to FIG. 26g4, at $\phi$1 time of the next clock cycle, a −$\phi$1 clock pulse is applied to reset the LDK latch 570 to inhibit production of the control signals for the crypto engine during this clock cycle in order to permit the next half byte to be read out of the MK memory 700 and shifted into the shift registers 702 in FIG. 26e1. Accordingly, referring to FIG. 26e1, at the same time that the LDK latch 570 is reset, a $\phi$1 clock pulse is applied to shift the next half byte from the MK memory 700 into the shift registers 702.

In a similar manner, during each succeeding clock cycle, a half byte of the cipher key is read out of the MK memory 700 and shifted into the shift registers 720 and the address counter 390 stepped to the next address count. After each second clock cycle, when a full byte of the cipher key is loaded into the shift registers 720, control signals are provided on the LDK, SR and $\overline{\text{LDK}}$ lines to parity check the cipher key byte and to simultaneously shift the previously loaded byte one position to the right and to latch up the newly entered byte in the key registers in the crypto engine.

Referring now to FIG. 26d2, when the address counter 390 steps to an address count of 8 (the 9th address location), a negative signal is produced on the −C8 line to set the 16 STEP latch 404 which, in being set, applies a positive signal to one input of the AND circuit 406. After the 8th byte is loaded into the key registers, the address counter 390 steps from an address count of 15 back to an address count of 0 (count of 16) causing a positive signal to be produced on the −C8 line which is applied to condition the AND invert circuit 402 and to the other input of the AND circuit 406. The AND circuit 406 is rendered effective to produce a positive signal which is inverted by inverter 408 to a negative signal on the −16 STEP line to reset the LMK latch 566 in FIG. 26g4. The LMK latch 566 in being reset applies a negative signal via the LMK to decondition the AND invert circuit 568 and inhibit further setting of the LDK latch 570 and further production of crypto engine control signals on the LDK, SR and $\overline{\text{LDK}}$ lines. Referring to FIG. 26d2, at $\phi$4 time of the 16th clock cycle, a $\phi$4 clock pulse is applied to reset the 16 STEP latch 404.

After loading the master key into the key registers of the crypto engines the first of a series of 8 PIOW data commands is now received by the DSD and after address selection at TA time and command loading into the command register at TC time, the AND invert circuit 226 in FIG. 26b2 decodes this command causing a negative signal to be applied to one input of the OR invert circuit 230. At TD time, a positive signal on the SYNCH TD line is inverted by inverter 228 to a negative signal to the other input of the OR invert circuit 230 which, in turn, applies a positive signal to the PIOW data line. The positive signal on the PIOW data line is applied to the AND invert circuit 426 in FIG. 26d3 which is presently conditioned by a positive signal on the −WMK line. Accordingly, the AND invert circuit 426 is rendered effective to apply a negative signal to one input of the OR invert circuit 430. At this time, positive signals are maintained at the input of the AND invert circuit 428 causing a negative signal to be applied to the other input of the OR invert circuit 430. The negative signal inputs to the OR invert circuit 430 causes a positive signal to be applied via the PIOW line to condition the AND invert circuit 431, to condition the AND invert circuit 444, in FIG. 26d4, and to be applied to the inverter 596 in FIG. 26g3 where it is inverted to a negative signal to decondition the AND circuit 600 which, in turn, applies a negative signal on the −LIB line to one input of the OR invert circuit 602. At −C time, a −C clock pulse is applied to the other input of the OR invert circuit 602. The negative signal inputs to the OR invert circuit 602 causes a positive signal to be applied via the LIB line and the control line bus to the crypto engines and to the OR invert circuit 648 in FIG. 26h4. The OR invert circuit 648 is rendered effective to apply a negative signal to the delay circuit 650, which provides a 250ns time delay, and via the $\overline{\text{LIB}}$ line and the control line bus to the crypto engines. Referring now to FIGS. 26f1 and 26g1 the combination of signals on the LIB and $\overline{\text{LIB}}$ lines are effective to permit the data field associated with the first PIOW data command to be loaded from the BUS IN via the P box 50 into the buffer registers UBR 100 and LBR 150 in each crypto engine.

Referring now to FIG. 26e3, at $\phi$3L time of the clock cycle, a $\phi$3L clock pulse is applied to render the conditioned AND invert circuit 431 effective to apply a negative signal to set the INPUT CYCLE latch 454 to start the input cycle operation. The INPUT CYCLE latch 454 in being set applies a negative signal via the $-$IN CYCLE line to set the START IN CYCLE END latch 530 which, in being set, applies a positive signal to one input of the AND invert circuit 532. Referring now to FIG. 26d4, at $\phi$4 time, a $\phi$4 clock pulse is applied to render the conditioned AND invert circuit 444 effective to apply a negative pulse to the STEP BYTE CTR line, the positive trailing edge of which is effective to step the byte counter 448 to a count of one.

In a similar manner, succeeding ones of the data fields associated with the series of 8 PIOW data commands are loaded into the buffer registers UBR 100 and LBR 150 with the previous byte being simultaneously shifted and the byte counter 448 counting each such byte received. After the 8th byte is written into the buffer registers, the byte counter 448 steps from a count of 7 back to a count of 0 causing a negative signal to be produced to set the COUNT 8 latch 450 which, in turn, applies a negative signal to the $-$CT8 line. The negative signal on the $-$CT8 line is applied to reset the INPUT CYCLE latch 454 in FIG. 26e3 thereby ending the input cycle. The INPUT CYCLE latch 454 in being reset applies a positive signal via the $-$IN CYCLE line to the AND invert circuit 410 in FIG. 26d3. The combination of positive signals on $-$IN CYCLE and $-$OUT CYCLE lines are applied to render the AND invert circuit 410 effective to apply a negative signal to reset the COUNT 8 latch 450 in FIG. 26d4 and is inverted by inverter 412 to a positive signal to set the BLOCK COUNT flip flop 414 producing a positive signal on the $-$BLK0 line and a negative signal on the $-$BLK1 line.

Referring now to FIGS. 26e3 and 26f3, positive signals on the $-$IN CYCLE line and from the START IN CYCLE END latch 530 are applied to condition the AND invert circuit 532. At the next $\phi$1 time, the AND invert circuit 524 is rendered effective to apply a negative pulse, from $\phi$1 time to $\phi$1L time, on the $-\phi$1/L line to inverter 526 where it is inverted to a positive pulse which is applied via the $\phi$1 DEL line to render the now conditioned AND invert circuit 532 effective to apply a negative pulse to set the IN CYCLE END latch 534 which, in being set, applies a positive signal to the IN CYCLE END line.

Referring now to FIG. 26f4, the positive signal on the IN CYCLE END line is applied to the inverter 622 where it is inverted to a negative signal and applied to decondition the AND circuit 626 causing a negative signal to be applied to set the START EB latch 628 and to the inverter 638 in FIG. 26g4 where it is inverted to a positive signal and applied to the OR invert circuit 640 which produces negative signals on the $-$ELR and $-$LDR lines. The negative signal on the $-$ELR line is applied to one input of the OR invert circuit 642 and, in FIG. 26c2 to decondition the AND circuit 382 causing a negative signal to be applied to reset the counter 390 in FIG. 26d2 in preparation for this counter to operate as a round counter for the 16 rounds of operation of the cipher engines. The negative signal on the $-$LDR line is applied to one input of the OR invert circuit 644. At $\phi$2 time, a $-$C clock pulse is applied to the other inputs of the OR invert circuit 642 and 644 causing positive signals to be applied via the ELR and LDR lines, respectively, to the control signal cable connected to the crypto engines. The positive signal on the ELR line is also applied to the OR invert circuit 648 causing a negative signal, delayed by the 250ns time delay circuit 650, to be applied via the $\overline{\text{LIB}}$ line to the control signal cable. The positive signal on the LDR line is applied to the OR invert circuit 652 causing a negative signal, delayed by the 250ns time delay circuit 654 to be applied via the $\overline{\text{LDR}}$ line to the control signal cable.

Referring now to the crypto engines in FIG. 26g1, the control signals LDR and $\overline{\text{LDR}}$ are effective for parallel transferring the contents of the buffer registers UBR 100 and LBR 150 to the data registers UDR 200 and LDR 250. The control signals ELR and $\overline{\text{LIB}}$ are effective for causing the contents of the upper data register UDR 200 and the lower data register LDR 250 (via the cipher function circuits) to be transferred to the upper buffer register UBR 100 and the lower buffer register LBR 150, the transfer to the buffer registers being of no consequence at this time but will be of consequence at the end of the 16th round of operation of the crypto engines. At this time, with the enciphered operational key presently stored in the data registers and the cipher key stored in the key registers, the crypto engines are now effective to perform a decipher function in a manner described in detail in the aforementioned U.S. Pat. No. 3,958,081. Reference may be made to the aforementioned patent for a more detailed description of the decipher function.

A description of the manner in which the crypto engine control signals are produced will now be given and can be followed in conjunction with the timing diagram in FIG. 30. Referring now to FIG. 26f3, at $\phi$1/L time, a $-\phi$1/L clock pulse is applied to reset the IN CYCLE END latch 534 which, in being reset, applies a negative signal to inverter 622 in FIG. 26f4, where it is inverted to a positive signal to be applied to render the AND circuit 626 effective and together with the positive signal from the set START EB latch 628 renders the AND invert circuit 630 effective to apply a negative signal to set the EB latch 632 indicating the start of the crypto operation. The EB latch 632 in being set applies a positive signal to the EB line and a negative signal to the $-$EB line. The positive signal on the EB line is applied to one input of the AND invert circuit 398 in FIG. 26d2 and to condition the ER flip flop 384 in FIG. 26c2 while the negative signal on the $-$EB line is applied to set the START EB END latch 612.

The cipher function is performed by repeating a product cipher function 16 times, termed 16 rounds, with each round being carried out in two clock cycles for a total of 32 clock cycles per cipher function. During each round, the data contents of the upper data register UDR 200 is ciphered (in the present case deciphered) under control of the contents of the key registers UKR 350 and LKR 400 with the results being added to the contents of the lower data register LDR 250 by modulo-2 adders 650-664. At the end of each round, the outputs of the modulo-2 adders are parallel transferred to the upper data registers UDR 200 while the contents of the upper data registers UDR 200 are parallel transferred to the lower data register LDR 250 to form the arguments for the next round.

Referring now to FIG. 26d2, during the cipher function operation the counter 390 functions as a round counter. The round counter 390 is stepped every 2 clock cycles from a count value of 0 to a count value of 15 providing a total count of 16 for the 16 rounds. Stepping of the round counter 390 is accomplished under control the ER flip flop 384 after being enabled by the positive signal on the EB line. Thus, at $\phi 1$ time following the conditioning of the ER flip flop 384, a $\phi 1$ clock pulse is applied to set the flip flop 384 and at $\phi 1$ time of the succeeding clock cycle, a $\phi 1$ clock pulse is again applied to reset the flip flop 384 which in being reset applies a negative signal to inverter 386 where it is inverted to a positive signal and applied to step the round counter 390. Therefore, it should be apparent, that the round counter 390 is stepped to the next count every 2 clock cycles. Additionally, during the first clock cycle of each round, ER flip flop 384 being in a reset state, applies a positive signal via the −ER FF line to one input of the AND invert circuit 400. The other input to the AND invert circuit 400 is connected to a round count decoder consisting of AND invert circuits 392, 394, 396 and 398 which is effective, while a positive signal is maintained on the EB line, to produce a positive signal at the output of the AND invert circuit 398 when the round count is 0, 7, 14 or 15 and a negative signal at all other times. Thus, during the first clock cycle of rounds 0, 7, 14 and 15, the combination of positive signals on the −ER FF line and the output of the AND invert circuit 398 will render AND invert circuit 400 effective to apply a negative signal on the CT 0, 7, 14, 15 line whereas during the first clock cycle of all other rounds the negative signal output of the AND invert circuit 398 deconditions the AND invert circuit 400 causing a positive signal to be applied to the CT 0, 7, 14, 15 line. During the second clock cycle of every round, the ER flip flop 384 is in a set state causing a negative signal to be applied to decondition the AND invert circuit 400, which, in turn, applies a positive signal to the CT 0, 7, 14, 15 line. Thus, it should be apparent, that a positive signal is maintained on the CT 0, 7, 14, 15 line during every round count except during the first clock cycle of round count 0, 7, 14 and 15 with one exception, namely, during the second cycle of the round count 15 (16th round). This is so because of the fact that the EB latch 632 in FIG. 26f4 is reset at the end of the first clock cycle of the 16th round to terminate the positive signal on the EB line and thereby inhibit production of a positive signal on the CT 0, 7, 14, 15 line during the second clock cycle. Therefore, a positive signal is maintained on the CT 0, 7, 14, 15 line from the beginning of the second clock cycle of round count 0 to the end of the second clock cycle of round count 6, then from the beginning of the second clock cycle of round count 7 to the end of the second clock cycle of round count 13 and during the second clock cycle of round count 14.

Referring now to the AND invert circuit 548 in FIG. 26g3, during the time that the positive signal is maintained on the CT 0, 7, 14, 15 line, that positive signal in combination with the positive signal on the DEC line are applied to render the AND invert circuit 548 effective for applying a negative signal via the −SRR line to one input of the OR invert circuit 550 and to decondition the AND circuit 572 in FIG. 26g4. The AND circuit 572 in being deconditioned causes a negative signal to be applied via the −SR line to one input of the OR invert circuit 574. Thus, negative signals are maintained on the −SRR and −SR line during times corresponding to the positive signal maintained on the CT 0, 7, 14, 15 line. During each succeeding −C time, while such negative signals are maintained on the −SRR and −SR lines, −C clock pulses are applied to the other input of the OR invert circuits 550 and 574 causing positive signals to be applied via the SRR and SR lines, respectively, to the control signal cable connected to the crypto engines. The positive signals on the SR lines are also applied to the OR invert circuit 606 causing negative signals delayed by delay circuit 608 to be applied via the $\overline{\text{LDK}}$ line to the control signal cable. Therefore, a total of 27 positive signals are produced on the SRR, SR and $\overline{\text{LDK}}$ lines during 15 rounds of the cipher function. Referring now to the crypto engines in FIG. 26g1, each combination of positive signals on the SR, SRR and $\overline{\text{LDK}}$ lines are effective for shifting the key register right one position. Thus, with this key shifting schedule arrangement the key registers are shifted twice each round except during round counts 0, 7 and 14 when the key registers are shifted once and during round count 15 where the key registers are not shifted at all as shown in the timing diagram of FIG. 27.

Referring now to the ER flip flop 384 in FIG. 26c2, since the ER flip flop 384 is switched every clock cycle, a negative signal is applied to the −ER FF line during every second clock cycle of each round except the last round. This is so because of the fact that the EB latch 632 in FIG. 26f4 is reset at the end of the first clock cycle of the round count 15 (16th round) to terminate the positive signal EB line and thereby inhibit ER flip flop 384 in FIG. 26c2 from being set during the second clock cycle of the round count 15. The successive negative signals on the −ER FF line are applied to one input of the OR invert circuit 542. Accordingly, during every second clock cycle of a round, a −C clock pulse is applied to the other input of the OR invert circuit 542 causing positive signals to be applied on the ER line to the control signal cable connected to the crypto engines. The positive signals on the ER line are also applied to render the OR invert circuit 652 in FIG. 26h4 effective to apply negative signals, delayed by a 250 ns delay circuit 654, via the $\overline{\text{LDR}}$ line to the control signal cable. Referring now to the crypto engine in FIG. 26g1, the positive signals on the ER and $\overline{\text{LDR}}$ line are applied to the upper and lower data registers UDR 200 and LDR 250 at the each of each round and are effective to cause the intermediate result of the cipher function to be transferred from the output of the modulo-2 adders 650-664 to the upper data register UDR 200 while the output of the upper data register UDR 200 are transferred to the lower data register LDR 250 in preparation for the next round of the cipher function.

Referring now to the AND invert circuit 624 in FIG. 26f4, at $\phi 4$ time of the first clock cycle of the round count 15, a $\phi 4$ clock pulse in combination with positive signals on the C1 and 14, 15 line render the AND invert circuit effective to apply a negative signal to reset START EB and EB latches 628 and 632, respectively. The EB latch 632 in being reset applies a negative signal on the EB line to decondition the ER flip flop 384 in FIG. 26c2 and a positive signal on the −EB line which together with a positive signal from the START EB END latch 612 condition the AND invert circuit 614. At $\phi 1$ time of the second clock cycle of round count 15, a $\phi 1$ DEL clock pulse is applied to render the AND invert circuit 614 effective to apply a negative signal to set the EB END latch 616 producing a positive signal on the EB END line and a negative signal on the −EB END line. The positive signal on the EB END line is applied to condition the AND invert circuit 610 in FIG. 26e4 and together with the positive signal on the DECK line to condition the AND invert circuit 618 and to render the AND circuit 636 in FIG. 26g4 effective to apply a positive signal to the OR invert circuit 640 causing negative signals to be applied via the −ELR and −LDR line to one input of the OR invert circuits 642 and 644, respectively. The negative signal on the −EB END line is applied to decondition the ANd circuit 382 in FIG. 26c2, causing a negative signal to be applied to reset the round counter 390 in FIG. 26d2 back to a count of 0.

Referring now to FIG. 26g4, at $\phi 2$ time of the second clock cycle of round 16, a −C clock pulse is applied to the other input of the OR invert circuit 642 and 644 causing positive signals to be applied via ELR and LDR lines to the control signal cable connected to the crypto engines. The positive signals on the ELR and LDR lines are also applied to the OR invert circuits 648 and 652, respectively, causing negative signals, delayed by delay circuits 650 and 654, to be applied via the $\overline{\text{LIB}}$ and $\overline{\text{LDR}}$ lines to the control signal cable. Referring now to the crypto engine in FIG. 26g1, the signals on the ELR and $\overline{\text{LIB}}$ lines and on the LDR and $\overline{\text{LDR}}$ lines cause a swapping action between the data registers and the buffer registers as previously described. However, the significance at this time is to transfer the contents of the upper data register UDR 200 to the upper buffer register UBR 100 and to transfer the outputs of the modulo-2 adders 650-664 to the lower buffer register LBR 150 so that the result of the cipher function, namely, the operational key in clear form is now stored in the buffer register.

Referring now to FIG. 26e4, at $\phi 4$ time of the second clock cycle of the 16th round, a $\phi 4$ clock pulse is applied to render the AND invert circuit 610 effective to apply a negative signal to reset the START EB END latch 612 in FIG. 26f4. At the same time, the $\phi 4$ clock pulse is also applied to render the AND invert circuit 618 in FIG. 26e4 effective to apply a negative signal to the OR invert circuit 620 in FIG. 26f4 where it is inverted to a positive signal on EB END L line. The positive signal on the EB END L line is applied to the AND invert circuit 619 the other inputs of which have positive signals maintained thereon so as to render the AND invert circuit 619 effective to maintain a negative signal input to the OR invert 620 thereby latching the positive signal on the EB END L line until a negative signal is subsequently applied to the −OUT CYCLE START line. The positive signal on the EB END L line is also applied to condition the AND invert circuit 458 in FIG. 26e3. At $\phi 1$ time of the next clock cycle, a $\phi 1$ clock pulse is applied to render the AND invert circuit 458 effective to apply a negative signal to set the OUTPUT CYCLE latch 464 producing a positive signal on OUT CYCLE line and a negative signal on the −OUT CYCLE line thereby initiating an output cycle with the negative signal on the −OUT CYCLE line being applied to set the START OUT CYCLE END latch 580. Referring now to FIG. 26g4, the positive signal on the OUT CYCLE line together with a positive signal on the K ORD line render the AND invert circuit 598 effective to apply a negative signal to decondition the AND circuit 600, to decondition the AND circuit 572 and via the −LKB line to one input of the OR invert circuit 604. The deconditioned AND circuit 600 applies a negative signal via the −LIB line to one input of the OR invert circuit 602 while the deconditioned AND circuit 572 applies a negative signal via the −SR line to one input of the OR invert circuit 574. Referring now to FIG. 26f4, at $\phi 1/L$ time, a $-\phi 1/L$ clock pulse is applied to reset the EB END latch 616. Referring now to FIG. 26g4, at $\phi 2$ time, a −C clock pulse is applied to the other input of the OR invert circuits 602, 604 and 574 causing them to be deconditioned and apply positive signals via the LIB, LKB and SR lines, respectively, to the control signal cable connected to the cryto engines. The positive signals on the SR line is also applied to the OR invert circuit 606 in FIG. 26h4 causing a negative signal, delayed by delay circuit 608, to be applied via the $\overline{\text{LDK}}$ line to the control signal cable.

Referring now to the crypto engines in FIG. 26g1, these signals are effective to cause the buffer and key registers to shift in synchronism with a data byte being transferred from the buffer registers UBR 100 and LBR 150 to the key registers UKR 350 and LKR 400. Referring now to FIG. 26d4, at $\phi 4$ time, a $\phi 4$ clock pulse in combination with positive signals on the OUT CYCLE and K ORD lines are applied to render the AND invert circuit 442 effective to apply a negative pulse to the STEP BYTE CTR line, at the trailing edge of which a positive signal is effective to step the byte counter to a count of 1. In a similar manner to that described above, the buffer registers and the key registers of the crypto engine are shifted in synchronism, once for each clock cycle, causing successive bytes of the operational key in clear form to be transferred from the buffer registers to the key registers.

The byte counter 448 counts the clock cycles and when the count steps from a count of 7 back to a count of 0, a negative signal is applied to set the COUNT 8 latch 450 which, in being set, applies a negative signal via the −CT8 line to reset the OUTPUT CYCLE latch 464 in FIG. 26e3. The OUTPUT CYCLE latch 464, in being reset, applies a positive signal on the −OUT CYCLE line and a negative signal on the OUT CYCLE line. Referring now to FIG. 26d3, the combination of positive signals on the −OUT CYCLE line and the −IN CYCLE line render the AND invert circuit 410 effective to apply a negative signal to reset the COUNT 8 latch 450 in FIG. 26d4, and is inverted by the inverter 412 to a positive signal to reset the BLOCK COUNT flip flop 414 producing a negative signal on the −BLK0 line and a positive signal on the −BLK1 line. At the same time, the negative signal on the OUT CYCLE line is applied to decondition the AND invert circuit 598 in FIG. 26g4 causing a positive signal to be applied via −LKB line to the OR invert circuit 604 and to render the AND circuits 600 and 572 effective to apply positive signals via the −LIB and −SR line to the OR invert circuits 602 and 574. As a result, negative signals ar now maintained on the LIB, LKB and SR line to terminate further shifting of the buffer and key registers in the crypto engines.

Referring now to FIG. 26f3, at $\phi 1$ time of the next clock cycle, a $\phi 1$ DEL clock pulse in combination with the positive signal on the −OUT CYCLE line and the positive signal output of the START OUT CYCLE END latch 580 are applied to render the AND invert circuit 582 effective to produce a negative signal to set the OUT CYCLE END latch 584. The OUT CYCLE END latch 584, in being set, applies a positive signal on the OUT CYCLE END line to condition the AND invert circuit 578 in FIG. 26e3 and a negative signal on the −OUT CYCLE END line to reset the DECK latch 296 in FIG. 26c3. The DECK latch 296 in being reset applies a positive signal to render the AND invert circuit 298 in FIG. 26c4 effective to apply a negative signal on the K ORD line and via the inverter 300 a positive signal on the −K ORD line indicating the end of the key order operation. Referring now to FIGS. 26e3 and 26f3, at φ4 time, a φ4 clock pulse is applied to render the AND invert circuit 578 effective to apply a negative signal to reset the START OUT CYCLE END latch 580. At φ1 time of the next clock cycle, a −φ1/L clock pulse is applied to reset the OUT CYCLE END latch 584 and thereby end the decipher key order operation with the operational key presently stored in the key registers in preparation for a subsequent data processing operation.

ENCIPHER ORDER OPERATION

The function of this operation is to encipher a message, which may consist of one or more 8 byte blocks of plaintext, into a corresponding message of ciphertext. After a valid operational key is installed in the crypto engines there is no need to issue any further key handling orders for successive blocks of plaintext so long as that same operational key is used. A valid operational key is loaded in the key registers of the crypto engine by performing a DECK operation, as previously described.

When the order code specifying the encipher order is decoded, a ENC latch is set to signal the encipher mode of operation. Following the ENC order command, a first series of 8 PIOW data commands is issued, with the data fields associated with the commands, being loaded into the buffer registers of the crypto engines as the first message block of plaintext to be enciphered. The first such command initiates an input cycle and a byte counter counts each such command received. After the 8 PIOW commands have been received and the 8th byte of the message block written into the buffer registers, then at the 8th count, the input cycle ends, a block counter is set and the crypto engines start an encipher function which is indicated by the generation of an engine busy signal. At the end of the encipher operation, half of the ciphertext block of data is present in the upper data register and the other half is present at the outputs of the cipher function circuits. Following the encipher operation, a series of 8 PIOR data commands are issued for reading the enciphered message block of ciphertext. The first such command initiates an output cycle and the byte counter counts each such command received. During the execution of the first PIOR data command, while the block count is at a count of 1, the message block of ciphertext is parallel transferred from the upper data register and the outputs of the cipher function circuits to the buffer registers where it is now available for reading, a byte at a time. At the end of the execution of each PIOR command, the buffer registers are shifted one position to present the next byte of the message block of ciphertext for reading. At the 8th count of the byte counter, the output cycle ends, the block counter is reset and the ENC latch remains set to end the encipher order operation. The ENC latch in remaining set permits one or more succeeding message blocks of plaintext to be enciphered in a similar manner as that described above.

A more detailed description of the encipher order operation will now be given in conjunction with the timing diagrams of FIGS. 31a–31d. After address selection at TA time and loading the command byte into the command register at TC time, the command code is decoded by AND invert circuit 266 in FIG. 26b2 to produce a negative signal which is inverted by inverter 268 to a positive signal on the WR DSD ORDER line thereby indicating the presence of a WR DSD ORDER command. At the same time, a data processing order code is decoded by the AND invert circuit 302 to apply a negative signal via the −DP DEC line to the inverter 304 where it is inverted to a positive signal and applied to one input of the AND invert circuit 306. At TD time, a positive signal is applied via the SYNCH TD line to render the AND circuit 270, conditioned by the positive signal on the WR DSD ORDER line, effective to produce a positive signal on the WR ORD TIME line which is applied to the remaining input of the AND invert circuit 306 to render it effective to produce a negative signal which is applied via the −RST ENC line to reset the ENC latch 312 in FIG. 26c4 and to the inverter 308 where it is inverted to a positive signal and applied to one input of the AND ivert circuit 310. A positive signal on the −Y line from the command register 224 personalizes the present order as an ENC order and is applied to the other input of the AND invert circuit 310 to render it effective to apply a negative signal via the −SET ENC line to set the ENC latch 312. The ENC latch 312 in being set applies a positive signal via the ENC line to FIG. 26g3 where it is effective via OR gate 522 to condition the AND circuit 536 and is inverted to a negative signal by the inverter 546 to apply a negative signal on the DEC line to decondition the AND invert circuits 548 and 560.

The series of 8 PIOW data commands is now received and processed in a similar manner to that described in the DECK order operation i.e. an input cycle is initiated, the byte counter 448 is conditioned to count each PIOW data command received and the message block of plaintext is loaded, a byte at a time, per PIOW data command, into the buffer registers UBR 100 and LBR 150. After the 8th byte has been written into the buffer registers, then, at the 8the count, the input cycle ends, the block count flip flop 414, in FIG. 26d3, is set and the IN CYCLE END latch 534 in FIG. 26f3 is set. The IN CYCLE END latch 534 in being set initiates the swapping action between the buffer registers and the data registers of the crypto engines which, in this case, causes the message block of plaintext to be transferred from the buffer registers UBR 100 and LBR 150 to the data registers UDR 200 and LDR 250 preparatory to performing the encipher operation. At the same time, referring to the AND circuit 538 in FIG. 26g3, positive signals on the IN CYCLE END and ENC lines render the AND circuit 538 effective to apply a positive signal to the OR invert circuit 540 causing a negative signal to be applied via the −SL line to one input of the OR invert circuit 544. At −C time, a −C clock pulse is applied to the other input of the OR invert circuit 544 causing it to apply a positive signal via the SL line to the control signal cable and to one input of the OR invert circuit 606 in FIG. 26h4. The OR invert circuit 606 is rendered effective to apply a negative signal, delayed by the delay circuit 608, via the $\overline{\text{LDK}}$ line to the control signal cable connected to the crypto engines. Referring now to the crypto engines in FIG. 26g1, the sinals on the SL and $\overline{\text{LDK}}$ line are applied to the key registers causing the contents thereof to be shifted one position to the left as a pre-shift operation prior to the encipher operation.

Figure 31C:
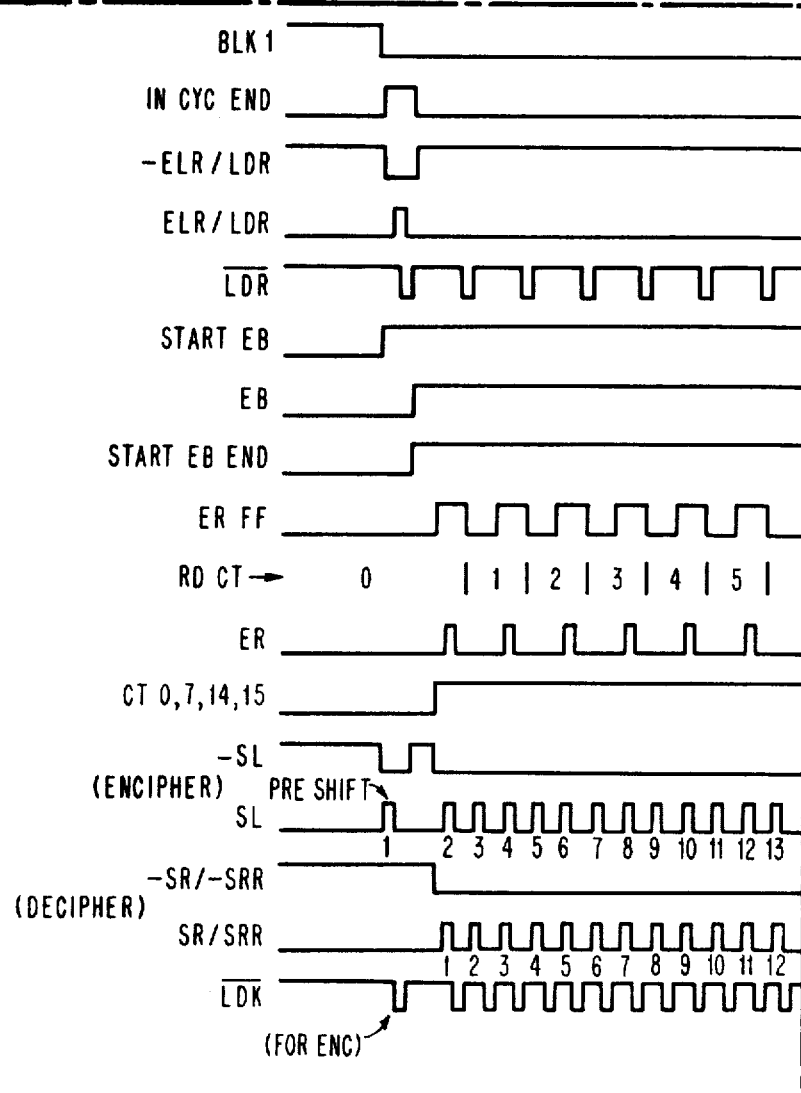
Figure 31:
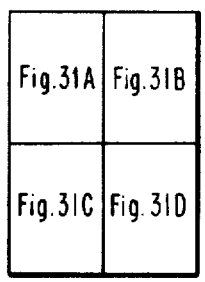
FIG. 31 illustrates how FIGS. 31a to 31d may be placed to form a composite timing diagram.
Figure 31D:
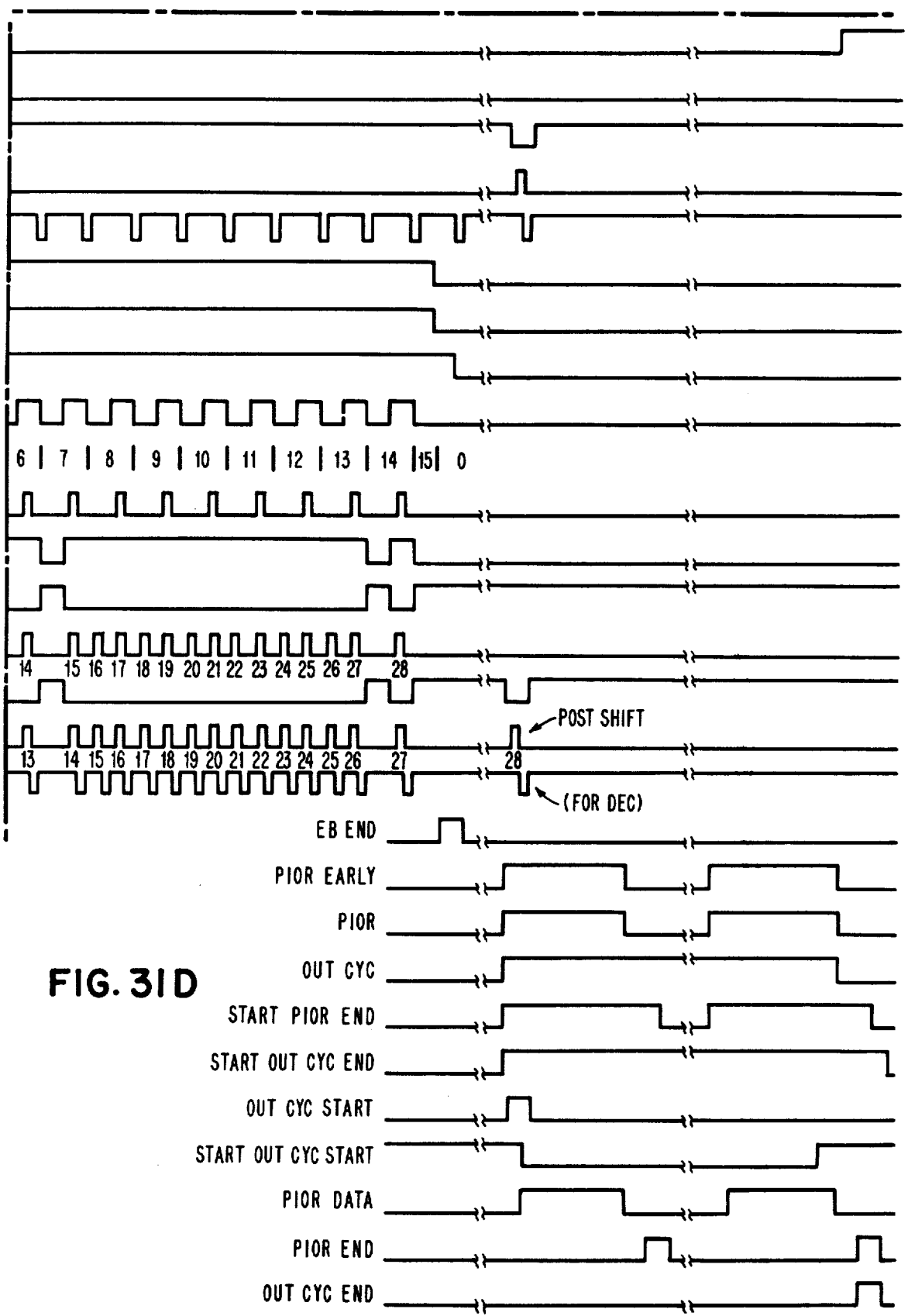
Figure 34D:
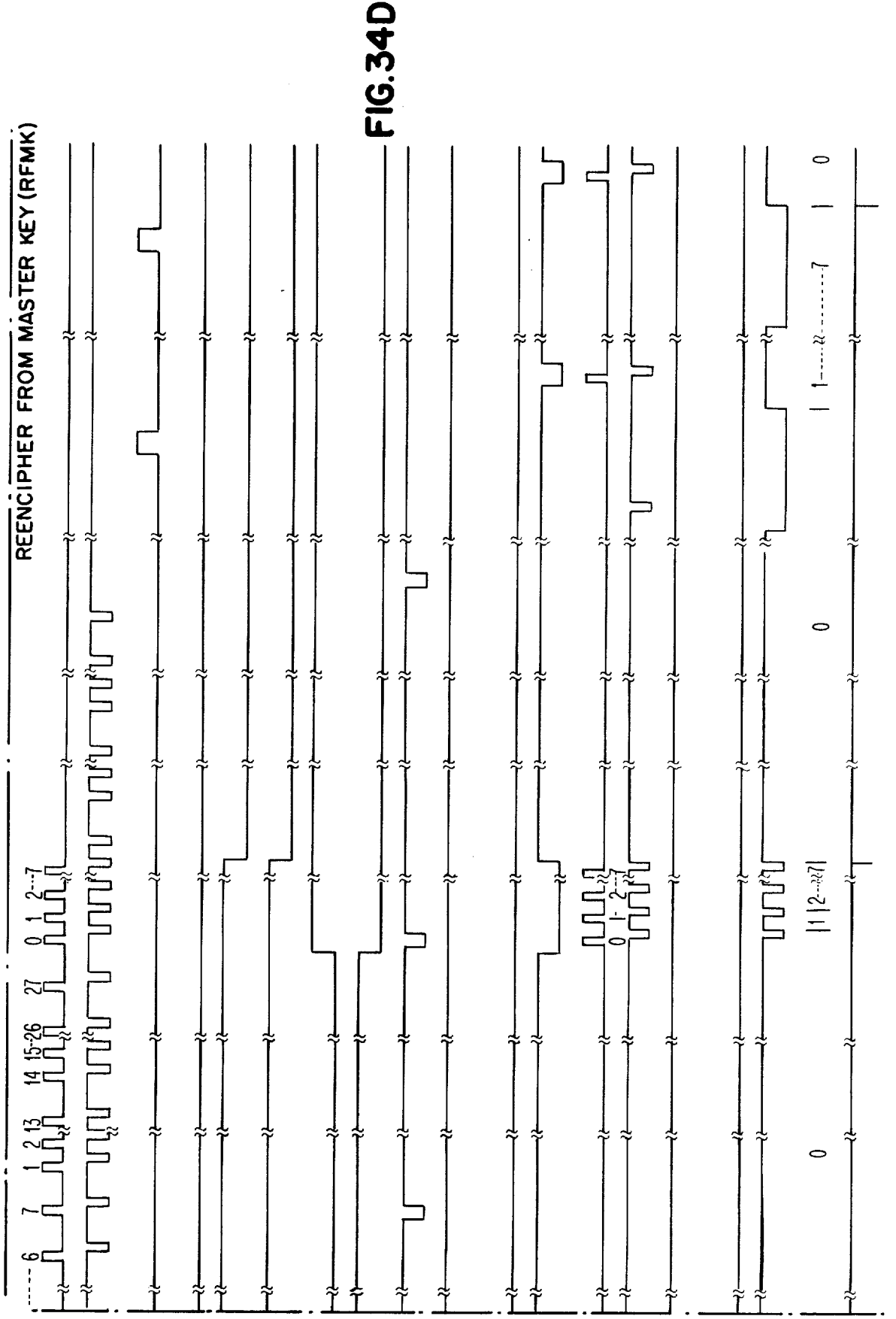
Figure 35A:
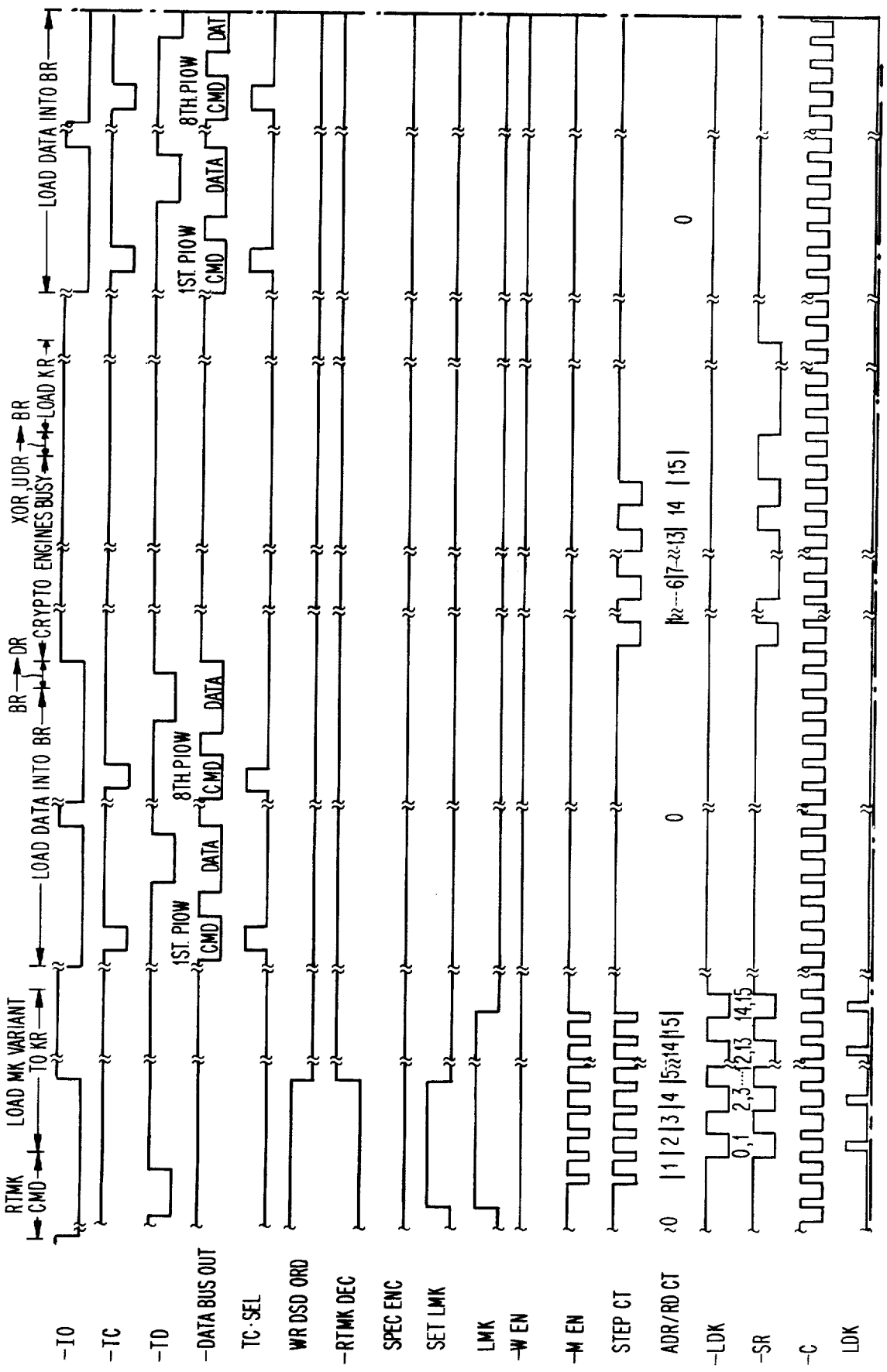
Figure 35B:
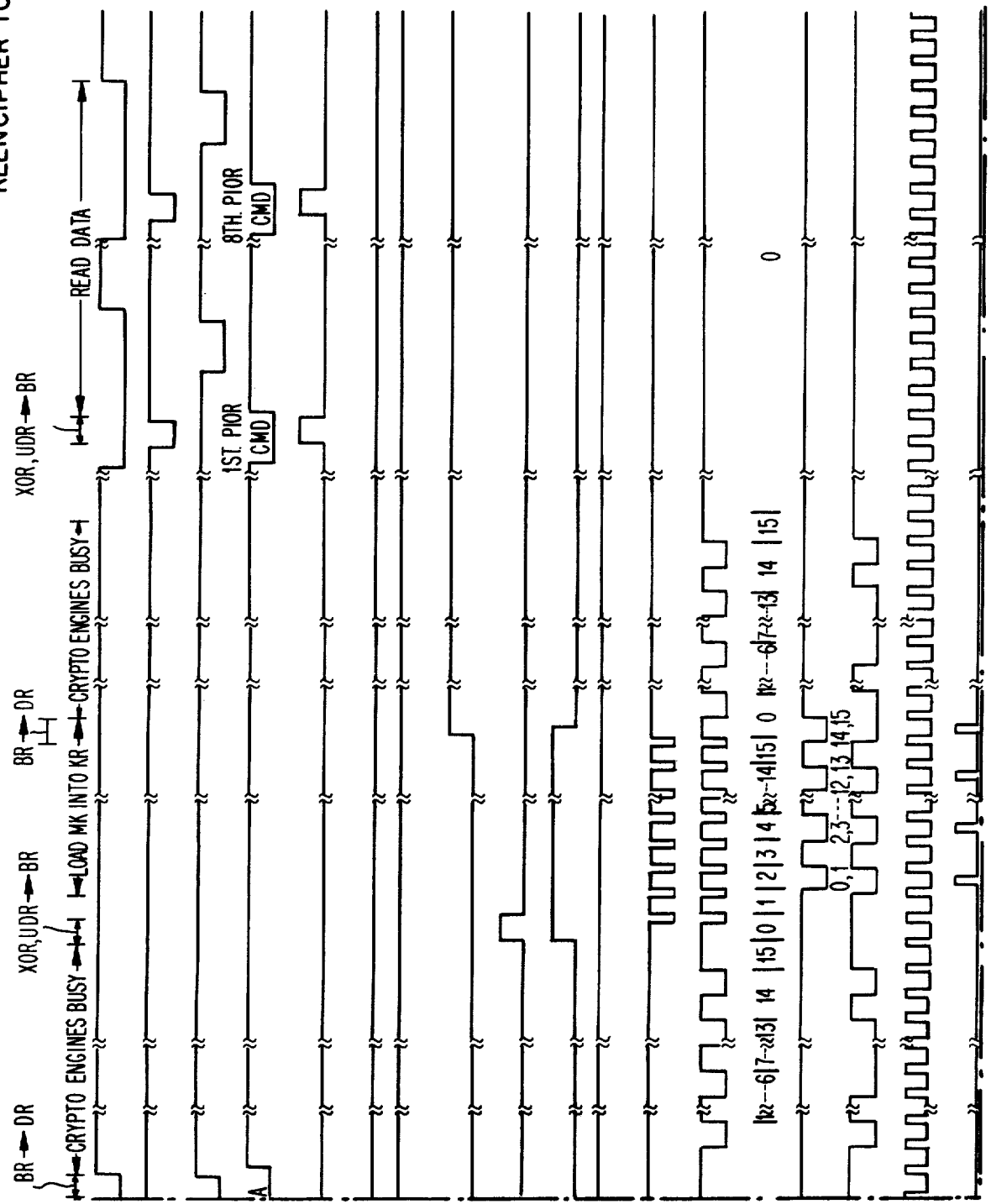

The encipher operation is similar to the decipher operation previously described in connection with DECK order operation except that in this case the key register is shifted to the left under control of SL control signals rather than the SRR and Sr control signals as can be better seen by referring to the timing diagram of FIG. 31. Referring to FIG. 26g3, this is so because the signals on the CT 0, 7, 14, 15 line are used with the AND circuit 536 conditioned by the positive signal on the ENC line and inhibited from being used with the AND circuit 548 deconditioned by the negative signal on the DEC line. As a result of the single pre-shift signal on the SL line and the 27 additional signals on the SL line during the encipher operation, the key registers shift left exactly 28 times to return the operational key back to the initial condition in the key registers in preparation for enciphering the next block of a multi-block plaintext message. At the end of the cipher function, half of the ciphertext block of data is available at the output of the upper data register UDR 200 and the other half is available at the outputs of the cipher function circuits.

Referring now to FIG. 26b2, the first of a series of 8 PIOR data commands is now received and after address selection at TA time and command loading into the command register at TC time, the AND invert circuit 262 decodes this command and applies a negative signal to one input of the OR invert circuit 260 and to the inverter 264 where it is inverted to a positive signal on the PIOR EARLY line. Referring now to FIGS. 26d3, the positive signal on the PIOR EARLY line is applied to the inverter 422 where it is inverted to a negative signal and applied to one input of the OR invert circuit 424. At this time, positive signals are maintained at the input of the AND invert circuit 416 causing a negative signal to be applied to the other input of the OR invert circuit 424 which therefore produces a positive signal on the PIOR line. The positive signal on the PIOR line is applied to the OR invert circuit 456 in FIG. 26e3 where it is inverted to a negative signal to set the OUTPUT CYCLE latch 464 producing a positive signal on the OUT CYCLE line and a negative signal on the −OUT CYCLE line to initiate an output cycle. The positive signal on the PIOR line is also applied to the inverter 462 where it is inverted to a negative signal and applied via the −PIOR line to set the START PIOR END latch 588 in FIG. 26f3. Referring now to FIGS. 26e3 and 26f3, the negative signal on the −OUT CYCLE line is applied to set the START OUT CYCLE END latch 580 while the positive signal on the OUT CYCLE line in combination with the positive signal output of the START OUT CYCLE START latch 554 in FIG. 26f3 are applied to condition the AND invert circuit 556. At $\phi 1$ time of the next clock cycle, a $\phi 1$ DEL clock pulse is applied to render the AND invert circuit 556 effective to apply a negative signal to set the OUT CYCLE START latch 558 which, in being set, applies a positive signal to the OUT CYCLE START line and a negative signal to the −OUT CYCLE START line. The positive signal on the OUT CYCLE START line is applied to condition the AND invert circuit 552 in FIG. 26e3 and is also applied to the AND circuit 634 in FIG. 26g4. Since this is not a key order operation and the block count is at a count of one, positive signals are maintained on the other inputs to the AND circuit 634 which, therefore, is rendered effective to apply a positive signal to the OR invert circuit 640 which, in turn, initiates production of the ELR and $\overline{\text{LIB}}$ control signals, in a manner previously described, to the crypto engines where they are effective to cause the enciphered block of data to be transferred from the outputs of the upper data register UDR 200 and the outputs of the modulo-2 adder 650-664 to the upper buffer register 100 and the lower buffer register 150, respectively, in preparation for reading the now enciphered block of ciphertext. Referring now to FIGS. 26e3 and 26f3, at $\phi 4$ time, a $\phi 4$ clock pulse is applied to render the AND invert circuit 552 effective to apply a negative signal to reset the START OUT CYCLE START latch 554. At $\phi 1/L$ time, a $-\phi 1/L$ clock pulse is applied to reset the OUT CYCLE START latch 558.

Referring now to FIG. 26b2, at TC END time, a positive signal on the TC END LINE is applied to the inverter 258 where it is inverted to a negative signal to decondition the OR invert circuit 260 causing a positive signal to be applied to the PIOR DATA line. Referring now to the AND circuit 902 in FIG. 26h3, assuming there has been no procedural error, the positive signal on the PIOR DATA line is applied to render the AND circuit 902 effective to apply a positive signal to condition an array of exclusive OR circuits 906 in FIG. 26i1. The function of this array is to compare corresponding data bytes from the two crypto engines for equality. Exclusive OR circuit 906A is representative of this array and will be described in detail. Byte outputs from the crypto engine are applied to the AND invert circuits 908, 910 and 912 with a positive signal on the bit line representing a bit 1 and a negative signal on the bit line representing a bit 0. If the output bits are both equal to 1, then positive signals are applied to render the AND invert circuit 908 effective to apply a negative signal to decondition both the AND invert circuits 910 and 912 causing a positive signal to be produced from the joint outputs thereof. Similarly, if the output bits are both equal to 0, then negative signals are applied to decondition the AND invert circuits 910 and 912 causing a positive signal to also be produced from the joint outputs thereof. On the other hand, if the output bits from the crypto engines are not equal, then the AND invert circuit 908 is deconditioned to apply a positive signal to condition the AND invert circuits 910 and 912, one of which will have a positive signal applied thereto from one of the crypto engines to render that AND invert circuit effective to apply a negative signal from the joint outputs thereof. Accordingly, it should be apparent that if the outputs of one crypto engine equal the outputs of the other crypto engine, then positive signals will be applied from the array of exclusive OR circuit 906 to render the AND invert circuit 916 effective to produce a negative signal to decondition the engine error detect AND invert circuit 918. On the other hand, if any bit of the cipher engines does not compare, then, a negative signal output from the exclusive OR circuit corresponding to the error bit will be applied to decondition the AND invert circuit 916 causing a positive signal to be applied to condition the engine error detect AND invert circuit 918.

During TC END time, while a positive signal is maintained on the PIOR DATA line, and assuming there is no engine error, the byte output of the crypto engines is taken from the output of the AND invert circuits, such as AND invert circuit 908, of the array of exclusive OR circuits 906 and applied to the −DATA BUS IN. At the same time, parity generator circuit 914, which is responsive to the data byte output of the array of exclusive OR circuits 906, generates a parity bit for the data byte which is applied to the −P line of the −DATA BUS IN.

At TD time, a positive signal is applied via the TD SEL line to render the AND invert circuit 918 effective or not depending on whether an engine error has been detected. If an engine error is detected, the AND invert circuit 918 is rendered effective to apply a negative signal via the ENGINE ERR line to set the bit 1 latch 954B of the status register 952 to indicate the fact that an engine error was detected.

At the end of this IO operation, the command register 224 in FIG. 26a2 is reset to decondition the command decoder AND invert circuit 262 thereby causing a positive signal to be applied to the OR invert circuit 260 and the inverter 264 which, in turn, cause negative signals to now be applied to the PIOR DATA and PIOR EARLY lines, respectively. The negative signal on the PIOR EARLY line is applied to the inverter 422 in FIG. 26d3 where it is inverted to a positive signal to render the OR invert circuit 424 effective to apply a negative signal on the PIOR line. The negative signal on the PIOR line is applied to the inverter 446, in FIG. 26d4, where it is inverted to a positive signal on the STEP BYTE CTR line to step the Byte Counter 448 to a count of 1. The negative signal on the PIOR line is also applied to the inverter 462 in FIG. 26e3 where it is inverted to a positive signal and applied together with a positive signal from the START PIOR END latch 588 in FIG. 26f3 to condition the AND invert circuit 590. At $\phi$1 time of the next clock cycle, a $\phi$1 DEL clock pulse is applied to render the AND invert circuit 590 effective to produce a negative signal to set the PIOR END latch 592 causing a positive signal to be produced on the PIOR END line to condition the AND invert circuit 586 in FIG. 26e4 and a negative signal on the −PIOR END line which is applied to decondition the AND circuit 600 in FIG. 26g.4. The AND circuit 600 in being deconditioned initiates the production of a LIB and $\overline{\text{LIB}}$ control signals, in a manner as previously described, via the control signal cable to the crypto engines to shift the buffer registers one position in preparation for outputting the next byte of ciphertext of the enciphered message block of data. Referring now to the AND invert circuit 586 in FIG. 26e4, at $\phi$4 time, a $\phi$4 clock pulse is applied to render the AND invert circuit 586 effective to reset the START PIOR END latch 588. At $\phi$1/L time of the next clock cycle, a −$\phi$1/L clock pulse is applied to reset the PIOR END latch 592.

In a similar manner, during each of the succeeding ones of the series of 8 PIOR data commands, the next data byte of cipher text is passed with an appended parity bit to the −DATA BUS IN, the data byte is checked for an engine error, the byte counter is stepped to the next count and the buffer registers of the crypto engines are shifted one position to provide the next succeeding data byte of ciphertext for processing.

After the 8th byte is read to the −DATA BUS IN, the byte counter 448 in FIG. 26d4 steps from a count of 7 back to a count of 0 causing a negative signal to be produced to set the COUNT 8 latch 450 which, in turn, applies a negative signal to the −CT 8 line. The negative signal on the −CT 8 line is applied to reset the OUTPUT CYCLE latch 464 in FIG. 26e3 thereby ending the output cycle. The OUTPUT CYCLE latch 464 in being reset applies a positive signal on the −OUT CYCLE line and a negative signal on the OUT CYCLE line.

Referring now to FIG. 26d3, the combination of the positive signals on the −OUT CYCLE line and the −IN CYCLE line render the AND invert circuit 410 effective to apply a negative signal to reset the COUNT 8 latch 450 in FIG. 26d4 and is inverted by inverter 412 to a positive signal to reset the BLOCK COUNT flip flop 414. The negative signal on the OUT CYCLE line is applied to set the START OUT CYCLE START latch 554 in FIG. 26f3. At the end of this IO operation, the command register is reset to effectively cause a positive signal to be applied on the −PIOR line, as in a manner previously described, which in combination with the positive signal output of the START PIOR END latch 588 are applied to condition the AND invert circuit 590 in FIG. 26f3. Accordingly, at $\phi$1 time of the next clock cycle, a $\phi$1 DEL clock pulse is applied to render the AND invert circuit 590 effective to apply a negative signal to set the PIOR END latch 592 which, in being set, applies a positive signal to the PIOR END line and a negative signal to the −PIOR END line. The negative signal on the −PIOR END line is applied to decondition the AND circuit 600 in FIG. 26g4 which initiates production of the LIB and $\overline{\text{LIB}}$ control signals, in a manner previously described, via the control cable to the crypto engines. Referring now to the crypto engine in FIG. 26g1, the LIB and $\overline{\text{LIB}}$ control signals are applied to shift the buffer register one more position to effectively clear the content thereof in preparation for receiving the next block of plaintext of a multi-block message for encipherment. Referring now to FIG. 26e4, at $\phi$4 time, a $\phi$4 clock pulse in combination with the positive signal on the PIOR END line are applied to render the AND invert circuit 586 effective to apply a negative signal to reset the START PIOR END latch 588 in FIG. 26f4. At $\phi$1/L time of the next clock cycle, a −$\phi$1/L clock pulse is applied to reset the PIOR END latch 592 to terminate the encipher order operation.

DECIPHER ORDER OPERATION

The function of this operation is to decipher a message, which may consist of one or more 8 byte blocks of ciphertext, into a corresponding message of plaintext. After a valid operational key is installed in the crypto engine by a DECK order operation there is no need to issue any further key handling orders for successive blocks of ciphertext so long as the same operational key is used.

When the order code specifying a decipher order is decoded, the ENC latch is reset to signal the decipher mode of operation. Following the DEC order command, a series of 8 PIOW data commands is issued, with the data fields associated with the commands, constituting the message block of ciphertext, being located into the buffer registers of the crypto engines. The first such command initiates an input cycle and a byte counter counts each such command received. After the 8 PIOW commands have been received and the 8th byte written into the buffer registers, then, at the 8th count, the input cycle ends, the block of ciphertext is transferred from the buffer registers to the data registers of the crypto engines, a block counter is set and the crypto engines start a decipher function which is indicated by the generation of an engine busy signal. At the end of the decipher operation, half of the cleartext block of data is present in the upper data register and the other half is present at the outputs of the cipher function circuits. Following the decipher operation, a series of 8 PIOR data commands are issued for reading the deciphered message block of cleartext. The first such command initiates an output cycle and the byte counter counts each such command received. During the execution of the first PIOR data command, while the block count is at a count of 1, the message block of cleartext is parallel transferred from the upper data register and the outputs of the cipher function circuits to the buffer registers where it is now available for reading, a byte at a time. At the end of the execution of each PIOR data command, the buffer registers are shifted one position to present the next byte of the message block of cleartext for reading. At the 8th count of the byte counter, the output cycle ends, the block counter is reset and the ENC latch remains reset to end the decipher operation. The ENC latch in remaining reset permits one or more succeeding message blocks of ciphertext to be deciphered in a similar manner as that described above.

The decipher operation is similar to the encipher operation in that an order code is decoded, a series of 8 PIOW data commands are issued to proceed into an input cycle for loading a data parameter into the crypot engines, a cipher function is performed on the data parameter under control of an operational key and a series of 8 PIOR data commands are issued to proceed into an output cycle for reading the results of the cipher function. The similarity between these two operations can be seen from the timing diagrams of FIGS. 31a–31d. The basic difference between these two operations is in the specification of the decipher order rather than an encipher order, which sets the device for the decipher mode of operation, and the key shifting schedule provided for the key registers during the decipher function performed by the crypto engines. It will be remembered that for an encipher operation the key registers are shifted to the left by one pre-shift SL control signal followed by 27 additional SL control signals during the 16 rounds of the encipher operation for a total of 28 SL control signals to restore the cipher key back to its initial home position in preparation for enciphering the next block of cleartext. In the decipher operation, the key registers, instead of being shifted to the left, as in the encipher operation, are shifted to the right by 27 SRR and SR control signals during the 16 rounds of the decipher function, as described in detailed in the DECK order operation, followed by one post-shift SRR and SR control signals at the beginning of the output cycle for a total of 28 SRR and SR control signals to restore the cipher key back to its initial home position in preparation for deciphering the next block of ciphertext. It should be apparent that with this symmetry, the decipher rounds are performed in the reverse order of the encipher rounds i.e. the set of cipher key bytes used in the last round of an encipher operation is the set of cipher key bytes used in the first round of the decipher operation so that each round of the decipher operation undoes each round of the encipher operation, in reverse order.

Since the basic cipher operation has been described in detail in the previous section and the generation of the 27 control signals SRR and SR for a decipher function has been described in connection with the detailed description of DECK order operation, the following detailed description will be restricted to a description of how the device is set for the decipher mode of operation and how the 28th post-shift SRR and SR control pulses are provided at the beginning of the output cycle of the decipher order operation.

After address selection at TA time and loading the command byte into the command register at TC time, the command code is decoded by the AND invert circuit 266 in FIG. 26b2 to produce a negative signal which is inverted by inverter 268 to a positive signal on the WR DSD ORDER line thereby indicating the presence of a WR DSD order command. At the same time, the order code for data processing operation is decoded by the AND invert circuit 302 in FIG. 26b3 to produce a negative signal on the −DP DEC line where it is inverted to a positive signal by inverter 304 and applied to one input of the AND invert circuit 306. At TD time, a positive signal is applied via the SYNCH TD line to render the AND circuit 270, conditioned by the positive signal on the WR DSD ORDER line, effective to produce a positive signal on the WR ORD TIME line which is applied to the remaining input of the AND invert circuit 306 to render it effective to produce a negative signal which is applied via the −RST ENC line to reset the ENC latch 312 in FIG. 26c4 and to the inverter 308 where it is inverted to a positive signal and applied to one input of the AND invert circuit 310. A negative signal on the −Y line from the command register 224 personalizes this data processor order as a DEC order and is applied to decondition the AND invert circuit 310, which in being deconditioned, maintains a positive signal on the −SET ENC line so that the ENC latch 312 remains in a reset condition. SPEC ENC latch 494 is also held reset by the inverted WR ORD TIME signal. The ENC latch 312, and SPEC ENC latch 494, being in a reset condition, apply a negative signal via OR circuit 522 to the inverter 546 in FIG. 26g3 where it is inverted to a positive signal on the DEC line to condition the AND invert circuits 548 and 560 each of which is effective for controlling the generation of the SRR and SR control signals used during the decipher operation.

After the decipher function has been completed and the key registers have been shifted 27 times under control of the 27 SRR and SR control signals, the first of a series of 8 PIOR data commands is issued to initiate an output cycle causing the OUTPUT CYCLE latch 464 in FIG. 26e3 to be set which, in being set, applies a positive signal to the OUT CYCLE line. The positive signal on the OUT CYCLE line in combination with a positive signal from the START OUT CYCLE START latch 554 in FIG. 26f3 are applied to condition the AND invert circuit 556. At the next $\phi 1$ time, a $\phi 1$ DEL clock pulse is applied to render the AND invert circuit 556 effective to apply a negative signal to set OUT CYCLE START latch 558. The OUT CYCLE START latch 558, in being set, applies a positive signal to the AND invert circuit 560 in FIG. 26g3 which, at this time, has positive signals maintained on the other inputs thereto thereby rendering the AND invert circuit 560 effective to apply a negative signal on the −SRR and via the AND circuit 572 in FIG. 26g4 a negative signal on the −SR line to initiate the generation of the post-shift SRR and SR control signals which are used to shift the key register the 28th time to restore the cipher key back to its initial home position in preparation for deciphering the next block of ciphertext. The remainder of the DEC order operation, namely, to read the 8 bytes of the block of cleartext is performed in a similar manner as that described in detail for the encipher order operation.

GENERATE RANDOM NUMBER ORDER OPERATION

The function of this operation is to generate a random number by enciphering a pseudo random number under a variant of the host master key which, in the applications previously described, is used as a secondary key (or multiple secondary keys if multiple operations are performed) or is used as an enciphered operational key.

During command time of this operation, when the order code specifying a generate random number (GRN) order is decoded, a load master key (LMK) latch and a key variant 3 latch are set. With the LMK latch set, the contents of the MK memory is caused to be read out and with the key variant 3 latch set, each byte of the master key read out is modified to provide a variant thereof for transfer to the crypto engines. The variant of the master key is parity checked, a byte at a time, and loaded as a working key into the key registers of the crypto engines. During synch TD time of this operation, a GRN latch and a special encipher latch are set, the latter causing the processing mode to be set for an encipher operation. After half of the variant of the master key is loaded into the key registers of the crypto engine and while the remaining half is being loaded, an input cycle is initiated during which the contents of a non-resettable 64 bit random counter is transferred, a byte at a time each clock cycle, to the buffer registers of the crypto engine. During this transfer, a byte counter counts the clock cycles and after the 8th byte of the random number has been loaded into the buffer registers, then, at the 8th count, the input cycle ends, the LMK latch is reset to terminate further MK memory read out, the random number is transferred from the buffer registers to the data registers of the crypto engine and a block counter is set. During this transfer, the last byte of the variant of the master key is loaded into the key registers, the crypto engines initiate an encipher operation, indicated by an engine busy signal, the key variant latch is reset and the random number counter is stepped to the next count value. During the encipher operation, the random number count value in the data registers of the crypto engines is enciphered under control of the variant of the master key in the key registers of the crypto engines. At the end of the encipher operation, half of the enciphered random number is present in the upper data register and the other half is present at the outputs of the cipher function circuits. Following the encipher operation, a series of 8 PIOR data commands is received for reading the enciphered random number. The first such command initiates an output cycle and a byte counter counts each such command received. During the execution of the first PIOR data command, while the block count is at a count of 1, the enciphered random number is parallel transferred from the upper data register and the outputs of the cipher function circuits to the buffer registers where it is then available for reading, a byte at a time, and the GRN latch is reset. At the end of the execution of each PIOR command, the buffer registers are shifted one position to present the next byte of the enciphered random number for reading. At the 8th count of the byte counter, the output cycle ends and the block counter is reset to end the operation.

A more detailed description of the generate random number order operation will now be given in conjunction with the timing diagrams of FIGS. 32a-32c. After address selection at TA time and loading the command byte into the command register at TC time, the command code is decoded by AND invert circuit 266 in FIG. 26b2 to produce a negative signal which is inverted by inverter 268 to a positive signal on the WR DSD ORDER line thereby indicating the presence of a WR DSD order command. At the same time, the order code is decoded by the AND invert circuit 314 to apply a negative signal via the −GRN DEC line to the inverter 316 where it is inverted to a positive signal and applied to one input of the AND invert circuit 318. Referring now to the inverter 476 in FIG. 26d5, the negative signal on the −GRN DEC line is inverted to a positive signal and passed via the OR circuit 484 to the SET LMK line. Referring now to the OR invert circuit 564 in FIG. 26g4, the positive signal on the SET LMK line is applied to render the OR invert circuit 564 effective to apply a negative signal to set the LMK latch 566 producing a positive signal on the LMK line and a negative signal on the −LMK line. Referring now to the AND invert circuit 368 in FIG. 26c2, the negative signal on the −LMK line is applied to decondition the AND invert circuit 368 which, in turn, maintains a positive signal at one input of the AND invert circuits 370 and 374 so long as the LMK latch 566 remains set i.e. while the MK memory is being read out.

Referring now to the KEY VAR 3 CTRL latch 515 in FIG. 26e5, the negative signal on the −GRN DEC line is applied to set the KEY VAR 3 CTRL latch 515 which, in being set, applies a positive signal to the VARIANT 3 line and via the OR circuit 518 to the VARIANT 1/3 line. Referring now to FIG. 26e1, the positive signals on the VARIANT 1/3 and VARIANT 3 lines are applied to the exclusive OR circuits 704A and 704D which are used to invert bits 0 and 6 of each byte read out of the MK memory 700 thereby providing a variant of the master key for transfer to the crypto engines.

Referring now to FIG. 26c2, negative signals are maintained at the inputs of the AND invert circuit 366 and a negative signal is maintained at the input to the inverter 162 both of which cause a positive signal to be applied to one input of the AND circuit 380 and to condition the AND invert circuit 376. Additionally, the MK OVW latch 276, presently in a reset state, causes a positive signal to be applied via the −MK OVW line to the other input of the AND circuit 380 thereby rendering it effective to apply and maintain a positive signal on the −W ENABLE line. Thereafter, and in a manner which is described in detail for the DECK order operation, the AND invert circuits 370 and 374 are alternately rendered effective by $\phi 3L$ and $-\phi 1L$ clock pulses, respectively; the AND invert circuit 370 controlling the AND invert circuit 376 and inverter 378 to produce successive negative signals on the −M ENABLE line which in combination with the positive signal on the −W ENABLE line allow successive reading of the MK memory 700 while the AND invert circuit 374 controlling the AND invert circuit 376 and inverter 388 in FIG. 26d2 to produce successive positive signals on the STEP CTR line for successively stepping the address counter 390 to address successive locations of the MK memory 700. Successive pairs of half bytes read out of the MK memory 700 in FIG. 26e1 are shifted into the shift registers 702 to provide successive bytes of the master key for the crypto engines, with bits 0 and 6 of each byte being inverted by the exclusive OR circuits 704A and 704D to effectively provide a variant of the master key for transfer to the crypto engines.

Referring now to the AND invert circuit 568 in FIG. 26g4, after each byte of the master key are loaded into the shift register 702 in FIG. 26e1, a $\phi1$ DEL clock pulse in combination with positive signals on the C1, −STEP CTR and LMK lines are applied to render the AND invert circuit 568 effective to produce a negative signal to set the LDK latch 570 which, in being set, initiates production of positive signals on the SR, LDK and $\overline{\text{LDK}}$ control lines for the crypto engines, in a manner as previously described in detail in connection with DECK order operation. Referring now to the crypto engine in FIG. 26g1, the positive signal on the LDK line is applied to condition the AND circuit 807 to permit a parity check to be made of each variant byte of the master key for parity errors. The successive positive signals on the SR, LDK and $\overline{\text{LDK}}$ lines are applied as control inputs to the key registers UKR 350 and LKR 400 to shift the key registers and allow successive variant bytes of the master key to be loaded into the key registers.

Referring now to FIG. 26b2, at TD time, while the variant of the master key is being loaded into the key registers, a positive signal is applied via the SYNCH TD line to render the AND circuit 270, conditioned by the positive signal on the WR DSD ORDER line, effective to provide a positive signal on the WR ORD TIME line. Referring now to FIG. 26b2', the positive signal on the WR ORDER TIME line is applied to the inverter 322 where it is inverted to a negative signal on the −WR ORD TIME line to reset the GRN latch 320 in FIG. 26c3' and the SPEC ENC latch 494 in FIG. 26d5. Referring now to FIG. 26b2, the positive signal on the WR ORD TIME line is applied to the remaining input of the AND invert circuit 318 to render it effective to produce a signal on the −SET GRN line which is applied to the GRN latch 320 in FIG. 26c3' producing a positive signal on the GRN line and a negative signal on the −GRN line. Referring now to FIG. 26e4 the positive signal on the GRN line is applied to one input of each of the AND circuits in units 472A–472H and to condition the AND circuits 475 in FIG. 26f1 while the negative signal on the −GRN line is applied to decondition the AND circuits 473. Accordingly, information on the BUS IN is inhibited from passing via the deconditioned AND circuits 473 while information from the random number (RN) counter 470 in FIG. 2234 is passed via the conditioned AND circuits 475 and the OR circuit 476 to the crypto engines. Referring now to FIG. 26d5, the positive signal on the GRN line is also applied to the OR invert circuit 490 where it is inverted to a negative signal to set the SPEC ENC latch 494 causing a positive signal to be applied to the SP ENC line and a negative signal to the −SP ENC line. Referring now to FIG. 26e3, the positive signal on the SP ENC line is applied via the OR circuit 522 to condition the AND circuits 536 and 538 in FIG. 26g3 and via the inverter 546 to apply a negative signal to the DEC line to decondition the AND invert circuits 548 and 560. Referring to FIG. 26f4, the negative signal on the −SP ENC line is applied to decondition the AND invert circuit 621 causing a positive signal to be applied to one input of the AND circuit 626.

Referring now to FIG. 26d4, while the variant of the master key is being loaded into the key registers and when the address counter 390 in FIG. 27d2 is stepped to a count of 8 by a −$\phi1$L clock pulse, a negative signal on the −C8 line is applied to set the 16 STEP latch 404 causing a positive signal to be applied to condition the AND circuit 406 and to set the CT OF 8 latch 441 in FIG. 26d4 causing a positive signal to be applied to the CT 8 line. The positive signal on the CT 8 line in combination with the positive signals on the GRN and LMK lines render the AND invert circuit 443 effective to apply a negative signal on the −GRNW line. The negative signal on the −GRNW line is applied to decondition the AND circuit 600 in FIG. 26d4 which, in being deconditioned, applies a negative signal via the −LIB line to one input of the OR invert circuit 602. At $\phi2$ time, a −C clock pulse is applied to the other input of the OR invert circuit 602 thereby deconditioning it and causing a positive signal to be applied via the LIB line to the control signal cable connected to the crypto engines and to the OR invert circuit 648 in FIG. 26h4 causing a negative signal, delayed by delay circuit 650, to be applied via the $\overline{\text{LIB}}$ line to the control signal cable connection to the crypto engines.

Referring to FIGS. 26d4 and 26e4 the RN counter 470 is a 64 stage nonresettable binary counter which is battery powered so that it may retain its contents independent of system power. Each of the 8 output bytes of the RN counter 470 is connected to a corresponding set of AND circuits 472A to 472H conditioned by the positive signal on the GRN line and controlled by the settings of the byte counter 448. At this time, the byte counter 448 is at a count of 0 which condition is decoded by the decoder 466 producing a positive signal on the BC 0 line to render effective the set of AND circuits 472A for passing the first byte of the count value in the RN counter 470 via the OR circuits 474 to the AND circuits 475. The AND circuits 475 being conditioned by the positive signal on the GRN line passes the random number byte via the OR circuit 476 and the P box 50 to the buffer registers UBR 100 and LBR 150. Accordingly, the now received combination of signals on the LIB and $\overline{\text{LIB}}$ line are effective to permit the random number byte to be loaded into the buffer registers in each crypto engine.

Referring now to FIG. 26e3. at $\phi3$L time, a $\phi3$L clock pulse together with positive signals on the GRNW and GRN lines render the AND invert circuit 435 effective to apply a negative signal to set the INPUT CYCLE latch 454 to start an input cycle operation during which successive bytes of the random number count value of the RN counter are loaded into the buffer registers. The INPUT CYCLE latch 454 in being set applies a negative signal via the −IN CYCLE line to set the START IN CYCLE END latch 530 in FIG. 26f3. Referring now to FIG. 27d4, at $\phi4$ time, a $\phi4$ clock pulse in combination with positive signals on the GRN, LMK and CT 8 lines are applied to render the AND invert circuit 440 effective to apply a negative pulse to the STEP BYTE CTR line, the positive trailing edge of which is effective to step the byte counter 448 to a count of 1.

In a similar manner, succeeding ones of the random number count value bytes are gated, under control of the byte counter 448, and loaded into the buffer registers UBR 100 and LBR 150, with the previous byte being simultaneously shifted and the byte counter 448 being stepped at $\phi4$ time of each clock cycle.

After the 8th random number count value byte is written into the buffer registers, then at $\phi4$ time of that clock cycle, the byte counter 448 steps from a count of 7 back to a count of 0 causing a negative signal to be produced to set the COUNT 8 latch 450 which, in being set applies a negative signal to the −CT 8 line. The negative signal on the −CT 8 line is applied to reset the INPUT CYCLE latch 454 in FIG. 26e 3 thereby endig the input cycle. Referring now to FIG. 26d3, the INPUT CYCLE latch 454, in being reset, applies a positive signal which, in combination with the positive signal on the −OUT CYCLE line, renders the AND invert circuit 410 effective to apply a negative signal to reset the COUNT 8 latch 450 in FIG. 26d4 and is inverted by inverter 412 to a positive signal to set the BLOCK COUNT flip flop 414 producing a positive signal on the −BLK 0 line and a negative signal on the −BLK 1 line.

Referring now to FIG. 27f3, at ϕ1 time of the next clock cycle, a ϕ1 DEL clock pulse in combination with positive signals on the −IN CYCLE line and from the START IN CYCLE END latch 530 render the AND invert circuit 532 effective to apply a negative signal to set the IN CYCLE END latch 534 which, in being set, applies a positive signal to the IN CYCLE end line. Referring now to FIG. 26f4, the positive signal on the IN CYCLE END line is applied to the inverter 622 where it is inverted to a negative signal and applied to decondition the AND circuit 626 causing a negative signal to be applied to set the START EB latch 628 and to the inverter 638 in FIG. 26g4 where it is inverted to a positive signal and applied to render the OR invert circuit 640 effective to apply negative signals via the −ELR and −LDR lines to one input of the OR invert circuits 642 and 644. Referring now to FIG. 26c2, the negative signal on the −ELR line is applied to decondition the AND circuit 382 which, in turn, resets the address counter 390 in FIG. 26d2 from a count of 15 back to a count of 0 causing a positive signal to be applied to the −C 8 line. The positive signal on the −C 8 line is applied to render the AND circuit 406, conditioned by the positive signal from the 16 STEP latch 404, effective to apply a positive signal to the inverter 408 where it is inverted to a negative signal on the −16 STEP line which is applied to reset the CT OF 8 latch 441 in FIG. 26d4 and to reset the LMK latch 566 in 26g4. LMK latch 566 in being reset applies a negative signal to the LMK line and a positive signal to the −LMK line. The negative signal on the LMK line deconditions the AND invert circuit 568 to inhibit further production of the shifting control signals SR, LDK and $\overline{\text{LDK}}$ for the key registers of the crypto engines. Referring now to FIG. 26c2, the positive signal on the −LMK line is applied to render the AND invert circuit 368 effective to apply a negative signal to decondition the AND invert circuits 370 and 374 to inhibit further reading of the MK memory 700 and stepping of the address counter 390.

Referring now to FIG. 26g3, the positive signal on the IN CYCLE END line in combination with the positive signal on the ENC line are applied to render the AND circuit 538 effective to apply a positive signal to the OR invert circuit 540 which, in turn, applies a negative signal via the −SL line to one input of the OR invert circuit 544. Referring now to FIGS. 26g3 and 26g4, at ϕ2 time, a −C clock pulse is applied to the other input of the OR invert circuits 544, 642 and 644 to decondition them causing positive signals to be applied via the SL, ELR and LDR lines, respectively, to the control signal cable connected to the crypto engines. Referring to FIG. 26h4, the positive signal on the SL line is applied to the OR invert 606 causing a negative signal, delayed by delay circuit 608, to be applied via the LDK line to the control signal cable. The positive signal on the LDR line is applied to the OR invert circuit 652 causing a negative signal, delayed by delay circuit 654, to be applied via the $\overline{\text{LDR}}$ line to the control signal cable. Referring now to the crypto engine in FIG. 26g1, the control signals LDR and $\overline{\text{LDR}}$ are effective for causing the random number stored in the buffer registers UBR 100 and LBR 150 to be transferred and loaded into the data registers UDR 200 and LDR 250 in preparation for the encipher function. The control signals on the SL and $\overline{\text{LDK}}$ lines are applied to the key registers causing the contents thereof, namely, the variant of the master key, to be shifted one position to the left as a pre-shift operation prior to the encipher operation.

Referring now to FIGS. 26e3 and 26f3, at ϕ4 time, a ϕ4 clock pulse in combination with the positive signal on the IN CYCLE END line are applied to render the AND invert circuit 528 effective to apply a negative signal to reset the START IN CYCLE END latch 530. At ϕ1/L time of the next clock cycle, a −ϕ1/L clock pulse is applied to reset the IN CYCLE END latch 534 causing a negative signal to be produced on the IN CYCLE END line. Referring now to FIG. 26f4, the negative signal on the IN CYCLE END line is applied to inverter 622 where it is inverted to a positive signal to be applied to render the AND circuit 626 effective to apply a positive signal to render the AND invert circuit 630, conditioned by the positive signal from the START EB latch 628, effective to apply a negative signal to set the EB latch 632 indicating the start of the crypto operation. The EB latch 632, in being set, applies a positive signal to the EB line and a negative signal to the −EB line. Referring to FIG. 26d4, the positive signal on the EB line in combination with the positive signal on the GRN line are applied to render the AND circuit 468 effective to apply a positive signal to step the RN COUNTER 470 to the next count. Referring to FIGS. 26c2 and 26d2, the positive signal on the EB line is also applied to condition the address decoder AND invert circuit 398 and to condition the ER flip flop 384 to permit stepping of the round counter 390. Referring to FIG. 26f4, the negative signal on the −EB line is applied to set the START EB END latch 612 and referring to FIG. 26e5, to reset the KEY VAR 3 CTRL latch 515.

The encipher function operation is similar to that previously described in detail in connection with the encipher order operation and can generally be followed by referring to the timing diagram of FIG. 32. Generally, the encipher function is performed by repeating a product cipher function for 16 rounds. During each round, the contents of the upper data register UDR 200 is enciphered under control of the contents of the key registers UKR 350 and LKR 400 with the results being added to the contents of the lower data register LDR 250 by the modulo-2 adders 650–664. At the end of each round, the outputs of the modulo-2 adders are parallel transferred to the upper data register UDR 200 while the contents of the upper data register UDR 200 are parallel transferred to the lower data register LDR 250 to form the arguments for the next round and the key registers are shifted by the control signal on the SL line in accordance with key shift schedule shown. As a result of the single pre-shift signal on the SL line and the 27 additional signals on the SL line during the encipher operation, the key registers shift left exactly 28 times to return the variant of the master key back to the initial home position in the key registers. At the end of encipher function, half of the enciphered random number is available at the outputs at the upper data register UDR 200 and the other half is available at the outputs of the cipher function circuits.

Following the encipher operation, a series of 8 PIOR data commands are issued for reading the enciphered random number. The first such command initiates an output cycle which is performed in a similar manner to that described in detail in connection with the encipher order operation. In general terms, during the execution of the PIOR data command, while the block count is at a count of 1, the enciphered random number is parallel transferred from the upper data register and the outputs of the cipher functin circuits to the buffer registers where it is then available for reading, a byte at a time. At the beginning of the execution of the first PIOR data command, a positive signal is applied on the OUT CYCLE START line to reset the GRN latch 320 in FIG. 26c3' and at the end of the execution of each PIOR command, the buffer registers are shifted one position to present the next byte of the enciphered random number for reading. At the 8th count of the byte counter, the output cycle ends and the block counter is reset to end the operation, with the enciphered random number now available for use as a secondary key or an enciphered operational key. While a 64 bit RN counter is used in this operation to provide a pseudo random number, it should be apparent that it is well within the skill of the art to use a truly random number generator for generating a random value e.g. a noise generator.

ENCIPHER MASTER KEY ORDER OPERATION

The function of the encipher master key EMK$\phi$ operation is to encipher an operational key under the host master key while the functions of the encipher master key EMK1 and EMK2 operations are to encipher a secondary key under a variant of the host master key.

When the order code specifying any of these orders is decoded, a load master key (LMK) latch is set and, in the case of the EMK1 order, a key variant 1 latch is additionally set and, in the case of the EMK2 order, a key variant 2 latch is additionally set. With the LMK latch set, the contents of the MK memory is caused to be read out and in the case of the EMK$\phi$ order operation, is transferred, a byte at a time, to the crypto engines while in the case of the EMK1 and EMK2 order operations each byte of the master key read out of the MK memory is modified to provide a variant of the master key to the crypto engines. The master key or the variant of the master key, depending upon which order is being performed, is parity checked in the crypto engines, a byte at a time, and loaded as a working key into the key registers of the crypto engines. During synch TD time of these operations, an EMK latch and a special encipher SPEC ENC latch are set, the latter causing the processing mode to be set for an encipher operation. After loading the master key or the variant of the master key into the key registers, a series of 8 PIOW commands are received with the data field associated with the commands, constituting the operational key or secondary key, depending upon which order is being performed, to be enciphered, being loaded into the buffer registers of the crypto engines. The first such command initiates an input cycle and a byte counter counts each such command received. After the 8 PIOW commands have been received and the 8th byte written into the buffer registers, then, at the 8th count, the input cycle ends, the operational or secondary key is transferred from the buffer registers to the data registers of the crypto engines, a block counter is set, the crypto engines start an encipher operation, indicated by the generation of an engine busy signal, and the key variant 1 and key variant 2 latches are reset. During the encipher operation, the operational or secondary key, depending upon which order operation is being performed, in the data registers of the crypto engines is enciphered under control of the master key or variant of the master key, respectively, in the key registers of the crypto engines. At the end of the encipher operation, half of the enciphered operational or secondary key is present in the upper data register and the other half is present at the outputs of the cipher function circuits. Following the encipher operation, a series of 8 PIOR data commands is received for reading the enciphered operational or secondary key. The first such command initiates an output cycle and the byte counter counts each such command received. During the execution of the first PIOR data command, while the block count is at a count of 1, the enciphered operational or secondary key is parallel transferred from the upper data register and the outputs of the cipher function circuits to the buffer registers where it is then available for reading, a byte at a time, and the EMK latch is reset. At the end of the execution of each PIOR command, the buffer registers are shifted one position to present the next byte of the enciphered operational or secondary key for reading. At the 8th count of the byte counter, the output cycle ends and the block counter is reset to end the operation.

A more detailed description of the encipher master key order operation will now be given in conjunction with the timing diagrams of FIGS. 33a–33c. After address selection at TA time and loading the command byte into the command register at TC time, the command code is decoded by the AND invert circuit 266 in FIG. 26b2 to produce a negative signal which is inverted by inverter 268 to a positive signal on the WR DSD ORDER line thereby indicating the presence of a WR DSD ORDER command. At the same time, if the order code specifies an EMK$\phi$ order, then that order code is decoded by the AND invert circuit 340 to apply a negative signal via the −EMK$\phi$ DEC line to the inverter 342 where it is inverted to a positive signal and applied to one input of the AND invert circuit 344 whereas, if the order code specifies a EMK1 order, the order code is decoded by the AND invert circuit 341 to apply a negative signal via the −EMK1 DEC line to the inverter 343 where it is inverted to a positive signal and applied to one input of the AND invert circuit 345 and if the order code specifies a EMK2 order, the order code is decoded by AND invert circuit 349 to apply a negative signal via the −EMK2 DEC line to the inverter 351 where it is inverted to a positive signal and applied to one input of the AND invert circuit 353. Referring now to the inverter circuits 479, 481 and 483 in FIG. 26d5, negative signals on either of the −EMK0 DEC, −EMK1 DEC or −EMK2 DEC lines are inverted, respectively, to positive signals and passed via the OR circuit 484 to the SET LMK line. Referring now to the OR invert circuit 564 in FIG. 26g4, the positive signal on the SET LMK line is applied to render the OR invert circuit 564 effective to apply a negative signal to set the LMK latch 566 producing a positive signal on the LMK line and a negative signal on the —LMK line. Referring now to the AND invert circuit 368 in FIG. 26c2, the negative signal on the —LMK line is applied to decondition the AND invert circuit 368 which, in turn, maintains a positive signal at one input of the AND invert circuits 370 and 374 so long as the LMK latch 566 remains set i.e. while the MK memory is being read out.

Referring now to the KEY VAR 1 CTRL latch 513 in FIG. 26e5, if the order code is a EMK1 order code, then the negative signal on the —EMK1 DEC line is applied via the OR circuits 511 to set the KEY VAR 1 CTRL latch 513 which, in being set applies a positive signal to the VARIANT 1 line and via the OR circuit 518 to the VARIANT 1/3 line. Referring now to FIG. 26e1, the positive signals on the VARIANT 1/3 and VARIANT 1 lines are applied to the exclusive OR circuits 704A and 704B which are used to invert bits 0 and 2 of each byte read out of MK memory 700 thereby providing a first variant of the master key for transfer to the crypto engines. On the other hand, if the other code is a EMK2 order code, then the negative signal on the —EMK2 DEC line is applied via the 512 to set the KEY VAR 2 CTRL latch 514 which, in being set, applies a positive signal to the VARIANT 2 line and via the OR circuit 521 to the VARIANT 2/3 line. Referring now to FIG. 26c1, the positive signals on the VARIANT 2 and VARIANT 2/3 lines are applied to the exclusive OR circuits 704C and 704D which are used to invert bits 4 and 6 of each byte read out of MK memory 700 thereby providing a second variant of the master key for transfer to the crypto engines.

Referring now to FIG. 26c2, positive signals are maintained at the inputs of the AND circuit 380 to thereby render it effective to apply and maintain a positive signal on the —W ENABLE line. The AND invert circuit 370 and 374 are alternately rendered effective by $\phi 3L$ and $-\phi 1L$ clock pulses, respectively; the AND invert circuit 370 controlling the AND invert circuit 376 and inverter 378 to produce successive negative signals on the —M ENABLE line which in combination with the positive signal on the —W ENABLE line allows successive reading of the MK memory 700 while the AND invert circuit 374 controlling the AND invert circuit 376 and inverter 388 in FIG. 26d2 to produce successive positive signals on the STEP CTR line for successively stepping the address counter 390 to address successive locations on the MK memory 700. Successive pairs of half bytes read out of the MK memory 700 in FIG. 26e1 are shifted into the shift registers 702 to provide successive bytes of the master key for the crypto engines. If the encipher master key order being performed is EMK$\phi$, the successive bytes of the master key are transferred in unmodified form to the crypto engines whereas if the encipher master key order being performed is EMK1, then bits 0 and 2 of each byte are inverted by the exclusive OR circuits 704A and 704B to effectively provide a first variant of the master key for transfer to the crypto engines and if the encipher master key order being performed is EMK2, then bits 4 and 6 of each byte are inverted by the exclusive OR circuits 704C and 704D to effectively provide a second variant of the master key for transfer to the crypto engines.

Referring now to the AND invert circuit 568 in FIG. 26g4 a $\phi 1$ DEL clock pulse in combination with positive signals on the C1, —STEP CTR and LMK lines are applied to render the AND invert circuit 568 effective to produce a negative signal to set the LDK latch 570 which, in being set, initiates production of the positive signals on the SR, LDK and LDK control lines for the crypto engines, in a manner previously described in detail in connection with the DECK order operation. Referring now to the crypto engine in FIG. 26g1, the successive positive signals on the LDK line are applied to successively condition the AND circuit 807 to permit a parity check to be made of each byte loaded into the key registers for parity errors. The successive positive signals on the SR, LDK and LDK lines are applied as control inputs to the key registers UKR 350 and LKR 400 to shift the key registers and allow successive bytes to be loaded into the key registers.

Referring now to FIG. 26b2, at TD time, while the key registers are being loaded, a positive signal is applied via the SYNCH TD line to render the AND circuit 270, conditioned by the positive signal on the WR DSD order line, effective to provide a positive signal on the WR ORD TIME line. Referring now to FIG. 26b2', the positive signal on the WR ORD TIME line is applied to the inverter 322 where it is inverted to a negative signal on the —WR ORD TIME line and applied to reset the EMK latch 346 in FIG. 26c3' and the SPEC ENC latch 494 in FIG. 26d5. Referring now to FIG. 26b2', the positive signal on the WR ORD TIME line is applied to the remaining input of the AND invert circuits 344, 345 and 353 to render one of them effective, depending upon whether the EMK$\phi$, EMK1 or EMK2 order operation is being performed, to produce a signal on the —SET EMK$\phi$ line, the —SET EMK1 line or the —SET EMK2 line, respectively, to decondition the AND circuit 345 causing a negative signal to be applied to set the EMK latch 346 which, in being set, applies a positive signal to the EMK line. Referring now to FIG. 26d5, the positive signal on the EMK line is applied to the OR invert circuit 490 where it is inverted to a negative signal to set the SPEC ENC latch 494 which, in being set, applies a positive signal to the SP ENC line and a negative signal to the —SP ENC line. Referring now to FIG. 26e3, the positive signal on the SP ENC line is applied via the OR circuit 522 to condition the AND circuit 536 and 538 in FIG. 26g3 and via the inverter 546 to apply a negative signal to the DEC line to decondition the AND invert circuits 548 and 560.

Referring now to FIG. 26d2, after the 8th byte is loaded into the key registers, the address counter 390 steps from an address count of 15 back to an address count of 0 (count of 16) causing a positive signal to be produced on the —C8 line which is applied to condition the AND invert circuit 402 and to render the AND circuit 406, conditioned by the positive signal output by the 16 STEP latch 404, effective to produce a positive signal which is inverted by inverter 408 to a negative signal on the —16 STEP line. Referring now to FIG. 26g4, the negative signal on the —16 STEP line is applied to reset the LMK latch 566 which, in being reset, applies a negative signal to the LMK line and a positive signal to the —LMK line. The negative signal on the LMK line deconditions the AND invert circuit 568 to inhibit further production of the shifting control signals SR, LDK and LDK for the key registers of the crypto engines. Referring now to FIG. 26c2, the positive signal on the —LMK line is applied to render the AND invert circuit 368 effective to apply a negative signal to decondition the AND invert circuits 370 and 374 to inhibit further reading of the MK memory 700 and stepping of the address counter 390.

After loading the key registers of the crypto engines, a series of 8 PIOW commands are received with the data fields associated with the commands constituting the operational key or the secondary key to be enciphered, being written into the buffer registers of the crypto engines. The writing operation of the operational key or the secondary key into the buffer registers of the crypto engines by a series of 8 PIOW commands is similar to the writing operation described in detail in DEC order operation i.e. an input cycle is initiated, the byte counter 448 is conditioned to count each PIOW data command received and the operational key or secondary key is written, a byte at a time, per PIOW data command, into the buffer registers UBR 100 and LBR 150. After the 8th byte of the operational key or the secondary key has been written into the buffer registers, then, at $\phi 4$ time of that clock cycle, the byte counter 448 steps from a count of 7 back to a count of 0 causing a negative signal to be produced to set the COUNT 8 latch 450 which, in being set applies a negative signal to the $-CT8$ line. The negative signal on the $-CT8$ line is applied to reset the INPUT CYCLE latch 454 in FIG. 26e3 thereby ending the input cycle. Referring now to FIG. 26d3, the INPUT CYCLE latch 454, in being reset, applies a positive signal on the $-IN$ CYCLE line which, in combination with the positive signal on the $-OUT$ CYCLE line, renders the AND invert circuit 410 effective to apply a negative signal to reset the COUNT 8 latch 450 in FIG. 26d4 and is inverted by inverter 412 to a positive signal to set the BLOCK COUNT flip flop 414 producing a positive signal on the $-BLK0$ line and a negative signal on the $-BLK1$ line.

Referring now to FIG. 26f3, at $\phi 1$ time of the next clock cycle, a $\phi 1$ DEL clock pulse in combination with positive signals on the $-IN$ CYCLE line and from the START IN CYCLE END latch 530 render the AND invert circuit 532 effective to apply a negative signal to set the IN CYCLE END latch 534, which, in being set, applies a positive signal to the IN CYCLE END line. Referring now to FIG. 26f4, the positive signal on the IN CYCLE END line is applied to the inverter 622 where it is inverted to a negative signal to decondition the AND circuit 626 which, in turn, causes a negative signal to be applied to set the START EB latch 628 and to the AND inverter 638 in FIG. 26g4 where it is inverted to a positive signal and applied to render the OR inverter circuit 640 effective to apply negative signals via the $-ELR$ and $-LDR$ lines to one input of the OR invert circuits 642 and 644.

Referring now to FIG. 26g3, the positive signal on the IN CYCLE END line in combination with the positive signal on the ENC line are applied to render the AND circuit 538 effective to apply a positive signal to the OR invert circuit 540 which, in turn, applies a negative signal via the $-SL$ line to one input of the OR invert circuit 544. Referring now to FIGS. 26g3 and 26g4, at $\phi 2$ time, a $-C$ clock pulse is applied to the other inputs of the OR invert circuits 544, 642 and 644 to decondition them causing positive signals to be applied via the SL, ELR and LDR lines, respectively, to the control signal cable connected to the crypto engines. The positive signal on the SL line initiates production of the $\overline{LDK}$ control signal and the positive signal on the LDR line is applied to initiate production of the $\overline{LDR}$ control signal both of which are applied via the control signal cable to the crypto engines. Referring now to the crypto engine in FIG. 26g1, the control signals LDR and $\overline{LDR}$ are effective for causing the operational key or the secondary key stored in the buffer registers UBR 100 and LBR 150 to be transferred and loaded into the data registers UDR 200 and LDR 250 in preparation for the encipher function. The control signals on the SL and $\overline{LDK}$ lines are applied to the key registers causing the contents thereof to be shifted one position to the left as a pre-shift operation prior to the encipher operation.

Referring now to FIGS. 26e3 and 26f3, at $\phi 4$ time, a $\phi 4$ clock pulse in combination with the positive signal on the IN CYCLE END line are applied to render the AND invert circuit 528 effective to apply a negative signal to reset the START IN CYCLE END latch 530. At $\phi 1/L$ time of the next clock cycle, a $-\phi 1/L$ clock pulse is applied to reset IN CYCLE END latch 534 causing a negative signal to be produced on the IN CYCLE END line. Referring now to FIG. 26f4, the negative signal on the IN CYCLE END line is applied to the inverter 622 where it is inverted to a positive signal and applied to render the AND circuit 626 effective to produce a positive signal which, in turn, renders the AND invert circuit 630, conditioned by the positive signal from the START EB latch 628, effective to apply a negative signal to set the EB latch 632 indicating the start of the crypto operation. The EB latch 632, in being set, applies a positive signal to the EB line and a negative signal to the $-EB$ line. Referring to FIGS. 26d2 and 26c2, a positive signal on the EB line is applied to condition the address decoder AND invert circuit 398 and to condition the ER flip flop 384 to permit stepping of the round counter 390. Referring now to FIG. 26f4, the negative signal on the $-EB$ line is applied to set the START EB END latch 612 and referring to FIG. 26e5, if the EMK1 order operation is being performed, to reset the KEY VAR 1 CTRL latch 513 or if the EMK2 operation is being performed, to reset the KEY VAR 2 CTRL latch 514.

The encipher function operation is similar to that previously described in detail in connection with the encipher order operation and can generally be followed by referring to the timing diagram of FIGS. 33a–33c. Generally, the encipher function is performed by repeating a product cipher function for 16 rounds. During each round, the contents of the upper data register UDR 200 is enciphered under control of the contents of the key register UKR 350 and LKR 400, which may contain the master key or a variant of the master key, depending upon whether the EMK$\phi$, EMK1 or EMK2 order operation is being performed, with the results being added to the contents of the lower data register LDR 250 by the modulo-2 adders 650–664. At the end of each round, the outputs of the modulo-2 adders are parallel transferred to the upper data register UDR 200 while the contents of the upper data register UDR 200 are parallel transferred to the lower data register LDR 250 to form the arguments for the next round and the key registers are shifted by the control signal on the SL line in accordance with the key shift schedule shown. As a result of the single pre-shift signal on the SL line and the 27 additional signals on the SL line during the encipher operation, the key registers shift left exactly 28 times to return the master key or the variant of the master key back to the initial home position in the key register. At the end of the encipher function, half of the enciphered operational or secondary key is available at the output of the upper data register UDR 200 and the other half is available at the outputs of the cipher function circuits.

Following the encipher operation, a series of 8 PIOR data commands are received for reading the enciphered operational or secondary key. The first such command initiates an output cycle which is performed in a similar manner to that described in detail in connection with the encipher order operation. In general terms, during the execution of the PIOR data command, while the block count is at a count of one, the enciphered operational or secondary key is parallel transferred from the upper data register and the outputs of the cipher function circuits to the buffer registers where it is then available for reading, a byte at a time. At the beginning of the execution of the first PIOR data command, a negative signal is applied on the OUT CYCLE START line to reset the EMK latch 346 in FIG. 26c3' and at the end of the execution of each PIOR command, the buffer registers are shifted one position to present the next byte of the enciphered operational or secondary key for reading. At the 8th count of the byte counter, the output cycle ends and the block counter is reset to end the operation.

REENCIPHER FROM MASTER KEY (RFMK) ORDER OPERATION

The function of this operation is to reencipher an operational key enciphered under a host master key to the operational key enciphered under a secondary key which is itself enciphered under a variant of the host master key.

During command time of this operation, when the order code specifying a RFMK order is decoded, a load master key (LMK) latch and a key variant 1 latch are set and a special encipher (SP ENC) latch is reset. With the LMK latch set, the contents of the MK memory is caused to be read out for transfer to the crypto engines and with the key variant 1 latch set each byte of the master key transferred is modified to provide a variant (KMH1) of the master key (KMH$\phi$). The variant of the master key is parity checked, a byte at a time, and loaded as a working key into the key registers of the crypto engines. During synch TD time of this operation, a RFMK latch is set causing a key order (K ORD) signal to be produced indicating that a key order operation is to be performed and an encipher (ENC) latch is reset causing the processing mode to be set for a decipher (DEC) operation. After the 8th byte is loaded into the key registers, the LMK latch is reset to terminate further MK memory read out. A series of 8 PIOW data commands is then received with the data fields associated with the commands, constituting a secondary key enciphered under the same variant of the host master key stored in the key registers, being loaded into the buffer registers of the crypto engines. The first such command initiates a first input cycle and a byte counter counts each such command received. After the 8 PIOW commands have been received and the 8th byte written into the buffer registers, then, at the 8th count, the input cycle ends, the enciphered secondary key is transferred from the buffer registers to the data registers of the crypto engines, a block counter is set, the crypto engines start a decipher operation, indicated by the generation of an engine busy signal, and the key variant 1 latch is reset. During the decipher operation the secondary key enciphered under the variant of the host master key in the data registers of the crypto engines is deciphered under control of the same variant of the host master key in the key registers of the crypto engines to obtain the secondary key in clear form. At the end of the decipher operation, half of the secondary key, now in clear form, is available at the outputs of the upper data register UDR and the other half is available at the outputs of the cipher function circuits. Additionally, at the end of the decipher operation, a special key operation (SP KEY OP) latch is set.

A second series of 8 PIOW data commands is then received with the data fields associated with the commands, constituting the operational key enciphered under the host master key, being loaded into the buffer registers of the crypto engines. The first such command received initiates a second input cycle and the byte counter again counts each such command received. After the 8 PIOW commands have been received and the 8th byte written into the buffer registers, then, at the 8th count, the second input cycle ends, the block counter is reset and the operational key enciphered under the host master key is transferred from the buffer registers to the data registers of the crypto engines while, at the same time, the secondary key, in clear form, is transferred from the outputs of the upper data register and the outputs of the cipher function circuits to the buffer registers. Following the end of this second input cycle, the LMK latch is again set and the host master key contents of MK memory (KMH$\phi$) is caused to be read out for transfer to the crypto engines. The host master key is parity checked, a byte at a time, and loaded as the working key into the key registers of the crypto engines. After the 8th byte is loaded into the key registers, the LMK latch is reset to terminate further MK memory read out and the crypto engines then start a second decipher operation, indicated by the EB signal, to decipher the operational key enciphered under the host master key in the data registers of the crypto engines under control of the host master key in the key registers of the crypto engines to obtain the operational key in clear form. At the end of the second decipher operation, half of the operational key, now in clear form, is available at the outputs of the upper data register UDR and the other half is available at the outputs of the cipher function circuits. Additionally, at the end of the second decipher operation, with the RFMK and SP K OP latches set, a first output cycle is initiated, at the start of which, the special encipher (SP ENC) latch is set causing the processing mode to now be set for an encipher (ENC) operation. Additionally, at the start of the output cycle, and end of round 16 (ER16) signal is produced to cause the half of the operational key at the outputs of the cipher function circuits to be transferred to the lower data register LDR so that the full operational key in clear form is now stored in the combined upper and lower data registers of the crypto engines. During the first output cycle, the buffer registers and the key registers are shifted in synchronism, once for each clock cycle, causing the secondary key, now stored in the buffer registers, to be shifted into the key registers, a byte at a time. During this transfer, each byte is checked for a parity error. The byte counter counts clock cycles and at the 8th count, the first output cycle ends, the block counter is again set and the RFMK latch is reset causing the key order signal to be terminated.

During the first clock cycle after the end of the first output cycle, the key registers are pre-shifted one position in preparation for the encipher operation. At the end of this clock cycle, the crypto engines then start the special encipher operation, indicated by the generation of the EB signal, and the EB signal together with the SP ENC latch still being set cause the SP K OP latch to be reset signaling the end of the special key operation. During the special encipher operation, the operational key, presently in the data registers, is enciphered under control of the secondary key, presently in the key registers, to obtain the operational key enciphered under the secondary key. At the end of the special encipher operation, half of the operational key enciphered under the secondary key is available at the outputs of the upper data register and the other half is available at the outputs of the cipher function circuits.

A series of 8 PIOR data commands is now received for reading the enciphered operational key. The first such command initiates a second output cycle and the byte counter counts each such command received. During the execution of the first PIOR data command, while the block count is at a count of 1, the enciphered operational key is parallel transferred from the outputs of the upper data register and the outputs of the cipher function circuits to the buffer registers where it is then available for reading, a byte at a time. At the end of the execution of each PIOR command, the buffer registers are shifted one position to present the next byte of the enciphered operational key for reading. At the 8th count of the byte counter, the second output cycle ends and the block counter is reset to end the RFMK operation.

A more detailed description of the RFMK order operation will now be given in conjunction with the timing diagrams of FIGS. 34a-34g. After address selection at TA time and loading the command byte into the command register at TC time, the command code is decoded by the AND invert circuit 266 in FIG. 26b2 to produce a negative signal which is inverted by inverter 268 to a positive signal on the WR DSD ORDER line thereby indicating the presence of a WR DSD ORDER command. At the same time, the order code is decoded by the AND invert circuit 324 to apply a negative signal via the −RFMK DEC line to the inverter 326 where it is inverted to a positive signal and applied to one input of the AND invert circuit 328. Referring now to the inverter 478 in FIG. 26d5, the negative signal on the −RFMK DEC line is inverted to a positive signal and passed via the OR circuit 484 to the SET LMK line. Referring now to the OR invert circuit 564 in FIG. 26g4, the positive signal on the SET LMK line is applied to render the OR invert circuit 564 effective to apply a negative signal to set the LMK latch 566 producing a positive signal on the LMK line and a negative signal on the −LMK line. Referring now to the AND invert circuit 368 in FIG. 26c2, the negative signal on the −LMK line is applied to decondition the AND invert circuit 368 which, in turn, maintains a positive signal at one input of the AND invert circuits 370 and 374 so long as the LMK latch 566 remains set i.e. while the MK memory is being read out. Referring now to the KEY VAR 1 CTRL latch 513 in FIG. 26e5, the negative signal on the −RFMK DEC line is applied to set the KEY VAR 1 CTRL latch 513 which, in being set, applies a positive signal to the VARIANT 1 line and via the OR circuit 518 to the VARIANT 1/3 line. Referring now to FIG. 26e1, the positive signals on the VARIANT 1/3 and VARIANT 1 lines are applied to the exclusive OR circuits 704A and 704B which are used to invert bits 0 and 2 of each byte read out of the MK memory 700 thereby providing a variant of the master key for transfer to the crypto engines. The balance of the operation for loading the variant of the master key into the key registers of the crypto engine can be followed from the timing diagrams of FIGS. 34a-34g and is similar to that described in detail in connection with the DECK order operation which may be referred to for such detail.

Referring now to FIG. 26b2, at TD time, while the variant of the master key is being loaded into the key registers, a positive signal is applied via the SYNCH TD line to render the AND circuit 270, conditioned by the positive signal on the WR DSD ORDER line, effective to provide a positive signal on the WR ORD TIME line. Referring now to FIG. 26b2', the positive signal on the WR ORD TIME line is applied to the inverter 322 where it is inverted to a negative signal on the −WR ORD TIME line to reset RFMK latch 330 in FIG. 26c3' and the SPEC ENC latch 494 in FIG. 26d5. Referring now to FIG. 26b2', the positive signal on the WR ORD TIME line is applied to the remaining input of the AND invert circuit 328 to render it effective to produce a negative signal on the −SET RFMK line which is applied to set the RFMK latch 330 which, in being set, applies a positive signal to the RFMK line and a negative signal to the −RFMK line. Referring now to FIG. 26c4, the negative signal on the −RFMK line is applied to decondition the AND invert circuit 298 causing a positive signal to be applied to the K ORD line and via the inverter 300 to a negative signal on the −K ORD line. The negative signal on the −K ORD line is applied to reset the ENC latch 312, which, in being reset, applies a negative signal to the ENC line. Referring now to FIG. 26g3, the negative signal on the ENC line is applied to decondition the AND circuits 536 and 538 and via the inverter 546 applies a positive signal to the DEC line to condition the AND invert circuits 548 and 560 for a decipher operation. Referring now to FIG. 26g4, after the 8th byte of the variant of the master key is loaded into the key registers, a negative signal on the −16 STEP line is applied to reset the LMK latch 566 to terminate further MK memory read out.

The next operation to be performed is to write the secondary key enciphered under the same variant of the host master key into the buffer registers of the crypto engines. This writing operation can be followed from the timing diagrams of FIGS. 34a-34g and is similar to the writing operation described in detail in the DECK order operation. In general terms, a series of 8 PIOW data commands is received with the data fields associated with the commands, constituting the secondary key enciphered under the same variant as the host master key stored in the key registers, being loaded into the buffer registers of the crypto engines. The first such command initiates a first input cycle and the byte counter 448, in FIG. 26d4, counts each such command received. After the 8 PIOW commands have been received and the 8th byte written into the buffer registers, then, at the 8th count, the input cycle ends, the BLOCK COUNT flip flop 414, in FIG. 26d3, is set, the enciphered secondary key is transferred from the buffer registers to the data registers of the crypto engines and the crypto engines then start a decipher operation, indicated by the generation of an engine busy EB signal, to decipher the secondary key enciphered under the variant of the host master key in the data registers of the crypto engines under control of the variant of the host master key in the key registers of the crypto engines to obtain the secondary key in clear form. Referring to FIG. 26e5, additionally, at the start of the decipher operation a negative signal on the −EB line is applied to reset KEY VAR 1 CTRL latch 513 which, in being reset, applies a negative signal to the VARIANT 1 line and via the OR circuit 518 to a negative signal on the VARIANT 1/3 line, both of which are effective to decondition the exclusive OR circuits 704A and 704B in FIG. 26e1, respectively, so that a subsequent transfer of the master key from the MK memory to the crypto engines will be in unmodified form. At the end of the decipher operation, half of the secondary key, now in clear form, is available at the outputs of the upper data register and the other half is available at the outputs of the cipher function circuits. Referring now to FIG. 26d5, at the end of the decipher operation, a positive signal is applied to the EB END line which is applied, in combination with positive signals on the RFMK and −SP ENC lines, to render the AND circuit 480 effective for one clock cycle, at the end of which, the positive signal on the EB END line is terminated with a negative signal being applied to decondition the AND circuit 480 causing a negative signal to be applied via OR circuit 500 to turn on the SPEC KEY OP latch 504 in FIG. 26e5 to signal a special key operation.

The next operation to be performed is to write the operational key enciphered under the host master key into the buffer registers of the crypto engines. This operation can also be followed from the timing diagrams of FIGS. 34a-34g and is similar to the write operation described in detail in the DECK order operation. In general terms, a series of 8 PIOW data commands is received with the data fields associated with the command, constituting the operational key enciphered under the host master key being loaded into the buffer registers of the crypto engines. The first such command initiates a second input cycle and the byte counter 448 again counts each such command received. After the 8 PIOW commands have been received and the 8th byte written into the buffer registers, then, at the 8th count, the input cycle ends, the BLOCK COUNT flip flop 414 in FIG. 26d3 is reset and the operational key enciphered under the host master key is transferred from the buffer registers to the data registers of the crypto engines by the control signals LDR and $\overline{\text{LDR}}$ in FIG. 26g1 while at the same time, the secondary key in clear form is transferred from the outputs of the upper data register UDR 200 and the outputs of the modulo-2 adders 650–664 to the buffer registers UBR 100 and LBR 150 by the control signals ELR and $\overline{\text{LIB}}$ as shown in FIG. 26g1.

Referring now to the AND circuit 475 in FIG. 26d5, at the end of the input cycle, a positive signal is applied to the IN CYCLE END line which in combination with positive signals on the RFMK and SP K OP lines render the AND circuit 475 effective to apply a positive signal via the OR circuit 484 to the SET LMK line. Referring now to FIG. 26g4, the positive signal on the SET LMK line is applied to render the OR invert circuit 564 effective to apply a negative signal to set the LMK latch 566 which, in being set, initiates the operation for reading the contents of the MK memory 700 for transfer in unmodified form to the crypto engines. Referring now to FIG. 26g1, successive control signals LDK and $\overline{\text{LDK}}$ permit the master key to be loaded, a byte at a time, as the working key into the key registers of the crypto engines. Additionally, the successive control signals LDK successively condition the AND circuit 807, to permit a parity check to be made of each byte loaded into the key registers.

Referring now to FIG. 26g4, after the 8th byte is loaded into the key registers, a negative signal on the −16 STEP line is applied to reset the LMK latch 566 which, in being reset, terminates further MK memory readout. Additionally, referring to the AND invert circuit 621 in FIG. 26f4, a positive signal on the 16 STEP line together with positive signals on the −SP ENC, RFMK and SP K OP lines are applied to render the AND invert circuit 621 effective to apply a negative signal to decondition the AND circuit 626 which, in turn, applies a negative signal to set the START EB latch 628. AT the end of the positive signal on the 16 STEP line, the AND invert circuit 621 is deconditioned causing a positive signal to be applied to render the AND circuit 626 effective to apply a positive signal to one input of the AND invert circuit 630. Accordingly, with the START EB latch now set, a positive signal is applied to the other input of the AND invert circuit 630 to render the AND invert circuit 630 effective to apply a negative signal to set the EB latch 632 producing a positive signal on the EB line and a negative signal on the −EB line indicating the start of the second decipher operation. A second decipher operation is then performed to decipher the operational key enciphered under the host master key in the data registers of the crypto engines under control of the host master key in the key registers of the crypto engines to obtain the operational key in clear form. Referring now to FIG. 26g1, at the end of the second decipher operation, half of the operational key, now in clear form, is available at the outputs of the upper data register UDR 200 and the other half is available at the outputs of the modulo-2 adders 650–664.

Referring now to FIG. 26f4, at φ4 time, a φ4 clock pulse in combination with positive signals on the C1 and 14, 15 lines are applied to render the AND invert circuit 624 effective to apply a negative signal to reset the START EB latch 628 and the EB latch 632 which, in being reset, applies a negative signal on the EB line and a positive signal on −EB line. At φ1 time of the next clock cycle, a φ1 DEL clock pulse in combination with the positive signal on the −EB line and the positive signal from the START EB END latch 612 are applied to render the AND invert circuit 614 effective to apply a negative signal to set the EB END latch 616 which, in being set, applies a positive signal to EB END line and a negative signal to the −EB END line. Referring now to the AND circuit 382 in FIG. 26c2, the negative signal on the −EB END line is applied to decondition the AND circuit 382 causing a negative signal to be applied to reset the round counter 390 in FIG. 26d2.

Referring now to the AND circuit 508 in FIG. 26e5, the positive signal on the EB END line in combination with the positive signals on the RFMK and SP K OP lines are applied to render the AND circuit 508 effective to apply a positive signal on the INIT OUT CYC line. The positive signal on the INIT OUT CYC line is applied to the OR invert circuit 490 in FIG. 26d5 where it is inverted to a negative signal to set the SPEC ENC latch 494 which, in being set, applies a positive signal to the EP ENC line and a negative signal to −SP ENC line. Referring now to FIGS. 26e3 and 26g3, the positive signal on the SP ENC line is passed via the OR circuit 522 to the ENC line where it is applied to condition the AND circuits 536 and 538 for an encipher operation and is inverted to a negative signal on the DEC line via the inverter 546 to decondition the AND invert circuits 548 and 560 used during a decipher operation.

Referring now to FIG. 26e3, the positive signal on the INIT OUT CYC line is also applied to the OR invert circuit 456 causing a negative signal to be applied to set the OUTPUT CYCLE latch 464 which, in being set, applies a positive signal on the OUT CYCLE line and a negative signal on the −OUT CYCLE line. Referring now to FIG. 26f3, the positive signal on the OUT CYCLE line in combination with the φ1 DEL clock pulse and the positive signal from the set START OUT CYCLE START latch 554 are applied to render the AND invert circuit 556 effective to apply a negative signal to set the OUT CYCLE START latch 558 which, in being set, applies a positive signal to the OUT CYCLE START line and a negative signal to the −OUT CYCLE START line. Referring now to FIG. 26e5, the positive signal on the OUT CYCLE START line in combination with the positive signals on the SP K OP and RFMK lines are applied to render the AND invert circuit effective to apply a negative signal via the −ER 16 line to one input of the OR invert circuit 646 in FIG. 26g4. The positive signals on the OUT CYCLE and K ORD lines are applied to render the AND invert circuit 598 effective to apply a negative signal to decondition the AND circuit 600 and via the −LDK line to decondition the AND circuit 572 and to one input of the OR invert circuit 604. The AND circuit 600 in being deconditioned applies a negative signal via the −LIB line to one input of the OR invert circuit 602 while the AND circuit 572 in being deconditioned applies a negative signal via the −SR line to one input of the OR invert circuit 574. Referring now to FIG. 26f3, the negative signal on the −OUT CYCLE line is applied to set the START OUT CYCLE END latch 580. Referring now to FIG. 26g4, at φ2 time, a −-C clock pulse is applied to the other inputs of the OR invert circuits 602, 604, 574 and 646, causing them to be deconditioned to apply positive signals via the LIB, LKB, SR and ER 16 lines to the control signal cable connected to the crypto engines. The positive signal on the LIB line is also applied to the OR invert circuit 648 causing a negative signal, delayed by delay circuit 650, to be applied via the $\overline{\text{LIB}}$ line to the control signal cable. The positive signal on the SR line is also applied to the OR invert circuit 606 causing a negative signal, delayed by the delay circuit 608, to be applied via the $\overline{\text{LDK}}$ line and the positive signal on the ER 16 line is applied to the OR invert circuit 652 causing a negative signal, delayed by the delay circuit 654, to be applied via the $\overline{\text{LDR}}$ line to the control signal cable. Referring now to the crypto engines in FIG. 26g1, the control signal ER 16 and $\overline{\text{LDR}}$ are applied to the lower data register LDR 250 causing the half of the operational key at the outputs of the modulo-2 adders 650–664 to be transferred to the lower data register LDR 250 so that the full operational key is now stored in the data registers. The LKB and $\overline{\text{LDK}}$ control signals are effective for allowing a byte of data from the outputs of the buffer registers UBR 100 and LBR 150 to be latched into the key registers UKR 350 and LKR 400 while at the same time the LIB and $\overline{\text{LIB}}$ control signals and the SR and $\overline{\text{LDK}}$ control signals are effective for shifting the buffer registers and the key registers, respectively, one position in synchronism. Referring now to FIGS. 26e3 and 26f3, at φ4 time, a φ4 clock pulse is applied to render the AND invert circuit 552, conditioned by the positive signal on the OUT CYCLE START line, effective to apply a negative signal to reset the START OUT CYCLE START latch 554. Referring now to FIG. 26d4, at φ4 time, the φ4 clock pulse is also effective in combination with the positive signals on the OUT CYCLE and K ORD lines to render the AND invert circuit 442 effective to apply a negative pulse to the STEP BYTE CTR line, the positive trailing edge of which is effective to step the BYTE COUNTER 448 to a count of 1. Referring now to FIGS. 26f3 and 26f4, at φ1 time of the next clock cycle a −φ1/L clock pulse is applied to reset the OUT CYCLE START latch 558 and the EB END latch 616. Referring now to FIG. 26e5, the negative signal on the OUT CYCLE START line is applied to decondition the AND invert circuit 506 which, in turn, applies a positive signal to the −ER 16 line to effectively terminate any further ER 16 control signals to the crypto engine.

Referring now to FIGS. 26g4 and 26h4, at φ2 time, a −C clock pulse is effective to again decondition the OR invert circuits 602, 604 and 574 to initiate production of the control signals on the LIB, LKB, SR, $\overline{\text{LIB}}$ and $\overline{\text{LDK}}$. Referring now to the crypto engines in FIG. 26g1, the LKB and $\overline{\text{LDK}}$ control signals are effective to load the next byte of the operational key from the buffer registers to the key registers, the LIB and $\overline{\text{LIB}}$ and SR and $\overline{\text{LDK}}$ control signals are effective to simultaneously shift the buffer registers and the key registers in synchronism so that the next byte of the operational key is available at the outputs of the buffer registers and the previously loaded byte of the operational key in the key registers is shifted one position. In a similar manner, the buffer registers and the key registers of the crypto engine are shifted in synchronism, once for each clock cycle, causing successive bytes of the operational key, in clear form, to be transferred from the buffer registers to the key registers.

The byte counter 448 counts the clock cycles and, at the 8th count, a negative signal is applied to set the COUNT 8 latch 450, which, in being set, applies a negative signal via the −CT8 line to reset the OUTPUT CYCLE latch 454 in FIG. 26e3. The OUTPUT CYCLE latch 454, in being reset, applies a positive signal to the −OUT CYCLE line and a negative signal on the OUT CYCLE line. Referring now to FIG. 26d3, the combination of positive signals on the −OUT CYCLE line and the −IN CYCLE line render the AND invert circuit 410 effective to apply a negative signal to reset the COUNT 8 latch 450 in FIG. 26d4, and is inverted by inverter 412 to a positive signal to reset BLOCK COUNT flip flop 414 producing a negative signal on the −BLK0 line and a positive signal on the −BLK1 line. The negative signal on the OUT CYCLE line is also applied to decondition the AND invert circuit 598 in FIG. 26g4 to initiate termination of the positive signals on the LIB, LKB and SR control lines to inhibit further shifting of the buffer key registers in the crypto engines. Referring now to FIG. 26f3, the negative signal on the OUT CYCLE line is applied to set the START OUT CYCLE START latch 554. Referring now to FIG. 26f3, at φ1 time of the next clock cycle, a φ1 DEL clock pulse in combination with the positive signal on the −OUT CYCLE line and the positive signal output of the START OUT CYCLE END latch 580 are applied to render the AND invert circuit 582 effective to produce a negative signal to set the OUT CYCLE END latch 584 which, in being set, applies a positive signal to the OUT CYCLE END line.

Referring now to FIG. 26e5, the positive signal on the OUT CYCLE END line in combination with the positive signal on the SP K OP line render the AND invert circuit 505 effective to apply a negative signal to the −SET EB line. Referring now to FIG. 26c3' the negative signal on the −SET EB line is applied to reset the RFMK latch 330, which, in being reset, applies a positive signal via the −RFMK line to render the AND invert circuit 298 in FIG. 26c4 effective to apply a negative signal to the K ORD line and via the inverter 330 a positive signal on the −K ORD line indicating the end of the key order operation. Referring now to FIG. 26f3, the negative signal on the −SET EB line is inverted to a positive signal on the SET EB line and applied via the SET EB line to the OR invert circuit 540 causing a negative signal to be applied to one input of the OR invert circuit 544 to initiate production of the SL control signal to pre-shift the key registers of the crypto engines in preparation for the encipher operation. Referring now to FIG. 26f4, the negative signal on the −SET EB line is applied to decondition the AND circuit 626, which, in being deconditioned, applies a negative signal to set the START EB latch 628. Referring now to FIGS. 26e3 and 26f3, at φ4 time, a φ4 clock pulse is applied to render the AND invert circuit 578 effective to apply a negative signal to reset the START OUT CYCLE END latch 580. At φ1 time of the next clock cycle, a −φ1/L clock pulse is applied to reset the OUT CYCLE END latch 584 which, in being reset, applies a negative signal via the OUT CYCLE END line to decondition the AND invert circuit 505 in FIG. 26e5 causing a positive signal to now be applied to the −SET EB line. Referring now to FIG. 26f4, the positive signal on the −SET EB line is applied to render the AND circuit 626 effective to apply a positive signal together with the positive signal output of the START EB latch 628 to render the AND invert circuit 630 effective to apply a negative signal to set the EB latch 632. The EB latch 632 in being set applies a positive signal to the EB line and a negative signal to the −EB line indicating the start of the encipher operation. Referring now to FIGS. 26d5 and 26e5, the positive signal on the EB line in combination with the positive signal on the SP ENC line is applied to render the AND invert circuit 502 effective to apply a negative signal to reset the SPEC K OP latch 504 which, in being reset, applies a negative signal to the SP K OP line indicating the end of the special key operation. During the encipher operation, the operational keys stored in the data registers of the crypto engine are enciphered under control of the secondary communication key stored in the key registers of the crypto engine to obtain, at the end of the encipher operation, the operational key enciphered under the secondary communication key. Referring now to FIG. 26g1, at the end of the encipher operation half of the enciphered operational key is available at the output of the upper data register UDR 200 and the other half is available at the outputs of the modulo-2 adders 650-654.

The balance of the RFMK order operation can be followed from the timing diagram of FIGS. 34a-34g and is similar to that described in detail in connection with the encipher order operation which may be referred to for such details. In general terms, a series of 8 PIOR data commands is received for reading the enciphered operational key. The first such command initiates a second output cycle and the byte counter counts each such command received. During the execution of the first PIOR data command, while the block count is at a count of one, the enciphered operational key is parallel transferred from the outputs of the upper data register and the outputs of the cipher function circuits to the buffer registers where it is then available for reading, a byte at a time. At the end of the execution of each PIOR command, the buffer registers are shifted one position to present the next byte of the enciphered operational key for reading. At the 8th count of the byte counter, the second output cycle ends and the block counter is reset to end the RFMK order operation.

REENCIPHER TO MASTER KEY ORDER OPERATION

The function of this operation is to reencipher an operational key enciphered under a secondary key, which is itself enciphered under a variant of the host master key, to the operational key enciphered under the host master key.

During command time of this operation, when the order code specifying a RTMK order is decoded, a load master key (LMK) latch and a key variant 2 latch are set and a special encipher (SP ENC) latch is reset. With the LMK latch set, the contents of the MK memory is caused to be read out for transfer to the crypto engines and with the key variant 2 latch set, each byte of the master key transferred is modified to provide a variant (KMH2) of the master key (KMHφ). The variant of the master key is parity checked, a byte at a time, and loaded as a working key into the key registers of the crypto engines. During synch TD time of this operation, a RTMK latch and a DECK latch are set causing a key order (K ORD) signal to be produced indicating that a key order operation is to be performed and an encipher (ENC) latch is reset causing the processing mode to be set for a decipher (DEC) operation. After the 8th byte is loaded into the key registers, the LMK latch is reset to terminate further MK memory readout. A series of PIOW data commands is then received with the data fields associated with the commands, constituting a secondary key enciphered under the same variant of the host master key stored in the key register, being loaded into the buffer registers of the crypto engines. The first such command initiates a first input cycle and the byte counter counts each such command received. After the 8 PIOW commands have been received and the 8th byte written into the buffer registers, then, at the 8th count, the input cycle ends, the enciphered secondary key is transferred from the buffer registers to the data registers of the crypto engine, a block counter is set, the crypto engines start a decipher operation, and the key variant 2 latch is reset. During the decipher operation the secondary key enciphered under the variant of the host master key in the data registers of the crypto engines is deciphered under control of the same variant of the host master key in key registers of the crypto engines to obtain the secondary key in clear form. At the end of the decipher operation, the secondary key, now in clear form, is transferred from the outputs of the upper data register UDR and the outputs of the cipher function circuits to the buffer registers of the crypto engine and an output cycle is started. During the output cycle, the buffer registers and the key registers are shifted in synchronism, once for each clock cycle, causing the secondary key presently in the buffer registers to be shifted into the key registers. During this transfer, the byte counter counts the clock cycles and after the 8th count, the output cycle ends, the block counter is reset and the DECK latch is reset causing the key order signal (K ORD) to be terminated. A second series of 8 PIOW data commands is then received with the data fields associated with the commands, constituting the operational key enciphered under the secondary key, being loaded into the buffer registers of the crypto engines. The first such command received initiates a second input cycle and the byte counter again counts each such command received. After the 8 PIOW commands have been received and the 8th byte written into the buffer register, then, at the 8th count, the second input cycle ends, the block counter is reset and the operational key enciphered under the secondary key is transferred from the buffer registers to the data registers of the crypto engines and the crypto engines start a decipher operation, indicated by the EB signal, to decipher the operational key enciphered under the secondary key in the data registers of the crypto engines under control of the secondary key in the key registers of the crypto engines to obtain the operational key in clear form. At the end of the decipher operation, half of the operational key, now in clear form, is available at the outputs of the upper data register UDR and the other half is available at the outputs of the cipher function circuit. Additionally, at the end of the decipher operation, with the RTMK latch still set, the operational key is transferred from the outputs of the upper data register UDR and from the outputs of the cipher function circuits to the buffer registers in the crypto engines, a special key operation (SP K OP) latch is set signaling that a special key operation is to be performed and the LMK latch is again set to cause the host master key contents of the MK memory (KMH$\phi$) to be read out for transfer to the crypto engine. The host mast key is parity checked, a byte at a time, and loaded as the working key into the key registers of the crypto engines. After the 8th byte is loaded into the key registers, the LMK latch is reset to terminate further MK memory read out.

At the end of writing the host master key into the key registers of the crypto engines and with the SP KEY OP and RTMK latches being set, the operational key is transferred from the buffer registers to the data register of the crypto engines, a special encipher (SP ENC) latch is set, the processing mode is now set for an encipher (ENC) operation and the RTMK latch is reset. Following this, the key registers of the crypto engine are pre-shifted one position to the left in preparation for the encipher operation, the crypto engine then initiates the special encipher operation, indicated by the generation of the EB signal, which together with the SP ENC latch being set causes the SP K OP latch to be reset signaling the end of the special key operation. During the special encipher operation, the operational key, presently stored in the data registers of the crypto engines, is enciphered under control of the host master key in the key registers of the crypto engines to obtain the operational key enciphered under the host master key. At the end of the special encipher operation, half of the operational key enciphered under the host master key is available at the output of the upper data register UDR and the other half is available at the outputs of the cipher function circuits.

A series of 8 PIOR data commands is now received for reading the enciphered operational key. The first such command initiates a second output cycle and the byte counter counts each such command received. During the execution of the PIOR data command, while the block count is at a count of one, the enciphered operational key is parallel transferred from the outputs of the upper data register UDR and the outputs of the cipher function circuit to the buffer registers where it is then available for reading, a byte at a time. At the end of the execution of each PIOR command, the buffer registers are shifted one position to present the next byte of the enciphered operational key for reading. At the 8th count of the byte counter, the second output cycle ends and the block counter is reset to end the RTMK operation.

A more detailed description of the RTMK order operation will now be given in conjunction with the timing diagrams of FIGS. 35a–35g. After address selection at TA time and loading the command byte into the command register at TC time, the command code is decoded by the AND invert circuit 266 in FIG. 26b2 to produce a negative signal which is inverted by inverter 268 to a positive signal on the WR DSD ORDER line thereby indicating the presence of a WR DSD ORDER command. At the same time, the order code for the RTMK order is decoded by the AND invert circuit 332 to apply a negative signal via the −RTMK DEC line to the inverter 334 where it is inverted to a positive signal and applied to one input of the AND invert circuit 336. Referring now to the inverter 468 in FIG. 26d5, the negative signal on the −RTMK DEC line is inverted to a positive signal and applied to the OR invert circuit 492 causing a negative signal to be applied to reset the SPEC ENC latch 494. Referring now to FIG. 26e5, the negative signal on the −RTMK DEC line is applied via the OR circuit 512 to set the KEY VAR 2 CTRL latch 514 which, in being set, applies a positive signal to the VARIANT 2 line and via the OR circuit 521 to the VARIANT 2/3 line. Referring now to FIG. 26e1, the positive signals on the VARIANT 2 and VARIANT 2/3 line are applied to condition the exclusive OR circuits 704c and 704d which are used to invert bits 4 and 6 of each byte to be read out of the MK memory 700 thereby providing a variant of the master key for transfer to the crypto engine. Referring now to FIG. 26b2, at TD time, a positive signal is applied via the SYNCH TD line to render the AND circuit 270, conditioned by the positive signal on the WR DSD ORDER line, effective to provide a positive signal on the WR ORD TIME line. Referring now to FIG. 26b2', the positive signal on the WR ORD TIME line is applied to the inverter 322 where it is inverted to a negative signal on the −WR ORD TIME line to reset the RTMK latch 338 in FIG. 26c3'. Referring now to FIG. 26b2', the positive signal on the WR ORD TIME line is applied to the remaining input of the AND invert circuit 336 to render it effective to produce a negative signal on the −SET RTMK line where it is applied to set the RTMK latch which, in being set, applies a positive signal to the RTMK line. The negative signal on the −SET RTMK line is also applied to decondition the AND circuit 294 in FIG. 26c3 which, in turn, applies a negative signal to set the DEC latch 296 producing a positive signal on the DECK line and a negative signal on the −DECK line. The negative signal from the −SET DEC output of the AND circuit 294 is applied to reset the key invalid latch 278 and, in FIG. 26g4 is inverted to a positive signal by inverter 562 and applied to the OR invert 564 causing a negative signal to be applied to set the LMK latch 566 producing a positive signal on the LMK line and a negative signal on the −LMK line. Referring now to the AND invert circuit 368 in FIG. 26c2, the negative signal on the −LMK line is applied to decondition the AND invert circuit 368 which, in turn, maintains a positive signal at one input of the AND invert circuits 370 and 374 so long as the LMK latch 566 remains set i.e. while the MK memory is being read out.

Except for the modification of the host master key as it is being transferred from the MK memory 700 to the key registers of the crypto engine, the next series of operations is similar to that described in connection with the DECK order operation which may be referred to for such details and can also be followed from the timing diagram of FIGS. 35a–35g. In general terms, with the DECK latch 296 set, a −K ORD signal (in FIG. 26c4) causes the encipher (ENC) latch 312 to be reset so that the processing mode is set for a decipher operation. Now, with the LMK latch 566 (in FIG. 26g4) set, the host master key contents of the MK memory 700 is caused to be read out for transfer to the crypto engine and with the key variant 2 latch 514 (in FIG. 26e5) set, each transferred byte of the host master key has bits 4 and 6 inverted to provide a variant (KMH2) of the host master key (KMH0). At the crypto engine (in FIG. 26g1), the variant of the host master key is parity checked, a byte at a time, and loaded as a working key into the key registers of the crypto engines. After the 8th byte is loaded into the key registers, a −16 STEP signal, indicating the end of the loading operation, is applied to reset LMK latch 566 to terminate further MK memory read out. Following along the general DECK operation, after (or concurrently with) loading the variant of the host master key into the key registers of the crypto engines, a series of 8 PIOW data commands are received with the data fields associated with the commands, in this case consisting of a secondary key enciphered under the same variant of the host master key as is stored in the key registers of the crypto engine, being loaded into the buffer registers of the crypto engines. The first such command sets the INPUT CYCLE latch 464 (in FIG. 26e3) to initiate a first input cycle and the byte counter 448 (in FIG. 26d4) counts each such command received. After the 8th PIOW commands have been received and the 8th byte written into the buffer registers, then, a −CT8 signal, indicating the 8th count, is applied to reset the INPUT CYCLE latch 464 to end the input cycle. The end of the input cycle causes a BLOCK COUNT flip flop 414 (in FIG. 26d3) to be set and an INPUT CYCLE END signal to be produced during the clock cycle following the end of the input cycle. The INPUT CYCLE END signal is effective to initiate production of the control signals LDR and $\overline{\text{LDR}}$ (in FIGS. 26f4, 26g4 and 26h4) for causing the enciphered secondary key, presently in the buffer register, to be transferred to the data registers of the crypto engines (in FIG. 26g1). The INPUT CYCLE END signal is also effective to set the START EB latch 628 (in FIG. 26f4) which conditions the EB latch 632 to be set at the end of the clock cycle and the decipher operation to be initiated.

During the decipher operation, the secondary key enciphered under the variant of the host master key in the data registers of the crypto engines is deciphered under control of the same variant of the host master key in the key registers of the crypto engines to obtain the secondary key in clear form. At the end of the decipher operation the START EB and EB latches 628 and 632, respectively, (in FIG. 26f4) are reset and the EB END latch 616 is set to cause an EB END signal to be produced during the clock cycle following the end of the decipher operation. The EB END signal is effective to initiate production of the control signals ELD and $\overline{\text{LIB}}$ (in FIGS. 26f4, 26g4 and 26h4) for causing the second-ary key, now in clear form, to be transferred from the outputs of the upper data registers UDR and the outputs of the modulo-2 adders 650–664 of the crypto engine (in FIG. 26g1) to the buffer registers of the crypto engine. At the end of the clock cycle, the EB END signal is also effective to initiate a EB END L signal to set the OUTPUT CYCLE latch 464 (in FIG. 26e3) to initiate a first output cycle. The OUTPUT CYCLE latch 464, in being set, produces an OUTPUT cycle signal which initiates production of the control signals LIB, LKB, SR and $\overline{\text{LIB}}$ and $\overline{\text{LDK}}$ (in FIGS. 26g4 and 26h4) for causing the buffer registers and the key registers to shift in sychronism, once for each succeeding clock cycle, whereby the secondary key presently in the buffer registers is shifted into the key registers of the crypto engine (in FIG. 26g1). During the shifting operation, the byte counter 448 (in FIG. 26d4) counts the clock cycles and after the secondary key has been completely shifted into the key registers, the, a −CT8 signal, indicating the 8th count, is applied to reset the OUTPUT CYCLE latch 464 to end the first output cycle. The OUTPUT CYCLE latch 464, in being reset, causes the BLOCK COUNT flip flop 414 (in FIG. 26g3) to be reset and an OUTPUT CYCLE END latch 584 (in FIG. 26f3) to be set for producing an OUTPUT CYCLE END signal during the clock cycle following the end of the output cycle. The OUTPUT CYCLE END signal is effective to reset DECK latch 296 (in FIG. 26c3) which, in turn, terminates the K ORD signal and ends the operation.

The next series of the operations to be performed in executing a RTMK function is to decipher a data parameter under control of the key parameter of the key registers of the crypto engines, the data parameter, in the present case, being an operational key enciphered under a secondary key and the key parameter being the same secondary key stored in the key registers of the crypto engine. Except for the significance of the data and key parameters, the series of operations is similar to that previously described in connection with DEC order operation and can also be followed from the timing diagram of FIGS. 35a–35g. In general terms, with the encipher (ENC) latch still being in a reset state, at the end of the previous operation, the processing mode is still set for a decipher operation. Accordingly, a second series of 8 PIOW data commands are now received with the data fields associated with the commands, constituting the operational key enciphered under the same secondary key as is stored in the key registers of the crypto engines, being loaded into the buffer registers of the crypto engines. The first such command received initiates a second input cycle, as previously described, and the byte counter 448 counts each command received. After the 8 PIOW commands have been received and the 8th byte written into the buffer register, then, at the 8th count, the second input cycle ends, the BLOCK COUNT flip flop 414 is reset and during the clock cycle following the end of the input cycle, the INPUT CYCLE END signal agains initiates production of the control signals LDR and $\overline{\text{LDR}}$ for causing the enciphered operational key, presently in the buffer registers, to be transferred to the data registers of the crypto engine. The INPUT CYCLE END signal is again also effective to initiate the sequential setting of the START EB and EB latches 628 and 632, respectively, and the decipher operation is initiated.

During the decipher operation, the operational key enciphered under the secondary key in the data registers of the crypto engines is deciphered under control of the same secondary key in the key registers of the crypto engines to obtain the operational key in clear form.

At the end of the decipher operation, the START EB and EB latches 628 and 632, respectively, (in FIG. 26f4) are again reset and the EB END latch 616 is set to cause an EB END signal to be produced during the clock cycle following the end of the decipher operation.

Referring now to FIG. 26d5, the positive EB END signal in combination with positive signals on the −DECK, RTMK and −SP ENC line are applied to render the AND circuit 482 effective to apply a positive signal via the OR circuit 484 to the SET LMK line. Referring now to the OR invert circuit 564 in FIG. 26g4, the positive signal on the SET LMK line is applied to render the OR invert circuit 564 effective to apply a negative signal to set the LMK latch 566 producing a positive signal on the LMK line and a negative signal on the −LMK line. Referring now to the AND invert circuit 368 in FIG. 26c2, the negative signal on the −LMK line is applied to decondition the AND invert circuit 368 which, in turn, maintains a positive signal at one input of the AND invert circuit 370 and 374 so long as the LMK latch 566 remains set i.e. while the MK memory is being read out. Referring now to FIG. 26d5, at the end of the EB END signal, the AND circuit 482 is deconditioned causing a negative signal to be applied to set the SPEC KEY OP latch 504 in FIG. 26e5 to produce a positive signal on the SP K OP line signaling a special key operation is to be performed. The AND invert circuits 370 and 374 are alternately rendered effective by $\phi 3L$ and $-\phi L$ clock pulses, respectively; the AND invert circuit 370 controlling the AND invert circuit 376 and inverter 378 to produce successive negative signals on the −M ENABLE line which in combination with a positive signal on the −W ENABLE line allows successive reading of the MK memory 700 while the AND invert circuit 374 controls the AND invert circuit 376 and inverter 388 in FIG. 26d2 to produce successive positive signals on the STEP CTR line for successively stepping the address counter 390 to address successive locations on the MK memory 700. Successive pairs of half bytes of the master key read out of the MK memory 700 in FIG. 26e1 are shifted into the shift registers 702 to provide successive bytes of the master key for transfer to the crypto engines. Referring now to FIG. 26g4, the AND invert circuit 568 conditioned by the positive signal on the LMK line is successively rendered effective to successively set the LDK latch 570 to initiate production of successive control signals on the SR, LDK and $\overline{\text{LDK}}$ lines for controlling the key registers in the crypto engines to shift the successive bytes of the master key for loading into the key registers of the crypto engines.

At the end of the special key operation, the address counter 390 in FIG. 26d2 is stepped a 16th time to return to a count of 0 to initiate production of a positive signal on the 16 STEP line. Referring now to FIG. 26e5, the positive signal on the 16 STEP line in combination with positive signals on the SP K OP and RTMK line are applied to render the AND invert circuit 510 effective to apply a negative signal to the −LDR & SET EB line. The negative signal on the −LDR & SET EB line is applied to the inverter 486 in FIG. 26d5 where it is inverted to a positive signal and applied to the OR invert circuit 490 causing a negative signal to be applied to set the SPEC ENC latch 494 to signal a special encipher operation causing a positive signal to be applied on the SP ENC line and a negative signal on the −SP ENC line. Referring now to FIGS. 26e3 and 26g3, the positive signal on the SP ENC line is applied via the OR circuit 522 to condition the AND circuits 536 and 538 for an encipher operation and to the inverter 546 where it is inverted to a negative signal on the DEC line to decondition the AND invert circuit 548 and 560 associated with the decipher operation. The negative signal on the −SP ENC line is applied to decondition the AND invert circuit 621 causing a positive signal to be applied to one input of the AND circuit 626. Since a negative signal is presently on the IN CYCLE END line, the inverter 622 inverts this to a positive signal to a second input of the AND circuit 626. Referring now to FIG. 26c3′, the negative signal on the −LDR & SET EB line is applied to reset RTMK latch 338.

Referring now to FIG. 26g3 the negative signal on the −LDR & SET EB line is applied to the inverter 539 where it is inverted to a positive signal and applied to the OR invert circuit 540 causing a negative signal to be applied to one input of the OR invert circuit 544. Referring now to FIG. 26g4, the negative signal on the −LDR & SET EB line is applied to decondition the AND invert circuit 638 causing a positive signal to be applied to the OR invert circuit 640 which, in turn, applies a negative signal via the −LDR line to one input of the OR invert circuit 644. A $\phi 2$ time of the clock cycle, a −C clock pulse is applied to the other input of the OR invert circuits 544 and 644 initiating the production of positive signals on the SL and LDR line to the control signal cable connected to the crypto engines. The positive signal on the LDR line is also applied to the OR invert circuit 652 in FIG. 26h4 causing a negative signal, delayed by the delay circuit 654, to be applied via the $\overline{\text{LDR}}$ line to the control cable. Additionally, the positive signal on the SL line is applied to the OR invert circuit 606 causing a negative signal, delayed by the delay circuit 608, to be applied via $\overline{\text{LDK}}$ line to the control signal cable. Referring now to the crypto engine in FIG. 26g2 the control signals SL and $\overline{\text{LDK}}$ are effective for causing a pre-shift of the key registers of the crypto engine in preparation for the encipher operation while the control signals LDR and $\overline{\text{LDR}}$ are effective for causing the operational key in the buffer registers to be transferred to the data registers of the crypto engine.

Referring now to FIG. 26e5 at the end of this clock cycle the positive signal on the 16 STEP line is terminated to decondition the AND invert circuit 510 causing a positive signal to now be applied to the −LDR & SET EB line. Referring now to FIG. 26f4, the positive signal now on the −LDR & SET EB line is applied to render the AND circuit 626 effective to apply a positive signal which, in combination with the positive signal from the START EB latch 628, renders the AND invert circuit 630 effective to apply a negative signal to set the EB latch 632 which, in being set, applies a positive signal to the EB line and a negative signal to the −EB line. Referring now to FIG. 26d5 the positive signal on the EB line in combination with the positive signal on the SP ENC line are applied to render the AND invert circuit 502 effective to apply a negative signal to reset the SPEC KEY OP latch 504 in FIG. 26e5 signaling the end of the special key operation.

The balance of the RTMK order operation can be followed from the timing diagrams of FIGS. 35a–35g and is similar to that described in detail in connection with the encipher order operation which may be referred to for such detail. In general terms, during the encipher operation the operational key in the data registers of the crypto engines is enciphered under control of the host master key in the key registers of the crypto engines. At the end of the special encipher operation, half of the operational key enciphered under the host master key is available at the outputs of the upper data register and the other half is available at the outputs of the cipher function circuits. A series of 8 PIOR data commands is now received for reading the enciphered operational key. The first such command initiates a second output cycle and the byte counter 448 counts each such command received. During the execution of the first PIOR data command, while the block count is at a count of 1, the enciphered operational key is parallel transferred from the outputs of the upper data registers and the outputs of the cipher function circuits to the buffer registers where it is then available for reading, a byte at a time. At the end of the execution of each PIOR command, the buffer registers are shifted one position to present the next byte of the enciphered operational key for reading. At the 8th count of the byte counter, the second output cycle ends and the block counter is reset to end the RTMK operation.

PROCEDURAL ERRORS

A Procedural error is one in which the DSD receives a command out of sequence or at the wrong time, such that its execution would cause the destruction or loss of good data in the crypto engines or the providing of useless data from the crypto engines. There are three commands that may cause a procedural error, namely, the PIOW data command, the PIOR data command and the WR DSD order command. The various error conditions which may occur for these three commands are described in the following.

1. Procedural errors for a PIOW data command
   a. If a PIOW data command is issued while a read operation is being performed (an output cycle is in progress), this causes a procedural error since the buffer registers cannot be used concurrently for both reading and writing. Accordingly, referring to FIG. 26d3, while the output cycle is in progress, a negative signal is applied to decondition the AND invert circuit 428 causing a positive signal to be applied to one input of the AND invert circuit 432. Since a WMK order operation is not in progress, a positive signal is applied via the −WMK line to a second input of the AND invert circuit 432. Now, if an attempt is made to execute a PIOW data command before the end of the output cycle, a positive signal is applied via the PIOW DATA line to a third input of the AND invert circuit 432 thereby conditioning this circuit. At $\phi$3L time of the same clock cycle in which the positive signal is applied to the PIOW DATA line, a $\phi$3L clock pulse is applied to render the AND invert circuit 432 effective to apply a negative signal to decondition the AND circuit 438 which, in turn, applies a negative signal to the −PROC ERR line indicating a procedural error.
   b. If a PIOW data command is issued while a block of data is contained in the buffer registers, this causes a procedural error since the buffer registers can only contain one block of data at a time. Accordingly, referring to FIG. 26d3, while a block of data is contained in the buffer registers, a negative signal is applied via the −BLK 1 line to decondition the AND invert circuit 428 causing a positive signal to be applied to one input of the AND invert circuit 432 and since a WMK order operation is not in progress and a PIOW data command is being attempted, positive signals are again applied via the −WMK and PIOW DATA lines to condition the AND invert circuit 432. At $\phi$3L time, the $\phi$3L clock pulse is again applied to apply a negative signal to decondition the AND circuit 438 which then applies a negative signal to the −PROC ERR line indicating a procedural error.
   c. After a reset or after a WMK order operation, the cipher key in the key registers is invalid and a new cipher key must be loaded into the key registers by a DECK order command. If a PIOW data command is issued while an invalid key is present in the key registers, this causes a procedural error since a valid key is not present in the key registers. Accordingly, referring to FIG. 26d3, while an invalid key is present in the key registers, a negative signal is applied via the −key invalid line to decondition the AND invert circuit 428 causing a positive signal to be applied to one input of the AND invert circuit 432 and since a WMK order operation is not in progress and a PIOW data command is being attempted, positive signals are again applied via the −WMK and PIOW DATA lines to condition the AND invert circuit 432 to produce a procedural error signal at $\phi$3L time on the −PROC ERR line.
   d. If a PIOW data command is issued to write a new master key into the MK memory less then 16 microseconds after issuing a WMK order command, a procedural error will occur since a WMK overwrite operation is in progress for overwriting the old master key in the MK memory. Therefore, referring to FIG. 26d3 a positive signal on the MK OVW line in combination with a positive signal on the PIOW DATA line renders the AND invert circuit 427 effective to apply a negative signal to decondition the AND circuit 438 to produce a negative signal on the −PROC ERR line indicating a procedural error.

2. Procedural errors for a PIOR data command
   a. If a PIOR data command is issued while a write operation is presently being performed (an input cycle is in progress), this causes a procedural error since the buffer registers cannot be used concurrently for both reading and writing. Accordingly, referring to FIG. 26d3, while an input cycle is in progress, a negative signal is applied to decondition the AND invert circuit 416 causing a positive signal to be applied to condition the AND invert circuit 436. Now, if an attempt is made to execute a PIOR data command, a positive signal on the PIOR EARLY line is applied to render the conditioned AND invert circuit 436 effective to apply a negative signal to decondition the AND circuit 438 causing a negative signal to be applied to the −PROC ERR line indicating a procedural error.
   b. If a PIOR data command is issued at a time when there is no data contained in the buffer registers of the crypto engines, this causes a procedural error since there is no data to be read. Accordingly, referring to FIG. 26d3, at a time when there is no data contained in the buffer registers of the crypto engines, the BLOCK COUNT flip flop 414 is in a reset condition causing a negative signal to be applied via the —BLK 0 line to decondition the AND invert circuit 416 causing a positive signal to be applied to condition the AND invert circuit 436. Consequently, if an attempt is made to execute a PIOR data command, a positive signal on the PIOR EARLY line is again applied to render the conditioned AND invert circuit 436 effective to apply a negative signal to decondition the AND circuit 438 causing a negative signal to be applied to the —PROC ERR line indicating a procedural error.

c. If a PIOR data command is issued at a time when any of a cipher key handling orders are in progress, this causes a procedural error since no data is to be read during these cipher key handling operations. Accordingly, referring to FIG. 26*d*3, whenever a key order operation is in progress a negative signal is applied via the —K ORD line to decondition the AND invert circuit 416 causing a positive signal to be applied to condition the AND invert circuit 436. Now, if an attempt is made to execute a PIOR data command, a positive signal on the PIOR EARLY line is applied to render the conditioned AND invert circuit 436 effective to apply a negative signal to decondition the AND circuit 438 causing a negative signal to be applied to the —PROC ERR line indicating a procedural error.

d. If a PIOR data command is issued at a time when a block of data is loaded in the buffer registers and fewer than 32 usec have elapsed since the last PIOW data command was issued, a procedural error will result since the engine is still busy processing the block of data. Therefore, referring to FIG. 26*d*3, while the engine is busy, a negative signal is applied via the —EB line to decondition the AND invert circuit 416 causing a positive signal to be applied to condition the AND invert circuit 436. Now, if an attempt is made to execute a PIOR data command, a positive signal on the PIOR EARLY is applied to render the conditioned AND invert circuit 436 effective to apply a negative signal to decondition the AND circuit 438 causing a negative signal to be applied to the —PROC ERR line indicating a procedural error.

3. Procedural errors for a WR DSD order command a. If a WR DSD order command is issued at a time when any of the cipher key handling orders are in progess, this causes a procedural error since a cipher key handling operation once begun must be completed. Accordingly, referring to FIG. 26*d*3, whenever a key handling order command is being performed a negative signal is applied via the —K ORD line to decondition the AND invert circuit 433 causing a positive signal to be applied to one input of the AND invert circuit 434. Now, if a WR DSD order command is given while a previous cipher key handling order is in progress, then, positive signals on the WR DSD ORDER and TC SEL lines are applied to render the AND invert circuit 434 effective to apply a negative signal to decondition the AND circuit 438 causing a negative signal to be applied to the —PROC ERR line indicating a procedural error.

b. If a WR DSD order command is issued at a time when data from the buffer registers of the crypto engines are being read, this causes a procedural error since unread data still remains in the crypto engines. Referring now to FIG. 26*d*3, while data is being read from the buffer registers of the crypto engines, the block count flip flop 414 is in a set state causing a positive signal to be applied via the —BLK 0 line to the inverter 418 where it is inverted to a negative signal to decondition the AND invert circuit 433 which, in being deconditioned, applies a positive signal to one input of the AND invert circuit 434. Now, when a WR DSD order command is issued, positive signals are applied via the WR DSD ORDER and TC SEL lines to render the AND invert circuit 434 effective to apply a negative signal to decondition the AND circuit 438 causing a negative signal to be applied to the —PROC ERR line indicating a procedural error.

c. If a WR DSD order command is issued at a time when a write operation is being performed (an input cycle is in progess), this causes a procedural error since a process once begun must be completed. Accordingly, referring to FIG. 26*d*3, while an input cycle is in progress, a negative signal is applied via the —IN CYCLE line to decondition the AND invert circuit 433 which, in turn, applies a negative signal to one input of the AND invert circuit 434, as described above, so that when a WR DSD order command is issued the AND invert circuit 434 is rendered effective to initiate generation of a negative signal on the —PROC ERR line indicating a procedural error.

d. If a WMK order command is issued at a time when the EW switch is off, this causes a procedural error since the command cannot be executed unless the EW switch is switched on. Referring now to FIG. 26*c*3, if the enable write switch is off, a negative signal on the EWMK line is applied to the inverter 423 where it is inverted to a positive signal and applied to one input of the AND invert circuit 425. Now, when a cylinder key handling order command is decoded and further particularized as a WMK order command by a positive signal on the —Y line then, positive signals are applied via the WMK and —Y lines to condition the AND invert circuit 425. At SYNCH TD time of the WMK order operation, a positive signal is applied via the WR ORD TIME line to render the AND invert circuit 425 effective to apply a negative signal to decondition the AND circuit 438 in FIG. 26*e*3 causing a negative signal to be applied to the —PROC ERR line indicating a procedural error.

Referring now to FIG. 26*i*2, whenever a procedural error occurs because of any of the above conditions, the negative signal on the —PROC ERR line is applied to set the bit 0 and bit 1 latches 954A and 954B of the status register 952 to provide an indication of the procedural error.

ERROR CONDITIONS

Six different kinds of errors are detected in the data security device. Each kind, when it is detected, results in the setting of a unique combination of bits in the status register thereby providing information usable by the processor in carrying out error recovery procedures. The combination of bits in the status register for the different kinds of errors is shown in the following table.

| Error Condition | STATUS BITS | | | | |
|---|---|---|---|---|---|
| | 0 | 1 | 2 | 3 | 5 |
| Command Error | — | — | — | — | 1 |
| Illegal Order | 1 | — | 1 | — | — |
| Procedural Order | 1 | 1 | — | — | — |
| Write Error | — | — | — | 1 | — |
| Key Bus Error | — | 1 | 1 | — | — |
| Engine Error | — | 1 | — | — | — |

ERROR CONDITIONS INDICATED IN STATUS REGISTER

The contents of the status register, indicating error conditions, if any, are read back to the processor under control of a READ BS command which will now be described.

READ BASIC STATUS COMMAND OPERATION

The function of this operation is to read the contents of the status register with correct parity, to provide information as to the occurrence of any of the six different kinds of errors indicated above. Therefore, this operation is performed periodically to check for error conditions.

Referring now to FIG. 26b2, after address selection is performing during TA time and the command byte is loaded into the command register during TC time, the AND invert circuit 242 decodes the READ BS command code and produces a negative signal which is applied to one input of the OR invert circuit 246. At TC END time, a positive signal on the TC END line is applied to the inverter 244 where it is inverted to a negative signal and applied to the other input of the OR invert circuit 246 which thereby causes the OR invert circuit 246 to apply a positive signal to the READ BS line. The positive signal on the READ BS line is applied to one input of the AND invert circuits 956 in FIG. 26e2, the other inputs of which are connected to the bit latches 954 of the status register 952. Accordingly, a pattern of bit signals, corresponding to the setting of the latches 954 of the status register, are applied to the —DATA BUS IN and to the parity generator 914. It should be noted that the status bits 4, 6 and 7 are not implemented and, therefore, are treated as 0 bits in the parity generator 914 to produce the correct parity bit on the —P line of the —DATA BUS IN. The setting of the status register 952, now present on the —DATA BUS IN, remains stable until the end of this IO operation when the command register is reset and the positive signal on the READ BS line is terminated.

SET/RESET BASIC STATUS COMMAND OPERATION

These commands are used for diagnostic purposes for testing the operation of the status register 952. Thus, in the case of the SET BS command, if the data fields associated with the command has good parity, then the status latches 954 that correspond to 1's in the data field associated with the command are set to 1's whereas in the case of the RESET BS command, if the data field associated with the command has good parity, then the status latches 954 that correspond to 1's in the data fields associated with the command are set to 0's. If a parity error is detected during the execution of either of these commands a write error signal will be produced, in a manner previously described, to set the bit 3 status latch 945D of the status register 952 to indicate the occurrence of this error. After execution of either of these commands, a READ BS command may be issued to read the content of the status register 952 in a manner described above, for subsequent determination as to whether a previously defined value written by either the SET BS or RESET BS commands is identical to that read by the READ BS command.

Referring now to FIGS. 26a2 and 26b2, after the address selection is performed during TA time and the command bit is loaded into the command register during the TC time, the AND invert circuit 232 decodes the SET BS command while the AND invert circiut 238 decodes the RST BS command. The AND invert circuit 232 causes a negative signal to be applied to one input of the OR invert circuit 236 while the AND invert circuit 238 causes the negative signal to be applied to one input of the OR invert circuit 240. At TD time, the data field to be loaded into the status register is received via the —DATA BUS OUT and applied via the inverters 170 to the parity generator 178 to generate a parity bit which is compared with the parity bit received from the —DATA BUS OUT. If the parity bits do not compare then, at TD SEL time the AND invert circuit 362 in FIG. 26b3 will detect the bad parity to apply a negative signal to turn on the WR ERR latch 364 which, in being turned on, applies a positive signal to the AND invert circuit 944 in FIG. 26i2 which is conditioned by positive signal on the —RST line to cause a negative signal to be applied to set the bit 3 latch 954D of the status register 952 indicating the occurrence of the write error. Referring back to FIG. 26b2, if the parity is bad then a negative signal is maintained on the parity good line to decondition the AND invert circuit 234 causing a positive signal to be applied to the OR invert circuits 236 and 240 which, in turn, maintain negative signals on the SET BS or RST BS lines to inhibit execution of either of these commands. On the other hand if good parity is detected, then a positive signal is applied to the AND invert circuit 234 causing a negative signal to be applied to the other inputs of the OR invert circuits 236 and 240. Accordingly, depending on which command is being called for, a positive signal is applied to either the SET BS or RST BS lines. Referring now to FIGS. 26h4 and 26i2, if the command being executed is the SET BS command, then a positive signal is applied to condition the AND invert circuits 924, 928, 934, 942 and 948. Therefore, those bits of the data field which correspond to 1's render these AND invert circuits effective to apply negative signals to set corresponding ones of the latches of the status register 952. On the other hand, if the command being executed is the RESET BS command, then a positive signal on the RESET BS line is applied to condition the AND invert circuits 926, 932, 940, 946 and 950. Therefore, those bits of the data field which correspond to 1's render these AND invert circuits effective to apply negative signals to reset corresponding ones of the latches of the status register 952.

While the invention has been particularly shown and described with reference to the preferred embodiment thereof, it will be understood by those skilled in the art that several changes in form and detail may be made without departure from the spirit and scope of the invention.

What is claimed is:

1. In a multiple domain data communication network providing communication security for data communication sessions between a first host system in one domain having cryptographic apparatus provided with a first master key and a second host system in another domain having cryptographic apparatus provided with a second master key, an arrangement for establishing a common operational key for cryptographic operations between said host systems comprising:

means in said first host system cryptographic apparatus providing a cross domain key enciphered under a first key encrypting key of said first host system cryptographic apparatus for cross domain communication with said second host system, means in said first host system cryptographic apparatus providing an operational key in protected form, cipher means in said first host system cryptographic apparatus operably responsive to said enciphered cross domain key and said protected operational key to perform a cryptographic operation for providing said operational key enciphered under said cross domain key for transmission to said second host system, means in said second host system cryptographic apparatus providing said cross domain key enciphered under a first key encrypting key of said second host system cryptographic apparatus, and cipher means in said second host system cryptographic apparatus operably responsive to said cross domain key enciphered under said first key encrypting key of said second host system and said received enciphered operational key to perform a cryptographic operation for providing said operational key enciphered under a second key encrypting key of said second host system cryptographic apparatus which is usable by said second host system cryptographic apparatus to perform cryptographic operations with said first host system.

2. In a multiple domain data communication network providing communication security for data communication sessions between a first host system in one domain having cryptographic apparatus provided with a first master key and a second host system in another domain having cryptograhic apparatus provided with a second master key, an arrangement for establishing a common operational key for cryptographic operations between said host systems comprising:

means in said first host system cryptographic apparatus providing a cross domain key enciphered under a first key encrypting key of said first host system cryptographic apparatus for cross domain communication with said second host system, means in said first host system cryptographic apparatus providing an operational key enciphered under a second key encrypting key of said first host system cryptographic apparatus, cipher means in said first host system cryptographic apparatus operably responsive to said enciphered cross domain key and said enciphered operational key to perform a cryptographic operation for reenciphering said operational key from encipherment under said second key encrypting key to encipherment under said cross domain key for transmission to said second host system, means in said second host system cryptographic apparatus providing said cross domain key enciphered under a first key encrypting key of said second host system cryptographic apparatus, and cipher means in said second host system cryptographic apparatus operably responsive to said second host system enciphered cross domain key and said received enciphered operational key to perform a cryptographic operation for reenciphering said operational key from encipherment under said cross domain key to encipherment under a second key encrypting key of said second host system cryptographic apparatus which is usable by said second host system cryptographic apparatus to perform cryptographic operations with said first host system.

3. In a multiple domain data communication network as defined in claim 2 wherein said second key encrypting key of said first host system cryptographic apparatus is said first master key and said first key encrypting key of said first host system cryptographic apparatus is a variant of said first master key.

4. In a multiple domain data communication network as defined in claim 2 wherein said second key encrypting key of said second host system cryptographic apparatus is said second master key and said first key encrypting key of said second host system cryptographic apparatus is a variant of said second master key.

5. In a multiple domain data communication network as defined in claim 2 wherein said second key encrypting key of said first host system cryptographic apparatus is said first master key and said second key encrypting key of said second host system cryptographic apparatus is said second master key.

6. In a multiple domain data communication network providing communication security for communication sessions between a first host system in one domain having cryptographic apparatus provided with a first master key and a second host system in another domain having cryptographic apparatus provided with a second master key where the cryptographic apparatus of each host system provides a cross domain key for cryptographic cross domain communication wit the other host system, an arrangement in said first host cryptographic apparatus for protecting the cross domain key provided by said first host system cryptographic apparatus comprising:

first host system working key storage means, means storing a first key encrypting key of said first host system in said first host working key storage means as a working key, means providing first input data representing said cross domain key provided by said first host system, and cipher means operable in a first cipher function to encipher said input data under control of said working key to obtain ciphertext representing said cross domain key provided by said first host system enciphered under said first key encrypting key.

7. In a multiple domain data communication network as defined in claim 6 wherein said first key encrypting key is a variant of said first master key.

8. In a multiple domain data communication network as defined in claim 6 for further providing an arrangement in said first host system cryptographic apparatus for protecting the cross domain key provided by said second host system wherein said first host system cryptographic apparatus further includes:

means storing a second key encrypting key of said first host system in said working key storage means to replace said first key encrypting key as the present working key said input means providing second input data representing said cross domain key provided by said second host system, said cipher means operable in a second cipher function to encipher said second input data under control of said present working key to obtain ciphertext representing said cross domain key providing by said second host system enciphered under said second key encrypting key.

9. In a multiple domain data communication network as defined in claim 8 wherein said first and second key encrypting keys are first and second variants, respectively, of said first master key.

10. In a multiple domain communication network as defined in claim 6 for further providing an arrangement in said second host system cryptographic apparatus for protecting said cross domain key provided by said first host system cryptographic apparatus comprising:
  second host system working key storage means,
  means storing a first key encrypting key of said second host system in said second host system working key storage means as a second host working key,
  means providing second host system input data representing said cross domain key provided by said first host system, and
  second host system cipher means operable in a first cipher function to encipher said second host system input data under control of said second host working key to obtain ciphertext representing said cross domain key provided by said first host system enciphered under said first key encrypting key of said second host system.

11. In a multiple domain communication network as defined in claim 10 wherein said first key encrypting key of said second host system cryptographic apparatus is a variant of said second master key.

12. In a multiple domain data communication network providing communication security for data communication sessions between a terminal associated with a first host system in one domain and an application program associated with a second host system in another domain where said terminal, said first host system and said second host system having cryptographic apparatus provided with a terminal master key, a first master key and a second master key, respectively, an arrangement for establishing a cryptographic cross domain communication session between said terminal and said application program comprising:
  means in said first host system cryptographic apparatus providing said terminal master key enciphered under a first key encrypting key of said first host system cryptographic apparatus,
  means in said first host system cryptographic apparatus providing an operational key enciphered under a second key encrypting key of said first host system cryptographic apparatus,
  cipher means in said first host system cryptographic apparatus operably responsive to said enciphered terminal master key and said enciphered operational key for performing a first cryptographic operation to reencipher said operational key from encipherment under said second key encrypting key to encipherment under said terminal master key,
  means in said first host system cryptographic apparatus providing a cross domain key enciphered under said first key encrypting key,
  said cipher means operably responsive to said enciphered cross domain key and said operational key enciphered under said second key encrypting key for performing a second cryptographic operation to reencipher said operational key from encipherment under said second key encrypting key to encipherment under said cross domain key for transmission with said operational key enciphered under said terminal master key to said second host system,
  means in said second host system cryptographic apparatus providing said cross domain key enciphered under a first key encrypting key of said second host system cryptographic apparatus, and
  cipher means in said second host system cryptographic apparatus operably responsive to said cross domain key enciphered under said first key encrypting key of said second host system and said received operational key enciphered under said cross domain key for performing a cryptographic operation to reencipher said operational key from encipherment under said cross domain key to encipherment under a second key encrypting key of said second host system cryptographic apparatus for transmission with said operational key enciphered under said terminal master key to said application program,
  said application program transmitting said operational key enciphered under said terminal master key to said terminal so that said operational key in enciphered form is commonly available at said terminal and said application program for subsequent cryptographic operations.

13. In a multiple domain data communication network as defined in claim 12 wherein said second key encrypting key of said first host system cryptographic apparatus is said first master key and said first encrypting key of said first host system cryptographic apparatus is a variant of said first master key.

14. In a multiple domain data communication network as defined in claim 12 wherein said second key encrypting key of said second host system cryptographic apparatus is said second master key and said first encrypting key of said second host system cryptographic apparatus is a variant of said second master key.

15. In a multiple domain communication network as defined in claim 12 wherein said terminal cryptographic apparatus is operably responsive to terminal plaintext and said operational key enciphered under said terminal master key for performing an encipher operation to obtain terminal ciphertext representing said terminal plaintext enciphered under said operational key for transmission to said second host system.

16. In a multiple domain communication network as defined in claim 15 wherein said second host system cryptographic apparatus is operably responsive to said terminal ciphertext and said operational key enciphered under said second key encrypting key of said second host system for performing a decipher operation to obtain said terminal plaintext at said second host system for use by said application program.

17. In a multiple domain communication network as defined in claim 12 wherein said second host system cryptographic apparatus is operably responsive to second host system plaintext and said operational key enciphered under said second key encrypting key of said second host system for performing an encipher operation to obtain second host system ciphertext representing said second host system plaintext enciphered under said operational key for transmission to said terminal.

18. In a multiple domain communication network as defined in claim 17 wherein said terminal cryptographic apparatus is operably responsive to said second host system ciphertext and said operational key enciphered under said terminal master key for performing a decipher operation to obtain said second host system plaintext at said terminal.

19. In a multiple domain data communication network providing communication security for data communication sessions between a first application program associated with a first host system in one domain and a second application program associated with a second host system in another domain where said first host system has cryptographic apparatus provided with a first master key and an application key associated with said first application program and said second host system has cryptographic apparatus provided with a second master key, an arrangement for establishing a cryptographic cross domain communication session between said application programs comprising:

means in said first host system cryptographic apparatus providing said application key enciphered under a first key encrypting key of said first host system cryptographic apparatus, means in said first host system cryptographic apparatus providing an operational key enciphered under said application key, cipher means in said first host system cryptographic apparatus operably responsive to said enciphered application key and said enciphered operational key for performing a first cryptographic operation to reencipher said operational key from encipherment under said application key to encipherment under a second key encrypting key of said first host system cryptographic apparatus, means in said first host system cryptographic apparatus providing a cross domain key enciphered under a third key encrypting key of said first host system cryptographic apparatus, said cipher means operably responsive to said enciphered cross domain key and said operational key enciphered under said second key encrypting key for performing a second cryptographic operation to reencipher said operational key from encipherment under said second key encrypting key to encipherment under said cross domain key for transmission with said operational key enciphered under said application key to said second host system, means in said second host system cryptographic apparatus providing said cross domain key enciphered under a first key encrypting key of said second host system cryptographic apparatus, and cipher means in said second host system cryptographic apparatus operably responsive to said cross domain key enciphered under said first key encrypting key of said second host system and said received operational key enciphered under said cross domain key for performing a cryptographic operation to reencipher said operational key from encipherment under said cross domain key to encipherment under a second key encrypting key of said second host system cryptographic apparatus for transmission with said operational key enciphered under said application key to second said application program, said application program transmitting said operational key enciphered under said application key to said first application program, and said cipher means in said first host system cryptographic apparatus operably responsive to said application key enciphered under said first key encrypting key of said first host system and said received enciphered operational key for performing a third cryptographic operation to reencipher said operational key from encipherment under said application key to encipherment under said second key encrypting key of said first host system for use by said first application program so that said operational key in enciphered form is commonly available to said application programs for subsequent cryptographic operations.

20. In a multiple domain data communication network as defined in claim 19 wherein said second key encrypting key of said first host system cryptographic apparatus is said first master key and said first and third key encrypting keys of said first host system cryptographic apparatus are first and second variants, respectively, of said first master key.

21. In a multiple domain data communication network as defined in claim 19 wherein said second key encrypting key of said second host system cryptographic apparatus is said second master key and said first key encrypting key of said second host system cryptographic apparatus is a variant of said second master key.

22. In a multiple domain communication network as defined in claim 19 wherein said first host system cryptographic apparatus is operably responsive to first host system plaintext in accordance with said first application program and said operational key enciphered under said application key for performing an encipher operation to obtain first host system ciphertext representing said first host system plaintext enciphered under said operational key for transmission to said second host system.

23. In a multiple domain communication network as defined in claim 22 wherein said second host system cryptographic apparatus is operably responsive to said first host system ciphertext and said operational key enciphered under said second key encrypting key of said second host system for performing a decipher operation to obtain said first host system plaintext at said second host system for use by said second application program.

24. In a multiple domain communication network as defined in claim 19 wherein said second host system cryptographic apparatus is operably responsive to second host system plaintext and said operational key enciphered under said second key encrypting key of said second host system for performing an encipher operation to obtain second host system ciphertext representing said second host system plaintext enciphered under said operational key for transmission to said first host system.

25. In a multiple domain communication network as defined in claim 24 wherein said first host system cryptographic apparatus is operably responsive to said second host system ciphertext and said operational key enciphered under said second key encrypting key of said first host system for performing a decipher operation to obtain said second host system plaintext at said first host system for use by said first application program.

26. In a multiple domain data communication network providing communication security for data communication sessions between a first host system in one domain having cryptographic apparatus provided with a first master key and a second host system in another domain having cryptographic apparatus provided with a second master key, the method of establishing a common operational key for cryptographic operations between said host systems comprising the steps of:

providing a cross domain key enciphered under a first key encrypting key of said first host system cryptographic apparatus for cross domain communication with said second host system providing an operational key in protected form, carrying out a cryptographic operation at said first host system cryptographic apparatus in accordance with said enciphered cross domain key and said protected operational key to provide said operational key enciphered under said cross domain key, communicating said operational key enciphered under said cross domain key to said second host system, providing said cross domain key enciphered under a first key encrypting key of said second host cryptographic apparatus, and carrying out a cryptographic operation at said second host system cryptographic apparatus in accordance with said cross domain key enciphered under said first key encrypting key of said second host system and said received operational key enciphered under said cross domain key to provide said operational key enciphered under a second key encrypting key of said second host system cryptographic apparatus which is usable by said second host system cryptographic apparatus to perform cryptographic operations with said first host system.

27. In a multiple domain data communication network providing communication security for data communication sessions between a first host system in one domain having cryptographic apparatus provided with a first master key and a second host system in another domain having cryptographic apparatus provided with a second master key, the method for establishing a common operational key for cryptographic operations between said host systems comprising the steps of:

providing a cross domain key enciphered under a first key encrypting key of said first host system cryptographic apparatus for cross domain communication with said second host system, providing an operational key enciphered under a second key encrypting key of said first host system cryptographic apparatus, carrying out a cryptographic operation at said first host system cryptographic apparatus in accordance with said enciphered cross domain key and said enciphered operational key to provide said operational key enciphered under said cross domain key, communicating said operational key enciphered under said cross domain key to said second host system, providing said cross domain key enciphered under a first key encrypting key of said second host system cryptographic apparatus, and carrying out a cryptographic operation at said second host system cryptographic apparatus in accordance with said cross domain key enciphered under said first key encrypting key of said second host system and said received operational key enciphered under said cross domain key to provide said operational key enciphered under a second key encrypting key of said second host system crypotgraphic apparatus which is usable by said second host system cryptographic apparatus to perform cryptographic operations with said first host system.

28. In a multiple domain data communication network providing communication security for data communication sessions between a terminal associated with a first host system in one domain and an application program associated with a second host system in another domain where said terminal, said first host system and said second host system have cryptographic apparatus provided with a terminal master key, a first master key and a second master key, respectively, the method of establishing a cryptographic cross domain communication session between said terminal and said application program comprising the steps of:

providing at said first host system said terminal master key enciphered under a first key encrypting key of said first host system cryptographic apparatus, providing at said first host system an operational key enciphered under a second key encrypting key of said first host system cryptographic apparatus, carrying out a first cryptographic operation at said first host system cryptographic apparatus in accordance with said enciphered terminal master key and said enciphered operational key to provide said operational key enciphered under said terminal master key, providing at said first host system a cross domain key enciphered under said first key encrypting key, carrying out a second cryptographic operation at said first host system cryptographic apparatus in accordance with said enciphered cross domain key and said operational key enciphered under said second key encrypting key to provide said operational key enciphered under said cross domain key, communicating said operational key enciphered under said terminal master key and said operational key enciphered under said cross domain key to said second host system, providing at said second host system said cross domain key enciphered under a first key encrypting key of said second host system cryptographic apparatus, carrying out a first cryptographic operation at said second host system cryptographic apparatus in accordance with said cross domain key enciphered under said first key encrypting key of said second host system and said received operational key enciphered under said cross domain key to provide said operational key enciphered under a second key encrypting key of said second host system cryptographic apparatus, communicating said operational key enciphered under said second key encrypting key of said second host system and said operational key enciphered under said terminal master key to said application program, and communicating said operational key enciphered under said terminal master key from said application program to said terminal so that said operational key in enciphered form is commonly available at said terminal and said application program for subsequent cryptographic operations.

29. In a multiple domain data communication network as defined in claim 28 wherein said second key encrypting key of said first host system cryptographic apparatus is said first master key and said first key encrypting key of said first host system is a variant of said first master key.

30. In a multiple domain data communication network as defined in claim 28 wherein said second key encrypting key of said second host system cryptographic apparatus is said second master key and said first key encrypting key of said second host system is a variant of said second master key.

31. In a multiple domain data communication network as defined in claim 28 further providing a cryptographic data communication between said terminal and said application program comprising the further steps of:

providing terminal plaintext at said terminal,
carrying out a cryptographic operation at said terminal cryptographic apparatus to encipher said terminal plaintext in accordance with said operational key enciphered under said terminal master key to provide terminal ciphertext representing said terminal plaintext enciphered under said operational key,
communicating said terminal ciphertext to said second host system, and
carrying out a second cryptographic operation at said second host system cryptographic apparatus to decipher said terminal ciphertext in accordance with said operational key enciphered under said second key encrypting key of said second host system to provide said terminal plaintext for use by said application program.

32. In a multiple domain data communication network as defined in claim 28 further providing a cryptographic data communication between said application program and said terminal comprising the further steps of:

providing second host system plaintext in accordance with said application program,
carrying out a second cryptographic operation at said second host system cryptographic apparatus to encipher said second host system plaintext in accordance with said operational key enciphered under said second key encrypting key of said second host system to provide second host system ciphertext representing said second host system plaintext enciphered under said operational key,
communicating said second host system ciphertext from said application program to said terminal, and
carrying out a cryptographic operation at said terminal cryptographic apparatus to decipher said second host system ciphertext in accordance with said operational key enciphered under said terminal master key to provide said second host system plaintext for use by said terminal.

33. In a multiple domain data communication network providing communication security for data communication sessions between a first application program associated with a first host system in one domain and a second application program associated with a second host system in another domain where said first host system has cryptographic apparatus provided with a first master key and an application key associated with said first application program and said second host system has cryptographic apparatus provided with a second master key, the method of establishing a cryptographic cross domain communication session between said application programs comprising the steps of:

providing at said first host system said application key enciphered under a first key encrypting key of said first host system cryptographic apparatus,
providing at said first host system an operational key enciphered under said application key,
carrying out a first cryptographic at said first host system cryptographic apparatus in accordance with said enciphered application key and said enciphered operational key to provide said operational key enciphered under a second key encrypting key of said first host system cryptographic apparatus,
providing at said first host system a cross domain key enciphered under a third key encrypting key of said first host system cryptographic apparatus,
carrying out a second cryptographic operation at said first host system cryptographic apparatus in accordance with said enciphered cross domain key and said operational key enciphered under said second key encrypting key to provide said operation key enciphered under said cross domain key,
communicating said operational key enciphered under said application key and said operational key enciphered under said cross domain key to said second host system,
providing at said second host system said cross domain key enciphered under a first key encrypting key of said second host system cryptographic apparatus,
carrying out a first cryptographic operation at said second host system cryptographic apparatus in accordance with said cross domain key enciphered under said first key encrypting key of said second host system and said received operational key enciphered under said cross domain key to provide said operational key enciphered under a second key encrypting key of said second host system cryptographic apparatus,
communicating said operational key enciphered under said second key encrypting key of said second host system and said operational key enciphered under said application key to said second application program,
communicating said operational key enciphered under said application key from said second application program to said first application program, and
carrying out a third cryptographic operation at said first host system cryptographic apparatus in accordance with said application key enciphered under said first key encrypting key of said first host system and said received operational key enciphered under said application key to provide said operational key enciphered under said second key encrypting key of said first host system so that said operational key in enciphered form is commonly available to said application programs for subsequent cryptographic operations.

34. In a multiple domain data communication network as defined in claim 33 wherein said second key encrypting key of said first host system cryptographic apparatus is said first master key and said first and third key encrypting keys of said first host system cryptographic apparatus are first and second variants, respectively, of said first master key.

35. In a multiple domain data communication network as defined in claim 33 wherein said second key encrypting key of said second host system cryptographic apparatus is said second master key and said first key encrypting key of said second host system cryptographic apparatus is a variant of said second master key.

36. In a multiple domain data communication network as defined in claim 33 further providing a cryptographic data communication between said first application program and said second application program comprising the steps of:

provided first host system plaintext in accordance with said first application program, carrying out a fourth cryptographic operation at said first host system cryptographic apparatus to encipher said first host system plaintext in accordance with said operational key enciphered under said second key encrypting key of said first host system to provide first host system ciphertext representing said first host system plaintext enciphered under said operational key, communicating said first host system ciphertext to said second host system, and carrying out a second cryptographic operation at said second host system cryptographic apparatus to decipher said first host system ciphertext in accordance with said operational key enciphered under said second key encrypting key of said second host system to provide said first host system plaintext for use by said second application program.

37. In a multiple domain data communication network as defined in claim 33 further providing a cryptographic data communication between said second application program and said first application program comprising the steps of:

providing second host system plaintext in accordance with said second application program, carrying out a second cryptographic operation at said second host system cryptographic apparatus to encipher said second host system plaintext in accordance with said operational key enciphered under said second key encrypting key of said second host system to provide second host system ciphertext representing said second host system plaintext enciphered under said operational key, communicating said second host system ciphertext to said first host system, and carrying out a fourth cryptographic operation at said first host system cryptographic apparatus to decipher said second host system ciphertext in accordance with said operational key enciphered under said second key encrypting key of said first host system to provide said second host system plaintext for use by said first application program.

38. In a multiple domain data communication network providing communication security for data communication sessions between a host system in one domain having cryptographic apparatus provided with multiple keys and a host system in another domain having cryptographic apparatus provided with multiple keys, an arrangement for communicating a cryptographic operational key in protected form provided by one of said host systems to the other of said host systems without revealing the multiple keys of either of said host systems to the other of said host systems comprising:

means in said one of said host systems providing said operational key enciphered under a cross domain key for cross domain communication between said one of said host systems and said other of said host systems, means in said other of said host systems providing said cross domain key enciphered under a first master key of said other of said host systems, and means in said other of said host systems operably responsive to said enciphered cross domain key and said enciphered operational key received from said one of said host systems to perform a cryptographic operation providing said operational key enciphered under a second master key of said other of said host systems which is in usable form for carrying out cryptographic operational functions at said other of said host systems.

39. In a multiple domain data communication network providing communication security for data communication sessions between a host system in one domain having cryptographic apparatus provided with multiple keys and a host system in another domain having cryptographic apparatus provided with multiple keys, an arrangement for communicating a cryptographic operational key in protected form provided by one of said host systems to the other of said host systems without revealing the multiple keys of either of said host systems to the other of said host systems comprising:

means in said one of said host systems providing a cross domain key for cross domain communication between said one of said host systems and said other of said host systems enciphered under a first master key of said one of said host systems, means in said one of said host systems providing said operational key enciphered under a second master key of said one of said host systems, means in said one of said host systems operably responsive to said enciphered cross domain key and said enciphered operational key to perform a cryptographic operation providing said operational key enciphered under said cross domain key for transmission to said other of said host systems, means in said other of said host systems providing said cross domain key enciphered under a first master key of said other of said host systems, and means in said other of said host systems operably responsive to said cross domain key enciphered under said first master key of said other of said host systems and said enciphered operational key received from said one of said host systems to perform a cryptographic operation providing said operational key enciphered under a second master key of said other of said host systems which is in a usable form for carrying out cryptographic operational functions at said other of said host systems.

40. In a multiple domain data communication network providing communication security for data communication sessions between a host system in one domain having cryptographic apparatus providing with multiple keys and a host system in another domain having cryptographic apparatus provided with multiple keys where each host system has a logical unit associated therewith and a logical unit communication key, an arrangement for communicating a cryptographic operational key in protected form provided by one of said host systems to the logical unit associated therewith via the other of said host systems without revealing the multiple keys of either of said host systems to the other of said host systems comprising:

means in said one of said host systems providing said operational key enciphered under the logical unit communication key of the logical unit associated with said one of said host systems, means communicating said enciphered operational key from said one of said host systems to said other of said host systems, means communicating said received enciphered operational key from said other of said host systems to the logical unit associated with said other of said host systems, and means communicating said enciphered operational key from the logical unit associated with said other of said host systems to the logical unit associated with said one of said host systems.

41. In a multiple domain data communication network as defined in claim 40 wherein said logical unit associated with said one of said host systems is a terminal and the logical unit associated with the other of said host systems is an application program.

42. In a multiple domain data communication network as defined in claim 40 wherein said logical units associated with said host systems are application programs.

43. In a multiple domain data communication network providing communication security for data communication sessions between a host system in one domain having cryptographic apparatus provided with multiple keys and a host system in another domain having cryptographic apparatus provided with multiple keys, the method of communicating a cryptographic operational key in protected form providing by one of said host systems to the other of said host systems without revealing the multiple keys of either of said host systems to the other of said host systems comprising the steps of:

providing at said one of said host systems said operational key enciphered under a cross domain key for cross domain communication between said one of said host systems and said other of said host systems, providing at said other of said host systems said cross domain key enciphered under a first master key of said other of said host systems, and carrying out a cryptographic operation at said second host system in accordance with said enciphered cross domain key and said enciphered operational key received from said one of said host systems to provide said operational key enciphered under a second master key of said other of said host systems which is in usable form for carrying out cryptographic operational functions at said other of said host systems.

44. In a multiple domain data communication network providing communication security for data communication sessions between a host system in one domain having cryptographic apparatus provided with multiple keys and a host system in another domain having cryptographic apparatus provided with multiple keys, the method of communicating a cryptographic operational key in protected form provided by one of said host systems to the other of said host systems without revealing the multiple keys of either of said host systems to the other of said host systems comprising:

providing at said one of said host systems a cross domain key for cross domain communication between said one of said host systems and said other of said host systems enciphered under a first master key of said one of said host systems, providing at said one of said host systems said operational key enciphered under a second master key of said one of said host systems, carrying out a cryptographic operation at said one of said host systems in accordance with said enciphered cross domain key and said enciphered operational key to provide said operational key enciphered under said cross domain key for transmission to said other of said host systems, providing at said other of said host systems said cross domain key enciphered under a first master key of said other of said host systems, and carrying out a cryptographic operation at said other of said host systems in accordance with said cross domain key enciphered under said first master key of said other of said host systems and said enciphered operational key received from said one of said host systems to provide said operational key enciphered under a second master key of said other of said host systems which is in a usable form for carrying out cryptographic operational functions at said other of said host systems.

45. In a multiple domain data communication network providing communication security for data communication sessions between a host system in one domain having cryptographic apparatus provided with multiple keys and a host system in another domain having cryptographic apparatus provided with multiple keys where each host system has a logical unit associated therewith and a logical unit communication key, the method of communicating a cryptographic operational key in protected form provided by one of said host systems to the logical unit associated therewith via the other of said host systems without revealing the multiple keys of either of said host systems to the other of said host systems comprising the steps of:

providing at said one of said host systems said operational key enciphered under the logical unit communication key of the logical unit associated with said one of said host systems for communication from said one of said host systems to said other of said host systems, communicating said enciphered operational key from said other of said host systems to the logical unit associated with said other of said host systems, and communicating said enciphered operational key from the logical unit associated with said other of said host systems to the logical unit associated with said one of said host systems.

46. In the method defined in claim 45 wherein said logical unit associated with said one of said host systems is a terminal and the logical unit associated with the other of said host systems is an application program.

47. In the method as defined in claim 45 wherein said logical units associated with said host systems are application programs.

* * * * *

UNITED STATES PATENT AND TRADEMARK OFFICE
CERTIFICATE OF CORRECTION

PATENT NO. : 4,227,253
DATED : October 7, 1980
INVENTOR(S) : William F. Ehrsam et al.

It is certified that error appears in the above—identified patent and that said Letters Patent is hereby corrected as shown below:

Figure 26a1 to Figure 26i2 has been inserted as part of Letters Patent No. 4,227,253 as shown on the attached sheets.

On the title page, "66 Drawing Figures" should read -- 101 Drawing Figures --.

Signed and Sealed this

Sixteenth Day of February 1982

[SEAL]

Attest:

GERALD J. MOSSINGHOFF

Attesting Officer     Commissioner of Patents and Trademarks

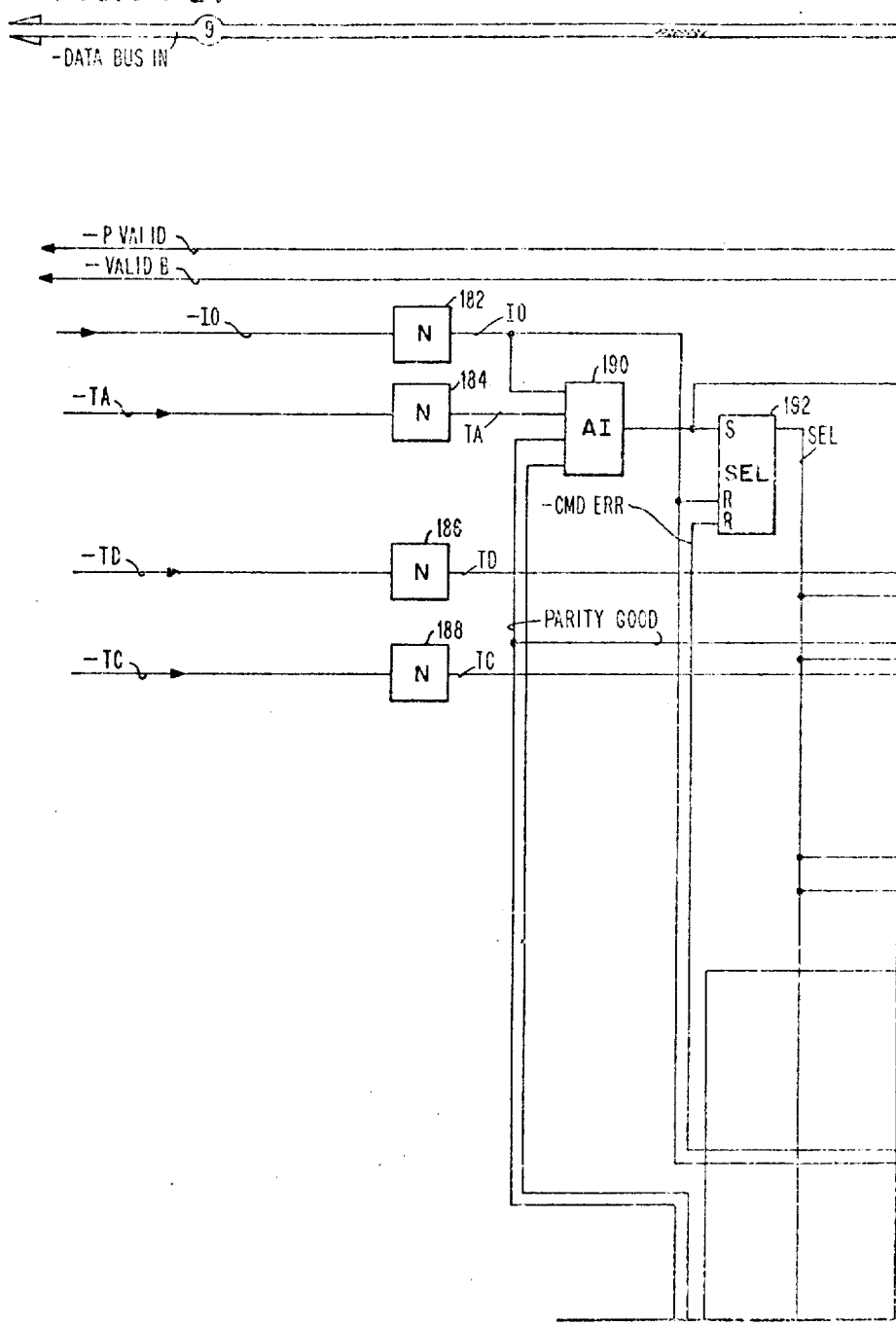
FIG. 26 a1

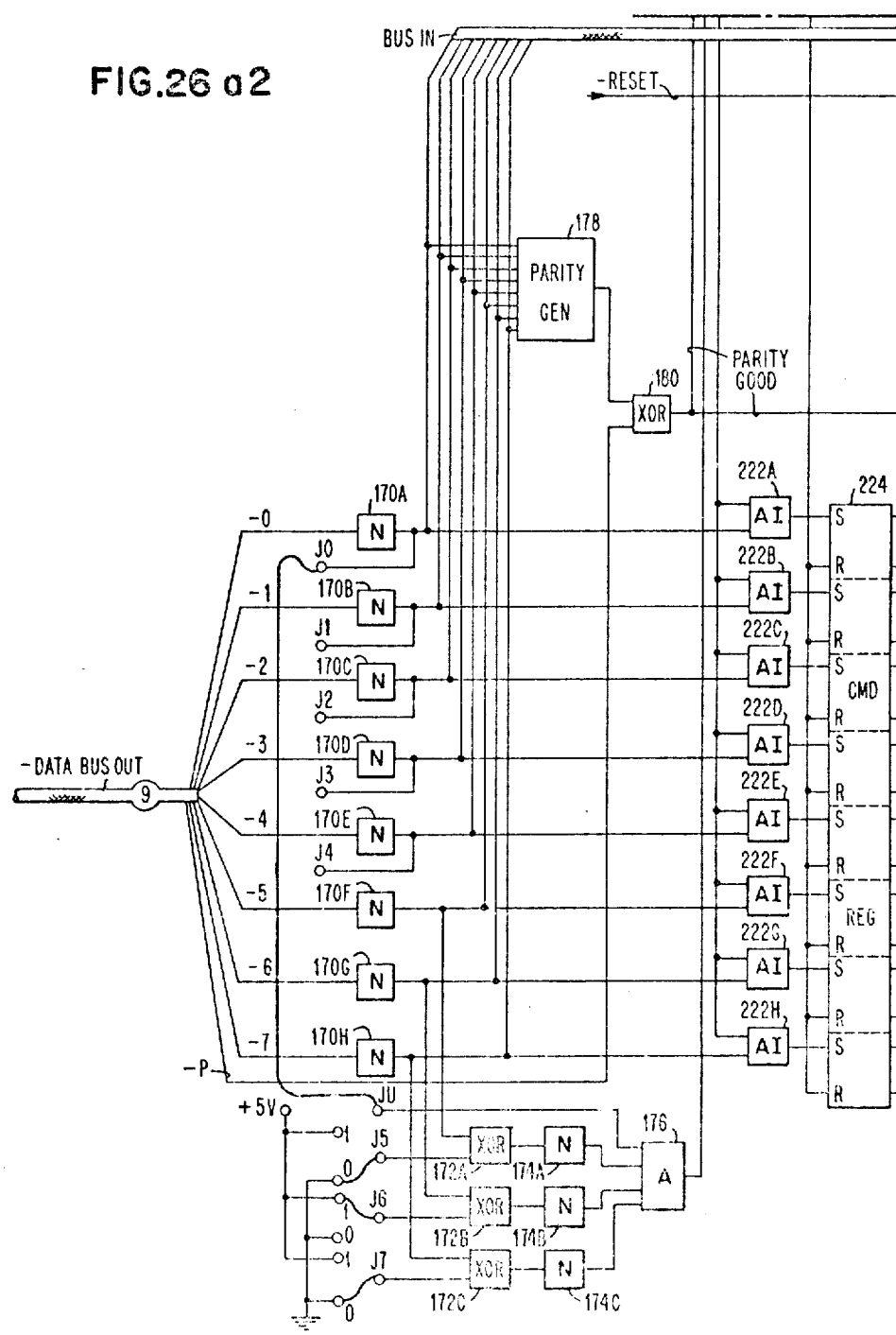
FIG.26 a2

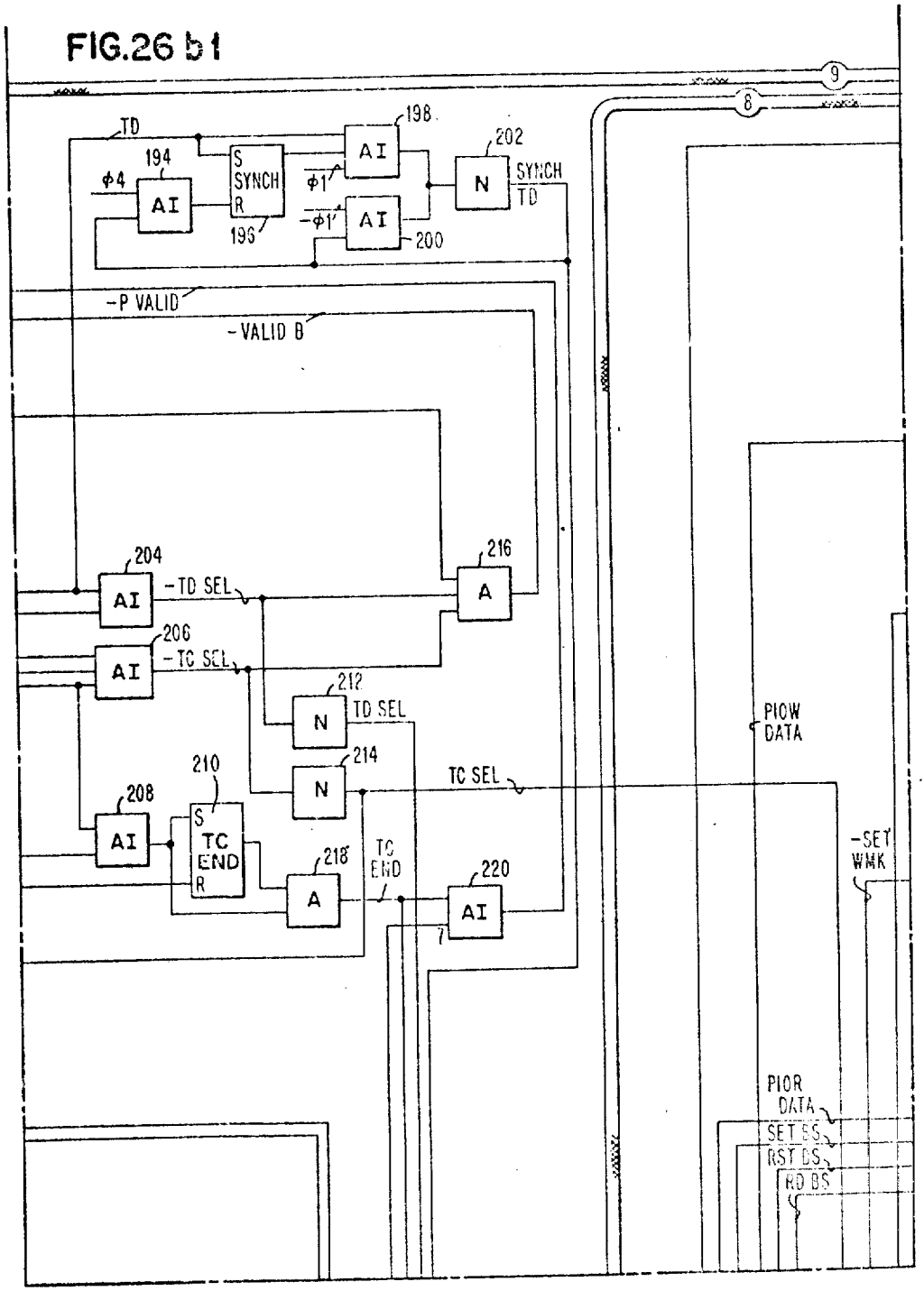
FIG.26 b1

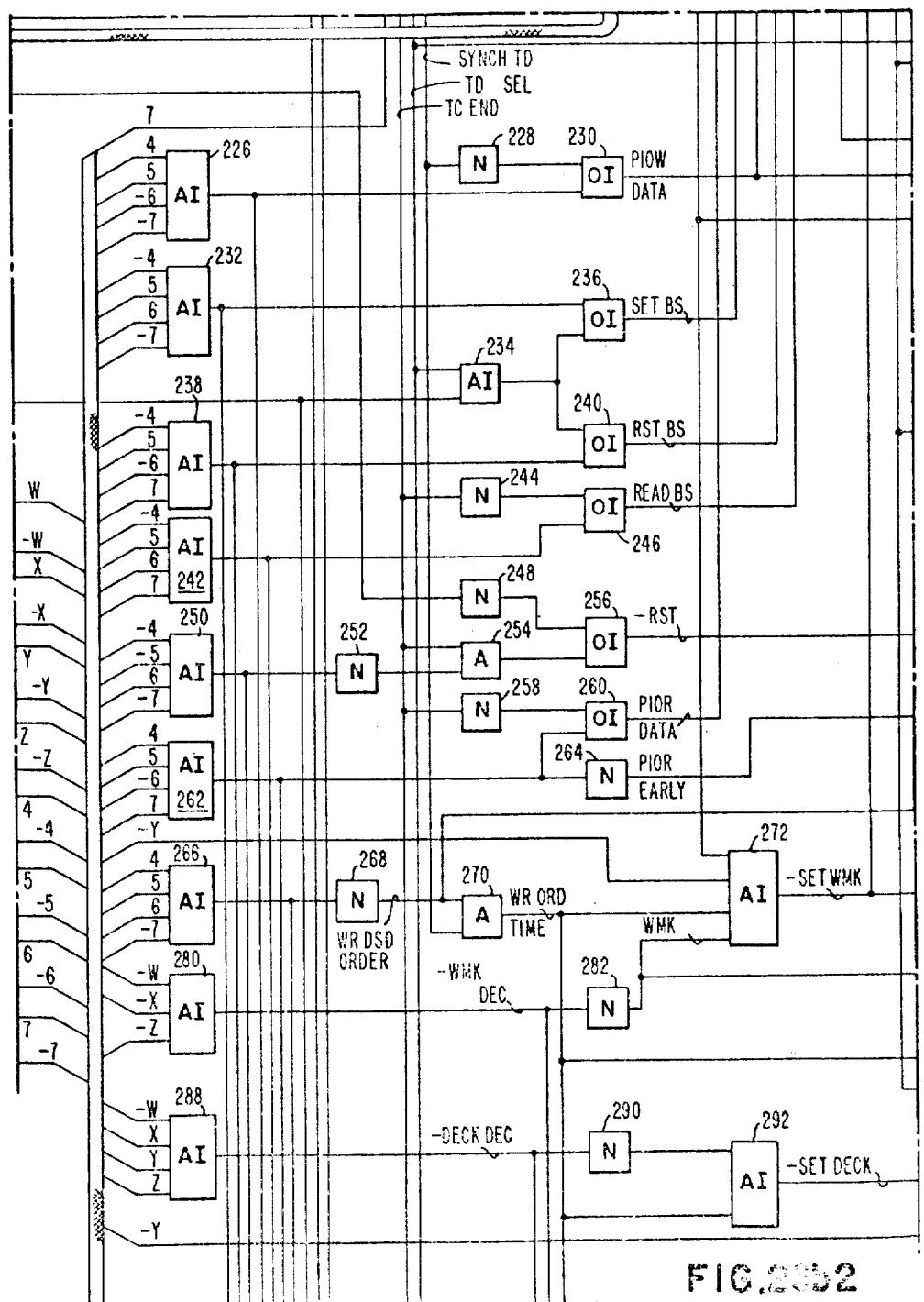

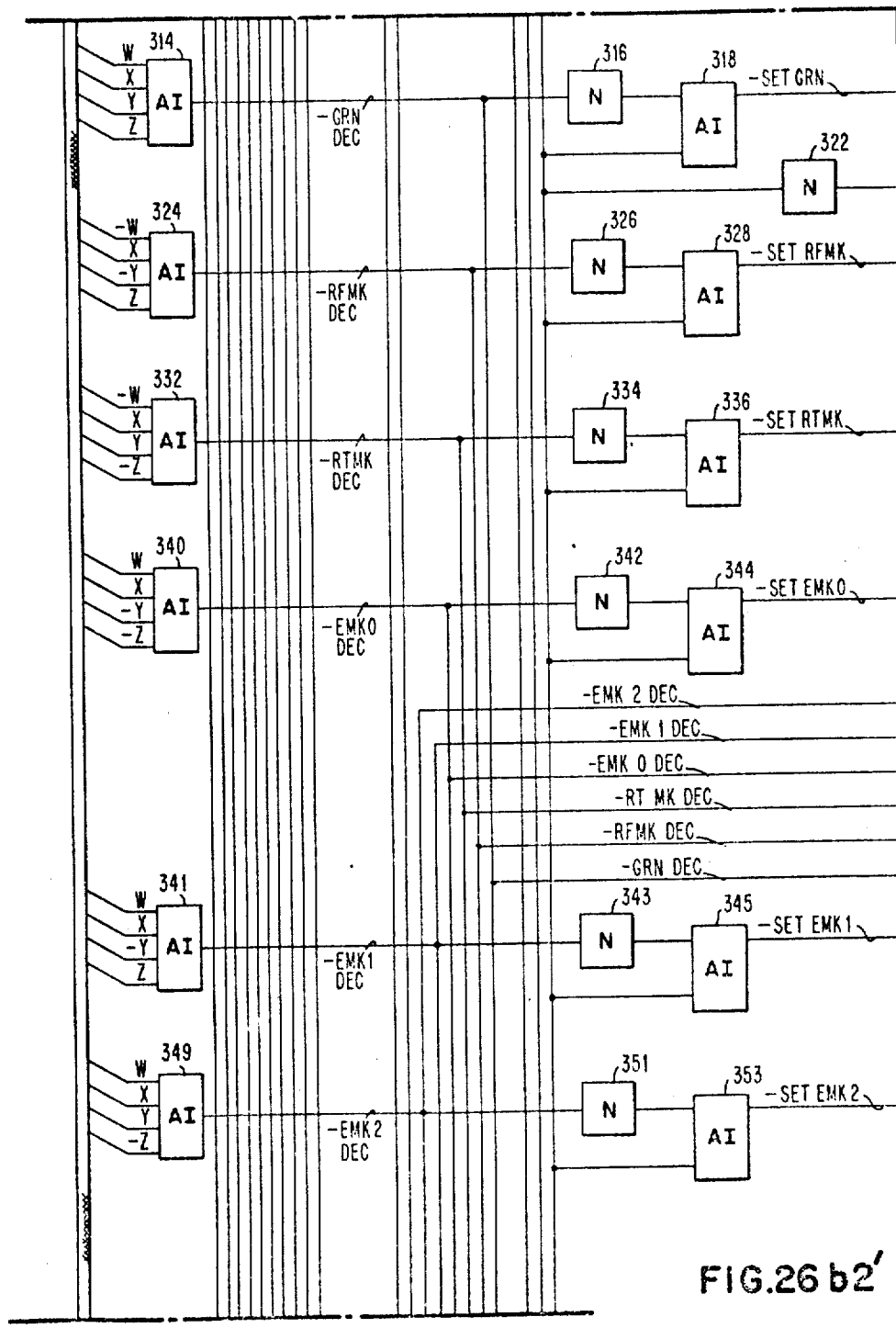
FIG.26 b2'

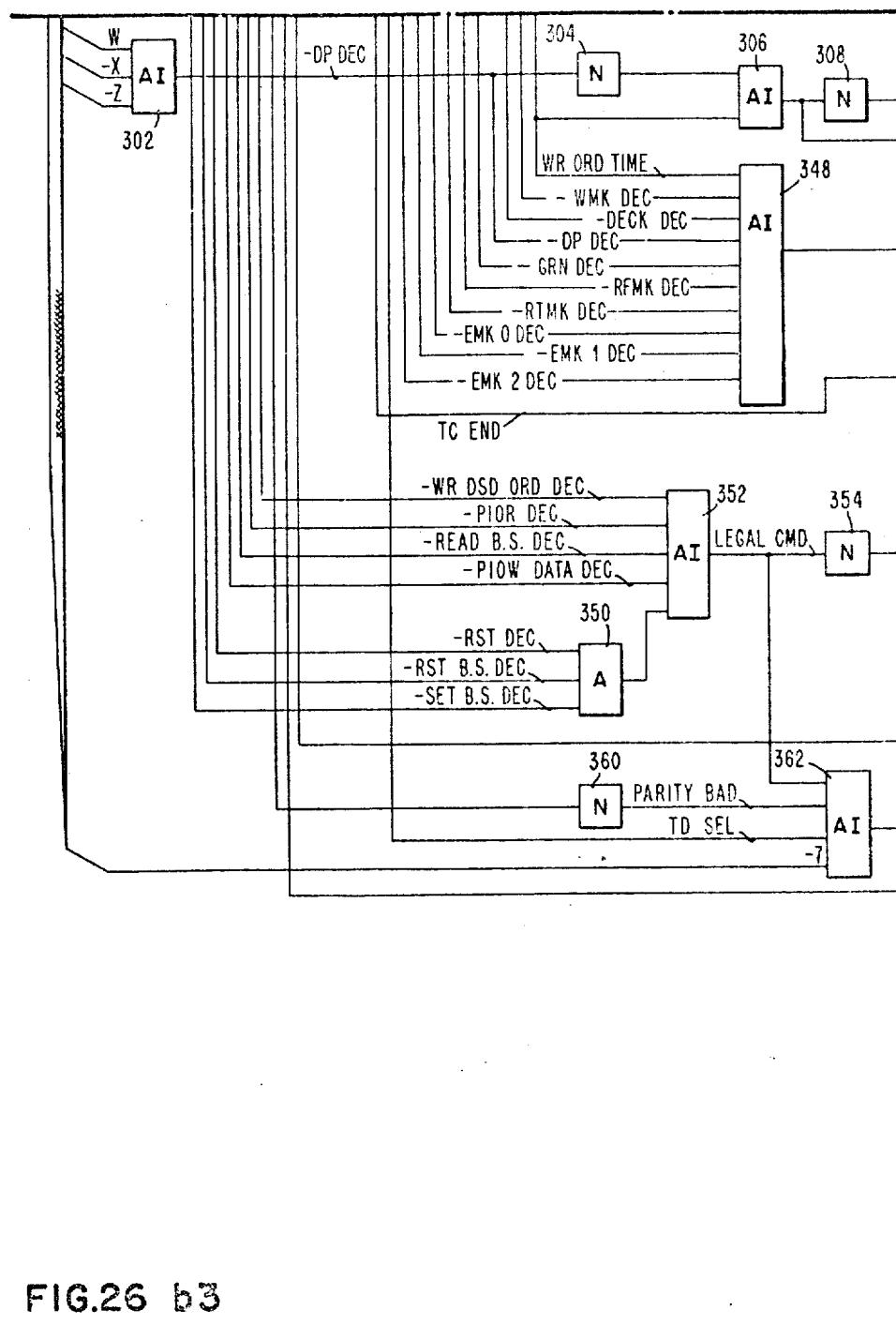
FIG.26 b3

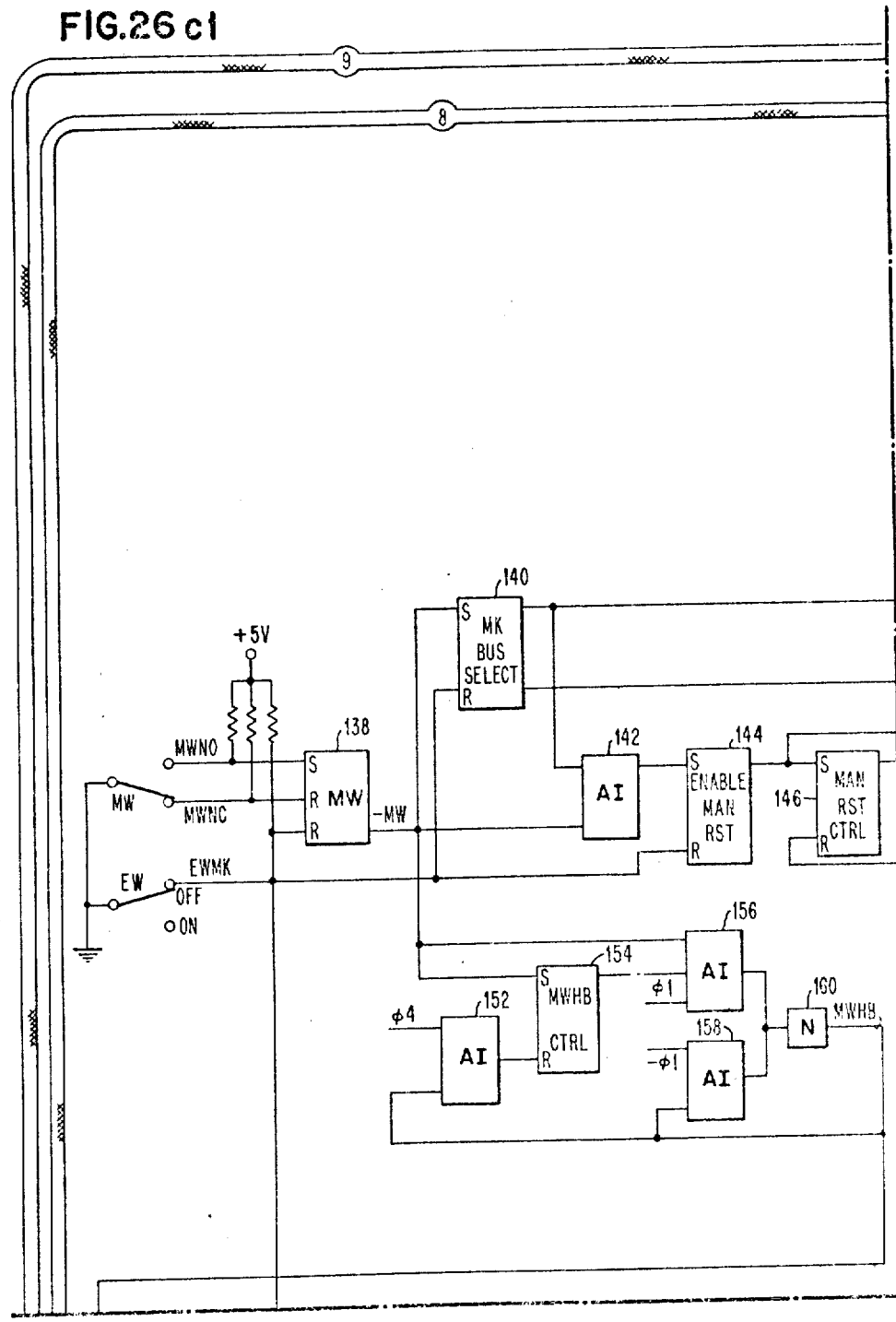
FIG.26 c1

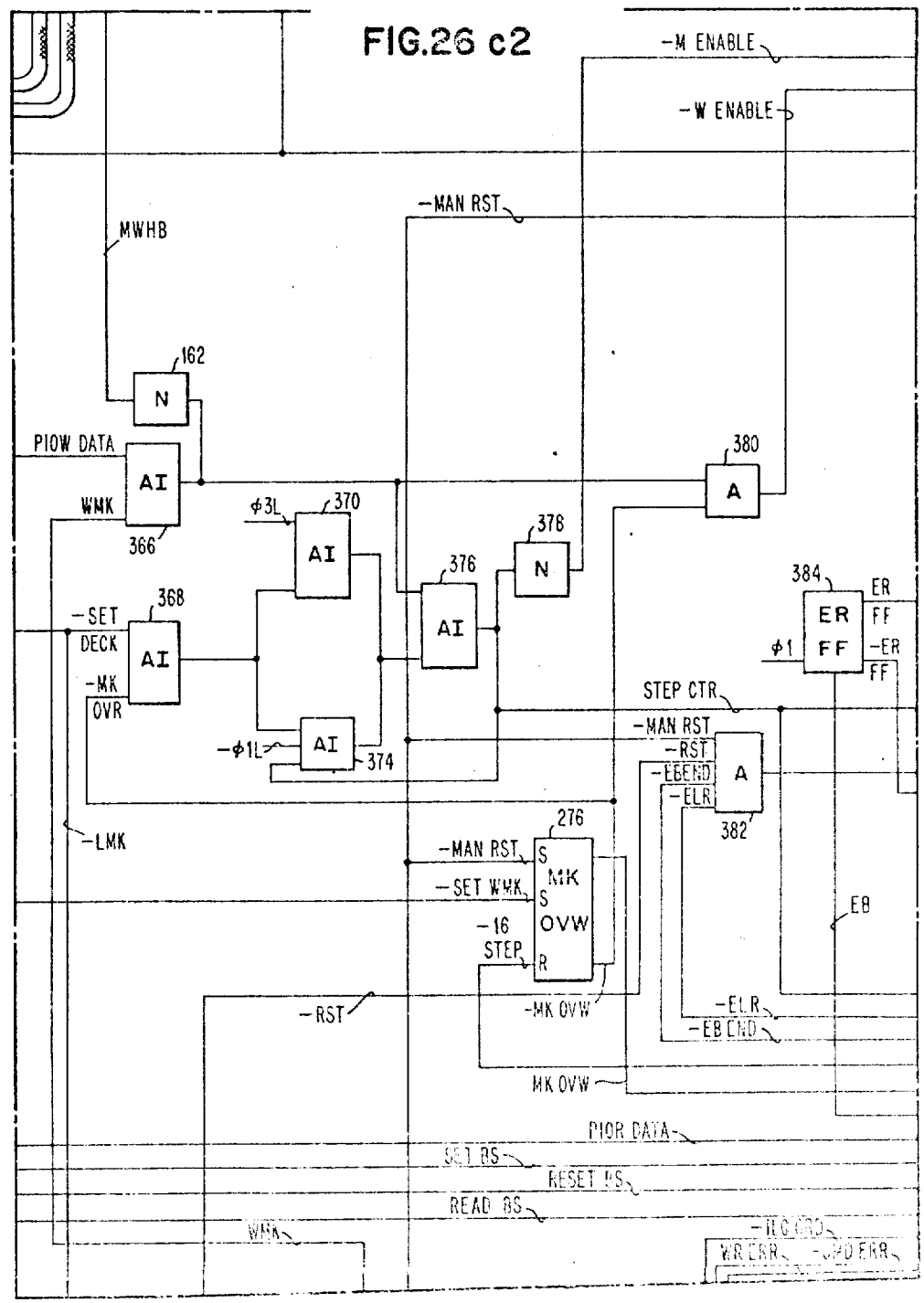
FIG.26 c2

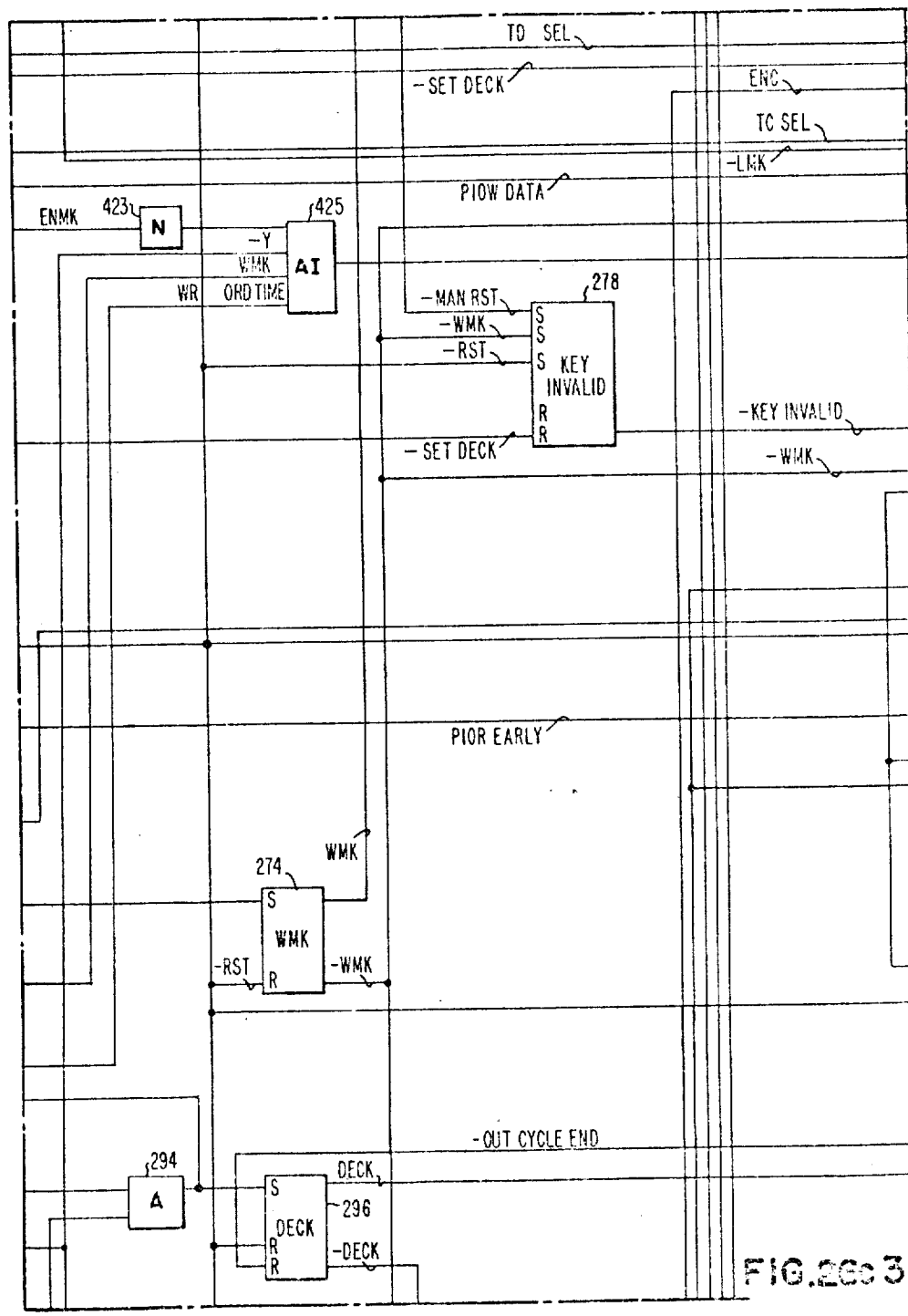
FIG. 26c3

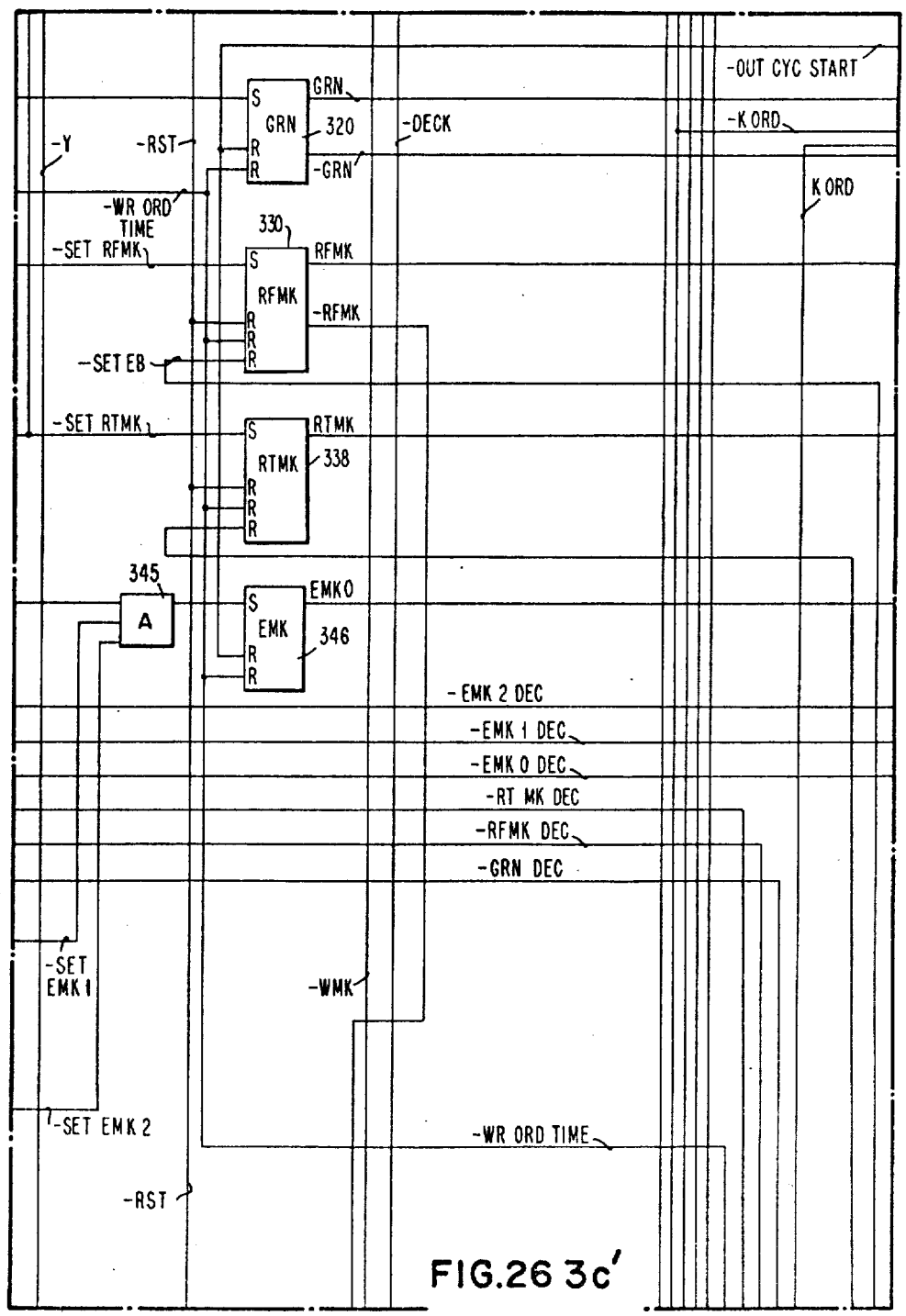
FIG.26 3c'

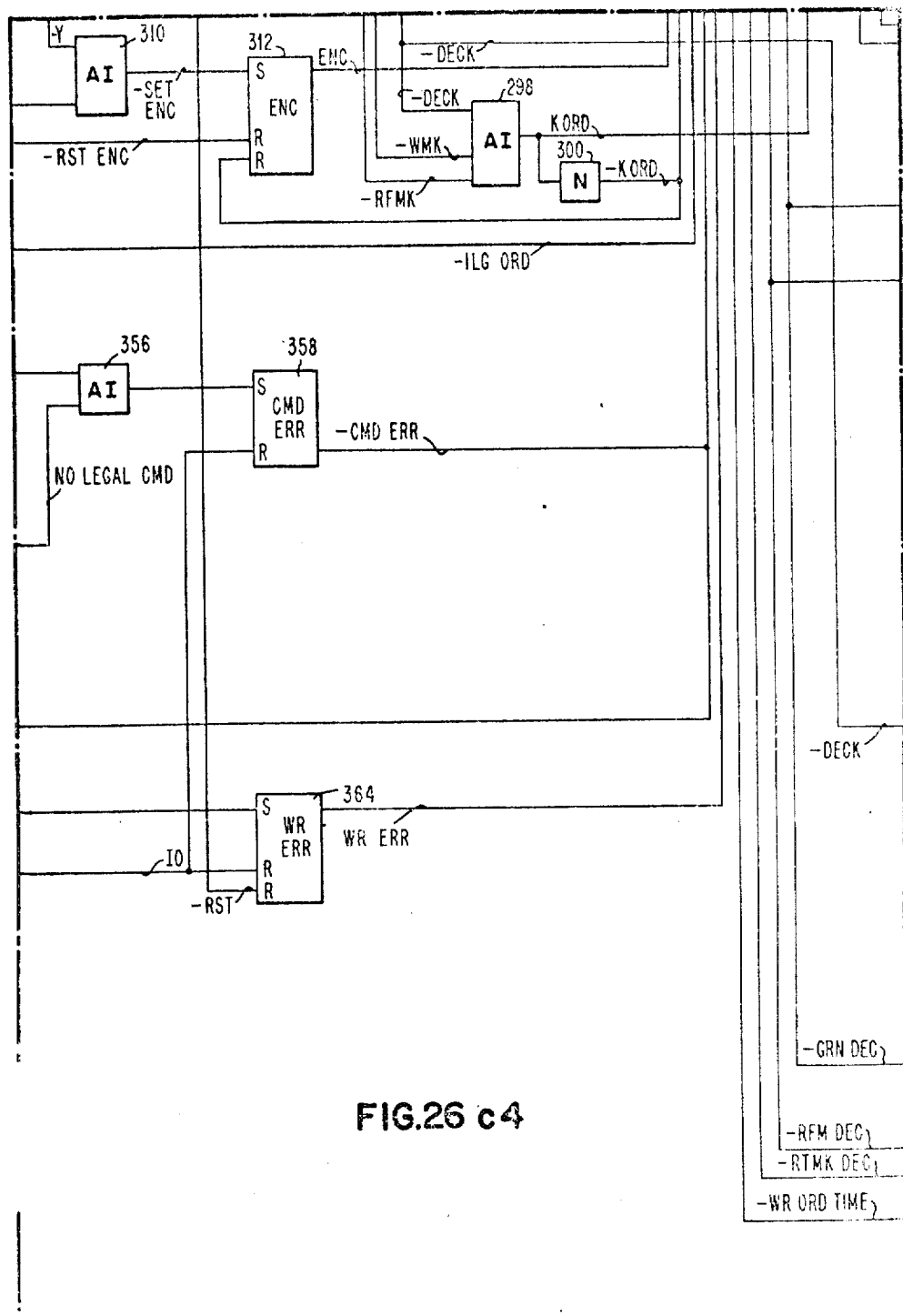
FIG.26 c4

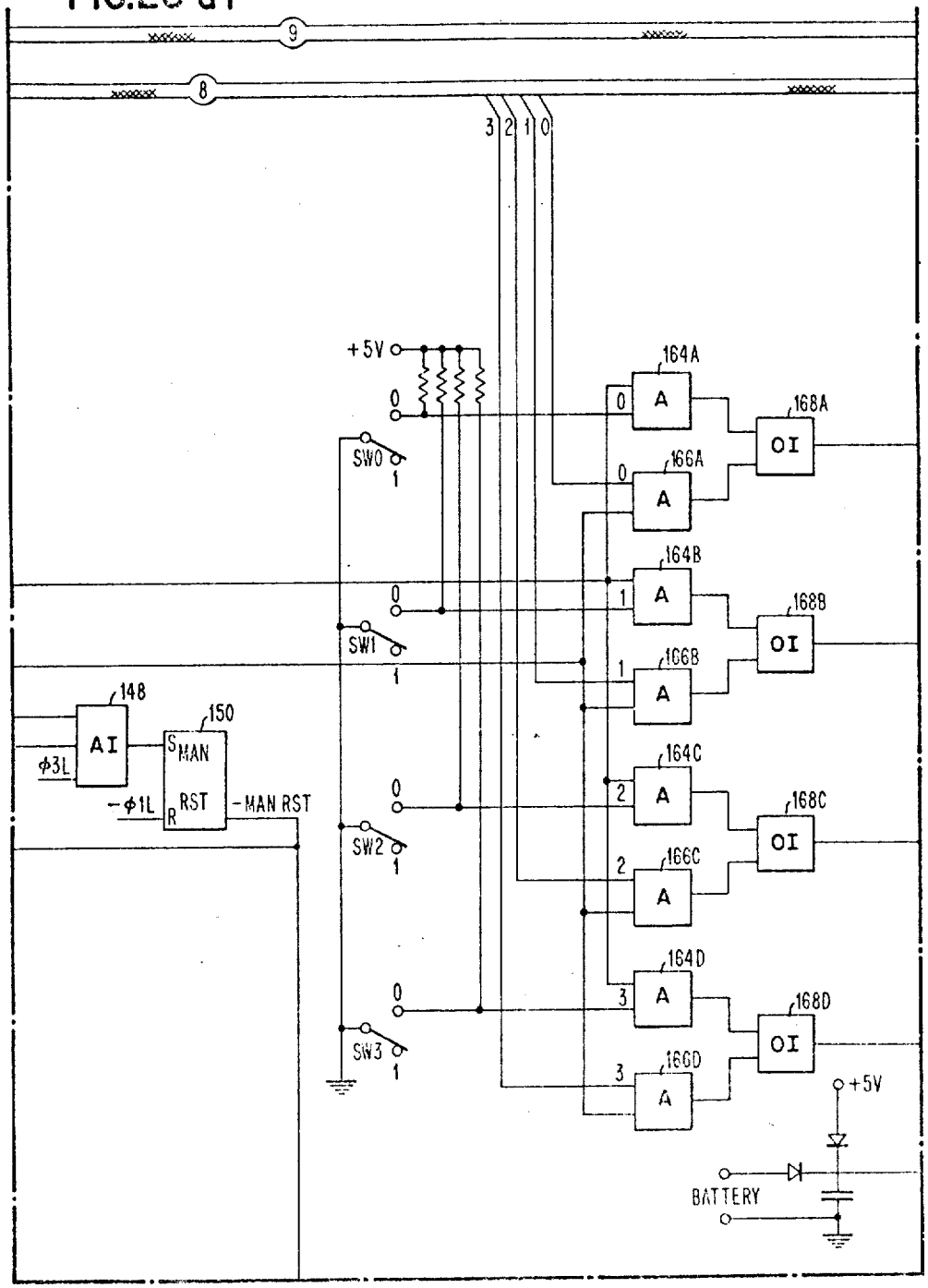
FIG.26 d1

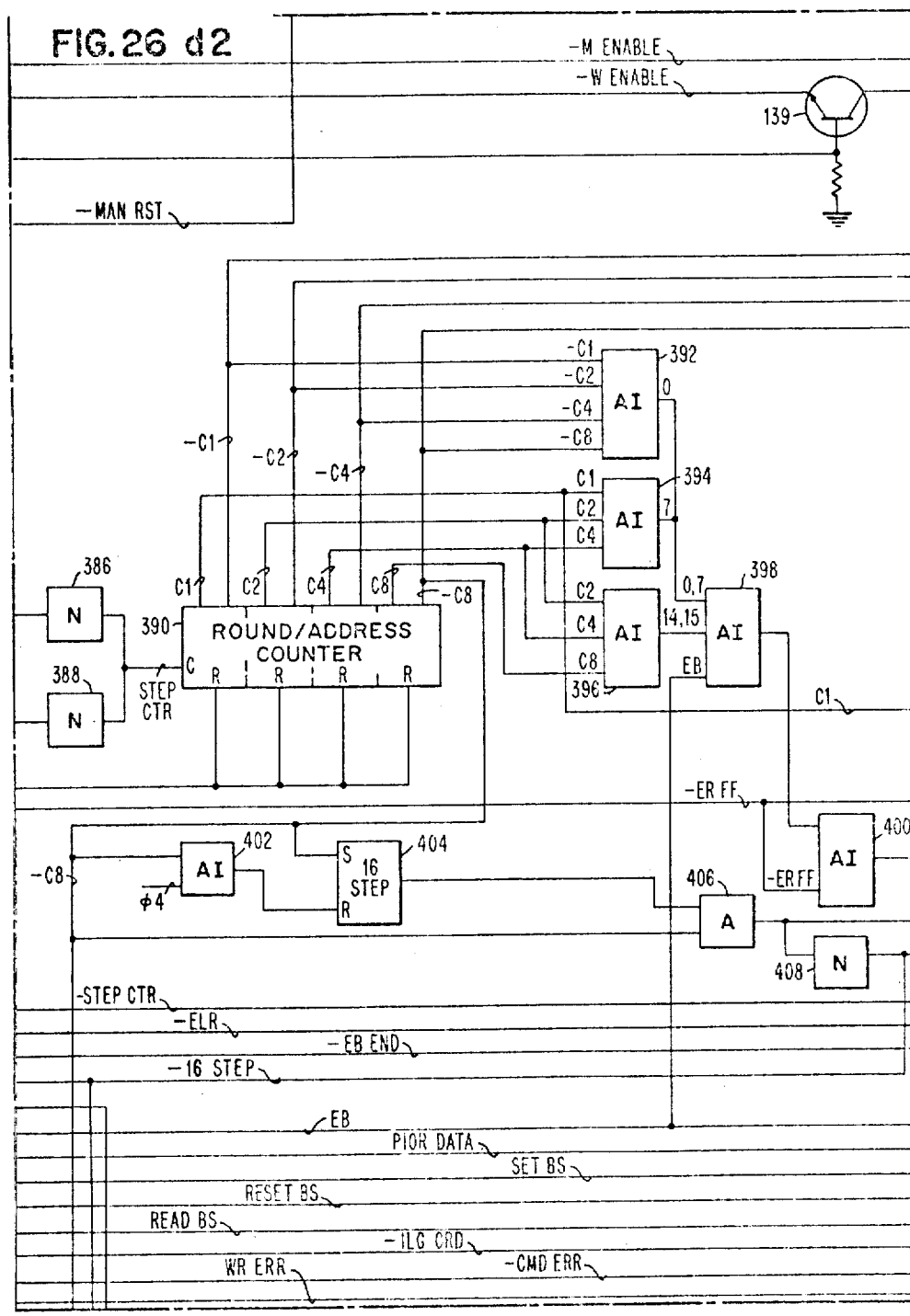

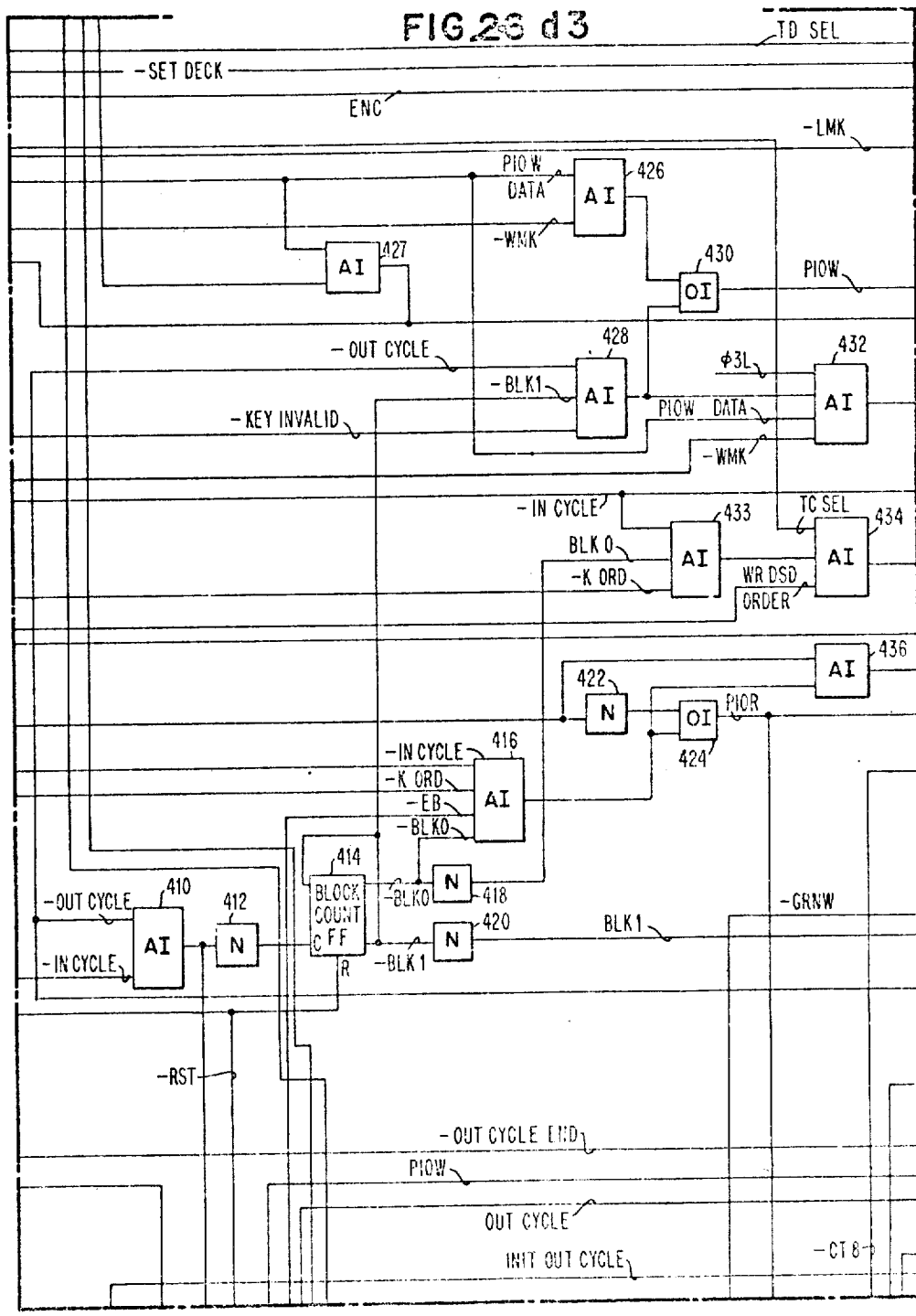

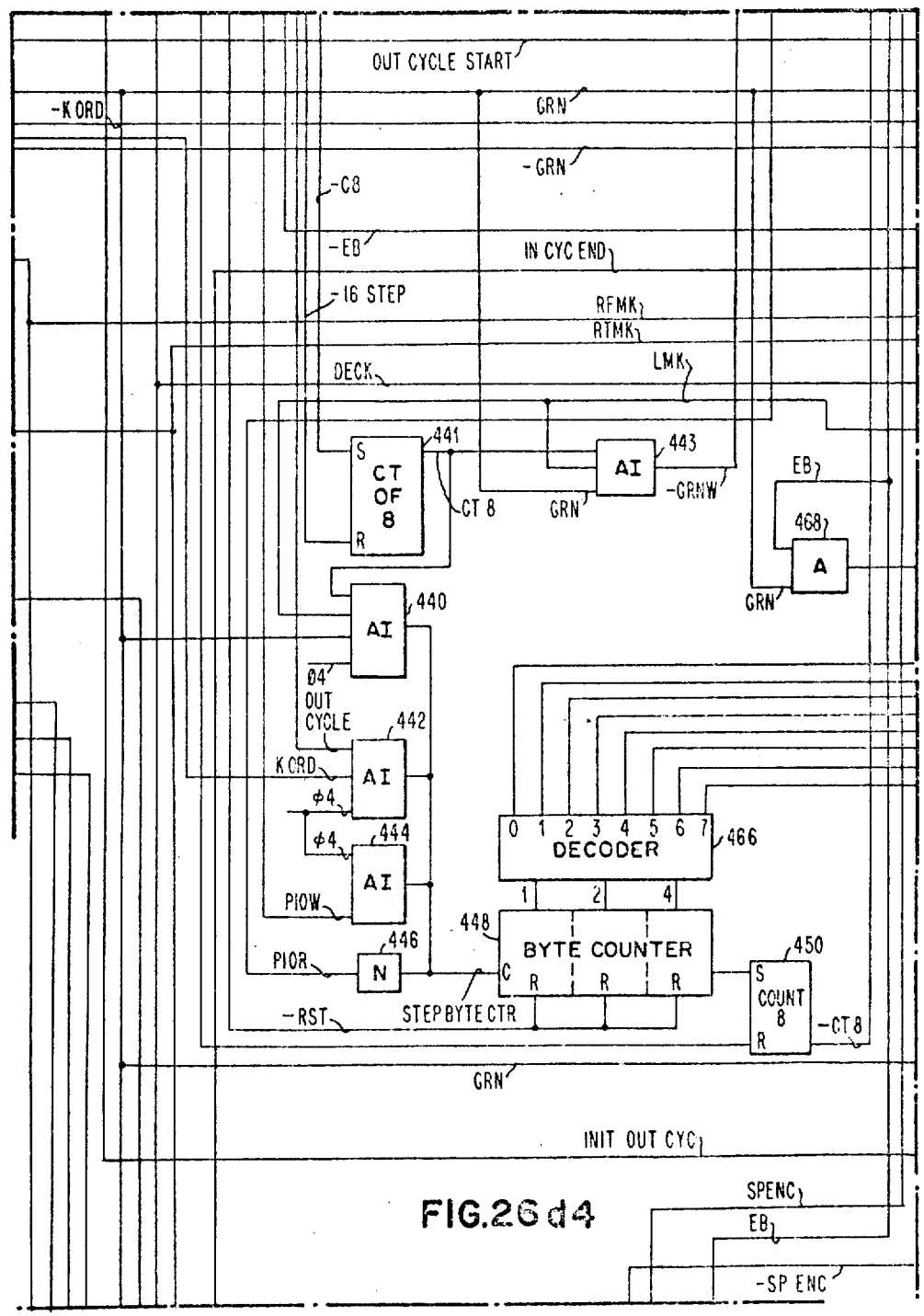
FIG.26d4

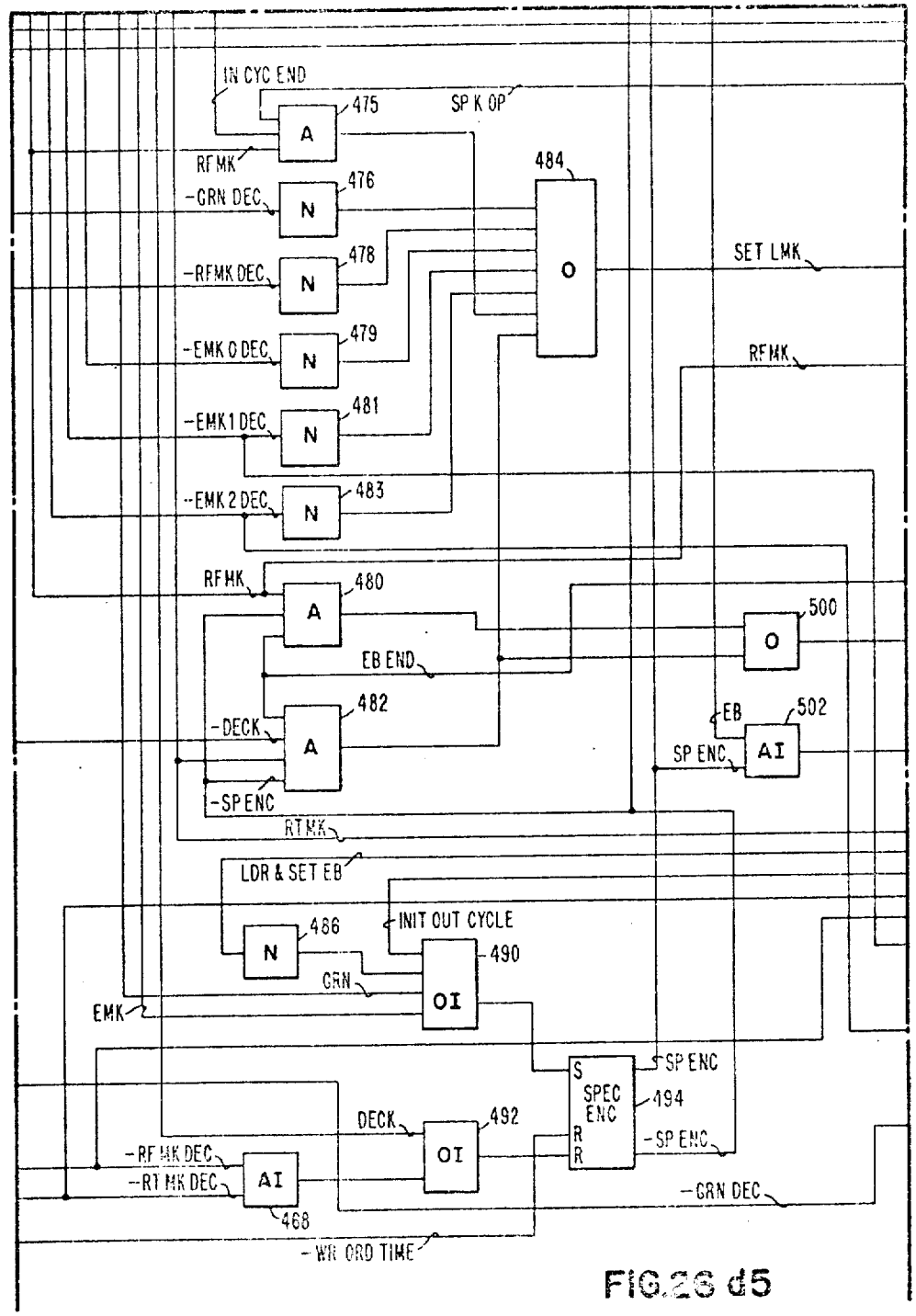
FIG.26 d5

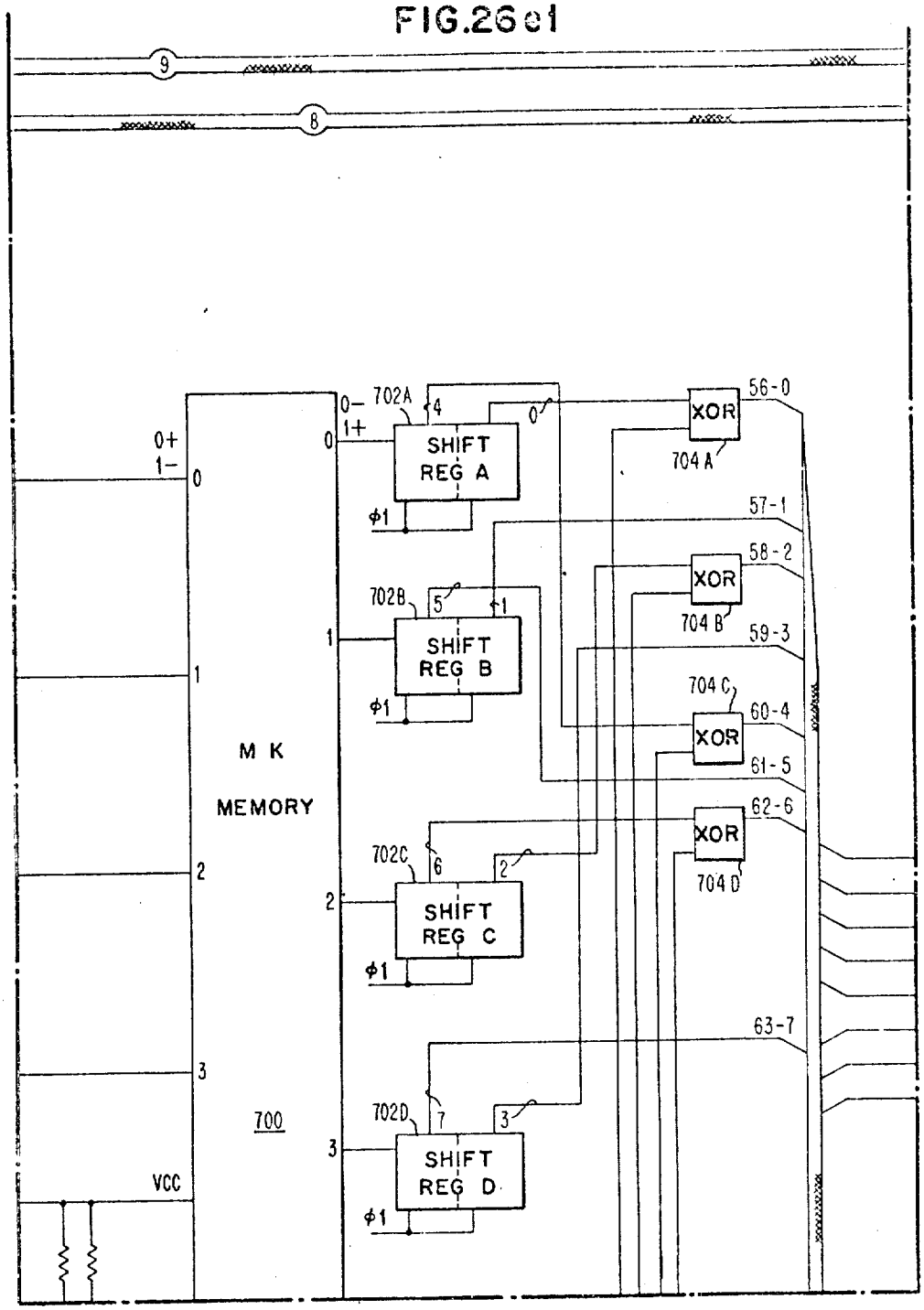
FIG.26e1

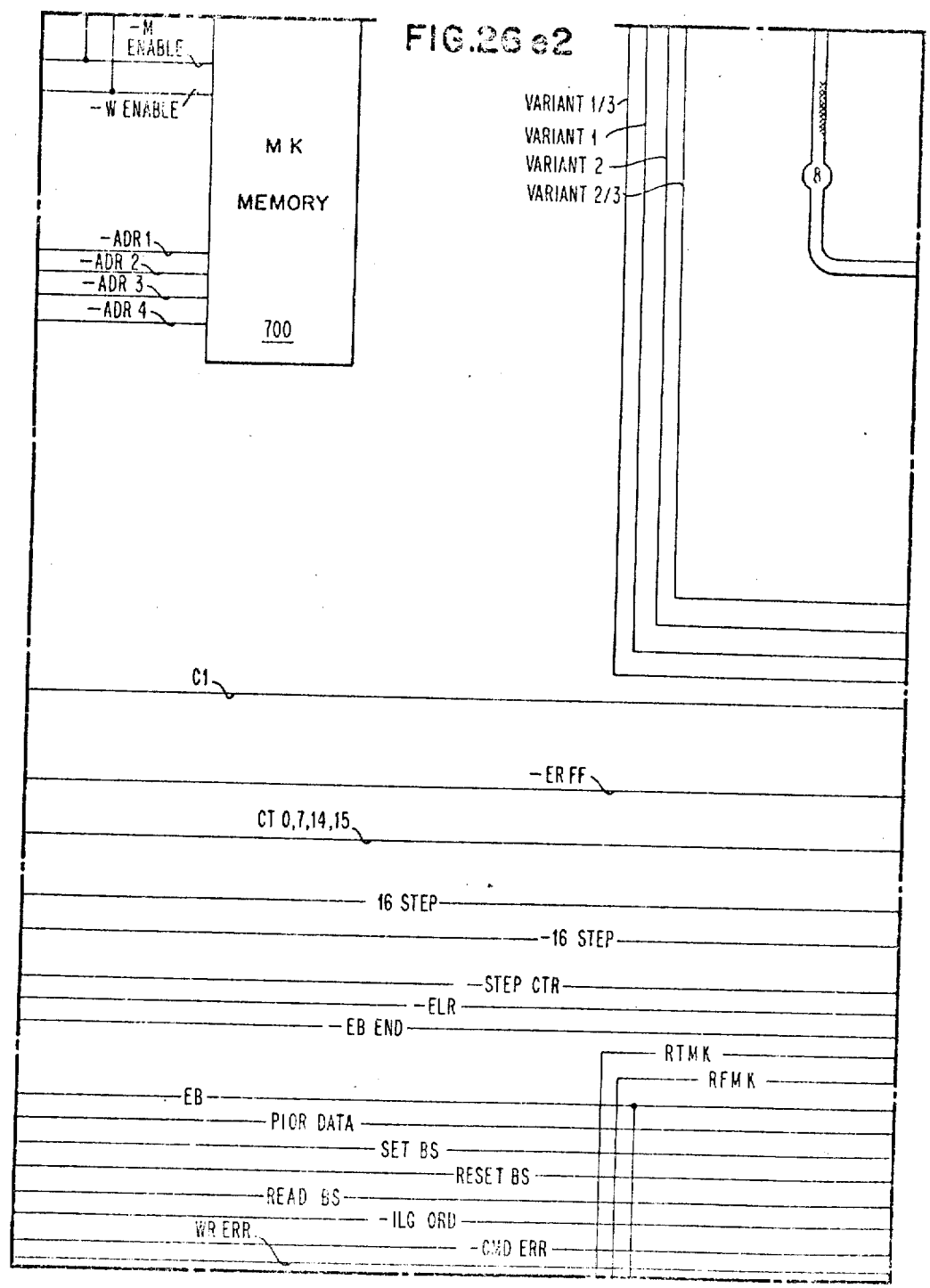

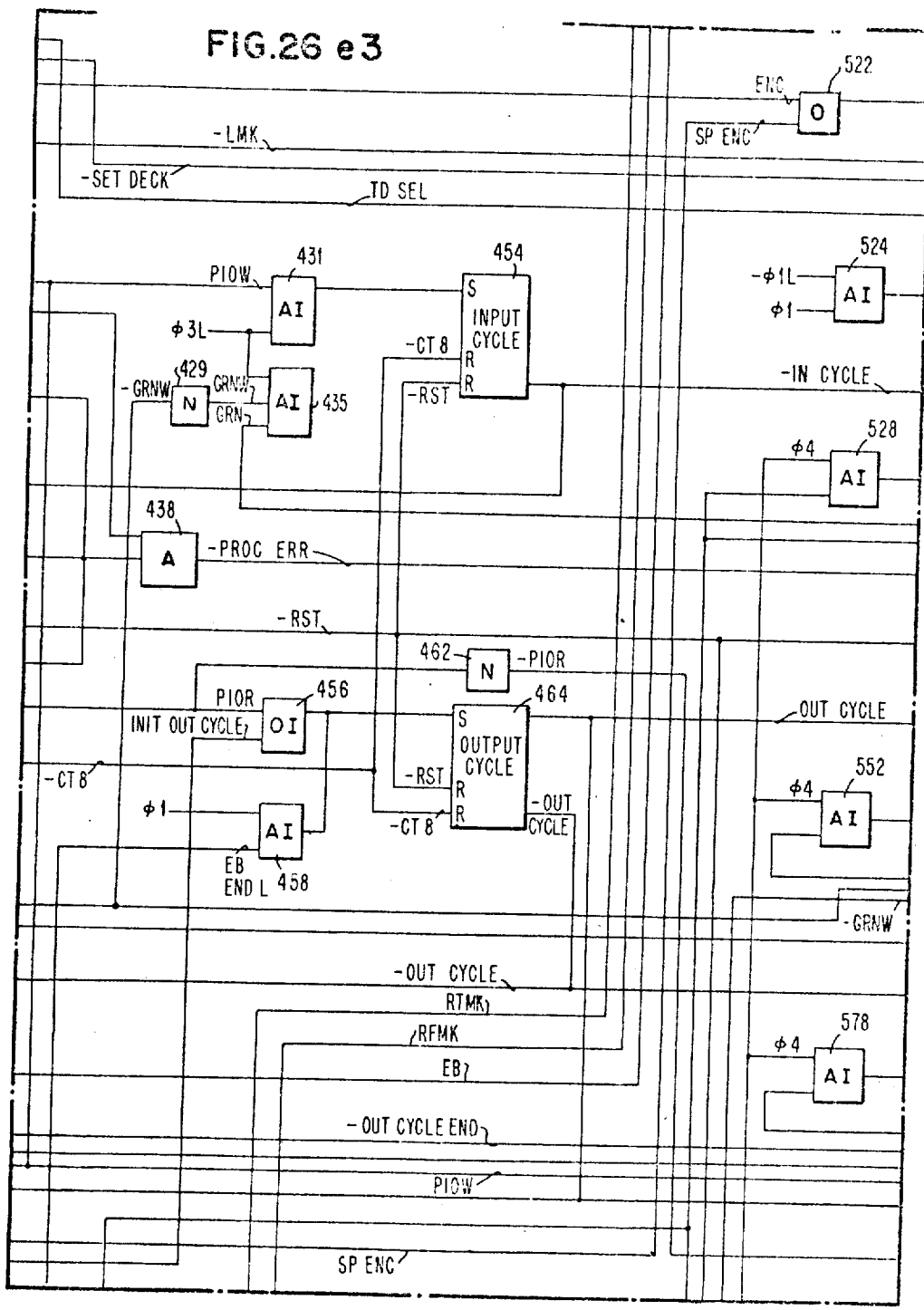

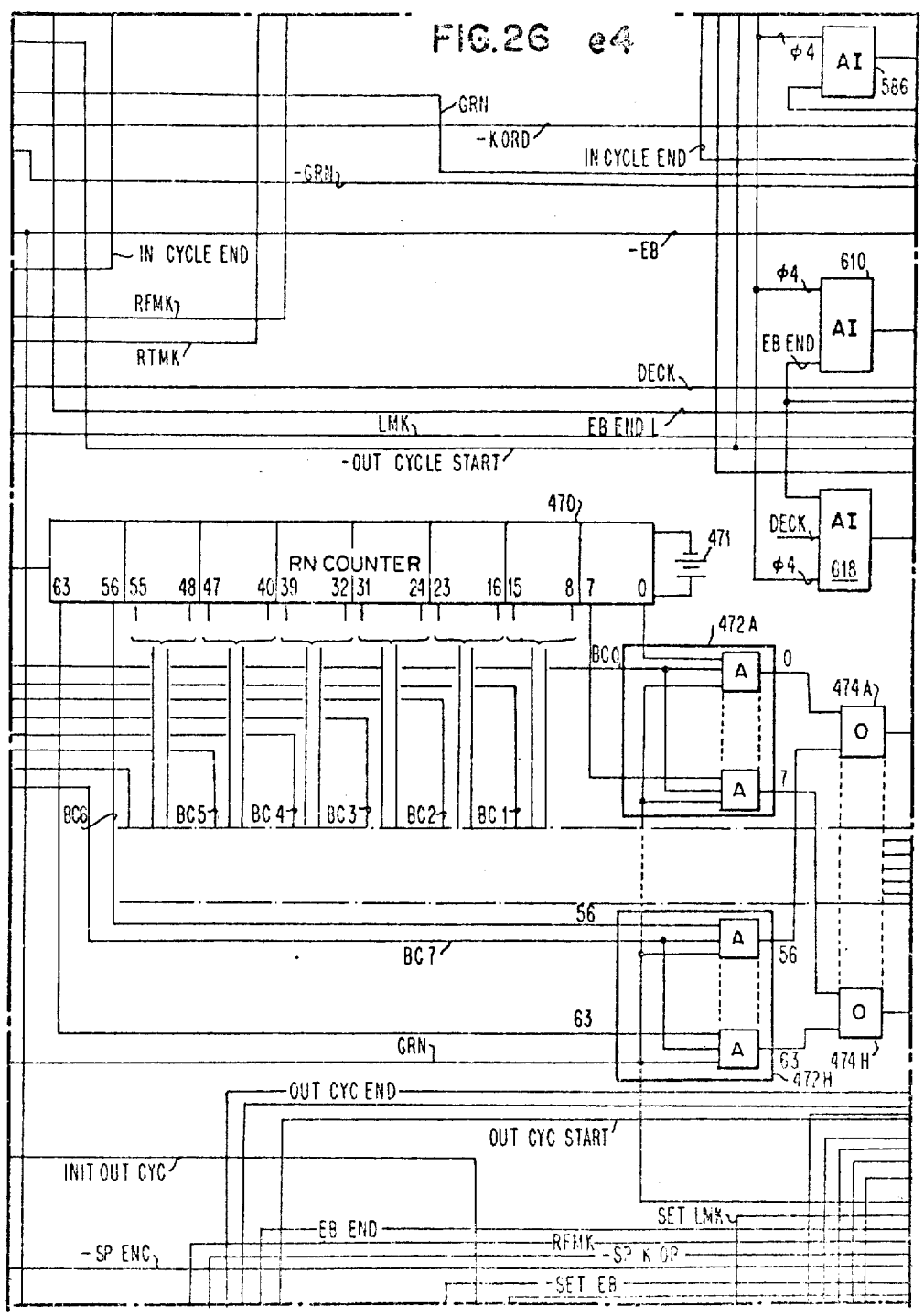

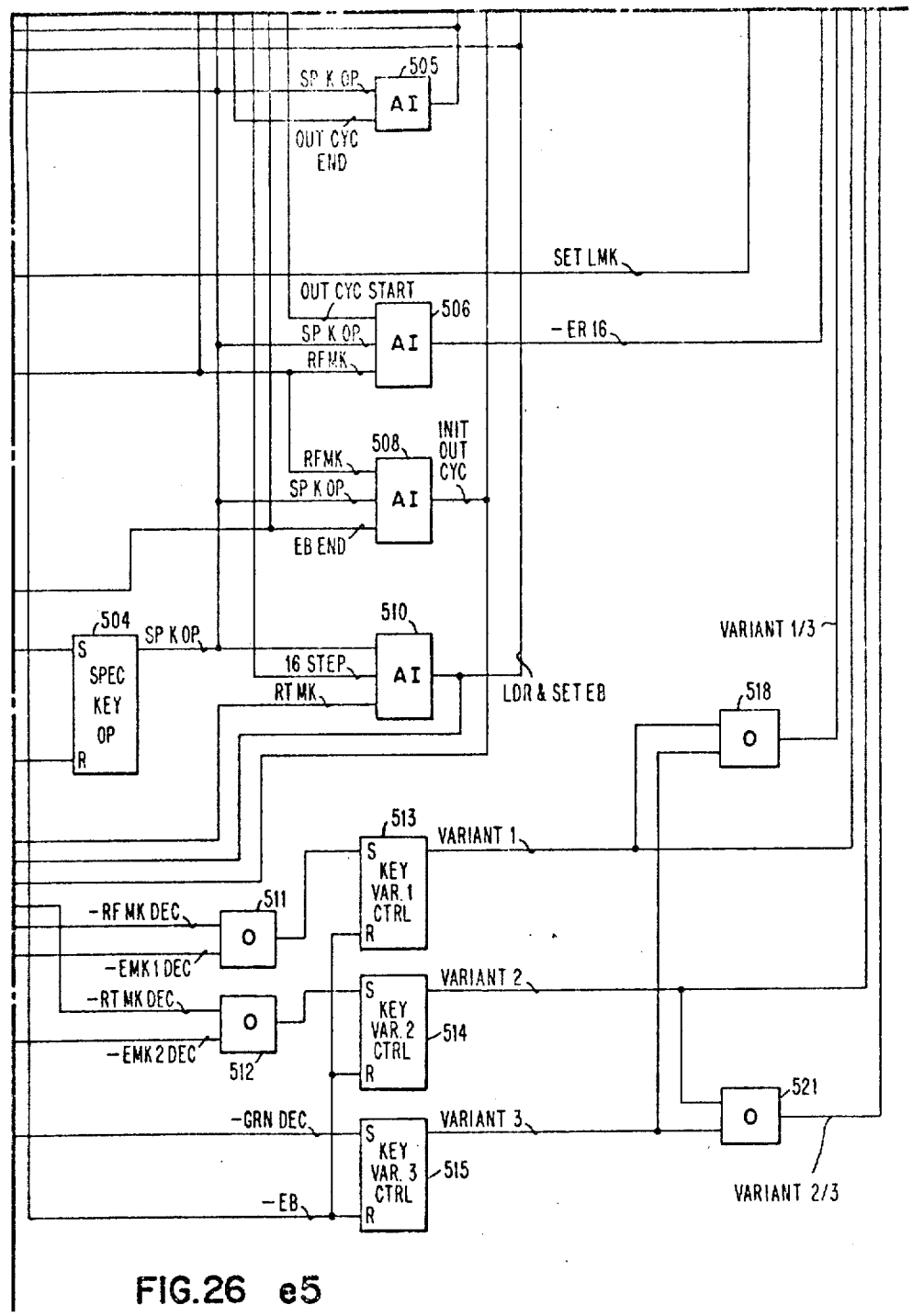
FIG.26 e5

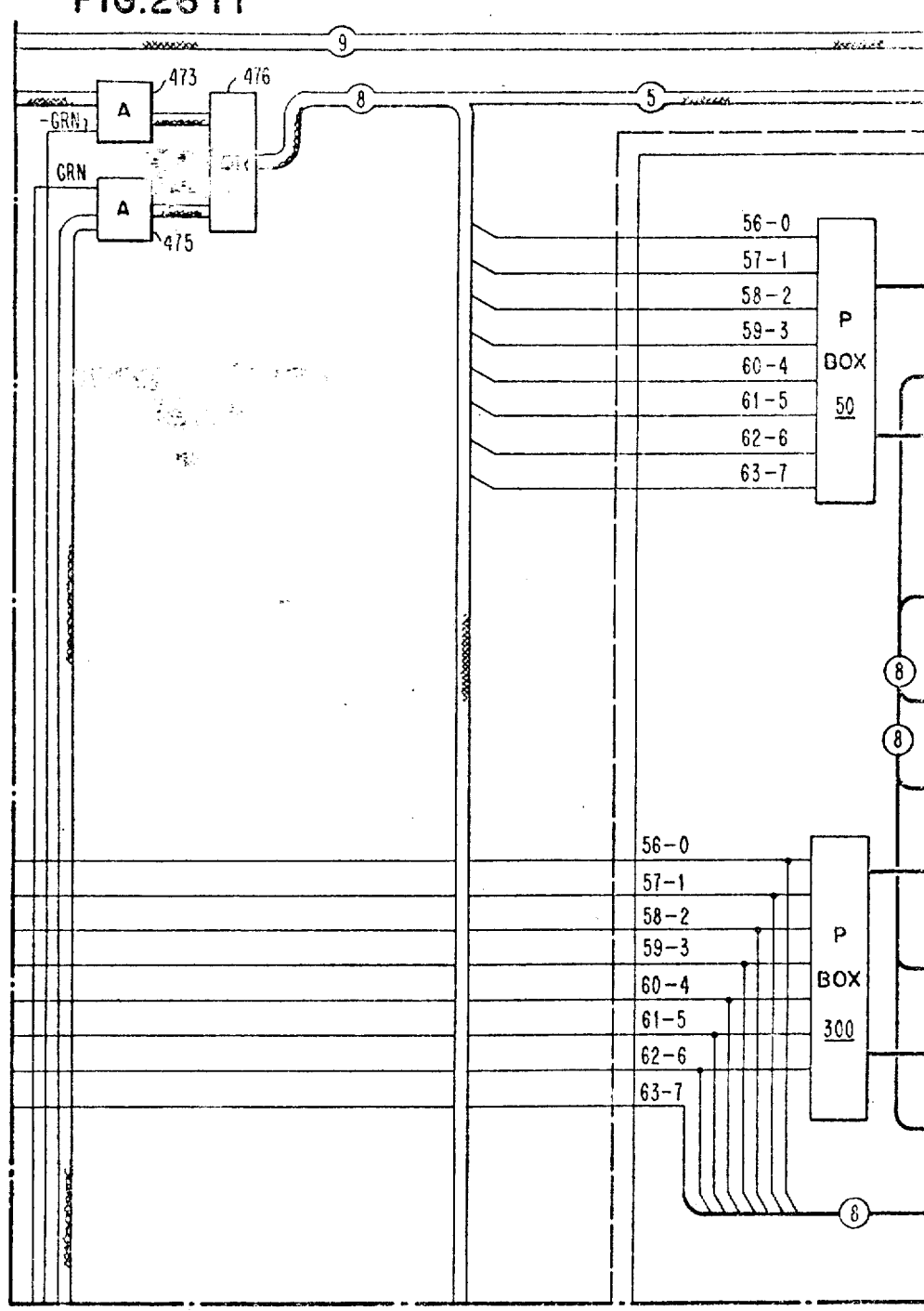
FIG.26 f1

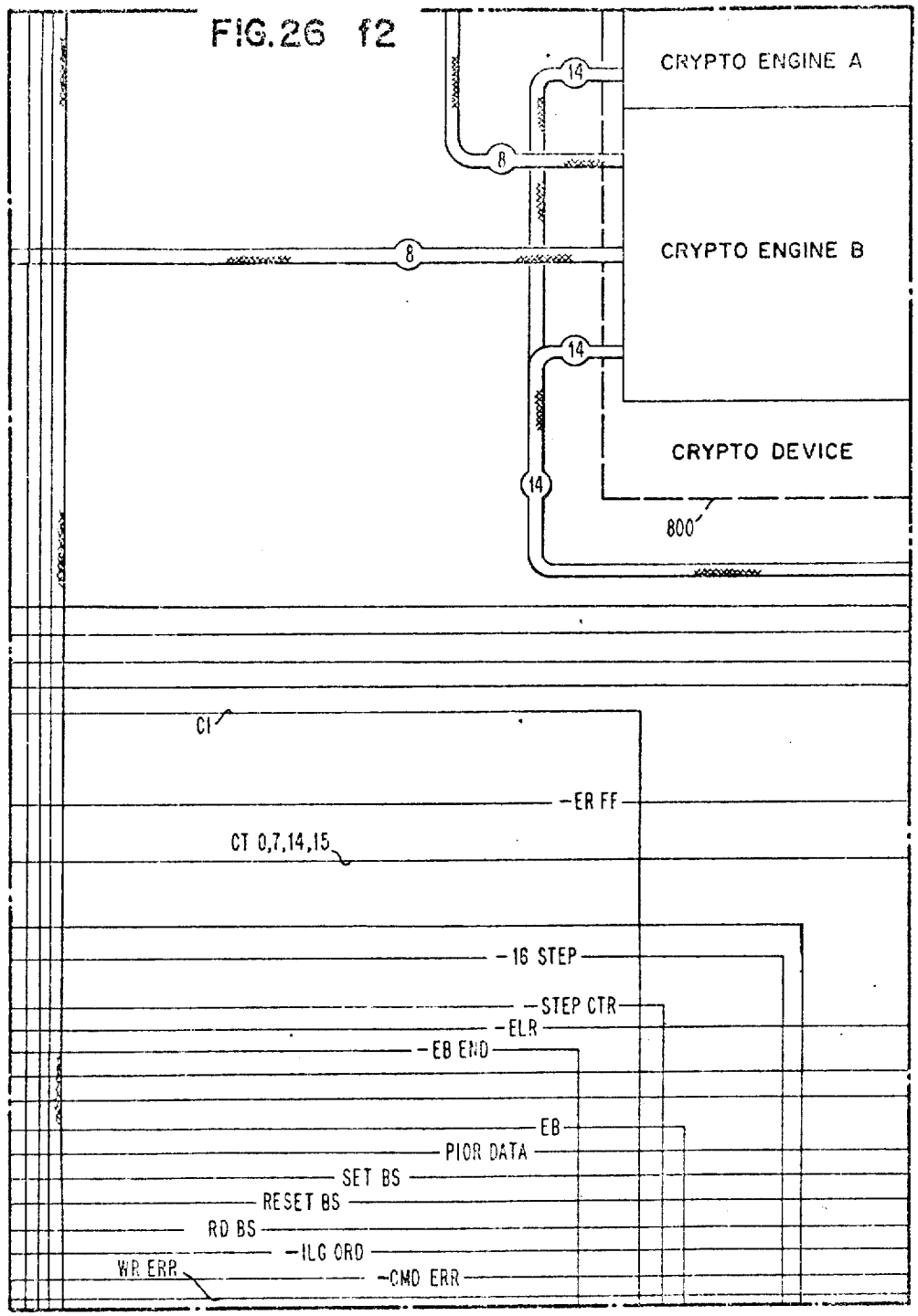
FIG.26 f2

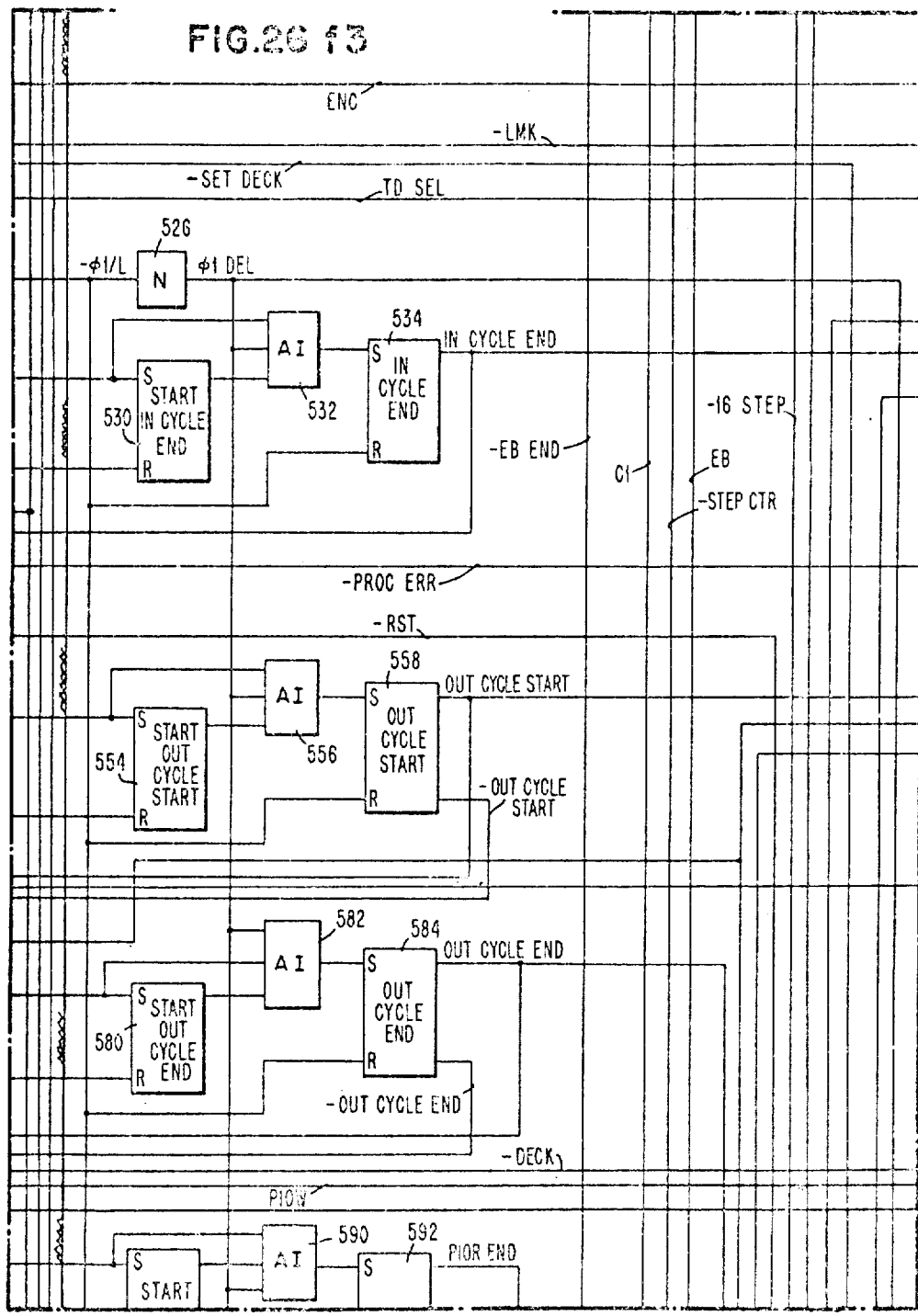

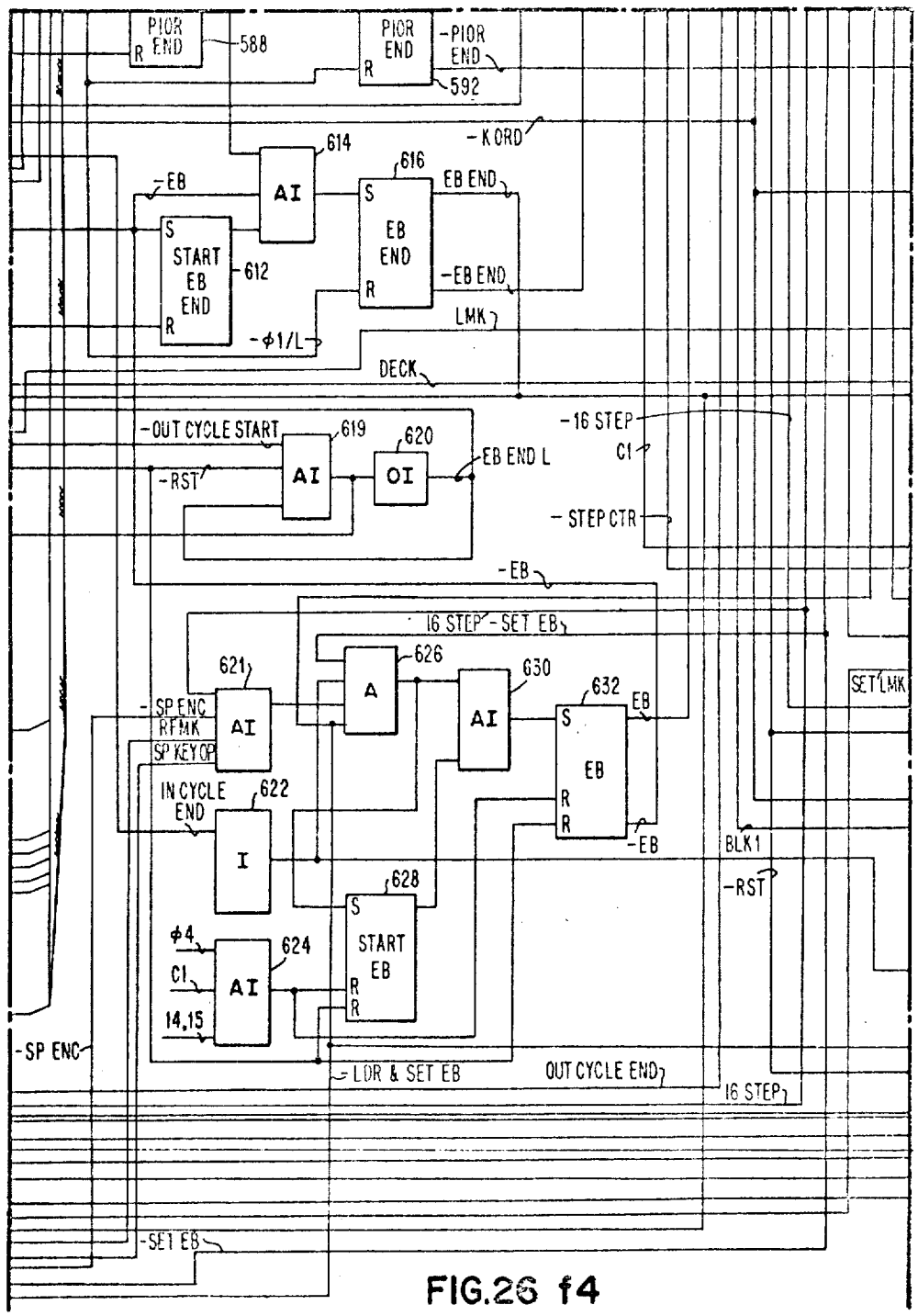
FIG.26 f4

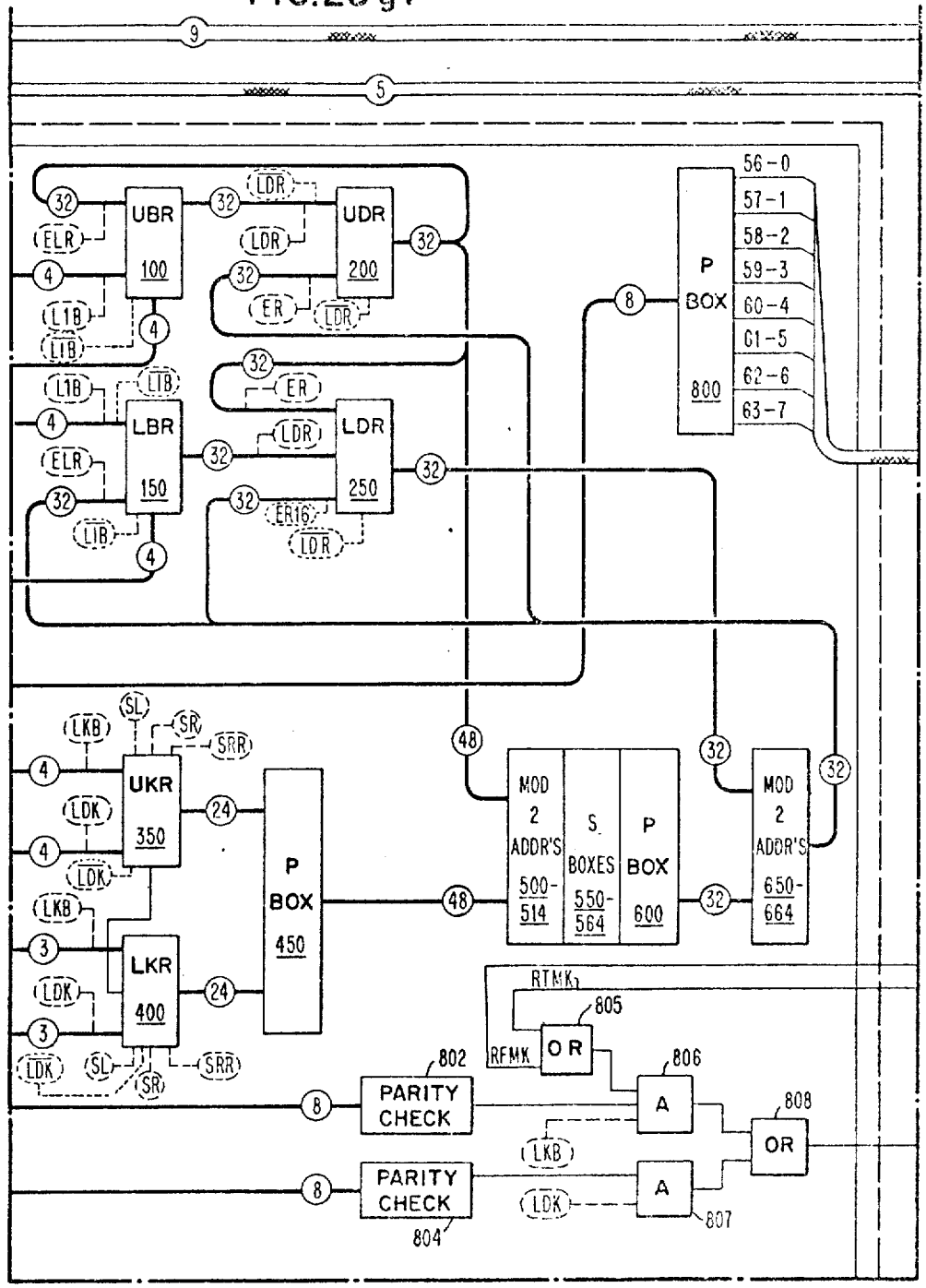
FIG.26g1

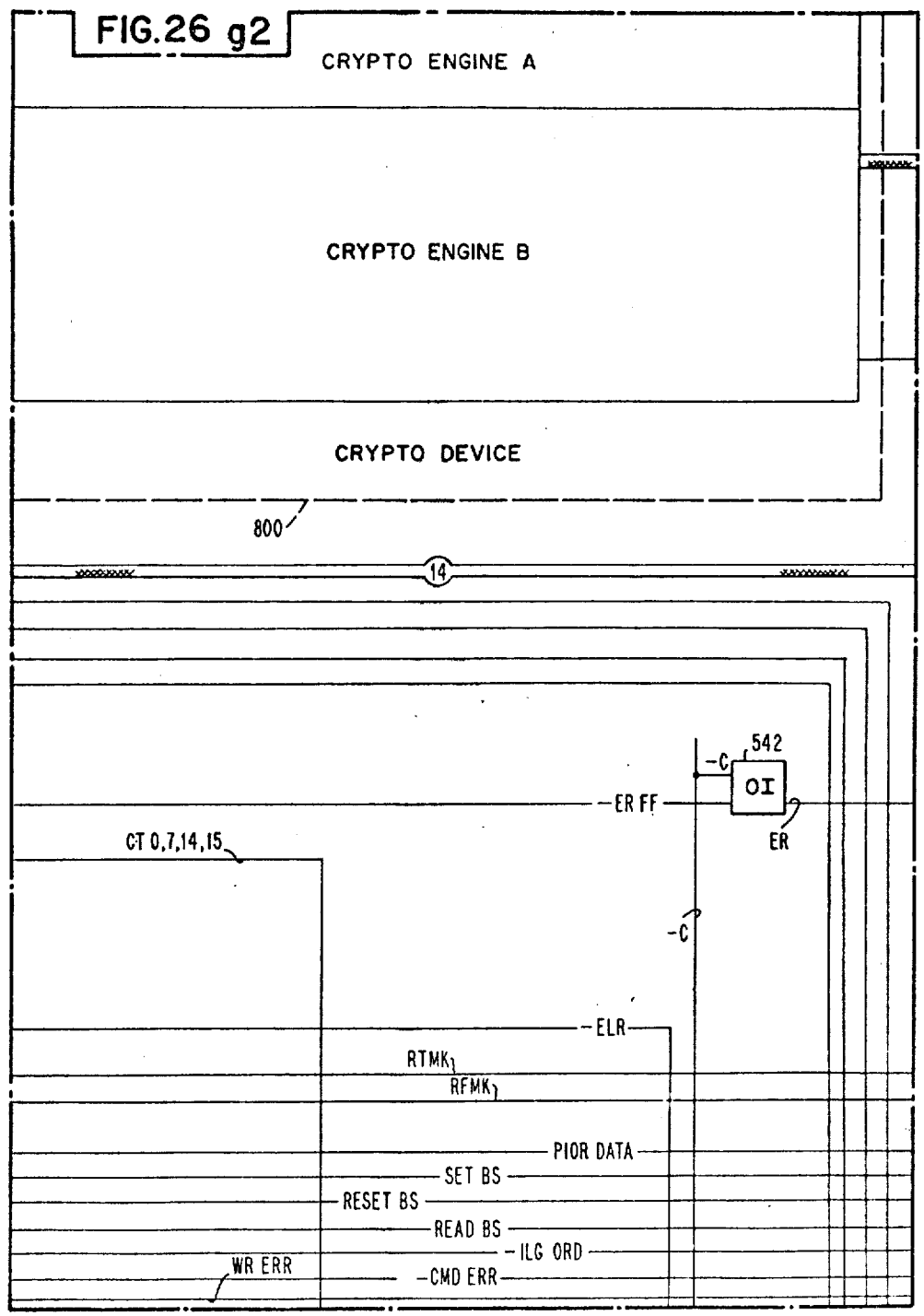

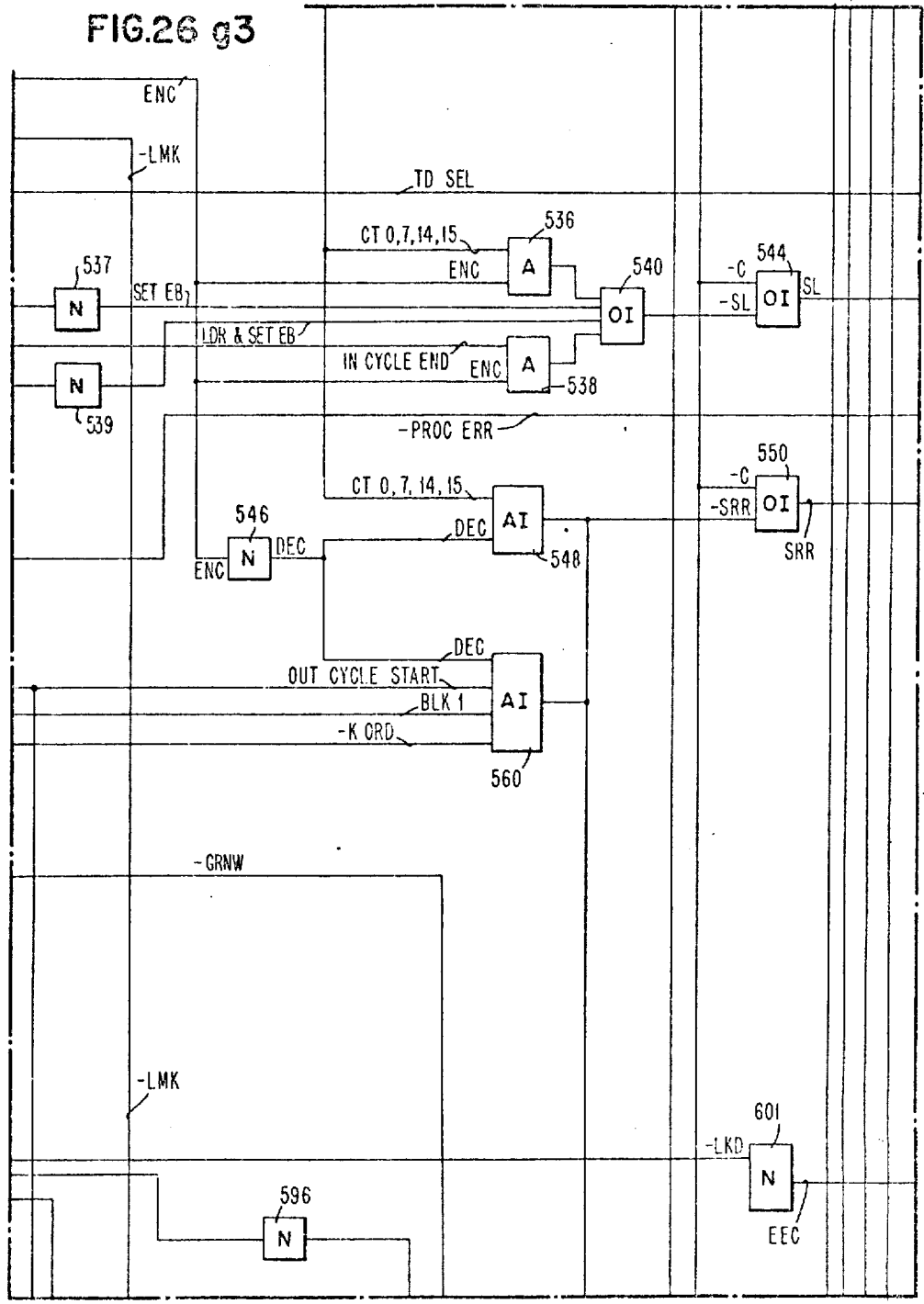

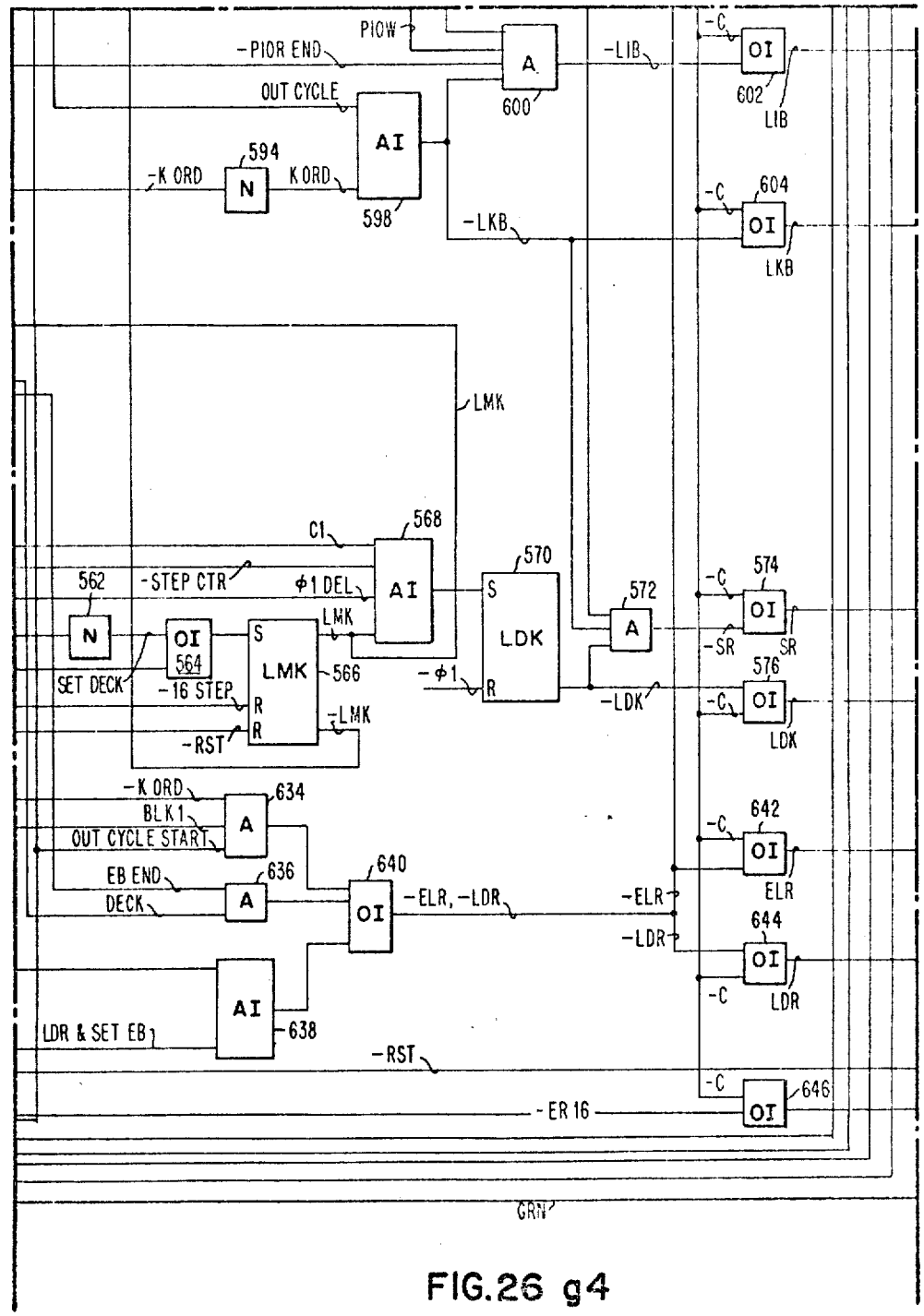
FIG.26 g4

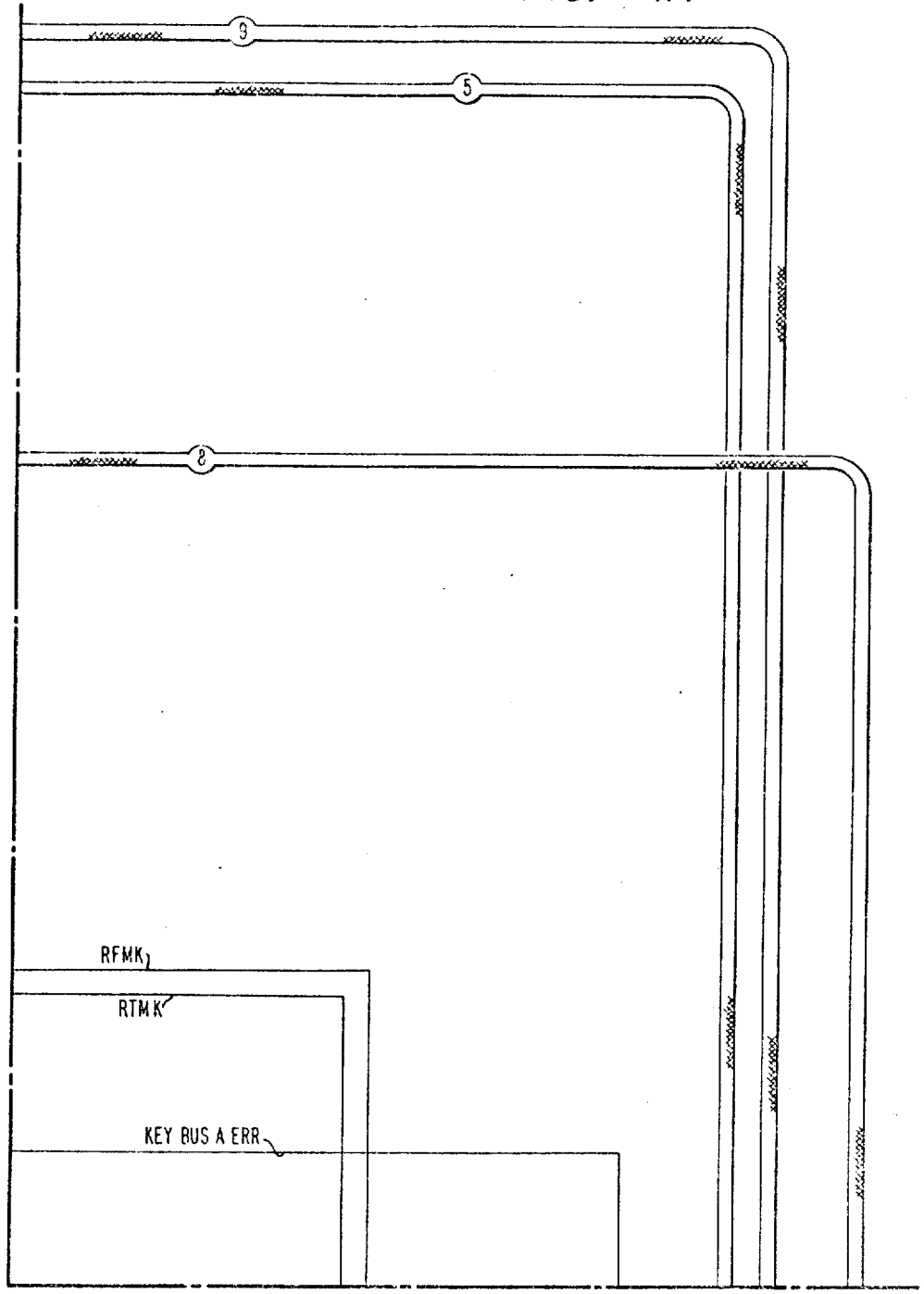
FIG. h1

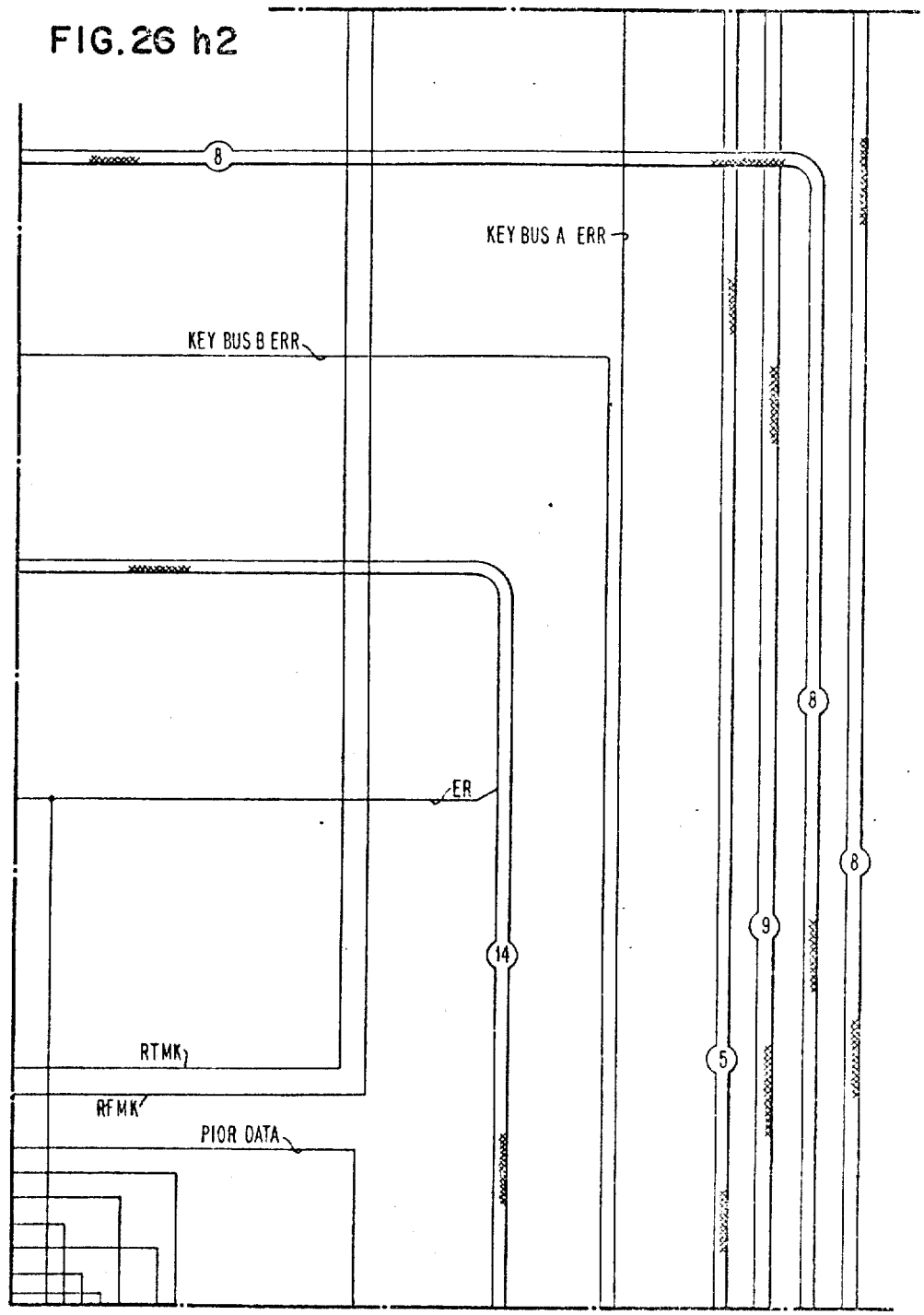
FIG. 26 h2

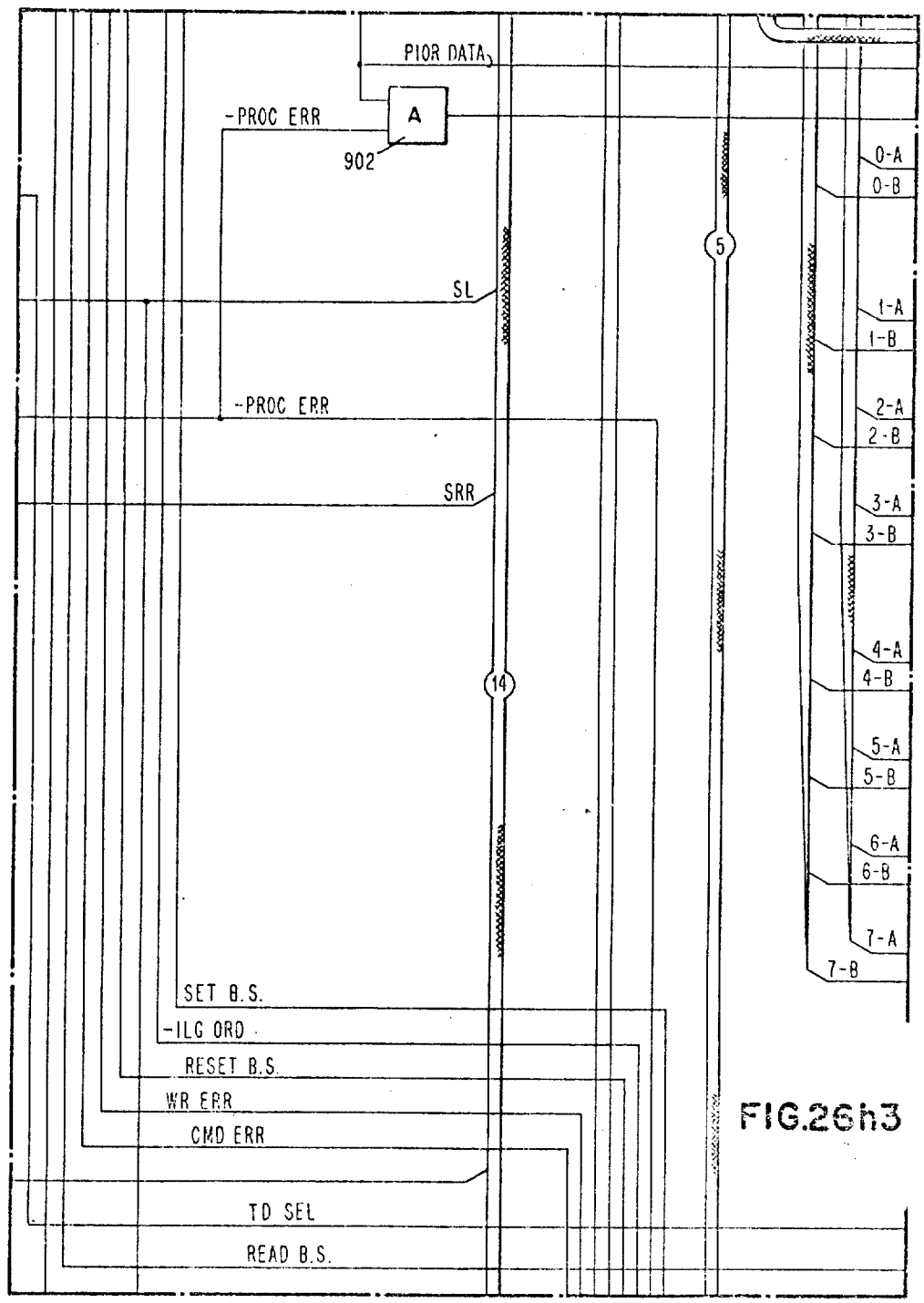
FIG.26h3

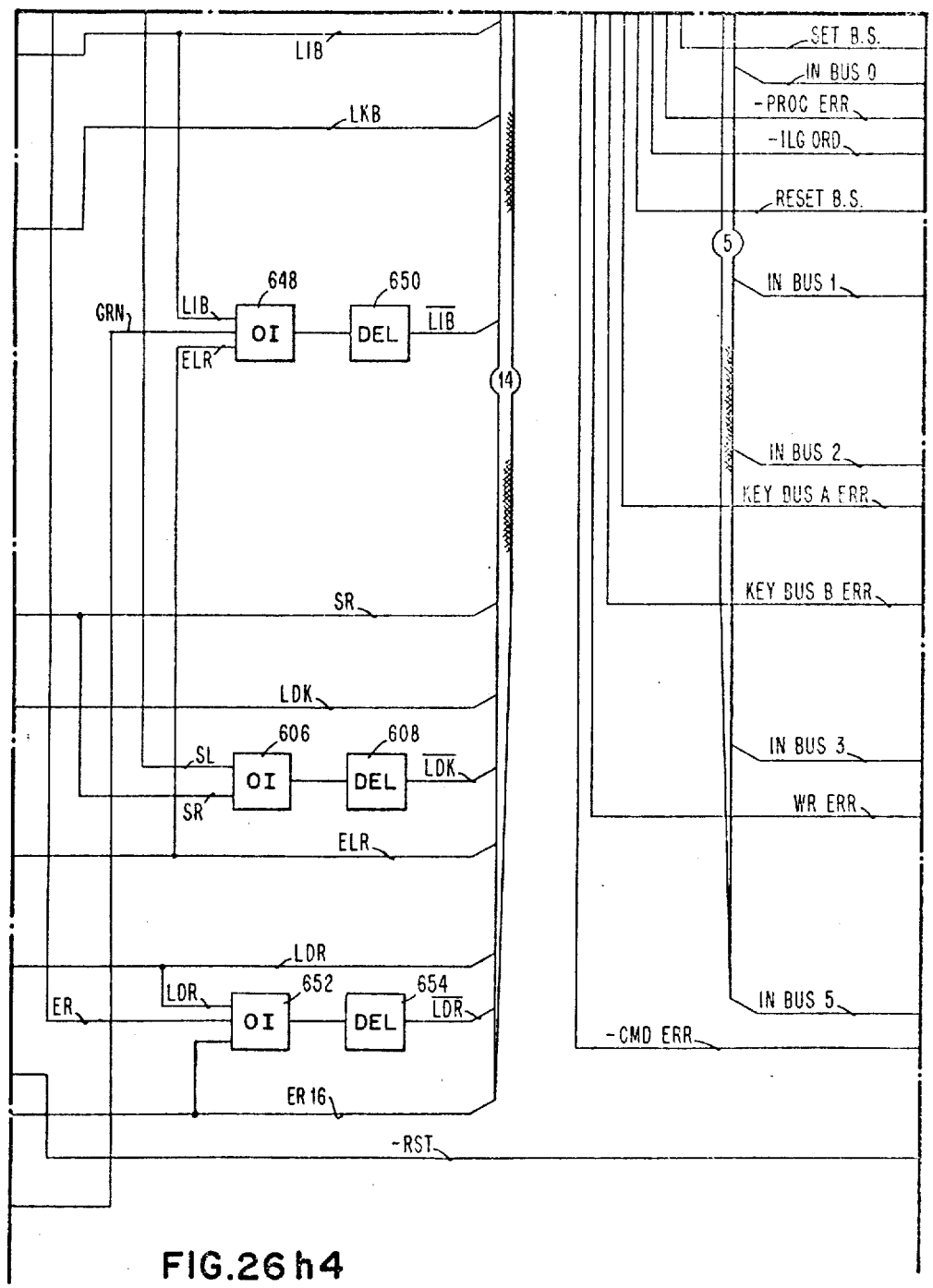
FIG. 26 h4

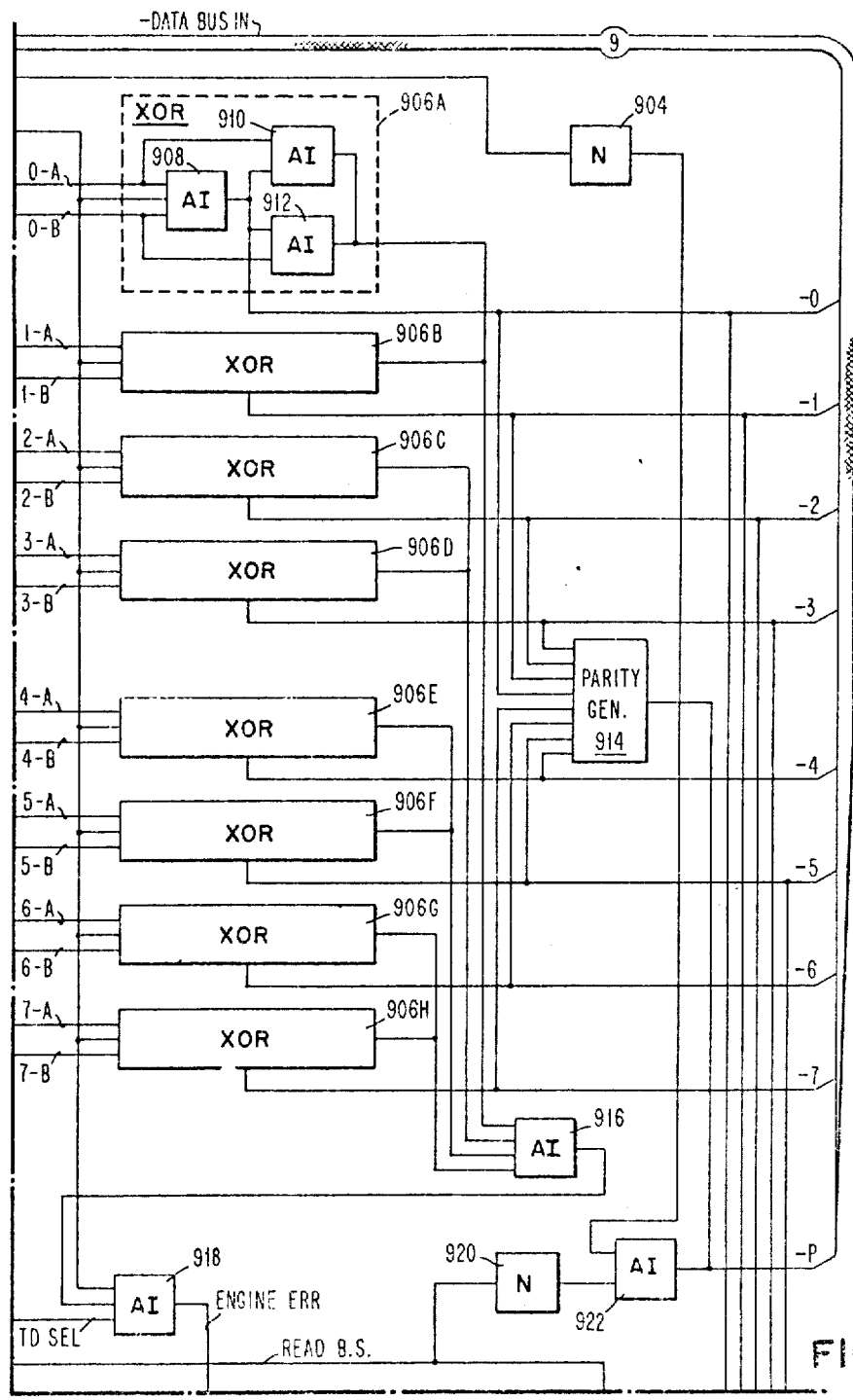
FIG.2a1

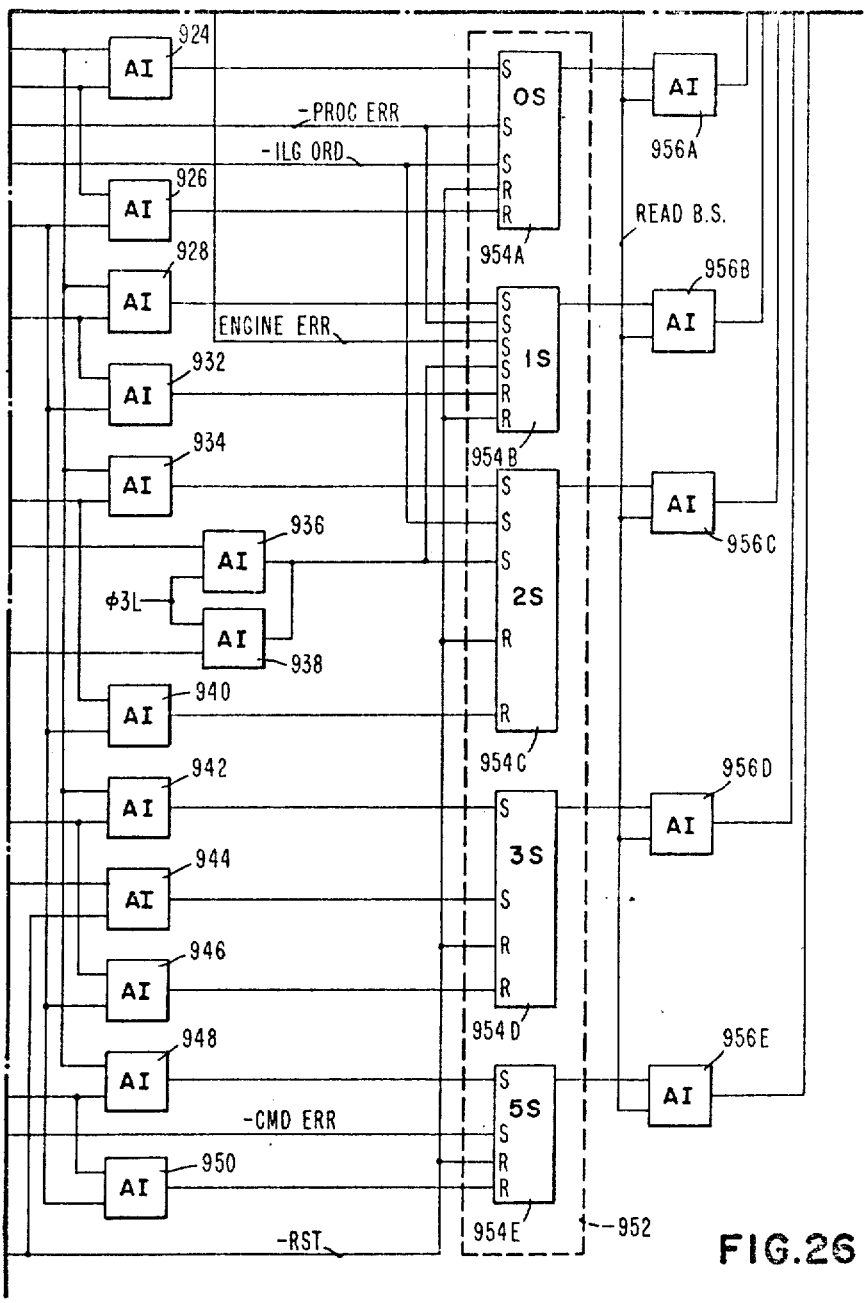
FIG.2612